(12) United States Patent
Baby et al.

(10) Patent No.: US 12,481,316 B2
(45) Date of Patent: Nov. 25, 2025

(54) FOLDABLE APPARATUS, FOLDABLE SUBSTRATE, AND METHODS OF MAKING

(71) Applicant: CORNING INCORPORATED, Corning, NY (US)

(72) Inventors: Shinu Baby, Painted Post, NY (US); Naigeng Chen, San Jose, CA (US); Timothy Michael Gross, Painted Post, NY (US); Jason Thomas Harris, Horseheads, NY (US); Dhananjay Joshi, Painted Post, NY (US); Yousef Kayed Qaroush, Painted Post, NY (US); Arlin Lee Weikel, Mansfield, PA (US); Tingge Xu, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 478 days.

(21) Appl. No.: 17/638,254

(22) PCT Filed: Aug. 28, 2020

(86) PCT No.: PCT/US2020/048507
§ 371 (c)(1),
(2) Date: Feb. 25, 2022

(87) PCT Pub. No.: WO2021/041882
PCT Pub. Date: Mar. 4, 2021

(65) Prior Publication Data
US 2022/0291712 A1    Sep. 15, 2022

Related U.S. Application Data

(60) Provisional application No. 63/022,748, filed on May 11, 2020, provisional application No. 62/914,720, (Continued)

(51) Int. Cl.
*G06F 1/16* (2006.01)
*G09F 9/30* (2006.01)

(52) U.S. Cl.
CPC .......... *G06F 1/1616* (2013.01); *G06F 1/1656* (2013.01); *G09F 9/301* (2013.01)

(58) Field of Classification Search
CPC ....... G09F 9/301; G06F 1/1616; G06F 1/1656
See application file for complete search history.

(56) References Cited

U.S. PATENT DOCUMENTS 5,219,640 A    6/1993  Gazit et al.
8,593,372 B2   11/2013 Kee et al.
(Continued)

FOREIGN PATENT DOCUMENTS

CN    103058506 A    4/2013
CN    106348579 A    1/2017
(Continued)

OTHER PUBLICATIONS

Taiwanese Patent Application No. 109129549, Office Action dated Feb. 21, 2024, 13 pages (English Translation only), Taiwanese Patent Office.
(Continued)

*Primary Examiner* — Catherine A. Simone
(74) *Attorney, Agent, or Firm* — Yiqun Zhao

(57) ABSTRACT

Foldable apparatus comprise a foldable substrate foldable about an axis and a substrate thickness defined between a first major surface and a second major surface. The foldable substrate comprises a central portion positioned between a first portion and a second portion. The first portion comprising a substrate thickness. The central portion comprises a central thickness that is less than the substrate thickness. In some embodiments, a width of central portion is about 45 millimeters or less. Methods of making a foldable apparatus (Continued)

comprise forming a recess in a first major surface of the foldable substrate. In some embodiments, methods comprise chemically strengthening the foldable substrate.

14 Claims, 23 Drawing Sheets

Related U.S. Application Data filed on Oct. 14, 2019, provisional application No. 62/893,291, filed on Aug. 29, 2019.

(56) References Cited

U.S. PATENT DOCUMENTS

| | | | |
|---|---|---|---|
| 8,776,547 B2 | 7/2014 | Abramov et al. |
| 8,854,623 B2 | 10/2014 | Fontaine et al. |
| 8,982,545 B2 | 3/2015 | Kim et al. |
| 9,090,501 B2 | 7/2015 | Okahata et al. |
| 9,187,365 B2 | 11/2015 | Allan |
| 9,302,938 B2 | 4/2016 | Kreski |
| 9,321,677 B2 | 4/2016 | Chang et al. |
| 9,321,678 B2 | 4/2016 | Chang et al. |
| 9,321,679 B2 | 4/2016 | Chang et al. |
| 9,354,476 B2 | 5/2016 | Han et al. |
| 9,515,099 B2 | 12/2016 | Kwon et al. |
| 9,516,743 B2 | 12/2016 | Kim et al. |
| 9,557,773 B2 | 1/2017 | Chang et al. |
| 9,578,150 B2 | 2/2017 | Xie et al. |
| 9,604,877 B2 | 3/2017 | Veerasamy et al. |
| 9,725,359 B2 | 8/2017 | Weber |
| 9,773,853 B2 | 9/2017 | Tao et al. |
| 9,779,190 B2 | 10/2017 | Ahmed et al. |
| 9,796,621 B2 | 10/2017 | Varshneya et al. |
| 9,898,046 B2 | 2/2018 | Chang et al. |
| 9,919,949 B2 | 3/2018 | Kawamoto et al. |
| 10,020,462 B1 | 7/2018 | Al et al. |
| 10,071,933 B2 | 9/2018 | Wang et al. |
| 10,104,787 B2 | 10/2018 | Rothkopf et al. |
| 10,268,238 B2 | 4/2019 | Hamburgen et al. |
| 10,268,242 B2 | 4/2019 | Seo et al. |
| 10,303,218 B2 | 5/2019 | Jones et al. |
| 10,345,856 B2 | 7/2019 | Song |
| 10,462,273 B2 | 10/2019 | Zhou et al. |
| 2011/0151282 A1 | 6/2011 | Nagashima |
| 2012/0236526 A1 | 9/2012 | Weber |
| 2014/0178663 A1 | 6/2014 | Varshneya et al. |
| 2014/0178689 A1 | 6/2014 | Kreski |
| 2015/0110990 A1 | 4/2015 | Chou et al. |
| 2015/0210589 A1 | 7/2015 | Chang et al. |
| 2015/0274585 A1 | 10/2015 | Rogers et al. |
| 2016/0031187 A1 | 2/2016 | Zhang et al. |
| 2016/0224822 A1 | 8/2016 | Hasegawa et al. |
| 2016/0326050 A1 | 11/2016 | Lee et al. |
| 2016/0357294 A1 | 12/2016 | Ozeki et al. |
| 2017/0015584 A1 | 1/2017 | Krzyzak et al. |
| 2017/0174566 A1 | 6/2017 | Kreski |
| 2017/0247291 A1 | 8/2017 | Hatano et al. |
| 2017/0311466 A1 | 10/2017 | Memering et al. |
| 2017/0334769 A1 | 11/2017 | Luzzato et al. |
| 2017/0334770 A1 | 11/2017 | Luzzato et al. |
| 2017/0334774 A1 | 11/2017 | Weber |
| 2018/0009697 A1 | 1/2018 | He et al. |
| 2018/0009706 A1 | 1/2018 | Luo et al. |
| 2018/0113490 A1 | 4/2018 | Chang et al. |
| 2018/0194678 A1 | 7/2018 | Scheyvaerts et al. |
| 2018/0217639 A1 | 8/2018 | Jones et al. |
| 2019/0011954 A1 | 1/2019 | Chu et al. |
| 2019/0022980 A1 | 1/2019 | Chu et al. |
| 2019/0023611 A1 | 1/2019 | Luzzato et al. |
| 2019/0045038 A1 | 2/2019 | Zhou et al. |
| 2019/0050027 A1 | 2/2019 | Chang et al. |
| 2019/0100457 A1 | 4/2019 | Luzzato et al. |
| 2019/0265756 A1 | 8/2019 | Jones et al. |
| 2019/0330103 A1 | 10/2019 | Ozeki et al. |
| 2020/0026327 A1 | 1/2020 | Hendren et al. |
| 2020/0287156 A1 | 9/2020 | Baby et al. |
| 2020/0292731 A1 | 9/2020 | Park et al. |
| 2020/0324521 A1 | 10/2020 | Park et al. |
| 2020/0329575 A1 | 10/2020 | Park et al. |
| 2020/0342789 A1 | 10/2020 | Park et al. |
| 2020/0392038 A1 | 12/2020 | Park et al. |
| 2021/0107829 A1 | 4/2021 | Chen et al. |
| 2021/0178730 A1 | 6/2021 | Baby et al. |
| 2021/0230057 A1 | 7/2021 | Kuang et al. |

FOREIGN PATENT DOCUMENTS

| | | |
|---|---|---|
| CN | 106660316 A | 5/2017 |
| CN | 107428586 A | 12/2017 |
| CN | 107810110 A | 3/2018 |
| CN | 108298827 A | 7/2018 |
| DE | 102015213075 A1 | 1/2017 |
| JP | 5516442 B2 | 6/2014 |
| JP | 5655980 B2 | 1/2015 |
| JP | 2015-113261 A | 6/2015 |
| JP | 2015-137224 A | 7/2015 |
| JP | 5834937 B2 | 12/2015 |
| JP | 2016-003158 A | 1/2016 |
| JP | 2016-169143 A | 9/2016 |
| JP | 2017-001902 A | 1/2017 |
| JP | 2017-030997 A | 2/2017 |
| JP | 2017-048090 A | 3/2017 |
| JP | 6149733 B2 | 6/2017 |
| JP | 2017-160111 A | 9/2017 |
| JP | 2018-002552 A | 1/2018 |
| JP | 2018-052803 A | 4/2018 |
| JP | 2018-168030 A | 11/2018 |
| JP | 2019-001691 A | 1/2019 |
| KR | 10-2068685 B1 | 1/2020 |
| KR | 10-2068729 B1 | 1/2020 |
| KR | 10-2069040 B1 | 1/2020 |
| TW | 201922662 A | 6/2019 |
| TW | 201924105 A | 6/2019 |
| TW | 201927710 A | 7/2019 |
| WO | 2012/015960 A2 | 2/2012 |
| WO | 2012/073603 A1 | 6/2012 |
| WO | 2012/125857 A1 | 9/2012 |
| WO | 2013/161651 A1 | 10/2013 |
| WO | 2014/007222 A1 | 1/2014 |
| WO | 2014/045978 A1 | 3/2014 |
| WO | 2014/045979 A1 | 3/2014 |
| WO | 2014/112444 A1 | 7/2014 |
| WO | 2014/139147 A1 | 9/2014 |
| WO | 2014/166082 A1 | 10/2014 |
| WO | 2015/057552 A2 | 4/2015 |
| WO | 2015/080095 A1 | 6/2015 |
| WO | 2015/093284 A1 | 6/2015 |
| WO | 2015/116465 A1 | 8/2015 |
| WO | 2015/116466 A1 | 8/2015 |
| WO | 2015/116649 A1 | 8/2015 |
| WO | 2015/156262 A1 | 10/2015 |
| WO | 2016/118544 A1 | 7/2016 |
| WO | 2016/149860 A1 | 9/2016 |
| WO | 2016/149861 A1 | 9/2016 |
| WO | 2016/152657 A1 | 9/2016 |
| WO | 2016/204087 A1 | 12/2016 |
| WO | 2017/009235 A1 | 1/2017 |
| WO | 2017/026190 A1 | 2/2017 |
| WO | 2017/102345 A1 | 6/2017 |
| WO | 2017/136507 A1 | 8/2017 |
| WO | 2017/154654 A1 | 9/2017 |
| WO | 2017/179360 A1 | 10/2017 |
| WO | 2017/217388 A1 | 12/2017 |
| WO | 2017/221805 A1 | 12/2017 |
| WO | 2018/008359 A1 | 1/2018 |
| WO | 2018/056329 A1 | 3/2018 |
| WO | 2018/066314 A1 | 4/2018 |
| WO | 2018/097096 A1 | 5/2018 |
| WO | 2018/116981 A1 | 6/2018 |
| WO | 2018/135547 A1 | 7/2018 |
| WO | 2018/135548 A1 | 7/2018 |
| WO | 2019/085302 A1 | 5/2019 |
| WO | 2020/219290 A1 | 10/2020 |

(56) References Cited

FOREIGN PATENT DOCUMENTS

| WO | 2021/025981 A1 | 2/2021 |
| WO | 2021/041857 A1 | 3/2021 |
| WO | 2022/046080 A1 | 3/2022 |

OTHER PUBLICATIONS

International Search Report and Written Opinion of the International Searching Authority; PCT/US2020/048469; mailed on Nov. 3, 2020, 11 pages; European Patent Office.
International Search Report and Written Opinion of the International Searching Authority; PCT/US2020/048507; mailed on Nov. 3, 2020, 18 pages; European Patent Office.
Matthewson et al, "Strength Measurement of Optical Fibers by Bending." Jam Ceram Soc 69, 815-821. 1986.

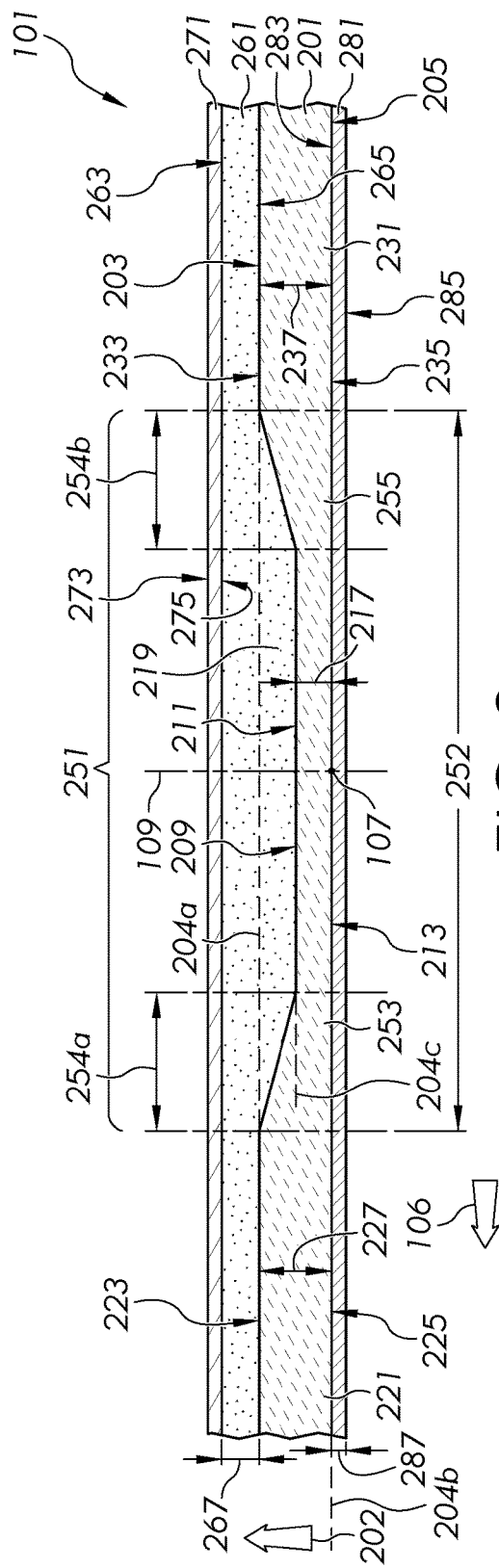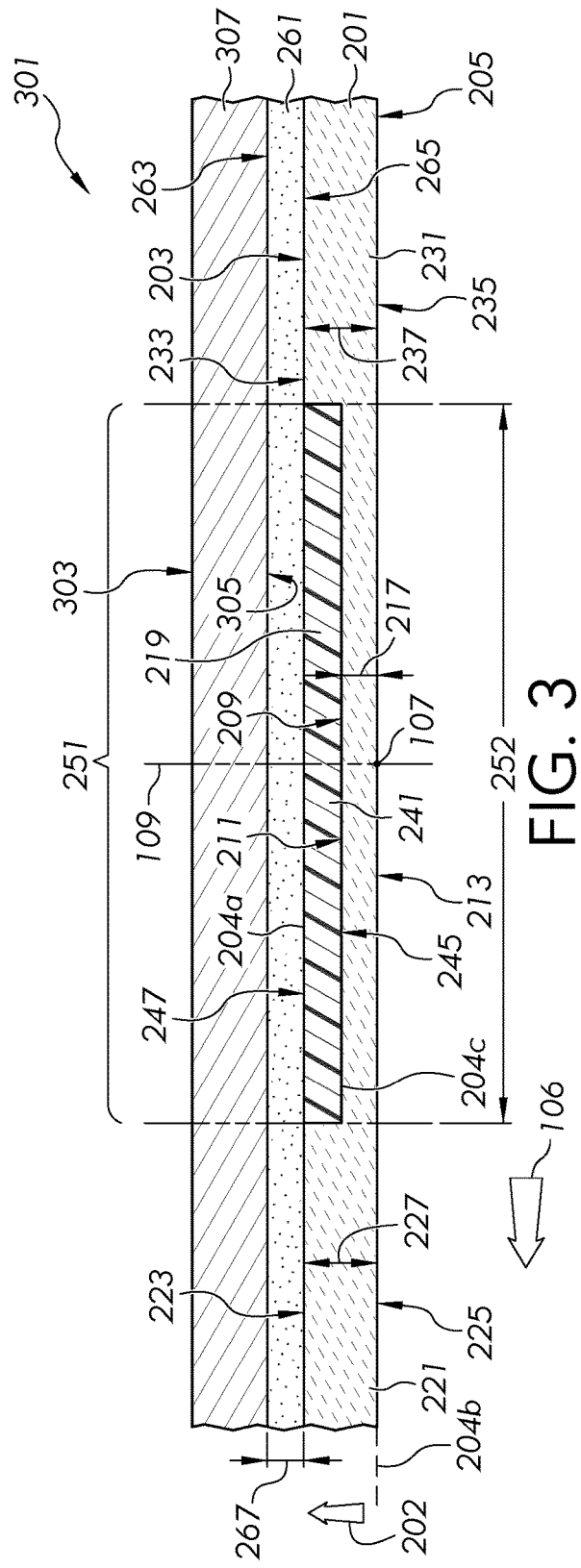

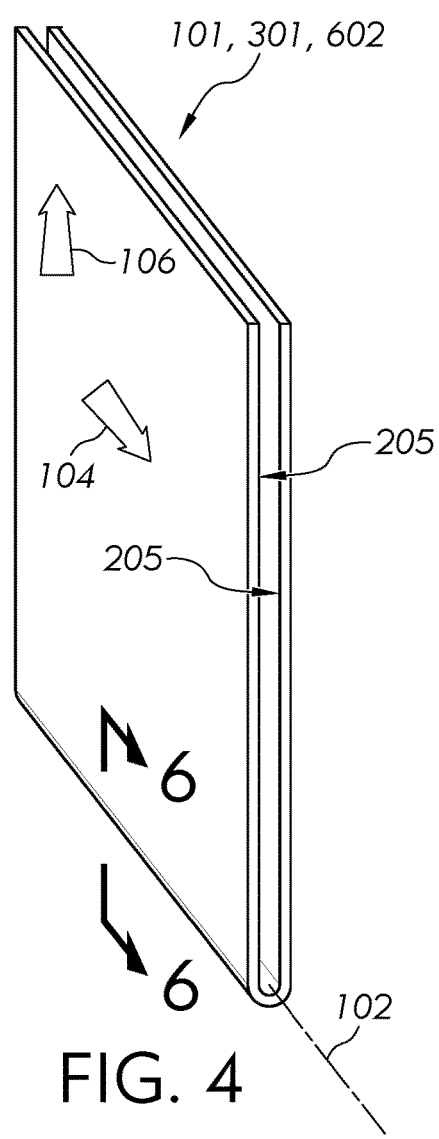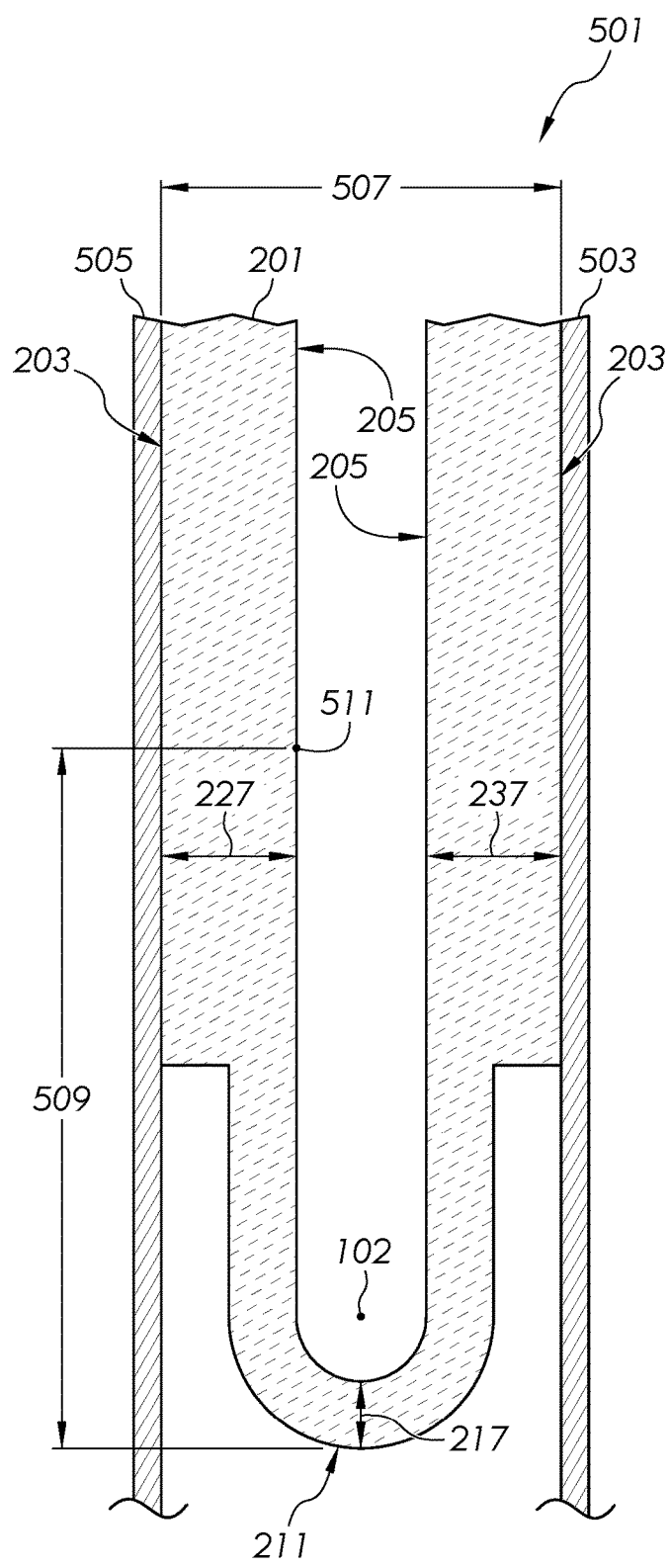
FIG. 4
FIG. 5

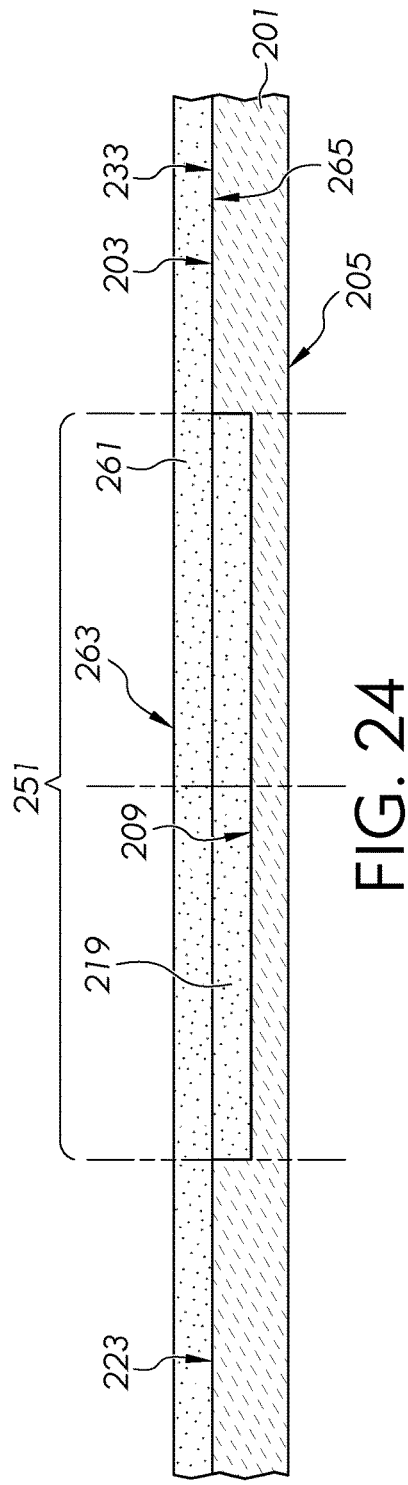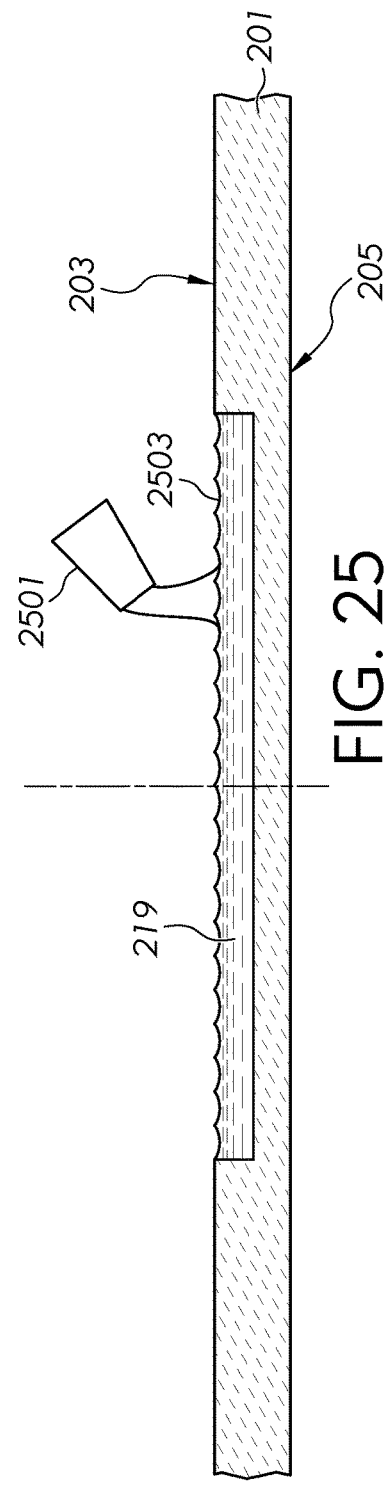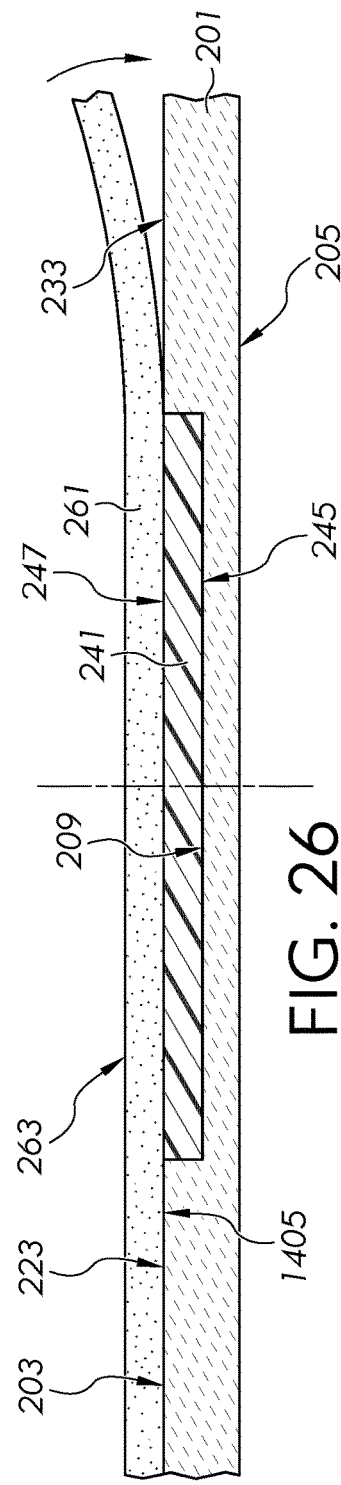

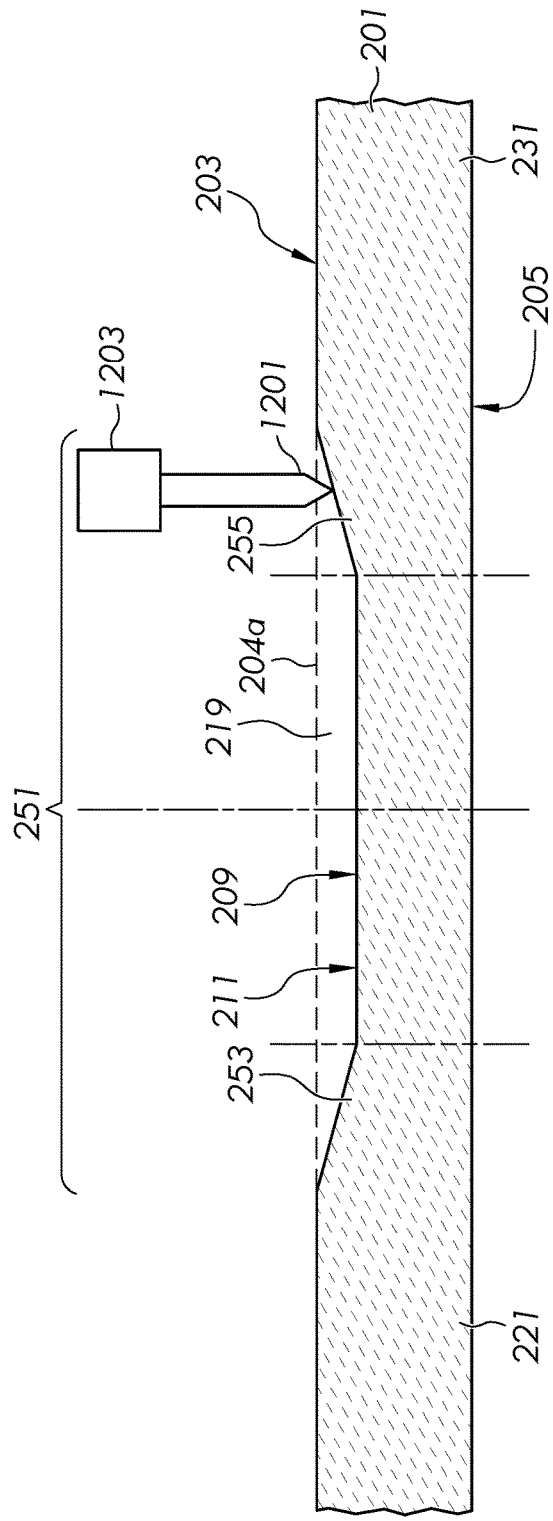
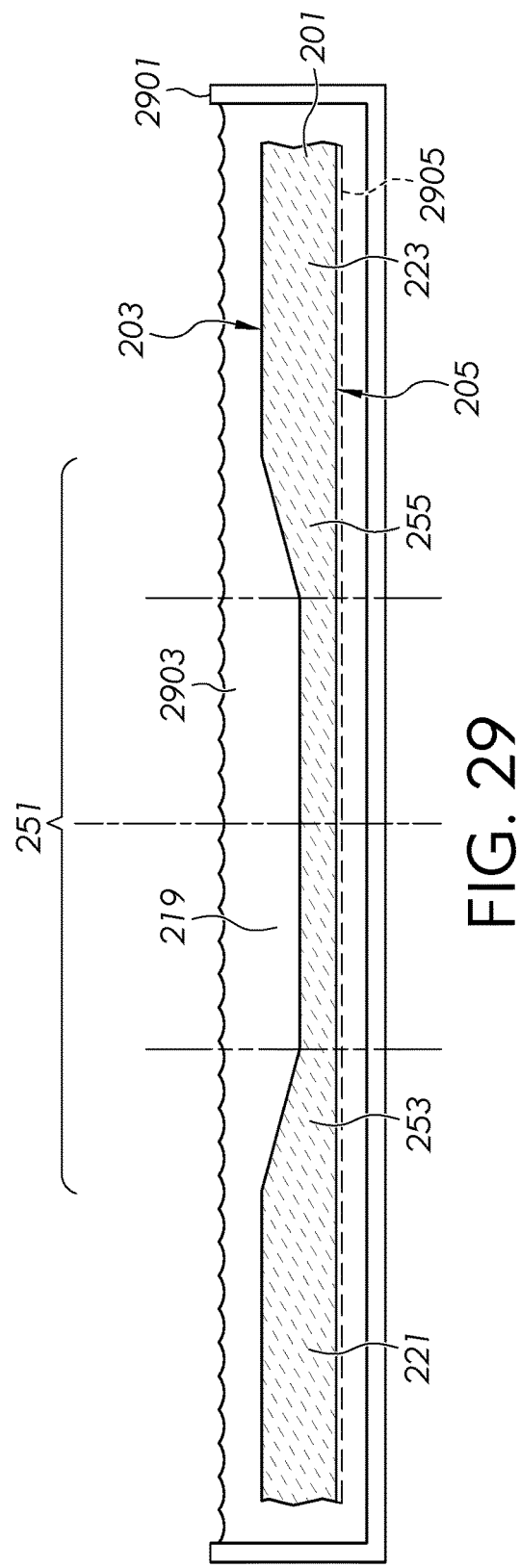

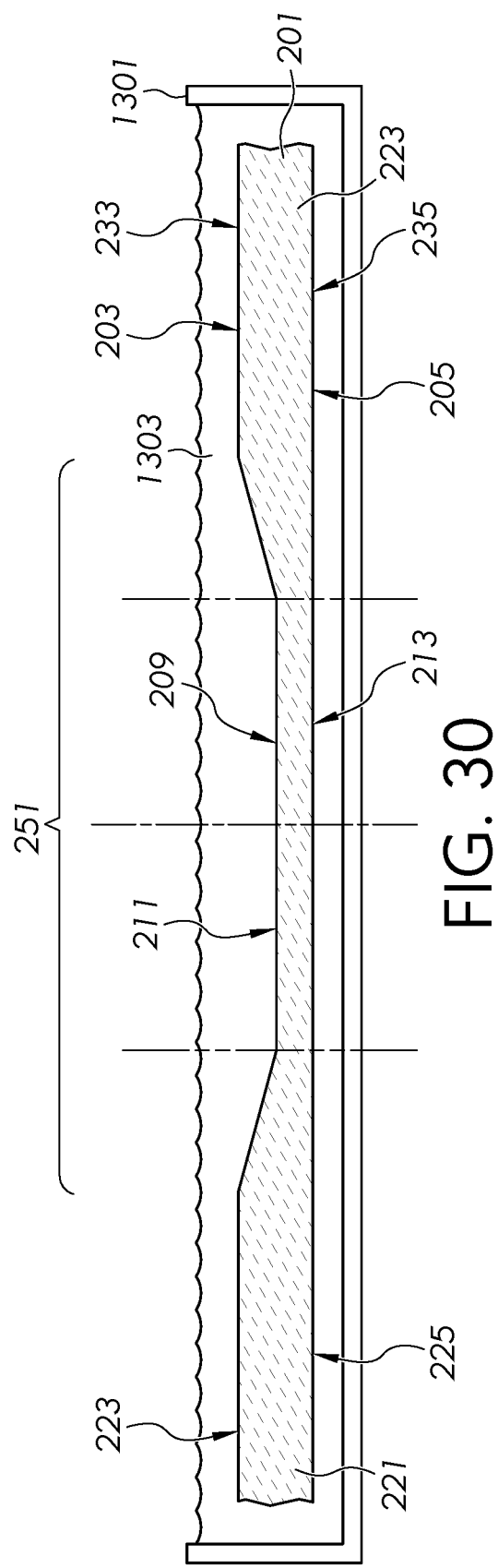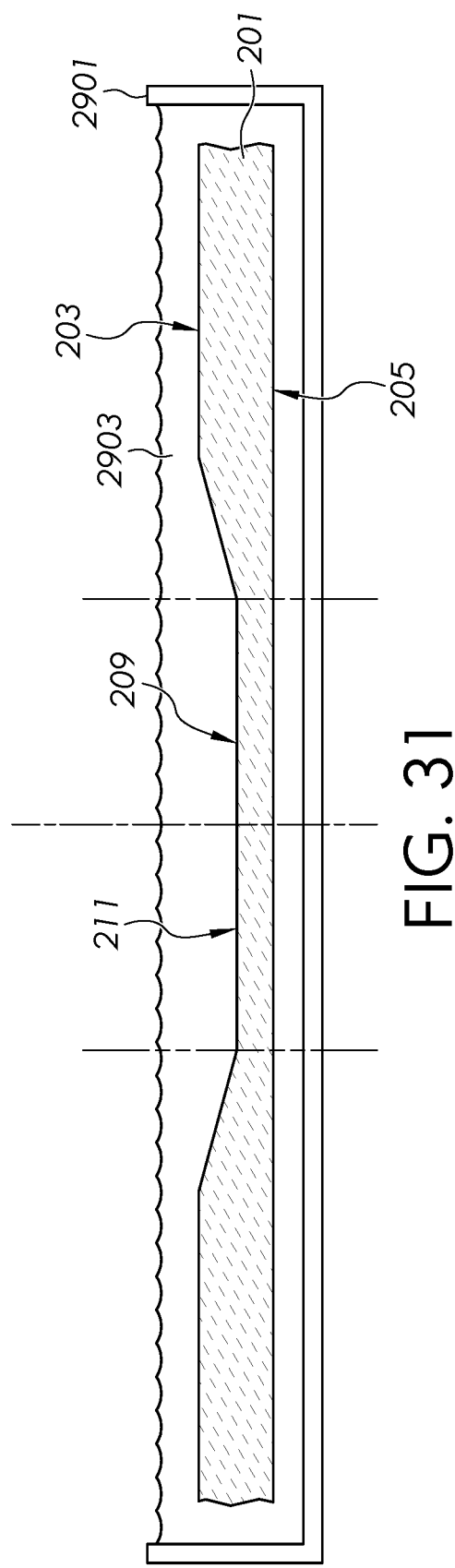

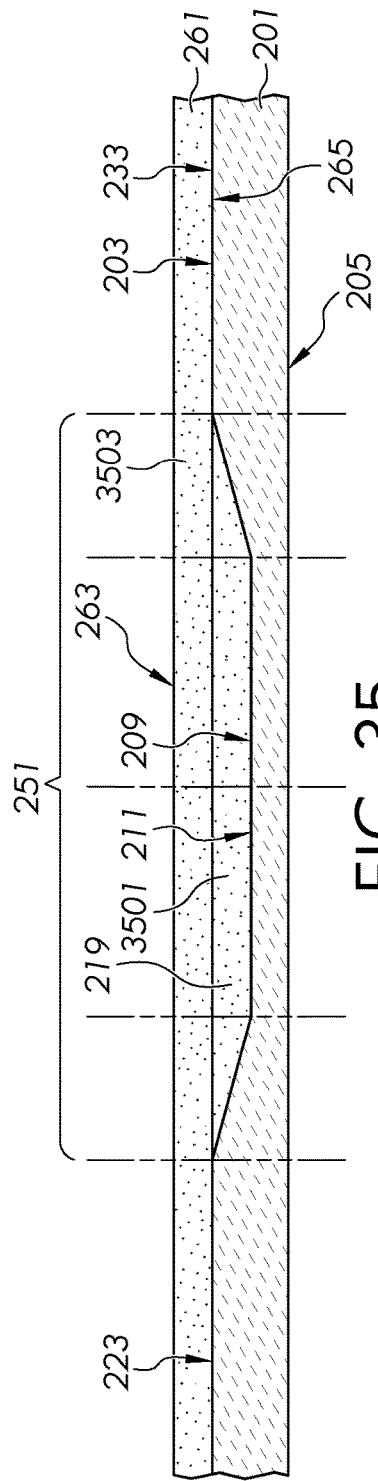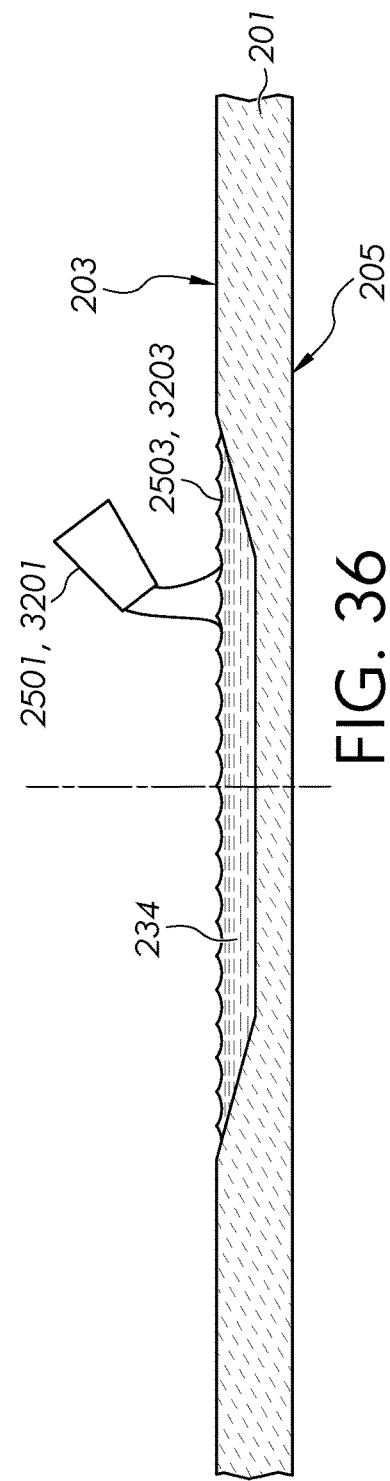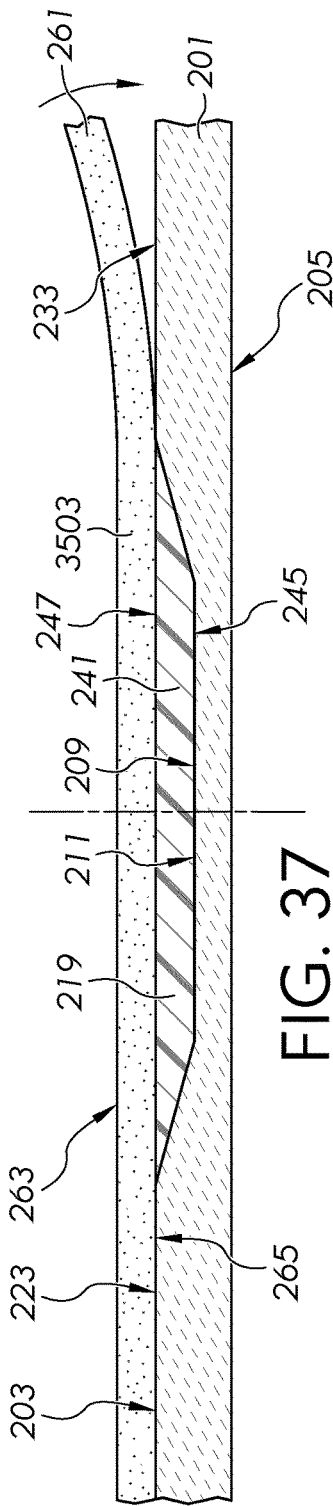

FOLDABLE APPARATUS, FOLDABLE SUBSTRATE, AND METHODS OF MAKING

CROSS-REFERENCE TO RELATED APPLICATIONS

This application is a national stage entry of International Patent Application Serial No. PCT/US2020/048507 filed on Aug. 28, 2020, which in turn, claims the benefit of priority under 35 U.S.C. § 119 of U.S. Provisional Application Ser. No. 63/022,748 filed on May 11, 2020, U.S. Provisional Application Ser. No. 62/914,720 filed on Oct. 14, 2019 and U.S. Provisional Application Ser. No. 62/893,291 filed on Aug. 29, 2019, the contents of each of which are relied upon and incorporated herein by reference in their entireties.

FIELD

The present disclosure relates generally to foldable apparatus, foldable substrates, and methods of making and, more particularly, to foldable apparatus and foldable substrates comprising portions and methods of making foldable apparatus and foldable substrates.

BACKGROUND

Glass-based substrates are commonly used, for example, in display devices, for example, liquid crystal displays (LCDs), electrophoretic displays (EPD), organic light emitting diode displays (OLEDs), plasma display panels (PDPs), or the like.

There is a desire to develop foldable versions of displays as well as foldable protective covers to mount on foldable displays. Foldable displays and covers should have good impact and puncture resistance. At the same time, foldable displays and covers should have small minimum bend radii (e.g., about 10 millimeters (mm) or less). However, plastic displays and covers with small minimum bend radii tend to have poor impact and/or puncture resistance. Furthermore, conventional wisdom suggests that ultra-thin glass-based sheets (e.g., about 75 micrometers (μm or microns) or less thick) with small minimum bend radii tend to have poor impact and/or puncture resistance. Furthermore, thicker glass-based sheets (e.g., greater than 125 micrometers) with good impact and/or puncture resistance tend to have relatively large minimum bend radii (e.g., about 30 millimeters or more). Consequently, there is a need to develop foldable apparatus that have low minimum bend radii and good impact and puncture resistance.

SUMMARY

There are set forth herein foldable apparatus, foldable substrates, and methods of making foldable apparatus and foldable substrates that comprise a first portion and a second portion. The portions can comprise glass-based and/or ceramic-based portions, which can provide good dimensional stability, reduced incidence of mechanical instabilities, good impact resistance, and/or good puncture resistance. The first portion and/or the second portion can comprise glass-based and/or ceramic-based portions comprising one or more compressive stress regions, which can further provide increased impact resistance and/or puncture resistance. By providing a substrate comprising a glass-based and/or ceramic-based substrate, the substrate can also provide increased impact resistance and/or increased puncture resistance while simultaneously facilitating good folding performance. In some embodiments, the substrate thickness can be sufficiently large (e.g., from about 80 micrometers (microns or μm) to about 2 millimeters) to provide good impact resistance and good puncture resistance. Providing a foldable substrate comprising a central portion comprising a central thickness that is less than a substrate thickness of the first portion and/or the second portion can enable small effective minimum bend radii (e.g., about 10 millimeters (mm) or less) based on the reduced thickness in the central portion. In some embodiments, the central thickness can be sufficiently small (e.g., from about 10 micrometers to about 125 micrometers) in a bend region (e.g., central portion) of the foldable apparatus to provide low effective bend radii (e.g., about 10 mm or less, about 9 mm or less, about 8 mm or less, about 7 mm or less, about 6 mm or less, about 5 mm or less, about 4 mm or less, about 3 mm or less, about 2 mm or less, or about 1 mm).

In some embodiments, the foldable substrate can comprise a first transition portion attaching the central portion to the first portion and/or a second transition region attaching the central portion to the second portion. Providing transition regions with continuously increasing thicknesses can reduce stress concentration in the transition regions and/or avoid optical distortions. Providing a sufficient length of the transition region(s) (e.g., about 1 mm or more) can avoid optical distortions that may otherwise exist from an abrupt stepped changed in thickness of the foldable substrate. Providing a sufficiently small length of the transition regions (e.g., about 5 mm or less) can reduce the amount of the foldable substrate having an intermediate thickness that may have reduced impact resistance and/or reduced puncture resistance.

Providing a first portion and/or a second portion comprising an average concentration of one or more alkali metal that is close to (e.g., within 100 parts per million, 10 parts per million on an oxide basis) a concentration of one or more alkali metal of the central portion can minimize differences in expansion of the first portion and/or the second portion compared to the central portion as a result of chemically strengthening. Substantially uniform expansion can decrease the incidence of mechanical deformation and/or mechanical instability as a result of the chemically strengthening.

Providing a ratio of a depth of layer to a thickness of the first portion and/or the second portion that is close to (e.g., within 0.1%, within 0.01%) a corresponding ratio of the central portion can minimize differences in near-surface expansion of the first portion and/or the second portion compared to the central portion as a result of chemically strengthening. Minimizing differences in near-surface expansion can reduce stresses and/or strains in a plane of the first major surface, the second major surface, the first central surface area, and/or the second central surface area, which can further reduce the incidence of mechanical deformation and/or mechanical instability as a result of the chemically strengthening.

Providing a ratio of a depth of compression to a thickness of the first portion and/or the second portion that is close to (e.g., within 1%, within 0.1%) a corresponding ratio of the central portion can minimize differences between chemically strengthening-induced strains in the first portion and/or the second portion relative to the central portion. Minimizing differences in chemically strengthening-induced strains can reduce the incidence of mechanical deformation and/or mechanical instability as a result of the chemically strengthening.

Minimizing stresses and/or strains on the first major surface, the second major surface, the first central surface area, and/or the second central surface area can reduce stress-induced optical distortions. Also, minimizing such stresses can increase puncture and/or impact resistance. Also, minimizing such stresses can be associated with low difference in optical retardation along a centerline (e.g., about 2 nanometers or less). Further, minimizing such stresses can reduce the incidence of mechanical deformation and/or mechanical instability as a result of the chemically strengthening.

Providing a central maximum tensile stress of a central tensile stress region of the central portion that is greater than a first maximum tensile stress of the first tensile stress region of the first portion and/or a second maximum tensile stress region of a second tensile stress region of the second portion can provide low energy fractures from impacts in the first portion and/or the second portion while providing good folding performance. In some embodiments, low energy fractures may be the result of the reduced thickness of the central portion, which stores less energy for a given maximum tensile stress than a thicker glass portion would. In some embodiments, low energy fractures may be the result of fractures in the first portion and/or the second portion located away from the central portion undergoing the bend, where the first portion and/or the second portion comprise lower maximum tensile stresses than the central portion. Further, in some embodiments, providing a substantially uniform depth of compression associated with compressive stress regions of the foldable substrate can simplify the making of the article by avoiding the use of masking or another method for non-uniform ion exchange.

Providing a neutral stress configuration when the foldable apparatus is in a bent configuration, the force to bend the foldable apparatus to a predetermined parallel plate distance can be decreased. Further, providing a neutral stress configuration when the foldable apparatus is in a bent state can reduce the maximum stress and/or strain experienced by the foldable substrate, an adhesive layer, and/or a polymer-based portion during normal use conditions, which can, for example, enable increased durability and/or reduced fatigue of the foldable apparatus. In some embodiments, the polymer-based portion can comprise a low (e.g., negative) coefficient of thermal expansion, which can mitigate warp caused by volume changes during curing of the polymer-based portion. In some embodiments, the neutral stress configuration can be generated by providing a polymer-based portion that expands as a result of curing. In some embodiments, the neutral stress configuration can be generated by curing the polymer-based portion in a bent configuration. In some embodiments, the neutral stress configuration can be generated by bending a foldable substrate at an elevated temperature (e.g., when the foldable substrate comprises a viscosity in a range from about $10^4$ Pascal-seconds to about $10^7$ Pascal-seconds).

Methods of the disclosure can enable making foldable substrates comprising one or more of the above-mentioned benefits. For example, disposing a diffusion barrier over a first central surface area and/or a second central surface area can adjust a rate of chemically strengthening of the central portion relative to the first portion and/or the second portion. For example, disposing an alkali metal ion-containing paste over a surface area of the first portion and/or the second portion can enable the above benefits by facilitating balancing one or more of the above ratios and/or concentrations of the central portion relative to the first portion and/or the second portion. In some embodiments, the foldable substrate can undergo further chemically strengthening to achieve greater compressive stresses without encountering mechanical deformation and/or mechanical instability, and the greater compressive stresses can further increase the impact and/or puncture resistance of the foldable substrate.

Further, methods of embodiments of the disclosure can achieve the above-mentioned benefits in a single chemically strengthening step (e.g., heating an alkali ion-containing paste, immersing the foldable substrate in an alkali ion-containing solution), which can reduce time, equipment, space, and labor costs associated with producing a foldable substrate. For example, a diffusion barrier disposed over both surfaces of the central portion can comprise a thickness that can produce a foldable substrate after a single chemically strengthening step. For example, a different alkali metal ion-containing paste can be applied to the central portion than the alkali metal ion-containing paste applied to the first portion and/or the second portion to produce a foldable substrate after a single chemically strengthening step. In some embodiments, a concentration of one or more alkali metal ions can be greater in the alkali metal ion-containing paste applied to the first portion and/or the second portion than in the different alkali metal containing paste applied to the central portion. In some embodiments, the different alkali metal containing paste applied to the central portion can comprise one or more alkali earth metal ions that can reduce the rate of chemically strengthening the central portion.

Some example embodiments of the disclosure are described below with the understanding that any of the features of the various embodiments may be used alone or in combination with one another.

Embodiment 1. A foldable apparatus comprises a foldable substrate foldable about an axis extending in a direction of a width of the foldable substrate. The foldable substrate further comprises a substrate thickness defined between a first major surface and a second major surface opposite the first major surface. The foldable substrate further comprises a first portion comprising the substrate thickness, a first surface area of the first major surface, and a first tensile stress region comprising a first maximum tensile stress. The foldable substrate further comprises a second portion comprising the substrate thickness, a third surface area of the first major surface, and a second tensile stress region comprising a second maximum tensile stress. The foldable substrate further comprises a central portion comprising a central thickness defined between a first central surface area and a second major surface opposite the first central surface area. The first central surface area attaches the first surface area to the third surface area. The central thickness is less than the substrate thickness. A central tensile stress region comprises a central maximum tensile stress. The central portion is positioned between the first portion and the second portion in a direction of a length of the foldable substrate that is perpendicular to the direction of the width of the foldable substrate. The first maximum tensile stress and the second maximum tensile stress are less than the central maximum tensile stress.

Embodiment 2. The foldable apparatus of embodiment 1, wherein the first maximum tensile stress is about 100 MegaPascals or less. The second maximum tensile stress is about 100 MegaPascals or less. The central maximum tensile stress is in a range from about 125 MegaPascals to about 375 MegaPascals.

Embodiment 3. The foldable apparatus of any one of embodiments 1-2, wherein the first maximum tensile stress in a range from about 10 MegaPascals to about 100 Mega- Pascals. The second maximum tensile stress is in a range from about 10 MegaPascals to about 100 MegaPascals.

Embodiment 4. The foldable apparatus of any one of embodiments 1-3, wherein the central portion further comprises a first transition portion attaching the first portion to the central portion. The first transition portion comprises a thickness that continuously increases from the central portion to the first portion. The central portion further comprises a second transition portion attaching the second portion to the central portion. The second transition portion comprises a thickness that continuously increases from the central portion to the second portion.

Embodiment 5. The foldable apparatus of any one of embodiments 1-4, wherein a width of the central portion is in a range from about 3 millimeters to about 45 millimeters.

Embodiment 6. A foldable apparatus comprises a foldable substrate comprising a first major surface extending along a first plane, a second major surface extending along a second plane that is parallel to the first plane. The foldable apparatus comprises a substrate thickness defined between the first plane and the second plane. The foldable substrate further comprises a first portion comprising a first surface area of the first major surface. The foldable substrate further comprises a second portion comprising a third surface area of the first major surface. The foldable substrate further comprises a central portion attaching the first portion of the foldable substrate to the second portion of the foldable substrate. The central portion comprises a first central surface area positioned between the first surface area and the third surface area. The central portion comprises a central thickness of the foldable substrate defined between the second plane and the first central surface area. The central thickness is less than the substrate thickness. The central portion comprises a first transition portion attaching the first portion to the central portion. The first transition portion comprises a thickness that continuously increases from the central portion to the first portion. The central portion comprises a second transition portion attaching the second portion to the central portion. The second transition portion comprises a thickness that continuously increases from the central portion to the second portion. A width of the central portion is in a range from about 3 millimeters to about 45 millimeters. A recess is defined between the first central surface area of the central portion and the first plane. An adhesive fills the recess.

Embodiment 7. The foldable apparatus of embodiment 6, wherein the first central surface area of the central portion comprises a central major surface of the central portion extending along a third plane parallel to the second plane.

Embodiment 8. The foldable apparatus of any one of embodiments 4-7, wherein a width of the first transition portion and/or a width of the second transition portion is in a range from about 1 millimeter to about 5 millimeters.

Embodiment 9. The foldable apparatus of any one of embodiments 4-8, wherein the thickness of the first transition portion increases at a constant rate from the central portion to the first portion.

Embodiment 10. The foldable apparatus of any one of embodiments 4-9, wherein the thickness of the second transition portion increases at a constant rate from the central portion to the second portion.

Embodiment 11. The foldable apparatus of any one of embodiments 1-10, wherein the foldable apparatus comprises a neutral stress configuration when the foldable apparatus is in a bent configuration.

Embodiment 12. A foldable apparatus comprises a foldable substrate foldable about an axis extending in a direction of a width of the foldable substrate. The foldable substrate further comprises a substrate thickness defined between a first major surface and a second major surface opposite the first major surface. The foldable substrate further comprises a first portion comprising the substrate thickness and a first surface area of the first major surface. The foldable substrate further comprises a second portion comprising the substrate thickness and a third surface area of the first major surface. The foldable substrate further comprises a central portion comprising a central thickness defined between a first central surface area and the second major surface opposite the first central surface area. The first central surface area attaches the first surface area to the third surface area. A width of the central portion is about 45 millimeters or less. The central thickness is less than the substrate thickness. The central portion is positioned between the first portion and the second portion in a direction of a length of the foldable substrate that is perpendicular to the direction of the width of the foldable substrate. The foldable apparatus comprises a neutral stress configuration when the foldable apparatus is in a bent configuration.

Embodiment 13. The foldable apparatus of any one of embodiments 11-12, wherein the foldable apparatus comprises a polymer-based portion positioned in a recess defined between the first central surface area of the central portion and a first plane that the first major surface extends along. A movement of the foldable apparatus from a flat configuration to the neutral stress configuration corresponds to a maximum magnitude of a deviatoric strain of the polymer-based portion in a range from about 1% to about 8%.

Embodiment 14. The foldable apparatus of embodiment 13, wherein the maximum magnitude of the deviatoric strain is in a range from about 2% to about 6%.

Embodiment 15. The foldable apparatus of any one of embodiments 5-14, wherein the foldable substrate of the foldable apparatus comprises an effective minimum bend radius in a range from about 1 millimeter to about 10 millimeters.

Embodiment 16. The foldable apparatus of embodiment 15, wherein the foldable substrate achieves an effective bend radius of 10 millimeters.

Embodiment 17. The foldable apparatus of embodiment 15, wherein the foldable substrate achieves an effective bend radius of 5 millimeters.

Embodiment 18. The foldable apparatus of embodiment 15, wherein the foldable apparatus achieves an effective bend radius of 2 millimeters.

Embodiment 19. The foldable apparatus of any one of embodiments 15-18, wherein the width of the central portion is in a range from about 2.8 times the effective minimum bend radius to about 6 times the effective minimum bend radius.

Embodiment 20. The foldable apparatus of any one of embodiments 15-18, wherein the width of the central portion is about 4.4 times the effective minimum bend radius or more.

Embodiment 21. The foldable apparatus of any one of embodiments 15-18, wherein the width of the central portion is in a range from about 2.8 millimeters to about 40 millimeters.

Embodiment 22. The foldable apparatus of any one of embodiments 1-21, wherein the substrate thickness is in a range from about 80 micrometers to about 2 millimeters.

Embodiment 23. The foldable apparatus of embodiment 22, wherein the substrate thickness is in a range from about 125 micrometers to about 200 micrometers.

Embodiment 24. The foldable apparatus of any one of embodiments 1-23, wherein the central thickness is in a range from about 10 micrometers to about 125 micrometers.

Embodiment 25. The foldable apparatus of embodiment 24, wherein the range of the central thickness is from about 10 micrometers to about 50 micrometers.

Embodiment 26. The foldable apparatus of any one of embodiments 1-25, wherein the central thickness is in a range from about 0.5% to about 13% of the substrate thickness.

Embodiment 27. The foldable apparatus of any one of embodiments 1-26, wherein the substrate thickness is at least 71 micrometers greater than about 4 times the central thickness.

Embodiment 28. The foldable apparatus of any one of embodiments 1-27, wherein the first portion further comprises a first compressive stress region extending to a first depth of compression from the first surface area of the first major surface and a second compressive stress region extending to a second depth of compression from a second surface area of the second major surface. The second portion further comprising a third compressive stress region extending to a third depth of compression from the third surface area of the first major surface and a fourth compressive stress region extending to a fourth depth of compression from a fourth surface area of the second major surface. The central portion further comprising a first central compressive stress region extending to a first central depth of compression from the first central surface area and a second central compressive stress region extending to a second central depth of compression from a second central surface area of the second major surface.

Embodiment 29. The foldable apparatus of embodiment 28, wherein an absolute difference between the first depth of compression as a percentage of the substrate thickness and the first central depth of compression as a percentage of the central thickness is about 1% or less.

Embodiment 30. The foldable apparatus of any one of embodiments 28-29, wherein an absolute difference between the third depth of compression as a percentage of the substrate thickness and the first central depth of compression as a percentage of the central thickness is about 1% or less.

Embodiment 31. The foldable apparatus of any one of embodiments 28-30, wherein an absolute difference between the second depth of compression as a percentage of the substrate thickness and the second central depth of compression as a percentage of the central thickness is about 1% or less.

Embodiment 32. The foldable apparatus of any one of embodiments 28-31, wherein an absolute difference between the fourth depth of compression as a percentage of the substrate thickness and the second central depth of compression as a percentage of the central thickness is about 1% or less.

Embodiment 33. The foldable apparatus of any one of embodiment 28-32, wherein the first central depth of compression is in a range from about 10% to about 30% of the central thickness. The second central depth of compression is in a range from about 10% to about 30% of the central thickness.

Embodiment 34. The foldable apparatus of any one of embodiments 28-33, wherein the first depth of compression is in a range from about 1% to about 10% of the substrate thickness. The second depth of compression is in a range from about 1% to about 10% of the substrate thickness.

Embodiment 35. The foldable apparatus of any one of embodiments 28-34, wherein the third depth of compression is in a range from about 1% to about 10% of the substrate thickness. The fourth depth of compression is in a range from about 1% to about 10% of the substrate thickness.

Embodiment 36. The foldable apparatus of any one of embodiments 28-35, wherein the first depth of compression is substantially equal to the first central depth of compression. The third depth of compression is substantially equal to the first central depth of compression.

Embodiment 37. The foldable apparatus of any one of embodiments 28-36, wherein the second depth of compression is substantially equal to the second central depth of compression. The fourth depth of compression is substantially equal to the second central depth of compression.

Embodiment 38. The foldable apparatus of any one of embodiments 28-35, wherein the first central depth of compression of the central portion is less than the first depth of compression of the first portion from the first surface area of the first major surface. The first central depth of compression of the central portion is less than the third depth of compression of the second portion from the second surface area of the first major surface.

Embodiment 39. The foldable apparatus of any one of embodiments 28-38, wherein the first compressive stress region comprises a first maximum compressive stress of about 700 MegaPascals or more. The second compressive stress region comprises a second maximum compressive stress, the third compressive stress region comprises a third maximum compressive stress of about 700 MegaPascals or more. The fourth compressive stress region comprises a fourth maximum compressive stress. The first central compressive stress region comprises a first central maximum compressive stress of about 700 MegaPascals or more. The second central compressive stress region comprises a second central maximum compressive stress.

Embodiment 40. The foldable apparatus of embodiment 39, wherein the second maximum compressive stress is about 700 MegaPascals or more. The fourth maximum compressive stress is about 700 MegaPascals or more. The second central maximum compressive stress is about 700 MegaPascals or more.

Embodiment 41. The foldable apparatus of any one of embodiments 28-40, wherein the first portion comprises a first average concentration of potassium on an oxide basis. The second portion comprises a second average concentration of potassium on an oxide basis. The central portion comprises a central average concentration of potassium on an oxide basis. An absolute difference between the first average concentration of potassium and the central average concentration of potassium is about 100 parts per million or less.

Embodiment 42. The foldable apparatus of embodiment 41, wherein an absolute difference between the second average concentration of potassium and the central average concentration of potassium is about 100 parts per million or less.

Embodiment 43. The foldable apparatus of any one of embodiments 28-42, wherein the first portion comprises a first depth of layer of one or more alkali metal ions associated with the first depth of compression and a second depth of layer of one or more alkali metal ions associated with the second depth of compression. The second portion comprises a third depth of layer of one or more alkali metal ions associated with the third depth of compression and a fourth depth of layer of one or more alkali metal ions associated with the fourth depth of compression. The central portion comprises a first central depth of layer of one or more alkali metal ions associated with the first central depth of compression and a second central depth of layer of the one or more alkali metal ions associated with the second central depth of compression. An absolute difference between the first depth of layer as a percentage of the substrate thickness and the first central depth of layer as a percentage of the central thickness is about 0.1% or less.

Embodiment 44. The foldable apparatus of embodiment 43, wherein an absolute difference between the third depth of layer as a percentage of the substrate thickness and the first central depth of layer as a percentage of the central thickness is about 0.1% or less.

Embodiment 45. The foldable apparatus of any one of embodiments 43-44, wherein an absolute difference between the second depth of layer as a percentage of the substrate thickness and the second central depth of layer as a percentage of the central thickness is about 0.1% or less.

Embodiment 46. The foldable apparatus of any one of embodiments 43-45, wherein an absolute difference between the fourth depth of layer as a percentage of the substrate thickness and the second central depth of layer as a percentage of the central thickness is about 0.1% or less.

Embodiment 47. The foldable apparatus of any one of embodiments 28-46, further comprising an optical retardation of the central portion along a centerline midway between the first portion and the second portion. An absolute difference between a maximum value of the optical retardation along the centerline and a minimum value of the optical retardation along the centerline is about 2 nanometers or less.

Embodiment 48. The foldable apparatus of any one of embodiments 1-47, wherein the foldable substrate is a glass-based substrate.

Embodiment 49. The foldable apparatus of any one of embodiments 1-47, wherein the foldable substrate is a ceramic-based substrate.

Embodiment 50. The foldable apparatus of any one of embodiments 1-5, wherein a recess defined between the first central surface area of the central portion and a first plane defined by the first major surface is filled with an adhesive.

Embodiment 51. The foldable apparatus of embodiment 6 or embodiment 50, wherein the adhesive comprises a first contact surface contacting the first surface area of the first major surface. A second surface area of the first major surface opposite the first surface area. The first central surface area of the central portion, the adhesive comprising a second contact surface spaced from the first contact surface of the adhesive.

Embodiment 52. The foldable apparatus of any one of embodiments 50-51, wherein a magnitude of a difference between an index of refraction of the foldable substrate and an index of refraction of the adhesive is about 0.1 or less.

Embodiment 53. The foldable apparatus of any one of embodiments 50-52 further comprising a display device attached to a second contact surface of the adhesive.

Embodiment 54. The foldable apparatus of any one of embodiments 50-52 further comprising a release liner attached to a second contact surface of the adhesive.

Embodiment 55. A consumer electronic product comprising a housing comprising a front surface, a back surface, and side surfaces. Electrical components are at least partially within the housing. The electrical components comprise a controller, a memory, and a display. The display is at or adjacent to the front surface of the housing. The consumer electronic device comprises a cover substrate disposed over the display. At least one of a portion of the housing or the cover substrate comprises the foldable apparatus of any one of embodiments 1-54.

Embodiment 56. A method of making a foldable apparatus comprises forming a recess in a first major surface of a foldable substrate that provides a first central surface area attaching a first portion of the foldable substrate and a second portion of the foldable substrate. A central portion comprises a first transition portion attaching the first portion to the central portion. A thickness of the first transition portion continuously increases from the central portion to the first portion. The central portion comprises a second transition portion attaching the second portion to the central portion. A thickness of the second transition portion continuously increases from the central portion to the second portion. The method comprises chemically strengthening the first central surface area of the central portion, a first surface area of the first portion of the first major surface, a third surface area of the second portion of the first major surface, and a second major surface of the foldable substrate. The method comprises applying an adhesive to contact a first surface area of the first major surface, a third surface area of the first major surface, and the first central surface area of the central portion. The adhesive fills the recess.

Embodiment 57. The method of embodiment 56, wherein the recess is mechanically formed in the first major surface of the foldable substrate.

Embodiment 58. The method of any one of embodiments 56-57 further comprising reducing a thickness of the foldable substrate prior to chemically strengthening.

Embodiment 59. The method of embodiment 58 wherein reducing the thickness occurs after forming the recess.

Embodiment 60. The method of any one of embodiments 58-59, wherein reducing the thickness comprises removing a layer of the second major surface of the foldable substrate.

Embodiment 61. The method of any one of embodiments 58-60 further comprising etching the foldable substrate after chemically strengthening and prior to applying the adhesive.

Embodiment 62. The method of any one of embodiments 56-61, wherein the chemically strengthening comprises chemically strengthening the first portion to a first depth of compression from the first surface area of the first major surface. The chemically strengthening comprises chemically strengthening the second portion to a third depth of compression from a third surface area of the first major surface. The chemically strengthening comprises chemically strengthening the central portion to a first central depth of compression from the first central surface area of the central portion. The first central depth of compression is less than the first depth of compression. The first central depth of compression is less than the third depth of compression.

Embodiment 63. The method of any one of embodiments 56-62, wherein the chemically strengthening comprises chemically strengthening the first portion to a second depth of compression from a second surface area of the second major surface. The chemically strengthening comprises chemically strengthening the second portion to a fourth depth of compression from a fourth surface area of the second major surface. The chemically strengthening comprises chemically strengthening the central portion to a second central depth of compression from a second central surface area of the second major surface. The second central surface area is positioned between the second surface area and the fourth surface area. The second central depth of compression is less than the second depth of compression. The second central depth of compression is less than the fourth depth of compression.

Embodiment 64. A method of making a foldable apparatus comprising forming a recess in a first major surface of a foldable substrate that forms a first central surface area of a central portion attaching a first portion to a second portion. The first portion comprises a first surface area and a second surface area opposite the first surface area. The second portion comprises a third surface area and a fourth surface area opposite the third surface area. The foldable substrate comprises a second major surface comprising the second surface area and the fourth surface area. The foldable substrate comprises a first major surface opposite the second major surface. The first major surface comprises the first surface area and the third surface area. The method comprises curing a polymer-based portion disposed between the first portion and the second portion. The foldable apparatus is in a bent configuration during the curing, wherein a movement of the foldable apparatus from a flat configuration to a neutral stress configuration corresponds to a maximum magnitude of a deviatoric strain of the polymer-based portion in a range from about 1% to about 8%.

Embodiment 65. The method of embodiment 64 further comprising chemically strengthening the first central surface area of the central portion, the first surface area, the third surface area, and the second major surface.

Embodiment 66. A method of making a foldable apparatus comprises folding a foldable substrate into a bent configuration while the foldable substrate comprises a viscosity in a range from about $10^4$ Pascal-seconds to about $10^7$ Pascal-seconds. The method comprises curing a liquid to form a polymer-based portion positioned between a first portion of the foldable substrate and a second portion of the foldable substrate.

Embodiment 67. The method of embodiment 66 further comprising forming a recess in the foldable substrate that forms a first central surface area of a central portion of the foldable substrate attaching a first portion of the foldable substrate to a second portion of the foldable substrate.

Embodiment 68. The method of any one of embodiments 66-67 further comprising chemically strengthening the foldable substrate.

Embodiment 69. The method of any one of embodiments 66-68, wherein a movement of the foldable apparatus from a flat configuration to a neutral stress configuration corresponds to a maximum magnitude of a deviatoric strain of the polymer-based portion in a range from about 1% to about 8%.

Embodiment 70. The method of embodiment 64, embodiment 65, or embodiment 69, wherein the maximum magnitude of the deviatoric strain is in a range from about 2% to about 6%.

Embodiment 71. The method of any one of embodiments 64-70, wherein the polymer-based portion expands as a result of curing.

Embodiment 72. A method of making a foldable apparatus comprises forming a recess in a first major surface of a foldable substrate that forms a first central surface area of a central portion attaching a first portion to a second portion. The first portion comprises a first surface area and a second surface area opposite the first surface area. The second portion comprises a third surface area and a fourth surface area opposite the third surface area. The foldable substrate comprises a second major surface comprising the second surface area and the fourth surface area. The foldable substrate comprises a first major surface opposite the second major surface, the first major surface comprising the first surface area and the third surface area. The method comprises curing a polymer-based portion disposed within the recess. The polymer-based portion expands as a result of curing.

Embodiment 73. The method of embodiment 72 further comprising chemically strengthening the first central surface area of the central portion, the first surface area, the third surface area, and the second major surface.

Embodiment 74. The method of any one of embodiments 72-73, wherein the polymer-based portion comprises a negative coefficient of thermal expansion.

Embodiment 75. The method of embodiment 74, wherein the polymer-based portion comprises particles of one or more of copper oxide, beta-quartz, a tungstate, a vanadate, a pyrophosphate, or a nickel-titanium alloy.

Embodiment 76. The method of any one of embodiments 72-75, wherein curing the polymer-based portion comprises a ring-opening metathesis polymerization.

Embodiment 77. A method of making a foldable apparatus comprises forming a recess in a first major surface of a foldable substrate that forms a first central surface area of a central portion attaching a first portion to a second portion. The first portion comprises a first surface area and a second surface area opposite the first surface area. The second portion comprises a third surface area and a fourth surface area opposite the third surface area. The foldable substrate comprises a second major surface comprising the second surface area and the fourth surface area. The foldable substrate comprises a first major surface opposite the second major surface. The first major surface comprises the first surface area and the third surface area. The method comprises curing a polymer-based portion disposed between the first portion and the second portion. The foldable apparatus is in a bent configuration during the curing. A movement of the foldable apparatus from a flat configuration to a neutral stress configuration corresponds to a maximum magnitude of a deviatoric strain of the polymer-based portion in a range from about 1% to about 8%.

Embodiment 78. The method of embodiment 77 further comprises chemically strengthening the first central surface area of the central portion, the first surface area, the third surface area, and the second major surface.

Embodiment 79. The method of any one of embodiments 77-78, wherein the maximum magnitude of the deviatoric strain is in a range from about 2% to about 6%.

Embodiment 80. A method of making a foldable apparatus comprises bending a foldable substrate into a bent configuration while the foldable substrate comprises a viscosity in a range from about $10^4$ Pascal-seconds to about $10^7$ Pascal-seconds. The method comprises curing a liquid to form a polymer-based portion positioned between a first portion of the foldable substrate and a second portion of the foldable substrate.

Embodiment 81. The method of embodiment 80 further comprises forming a recess in the foldable substrate that forms a first central surface area of a central portion of the foldable substrate attaching a first portion of the foldable substrate to a second portion of the foldable substrate.

Embodiment 82. The method of any one of embodiments 80-81 further comprises chemically strengthening the foldable substrate.

Embodiment 83. The method of any one of embodiments 80-82, wherein a movement of the foldable apparatus from a flat configuration to a neutral stress configuration corresponds to a maximum magnitude of a deviatoric strain of the polymer-based portion in a range from about 1% to about 8%.

Embodiment 84. The method of embodiment 83, wherein the maximum magnitude of the deviatoric strain is in a range from about 2% to about 6%.

Embodiment 85. A method of making a folding substrate comprises a foldable substrate comprising a substrate thickness defined between a first major surface and a second major surface. The foldable substrate comprises a first portion comprising the substrate thickness. The foldable substrate comprises a second portion comprising the substrate thickness. The foldable substrate comprises a central portion comprising a central thickness defined between a first central surface area and a second central surface area. The central thickness is less than the substrate thickness. The central portion is positioned between the first portion and the second portion. The method comprises disposing a first layer over one or more of the first central surface area or the second central surface area. The method comprises, after disposing the first layer, chemically strengthening the foldable substrate for a first period of time. The method comprises, after chemically strengthening the foldable substrate, removing the first layer.

Embodiment 86. The method of embodiment 85, wherein the first layer comprises a thickness in a range from about 10 nanometers to about 200 nanometers.

Embodiment 87. The method of any one of embodiments 85-86, wherein disposing the first layer comprises disposing $SiO_2$ using physical vapor deposition.

Embodiment 88. The method of any one of embodiments 85-87, further comprising forming a recess in the first major surface of the glass-based substrate to provide the first central surface area before the disposing the first layer.

Embodiment 89. The method of any one of embodiments 85-88, wherein, after the chemically strengthening the foldable substrate, the first portion comprises a first depth of layer from the first major surface of one or more alkali metal ions introduced into the first portion during the chemically strengthening. After the chemically strengthening the foldable substrate, the central portion comprises a first central depth of layer from the first central surface area of one or more alkali metal ions introduced into the central portion during the chemically strengthening. An absolute difference between the first depth of layer as a percentage of the substrate thickness and the first central depth of layer as a percentage of the central thickness is about 1% or less.

Embodiment 90. The method of embodiment 89, wherein, after the chemically strengthening the foldable substrate, the second portion comprises a third depth of layer from the first major surface of one or more alkali metal ions introduced into the second portion during the chemically strengthening. An absolute difference between the third depth of layer as a percentage of the substrate thickness and the first central depth of layer as a percentage of the central thickness is about 1% or less.

Embodiment 91. The method of any one of embodiments 89-90, wherein the one or more alkali metal ions comprise potassium ions.

Embodiment 92. The method of any one of embodiments 85-91, wherein, after the chemically strengthening the foldable substrate, the first portion comprises a first average concentration of potassium on an oxide basis. After the chemically strengthening the foldable substrate, the central portion comprises a central average concentration of potassium on an oxide basis. An absolute difference between the first average concentration of potassium and the central average concentration of potassium is about 100 parts per million or less.

Embodiment 93. The method of embodiment 92, wherein, after the chemically strengthening the foldable substrate, the second portion comprises a second average concentration of potassium on an oxide basis. An absolute difference between the second average concentration of and the central average concentration of potassium is about 100 parts per million or less.

Embodiment 94. The method of any one of embodiments 85-93, wherein, after the chemically strengthening the foldable substrate, the first portion comprises a first compressive stress region extending to a first depth of compression from the first major surface. After the chemically strengthening the foldable substrate, the central portion comprises a first central compressive stress region extending to a first central depth of compression. An absolute difference between the first depth of compression as a percentage of the substrate thickness to the first central depth of compression as a percentage of the central thickness is about 1% or less.

Embodiment 95. The method of embodiment 94, wherein, after the chemically strengthening the foldable substrate, the second portion comprises a third compressive stress region extending to a third depth of compression from the first major surface. An absolute difference between the third depth of compression as a percentage of the substrate thickness to the first central depth of compression as a percentage of the central thickness is about 1% or less.

Embodiment 96. The method of any one of embodiments 85-88, further comprising, after removing the first layer, further chemically strengthening the foldable substrate for a second period of time.

Embodiment 97. The method of embodiment 96, wherein the second period of time is greater than the first period of time.

Embodiment 98. The method of embodiment 97, wherein the second period of time as a percentage of the first period of time is in a range from about 103% to about 175%.

Embodiment 99. The method of any one of embodiments 96-98, wherein, after the further chemically strengthening the foldable substrate, the first portion comprises a first depth of layer from the first major surface of one or more alkali metal ions introduced into the first portion during the chemically strengthening or the further chemically strengthening. After the further chemically strengthening the foldable substrate, the central portion comprises a first central depth of layer from the first central surface area of one or more alkali metal ions introduced into the central portion during the chemically strengthening or the further chemically strengthening. An absolute difference between the first depth of layer as a percentage of the substrate thickness and the first central depth of layer as a percentage of the central thickness is about 0.1% or less.

Embodiment 100. The method of embodiment 99, wherein, after the further chemically strengthening the foldable substrate, a third depth of layer from the first major surface of one or more alkali metal ions introduced into the second portion during the chemically strengthening or the further chemically strengthening. An absolute difference between the third depth of layer as a percentage of the substrate thickness and the first central depth of layer as a percentage of the central thickness is about 0.1% or less.

Embodiment 101. The method of any one of embodiments 99-100, wherein the one or more alkali metal ions comprise potassium ions.

Embodiment 102. The method of any one of embodiments 96-101, wherein, after the further chemically strengthening the foldable substrate, the first portion comprises a first average concentration of potassium on an oxide basis. After the further chemically strengthening the foldable substrate, the central portion comprises a central average concentration of potassium on an oxide basis. An absolute difference between the first average concentration of potassium and the central average concentration of potassium is about 100 parts per million or less.

Embodiment 103. The method of embodiment 102, wherein, after the further chemically strengthening the foldable substrate, the second portion comprises a second average concentration of potassium on an oxide basis. An absolute difference between the second average concentration of potassium and the central average concentration of potassium is about 100 parts per million or less.

Embodiment 104. The method of any one of embodiments 96-103, wherein, after the further chemically strengthening the foldable substrate, the first portion comprises a first compressive stress region extending to a first depth of compression from the first major surface. After the further chemically strengthening the foldable substrate, the central portion comprises a first central compressive stress region extending to a first central depth of compression. An absolute difference between the first depth of compression as a percentage of the substrate thickness to the first central depth of compression as a percentage of the central thickness is about 1% or less.

Embodiment 105. The method of embodiment 104, wherein, after the further chemically strengthening the foldable substrate, the second portion comprises a third compressive stress region extending to a third depth of compression from the first major surface. An absolute difference between the third depth of compression as a percentage of the substrate thickness to the first central depth of compression as a percentage of the central thickness is about 1% or less.

Embodiment 106. A method of making a folding substrate comprising a foldable substrate comprising a substrate thickness defined between a first major surface and a second major surface. The foldable substrate comprises a first portion comprising the substrate thickness. The foldable substrate comprises a second portion comprising the substrate thickness. The foldable substrate comprises a central portion comprising a central thickness defined between a first central surface area and a second central surface area. The central thickness is less than the substrate thickness. The central portion is positioned between the first portion and the second portion. The method comprises applying a paste comprising alkali metal ions to the first portion and the second portion. The method comprises, after applying the paste, heating the foldable substrate. The method comprises, after heating the foldable substrate, removing the paste. The method comprises, after removing the paste, chemically strengthening the foldable substrate.

Embodiment 107. The method of embodiment 106, wherein, after the chemically strengthening the foldable substrate, the first portion comprises a first depth of layer from the first major surface of one or more alkali metal ions introduced into the first portion during the heating or the chemically strengthening. After the chemically strengthening the foldable substrate, the central portion comprises a first central depth of layer from the first central surface area of one or more alkali metal ions introduced into the central portion during the chemically strengthening. An absolute difference between the first depth of layer as a percentage of the substrate thickness and the first central depth of layer as a percentage of the central thickness is about 0.1% or less.

Embodiment 108. The method of embodiment 107, wherein, after the chemically strengthening the foldable substrate, the second portion comprises a third depth of layer from the first major surface of one or more alkali metal ions introduced into the second portion during the heating or the chemically strengthening. An absolute difference between the third depth of layer as a percentage of the substrate thickness and the first central depth of layer as a percentage of the central thickness is about 0.1% or less.

Embodiment 109. The method of any of embodiments 107-108, wherein the one or more alkali metal ions comprise potassium ions.

Embodiment 110. The method of any one of embodiments 106-109, wherein, after the chemically strengthening the foldable substrate, the first portion comprises a first average concentration of potassium on an oxide basis. After the chemically strengthening the foldable substrate, the central portion comprises a central average concentration of potassium on an oxide basis. An absolute difference between the first average concentration of potassium the central average concentration of potassium is about 100 parts per million or less.

Embodiment 111. The method of embodiment 110, wherein, after the chemically strengthening the foldable substrate, the second portion comprises a second average concentration of potassium on an oxide basis. An absolute difference between the second average concentration of potassium and the central average concentration of potassium is about 100 parts per million or less.

Embodiment 112. The method of any one of embodiments 106-111, wherein, after the chemically strengthening the foldable substrate, the first portion comprises a first compressive stress region extending to a first depth of compression from the first major surface. After the chemically strengthening the foldable substrate, the central portion comprises a first central compressive stress region extending to a first central depth of compression. An absolute difference between the first depth of compression as a percentage of the substrate thickness to the first central depth of compression as a percentage of the central thickness is about 1% or less.

Embodiment 113. The method of embodiment 112, wherein, after the chemically strengthening the foldable substrate, the second portion comprises a third compressive stress region extending to a third depth of compression from the first major surface. An absolute difference between the third depth of compression as a percentage of the substrate thickness to the first central depth of compression as a percentage of the central thickness is about 1% or less.

Embodiment 114. A method of making a folding substrate comprising a foldable substrate comprises a substrate thickness defined between a first major surface and a second major surface. The foldable substrate comprises a first portion comprising the substrate thickness. The foldable substrate comprises a second portion comprising the substrate thickness. The foldable substrate comprises a central portion comprising a central thickness defined between a first central surface area and a second central surface area. The central thickness is less than the substrate thickness. The central portion is positioned between the first portion and the second portion. The method comprises applying a first paste comprising alkali metal ions to the first portion. The method comprises applying a second paste comprising alkali metal ions to the central portion. The method comprises, after applying the first paste and the second paste, heating the foldable substrate. The method comprises, after heating the foldable substrate, removing the first paste from the first portion. The method comprises, after heating the foldable substrate, removing the second paste from the central portion.

Embodiment 115. The method of embodiment 114, wherein a concentration of potassium ions in the first paste is greater than a concentration of potassium ions in the second paste.

Embodiment 116. The method of any one of embodiments 114-115, wherein the second paste further comprises one or more alkali earth metal ions in a concentration of about 5 parts per million or more on an oxide basis.

Embodiment 117. The method of embodiment 116, wherein the one or more alkali earth metal ions comprises calcium in a concentration ranging from about 10 parts per million to about 1,000 parts per million on an oxide basis.

Embodiment 118. The method of any one of embodiments 114-117, wherein, after the heating the foldable substrate, the first portion comprises a first depth of layer from the first major surface of one or more alkali metal ions introduced into the first portion during the heating. After the heating the foldable substrate, the central portion comprises a first central depth of layer from the first central surface area of one or more alkali metal ions introduced into the central portion during the heating. An absolute difference between the first depth of layer as a percentage of the substrate thickness and the first central depth of layer as a percentage of the central thickness is about 0.1% or less.

Embodiment 119. The method of any one of embodiments 114-118, wherein, after the heating the foldable substrate, the first portion comprises a first average concentration of potassium on an oxide basis. After the heating the foldable substrate, the central portion comprises a central average concentration of potassium on an oxide basis. An absolute difference between the first average concentration of potassium and the central average concentration of potassium is about 100 parts per million or less.

Embodiment 120. The method of embodiment 119, wherein, after the further chemically strengthening the foldable substrate, the second portion comprises a second average concentration of potassium on an oxide basis. An absolute difference between the second average concentration of potassium and the central average concentration of potassium is about 100 parts per million or less.

Embodiment 121. The method of any one of embodiments 114-120, wherein, after the heating the foldable substrate, the first portion comprises a first compressive stress region extending to a first depth of compression from the first major surface. After the heating the foldable substrate, the central portion comprises a first central compressive stress region extending to a first central depth of compression. An absolute difference between the first depth of compression as a percentage of the substrate thickness to the first central depth of compression as a percentage of the central thickness is about 1% or less.

Embodiment 122. The method of embodiment 121, further comprising applying the first paste comprising alkali metal ions to the second portion before the heating the foldable substrate. The method further comprises removing the first paste from the second portion after the heating the foldable substrate.

Embodiment 123. The method of embodiment 122, wherein, after the heating the foldable substrate, the second portion comprises a third depth of layer from the first major surface of one or more alkali metal ions introduced into the second portion during the heating. After the chemically strengthening the foldable substrate, the central portion comprises a first central depth of layer from the first central surface of one or more alkali metal ions introduced into the central portion during the heating. An absolute difference between the third depth of layer as a percentage of the substrate thickness and the first central depth of layer as a percentage of the central thickness is about 0.1% or less.

Embodiment 124. The method of embodiments 122-123, wherein, after the chemically strengthening the foldable substrate, the second portion comprises a second average concentration of potassium on an oxide basis. After the chemically strengthening the foldable substrate, the central portion comprises a central average concentration of potassium on an oxide basis. An absolute difference between the first average concentration of potassium and the central average concentration of potassium is about 100 parts per million or less.

Embodiment 125. The method of embodiment 124, wherein, after the further chemically strengthening the foldable substrate, the second portion comprises a second average concentration of potassium on an oxide basis. An absolute difference between the second average concentration of potassium and the central average concentration of potassium is about 100 parts per million or less.

Embodiment 126. The method of any one of embodiments 122-125, wherein, after the heating the foldable substrate, the second portion comprises a third compressive stress region extending to a third depth of compression from the first major surface. After the heating the foldable substrate, the central portion comprises a first central compressive stress region extending to a first central depth of compression from the first central surface. An absolute difference between the third depth of compression as a percentage of the substrate thickness to the first central depth of compression as a percentage of the central thickness is about 1% or less.

BRIEF DESCRIPTION OF THE DRAWINGS

The above and other features and advantages of embodiments of the present disclosure are better understood when the following detailed description is read with reference to the accompanying drawings, in which:

FIGS. 2-3 are a cross-sectional views of the foldable apparatus along line 2-2 of FIG. 1 according to some embodiments;

FIG. 4 is a schematic view of example foldable apparatus of embodiments of the disclosure in a folded configuration wherein a schematic view of the flat configuration may appear as shown in FIG. 1;

FIG. 5 is a schematic view of example foldable substrate of embodiments of the disclosure in a folded configuration for failure mode testing;

FIGS. 12-26 schematically illustrate steps in a method of making a foldable substrate and/or foldable apparatus;

FIGS. 28-37 schematically illustrate steps in a method of making a foldable substrate and/or foldable apparatus;

Figure 1:
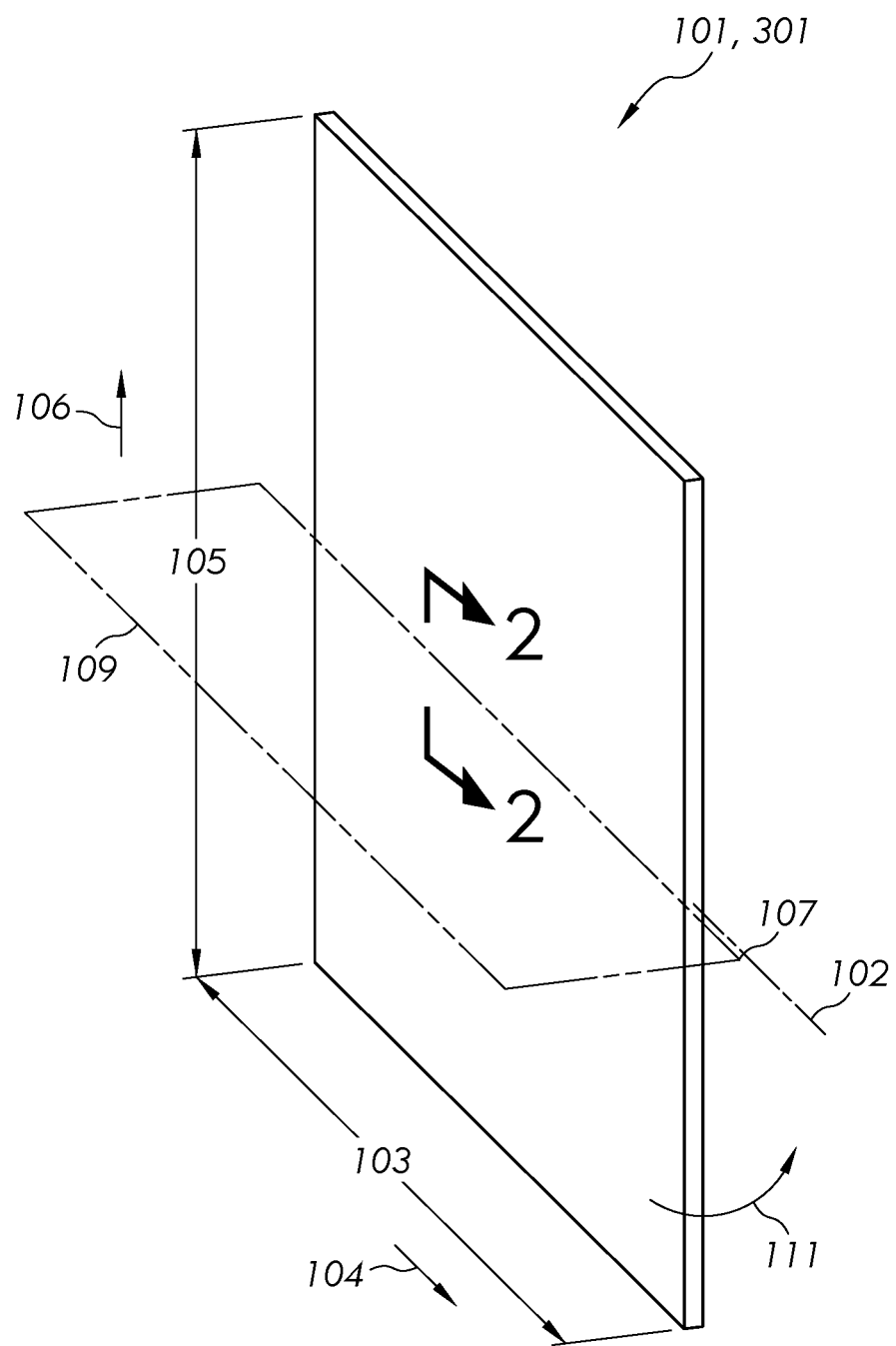
FIG. 1 is a schematic view of an example foldable apparatus in a flat configuration according to some embodiments, wherein a schematic view of the folded configuration may appear as shown in FIG. 4.

Throughout the disclosure, the drawings are used to emphasize certain aspects. As such, it should not be assumed that the relative size of different regions, portions, and substrates shown in the drawings are proportional to its actual relative size, unless explicitly indicated otherwise.

DETAILED DESCRIPTION

Embodiments will now be described more fully hereinafter with reference to the accompanying drawings in which example embodiments are shown. Whenever possible, the same reference numerals are used throughout the drawings to refer to the same or like parts. However, claims may encompass many different aspects of various embodiments and should not be construed as limited to the embodiments set forth herein.

FIGS. 1-4 and 6-7 illustrate views of foldable apparatus 101 and 301 and/or test foldable apparatus 602 comprising a foldable substrate 201 in accordance with embodiments of the disclosure. Unless otherwise noted, a discussion of features of embodiments of one foldable apparatus can apply equally to corresponding features of any embodiments of the disclosure. For example, identical part numbers throughout the disclosure can indicate that, in some embodiments, the identified features are identical to one another and that the discussion of the identified feature of one embodiment, unless otherwise noted, can apply equally to the identified feature of any of the other embodiments of the disclosure.

Figure 7:
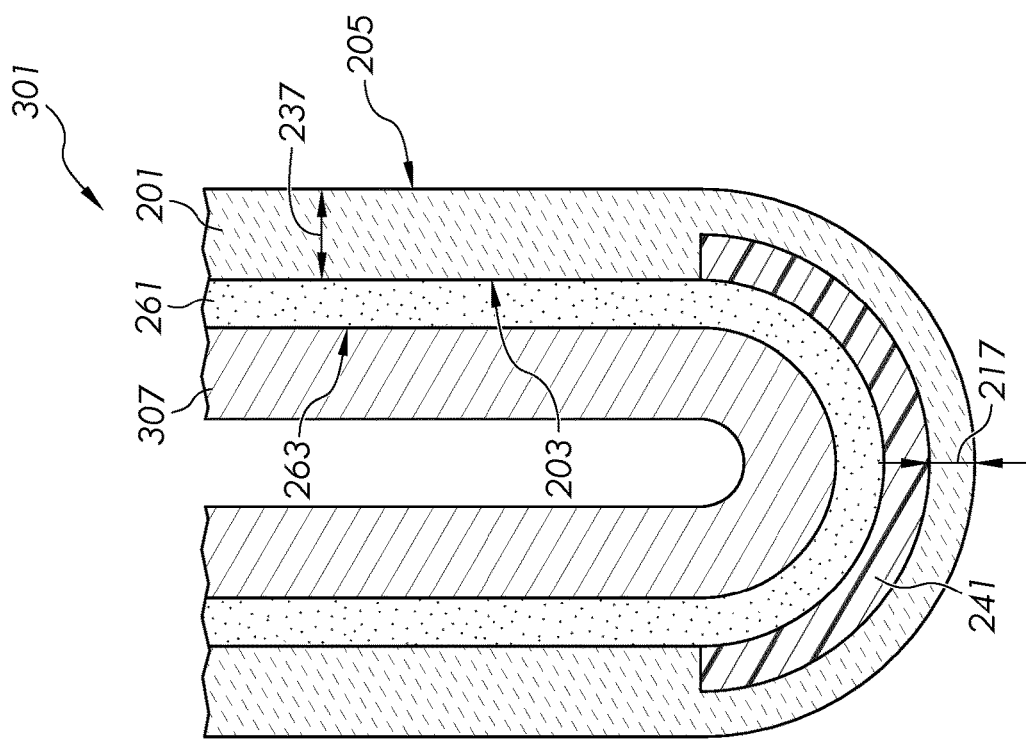
FIG. 7 is a cross-sectional view of another example foldable apparatus along line 6-6 of FIG. 4 according to some embodiments.
Figure 6:
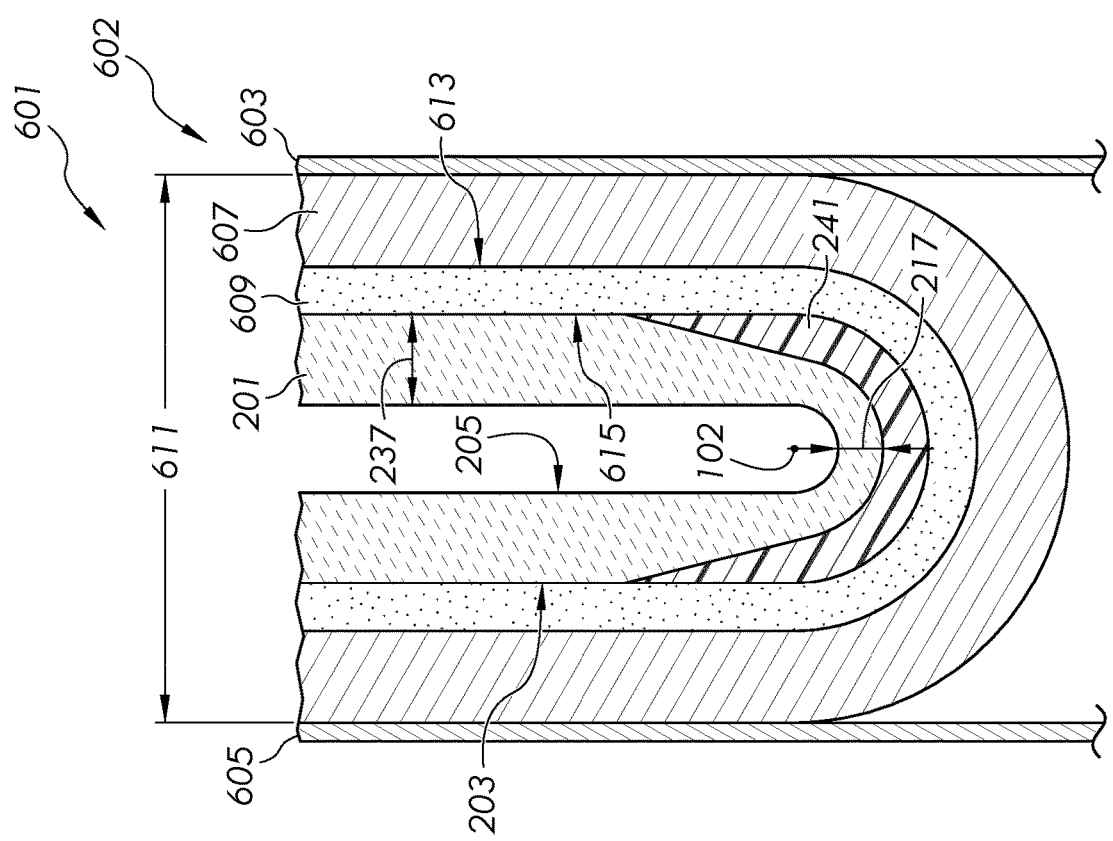
FIG. 6 is a cross-sectional view of a testing apparatus to determine the effective minimum bend radius of an example modified foldable apparatus along line 6-6 of FIG. 4.

FIGS. 2-3 schematically illustrate example embodiments of foldable apparatus 101 and 301 comprising the foldable substrate 201 in accordance with embodiments of the disclosure in an unfolded (e.g., flat) configuration while FIGS. 6-7 demonstrate a test foldable apparatus 602 and a foldable apparatus 301, respectively, comprising the foldable substrate 201 in accordance with embodiments of the disclosure in a folded configuration. The foldable apparatus 101 and 301 comprise a first portion 221, a second portion 231, and a central portion 251 positioned between the first portion 221 and the second portion 231. In some embodiments, as shown in FIGS. 2-3, the foldable apparatus 101, 301 can comprise the foldable substrate 201. In some embodiments, as shown in FIG. 2, the foldable apparatus 101 can comprise a release liner 271 although other substrates (e.g., a glass-based substrate and/or a ceramic-based substrate discussed throughout the application) may be used in further embodiments rather than the illustrated release liner 271. In some embodiments, as shown in FIG. 3, the foldable apparatus 301 can comprise a display device 307. It is to be understood that any of the foldable apparatus of the disclosure can comprise an additional substrate (e.g., a glass-based substrate and/or a ceramic-based substrate), a release liner 271, and/or a display device 307. In some embodiments, as shown in FIGS. 2-3 and 6-7, an adhesive layer 261 (e.g., an optically clear adhesive (OCA)) can be disposed over the first major surface 203 of the foldable substrate 201. In further embodiments, as shown in FIGS. 3 and 6-7, a polymer-based portion can be disposed over the foldable substrate 201 (e.g., disposed over the first central surface area 209 as shown in FIG. 3).

Throughout the disclosure, with reference to FIG. 1, the width 103 of the foldable apparatus 101 and/or 301 is considered the dimension of the foldable apparatus taken between opposed edges of the foldable apparatus in a direction 104 of a fold axis 102 of the foldable apparatus, wherein the direction 104 also comprises the direction of the width 103. Furthermore, throughout the disclosure, the length 105 of the foldable apparatus 101 and/or 301 is considered the dimension of the foldable apparatus 101 and/or 301 taken between opposed edges of the foldable apparatus 101 and/or 301 in a direction 106 perpendicular to the fold axis 102 of the foldable apparatus 101 and/or 301. In some embodiments, as shown in FIGS. 1-3, the foldable apparatus of any embodiments of the disclosure can comprise a fold plane 109 that includes the fold axis 102 and the direction 202 of the substrate thickness 227 (e.g., first thickness of the first portion 221) when the foldable apparatus is in the flat configuration (e.g., see FIG. 1). The plane 109, in some embodiments, may comprise a central axis 107 of the foldable apparatus, which can be positioned at the second major surface 205 as shown in FIGS. 2-3. In some embodiments, the foldable apparatus can be folded in a direction 111 (e.g., see FIG. 1) about the fold axis 102 extending in the direction 104 of the width 103 to form a folded configuration (e.g., see FIGS. 4 and 6-7). As shown, the foldable apparatus may include a single fold axis to allow the foldable apparatus to comprise a bifold wherein, for example, the foldable apparatus may be folded in half. In further embodiments, the foldable apparatus may include two or more fold axes with each fold axis including a corresponding central portion similar or identical to the central portion 251 discussed herein. For example, providing two fold axes can allow the foldable apparatus to comprise a trifold wherein, for example, the foldable apparatus may be folded with the first portion 221, the second portion 231, and a third portion similar or identical to the first portion or second portion with the central portion 251 and another central portion similar to or identical to the central portion positioned between the first portion and the second portion and between the second portion and the third portion, respectively.

Foldable apparatus 101 and 301 of the disclosure can comprise the foldable substrate 201. In some embodiments, the foldable substrate 201 can comprise a glass-based substrate and/or a ceramic-based substrate having a pencil hardness of 8H or more, for example, 9H or more.

In some embodiments, the foldable substrate 201 can comprise a glass-based substrate. As used herein, "glass-based" includes both glasses and glass-ceramics, wherein glass-ceramics have one or more crystalline phases and an amorphous, residual glass phase. A glass-based material (e.g., glass-based substrate) may comprise an amorphous material (e.g., glass) and optionally one or more crystalline materials (e.g., ceramic). Amorphous materials and glass-based materials may be strengthened. As used herein, the term "strengthened" may refer to a material that has been chemically strengthened, for example, through ion-exchange of larger ions for smaller ions in the surface of the substrate, as discussed below. However, other strengthening methods, for example, thermal tempering, or utilizing a mismatch of the coefficient of thermal expansion between portions of the substrate to create compressive stress and central tension regions, may be utilized to form strengthened substrates. Exemplary glass-based materials, which may be free of lithia or not, comprise soda lime glass, alkali aluminosilicate glass, alkali-containing borosilicate glass, alkali-containing aluminoborosilicate glass, alkali-containing phosphosilicate glass, and alkali-containing aluminophosphosilicate glass. In one or more embodiments, a glass-based material may comprise, in mole percent (mol %): $SiO_2$ in a range from about 40 mol % to about 80%, $Al_2O_3$ in a range from about 5 mol % to about 30 mol %, $B_2O_3$ in a range from 0 mol % to about 10 mol %, $ZrO_2$ in a range from 0 mol % to about 5 mol %, $P_2O_5$ in a range from 0 mol % to about 15 mol %, $TiO_2$ in a range from 0 mol % to about 2 mol %, $R_2O$ in a range from 0 mol % to about 20 mol %, and RO in a range from 0 mol % to about 15 mol %. As used herein, $R_2O$ can refer to an alkali metal oxide, for example, $Li_2O$, $Na_2O$, $K_2O$, $Rb_2O$, and $Cs_2O$. As used herein, RO can refer to MgO, CaO, SrO, BaO, and ZnO. In some embodiments, a glass-based substrate may optionally further comprise in a range from 0 mol % to about 2 mol % of each of $Na_2SO_4$, NaCl, NaF, NaBr, $K_2SO_4$, KCl, KF, KBr, $As_2O_3$, $Sb_2O_3$, $SnO_2$, $Fe_2O_3$, MnO, $MnO_2$, $MnO_3$, $Mn_2O_3$, $Mn_3O_4$, $Mn_2O_7$. "Glass-ceramics" include materials produced through controlled crystallization of glass. In some embodiments, glass-ceramics have about 1% to about 99% crystallinity. Examples of suitable glass-ceramics may include $Li_2O$—$Al_2O_3$—$SiO_2$ system (i.e., LAS-System) glass-ceramics, MgO—$Al_2O_3$—$SiO_2$ system (i.e., MAS-System) glass-ceramics, $ZnO \times Al_2O_3 \times nSiO_2$ (i.e., ZAS system), and/or glass-ceramics that include a predominant crystal phase including β-quartz solid solution, β-spodumene, cordierite, petalite, and/or lithium disilicate. The glass-ceramic substrates may be strengthened using the chemical strengthening processes. In one or more embodiments, MAS-System glass-ceramic substrates may be strengthened in $Li_2SO_4$ molten salt, whereby an exchange of $2Li^+$ for $Mg^{2+}$ can occur.

In some embodiments, the foldable substrate 201 can comprise a ceramic-based substrate. As used herein, "ceramic-based" includes both ceramics and glass-ceramics, wherein glass-ceramics have one or more crystalline phases and an amorphous, residual glass phase. Ceramic-based materials may be strengthened (e.g., chemically strengthened). In some embodiments, a ceramic-based material can be formed by heating a glass-based material to form ceramic (e.g., crystalline) portions. In further embodiments, ceramic-based materials may comprise one or more nucleating agents that can facilitate the formation of crystalline phase(s). In some embodiments, the ceramic-based materials can comprise one or more oxide, nitride, oxynitride, carbide, boride, and/or silicide. Example embodiments of ceramic oxides include zirconia ($ZrO_2$), zircon zirconia ($ZrSiO_4$), an alkali metal oxide (e.g., sodium oxide ($Na_2O$)), an alkali earth metal oxide (e.g., magnesium oxide (MgO)), titania ($TiO_2$), hafnium oxide ($Hf_2O$), yttrium oxide ($Y_2O_3$), iron oxide, beryllium oxide, vanadium oxide ($VO_2$), fused quartz, mullite (a mineral comprising a combination of aluminum oxide and silicon dioxide), and spinel ($MgAl_2O_4$). Example embodiments of ceramic nitrides include silicon nitride ($Si_3N_4$), aluminum nitride (AlN), gallium nitride (GaN), beryllium nitride ($Be_3N_2$), boron nitride (BN), tungsten nitride (WN), vanadium nitride, alkali earth metal nitrides (e.g., magnesium nitride ($Mg_3N_2$)), nickel nitride, and tantalum nitride. Example embodiments of oxynitride ceramics include silicon oxynitride, aluminum oxynitride, and a SiAlON (a combination of alumina and silicon nitride and can have a chemical formula, for example, $Si_{12-m-n}Al_{m+n}O_nN_{16-n}$, $Si_{6-n}Al_nO_nN_{8-n}$, or $Si_{2-n}Al_nO_{1+n}N_{2-n}$, where m, n, and the resulting subscripts are all non-negative integers). Example embodiments of carbides and carbon-containing ceramics include silicon carbide (SiC), tungsten carbide (WC), an iron carbide, boron carbide ($B_4C$), alkali metal carbides (e.g., lithium carbide ($Li_4C_3$)), alkali earth metal carbides (e.g., magnesium carbide ($Mg_2C_3$)), and graphite. Example embodiments of borides include chromium boride ($CrB_2$), molybdenum boride ($Mo_2B_5$), tungsten boride ($W_2B_5$), iron boride, titanium boride, zirconium boride ($ZrB_2$), hafnium boride ($HfB_2$), vanadium boride ($VB_2$), Niobium boride ($NbB_2$), and lanthanum boride ($LaB_6$). Example embodiments of silicides include molybdenum disilicide ($MoSi_2$), tungsten disilicide ($WSi_2$), titanium disilicide ($TiSi_2$), nickel silicide (NiSi), alkali earth silicide (e.g., sodium silicide (NaSi)), alkali metal silicide (e.g., magnesium silicide ($Mg_2Si$)), hafnium disilicide ($HfSi_2$), and platinum silicide (PtSi).

Throughout the disclosure, a tensile strength, ultimate elongation (e.g., strain at failure), and yield point of a polymeric material (e.g., adhesive, polymer-based portion) is determined using ASTM D638 using a tensile testing machine, for example, an Instron 3400 or Instron 6800, at 23° C. and 50% relative humidity with a type I dogbone shaped sample. Throughout the disclosure, an elastic modulus (e.g., Young's modulus) and/or a Poisson's ratio is measured using ISO 527-1:2019. In some embodiments, the foldable substrate 201 can comprise an elastic modulus of about 1 GigaPascal (GPa) or more, about 3 GPa or more, about 5 GPa or more, about 10 GPa or more, about 100 GPa or less, about 80 GPa or less, about 60 GPa or less, or about 20 GPa or less. In some embodiments, the foldable substrate 201 can comprise an elastic modulus in a range from 1 GPa to about 100 GPa, from about 1 GPa to about 80 GPa, from about 3 GPa to about 80 GPa, from about 3 GPa to about 60 GPa, from about 5 GPa to about 60 GPa, from about 5 GPa to about 20 GPa, from about 10 GPa to about 20 GPa, or any range or subrange therebetween. In further embodiments, the foldable substrate 201 can comprise a glass-based portion and/or a ceramic-based portion comprising an elastic modulus in a range from about 10 GPa to about 100 GPa, from about 40 GPa to about 100 GPa, from about 60 GPa to about 100 GPa, from about 60 GPa to about 80 GPa, from about 80 GPa to about 100 GPa, or any range or subrange therebetween.

In some embodiments, the foldable substrate 201 can be optically transparent. As used herein, "optically transparent" or "optically clear" means an average transmittance of 70% or more in the wavelength range of 400 nm to 700 nm through a 1.0 mm thick piece of a material. In some embodiments, an "optically transparent material" or an "optically clear material" may have an average transmittance of 75% or more, 80% or more, 85% or more, or 90% or more, 92% or more, 94% or more, 96% or more in the wavelength range of 400 nm to 700 nm through a 1.0 mm thick piece of the material. The average transmittance in the wavelength range of 400 nm to 700 nm is calculated by measuring the transmittance of whole number wavelengths from about 400 nm to about 700 nm and averaging the measurements.

As shown in FIGS. 2-3 and 6-7, the foldable substrate 201 can comprise a first major surface 203 and a second major surface 205 opposite the first major surface 203. As shown in FIGS. 2-3, the first major surface 203 can extend along a first plane 204a. The second major surface 205 can extend along a second plane 204b. In some embodiments, as shown, the second plane 204b can be parallel to the first plane 204a. As used herein, a substrate thickness can be defined between the first major surface 203 and the second major surface 205 as a distance between the first plane 204a and the second plane 204b. In some embodiments, the substrate thickness can be about 10 micrometers (μm) or more, about 25 μm or more, about 40 μm or more, about 60 μm or more, about 80 μm or more, about 100 μm or more, about 125 μm or more, about 150 μm or more, about 2 millimeters (mm) or less, about 1 mm or less, about 800 μm or less, about 500 μm or less, about 300 μm or less, about 200 μm or less, about 180 μm or less, or about 160 μm or less. In some embodiments, the substrate thickness can be in a range from about 10 μm to about 2 mm, from about 25 μm to about 2 mm, from about 40 μm to about 2 mm, from about 60 μm to about 2 mm, from about 80 μm to about 2 mm, from about 100 μm to about 2 mm, from about 100 μm to about 1 mm, from about 100 μm to about 800 μm, from about 100 μm to about 500 μm, from about 125 μm to about 500 μm, from about 125 μm to about 300 μm, from about 125 μm to about 200 μm, from about 150 μm to about 200 μm, from about 150 μm to about 160 μm, or any range or subrange therebetween. Based on results from the Pen Drop Test (discussed below with reference to FIG. 42), increased puncture resistance can be achieved by selecting thicknesses of the foldable substrate that is greater than about 80 micrometers (μm). In some embodiments, puncture resistance of the foldable substrate can be increased with the substrate thickness 227 of about 80 μm or more, about 200 μm or more, about 500 μm or more, about 2 mm or less, about 1 mm or less, about 500 μm or less, or about 300 μm or less. In some embodiments, the substrate thickness 227 can be in a range from about 80 μm to about 2 mm, from about 80 μm to about 1 mm, from about 80 μm to about 500 μm, from about 80 μm to about 300 μm, from about 200 μm to about 2 mm, from about 200 μm to about 1 mm, from about 200 μm to about 500 μm, from about 500 μm to about 2 mm, from about 500 μm to about 1 mm, or any range or subrange therebetween.

The first portion 221 will now be described with reference to the foldable apparatus 101 of FIG. 2 with the understanding that such description of the first portion 221, unless otherwise stated, can also apply to any embodiments of the disclosure, for example, the foldable apparatus 301 and/or foldable substrate 201 illustrated in FIGS. 3 and 6-7. As shown in FIG. 2, the first portion 221 can comprise a first surface area 223 and a second surface area 225 opposite the first surface area 223. In some embodiments, as shown, the second surface area 225 of the first portion 221 can comprise a planar surface. In further embodiments, as shown, the second surface area 225 can be parallel to the first surface area 223. In some embodiments, as shown, the first major surface 203 can comprise the first surface area 223 and the second major surface 205 can comprise the second surface area 225. In further embodiments, the first surface area 223 can extend along the first plane 204a. In further embodiments, the second surface area 225 can extend along the second plane 204b. A substrate thickness 227 can be defined between the first plane 204a and the second plane 204b. In some embodiments, the substrate thickness 227 can correspond to the distance between the first surface area 223 of the first portion 221 and the second surface area 225 of the first portion 221. In some embodiments, the substrate thickness 227 can be substantially uniform across the first surface area 223. In some embodiments, a first thickness defined between the first surface area 223 and the second surface area 225 can be within one or more of the ranges discussed above with regards to the substrate thickness. In further embodiments, the first thickness can comprise the substrate thickness 227. In further embodiments, the first thickness of the first portion 221 may be substantially uniform between the first surface area 223 and the second surface area 225 across its corresponding length (i.e., in the direction 106 of the length 105 of the foldable apparatus) and/or its corresponding width (i.e., in the direction 104 of the width 103 of the foldable apparatus).

As shown in FIGS. 2-3 and 6-7, the foldable substrate 201 can also comprise a second portion 231 comprising a third surface area 233 and a fourth surface area 235 opposite the third surface area 233. The second portion 231 will now be described with reference to the foldable apparatus 101 of FIG. 2 with the understanding that such description of the second portion 231, unless otherwise stated, can also apply to any embodiments of the disclosure, for example, the foldable apparatus 101, 301 and/or foldable substrate 201 illustrated in FIGS. 3 and 6-7. In some embodiments, as shown, the third surface area 233 of the second portion 231 can comprise a planar surface. In further embodiments, the third surface area 233 of the second portion 231 can be in a common plane with the first surface area 223 of the first portion 221. In some embodiments, as shown, the fourth surface area 235 of the second portion 231 can comprise a planar surface. In further embodiments, as shown, the fourth surface area 235 can be parallel to the third surface area 233. In further embodiments, the fourth surface area 235 of the second portion 231 can be in a common plane with the second surface area 225 of the first portion 221.

A second thickness 237 can be defined between the third surface area 233 of the second portion 231 and the fourth surface area 235 of the second portion 231. In some embodiments, the second thickness 237 can be within the range discussed above with regards to the substrate thickness. In further embodiments, the second thickness 237 can comprise the substrate thickness. In further embodiments, as shown, the second thickness 237 can be substantially equal to the first thickness (e.g., substrate thickness 227). In some embodiments, the second thickness 237 of the second portion 231 may be substantially uniform between the third surface area 233 and the fourth surface area 235.

As shown in FIGS. 2-3 and 6-7, the foldable substrate 201 can comprise a central portion 251 positioned between the first portion 221 and the second portion 231. In some embodiments, the central portion 251 can comprise a first central surface area 209 and a second central surface area 213 opposite the first central surface area 209. In further embodiments, the central portion 251 can comprise the first central surface area 209 positioned between the first surface area 223 and the third surface area 233. In even further embodiments, as shown, the first central surface area 209 can be recessed from the first major surface 203. In further embodiments, the central portion 251 can comprise the second central surface area 213 positioned between the second surface area 225 and the fourth surface area 235. In even further embodiments, as shown, the second major surface 205 can comprise the second central surface area 213.

A central thickness 217 of the central portion 251 can be defined between the first central surface area 209 and the second central surface area 213. In some embodiments, the first central surface area 209 can comprise a central major surface 211 that may extend along a third plane 204c when the foldable apparatus 101, 301 is in a flat configuration, although the first central surface area 209 may be provided as a nonplanar area in further embodiments. In further embodiments, the third plane 204c can be substantially parallel to the first plane 204a and/or the second plane 204b. By providing the central major surface 211 of the central portion 251 extending along a third plane 204c parallel to the second plane 204b, a uniform central thickness 217 may extend across the central portion 251 that can provide enhanced folding performance at a predetermined thickness for the central thickness 217. A uniform central thickness 217 across the central portion 251 can improve folding performance by preventing stress concentrations that would occur if a portion of the central portion 251 was thinner than the rest of the central portion 251.

In some embodiments, as shown in FIGS. 2-3 and 6-7, the central thickness 217 can be less than the substrate thickness 227 (e.g., first thickness of the first portion 221, second thickness 237 of the second portion 231). In some embodiments, the central thickness 217 can be about 0.5% or more, about 1% or more, about 2% or more, about 5% or more, about 13% or less, about 10% or less, or about 5% or less of the substrate thickness 227 (e.g., first thickness, second thickness 237). In some embodiments, the central thickness 217 as a percentage of the substrate thickness 227 (e.g., first thickness, second thickness 237) can be in a range from about 0.5% to about 13%, from about 0.5% to about 10%, from about 0.5% to about 5%, from about 1% to about 13%, from about 1% to about 10%, from about 1% to about 5%, from about 2% to about 13%, from about 2% to about 10%, from about 2% to about 5%, from about 5% to about 13%, from about 5% to about 10%, or any range or subrange therebetween. In further embodiments, the central thickness 217 can be within one or more of the ranges for the substrate thickness 227 (e.g., first thickness, second thickness 237) while being less than the substrate thickness. In further embodiments, the central thickness 217 can be about 10 μm or more, about 25 μm or more, about 50 μm or more, about 80 μm or more, about 220 μm or less, about 125 μm or less, about 100 μm or less, about 80 μm or less, about 60 μm or less, or about 40 μm or less. In even further embodiments, the central thickness 217 can be in a range from about 10 μm to about 220 μm, from about 10 μm to about 125 μm, from about 10 μm to about 100 μm, from about 10 μm to about 80 μm, from about 25 μm to about 80 μm, from about 25 μm to about 60 μm, from about 50 μm to about 60 μm, or any range or subrange therebetween. Increased puncture resistance can be achieved by selecting a central thickness 217 that is less than about 50 micrometers (μm) or greater than about 80 μm based on results from the Pen Drop Test discussed below with reference to FIG. 42. In further embodiments, the central thickness 217 can be greater than about 80 μm, for example, about 80 μm or more, about 100 μm or more, about 125 μm or more, about 220 μm or less, about 175 μm or less, or about 150 μm or less. In even further embodiments, the central thickness 217 can be in a range from about 80 μm to about 220 μm, from about 80 μm to about 175 μm, from about 80 μm to about 150 μm, from about 100 μm to about 150 μm, from about 125 μm to about 150 μm, or any range or subrange therebetween. In further embodiments, the central thickness 217 can be less than about 80 μm, for example, in a range from about 10 μm to about 80 μm, from about 25 μm to about 60 μm, from about 10 μm to about 50 μm, from about 25 μm to about 50 μm, from about 10 μm to about 40 μm, from about 25 μm to about 40 μm, or any range or subrange therebetween.

As shown in FIG. 2, the central portion 251 can comprise a first transition portion 253. The first transition portion 253 can attach the first portion 221 to a region of the central portion 251 comprising the central thickness 217 (e.g., region comprising the central major surface 211). A thickness of the first transition portion 253 can be defined between the second plane 204b and the first central surface area 209. As shown in FIG. 2, the thickness of the first transition portion 253 can continuously increase from the central major surface 211 (e.g., the central thickness 217) to the first portion 221 (e.g., the first thickness, substrate thickness 227). In some embodiments, as shown, the thickness of the first transition portion 253 can increase at a constant rate from the central major surface 211 to the first portion 221. In some embodiments, although not shown, the thickness of the first transition portion 253 may increase more slowly where the central major surface 211 meets the first transition portion 253 than in the middle of the first transition portion 253. In some embodiments, although not shown, the thickness of the first transition portion 253 may increase more slowly where the first portion 221 meets the first transition portion 253 than in the middle of the first transition portion 253. In some embodiments, as shown in FIG. 3, the central portion 251 may not comprise a first transition portion.

The central portion 251 can comprise a second transition portion 255. As shown in FIG. 2, the second transition portion 255 can attach the second portion 231 to a region of the central portion 251 comprising the central thickness 217 (e.g., region comprising the central major surface 211). A thickness of the second transition portion 255 can be defined between the second plane 204b and the first central surface area 209. As shown in FIG. 2, the thickness of the second transition portion 255 can continuously increase from the central major surface 211 (e.g., the central thickness 217) to the second portion 231 (e.g., the first thickness). In some embodiments, as shown, the thickness of the second transition portion 255 can increase at a constant rate from the central major surface 211 to the second portion 231. In some embodiments, although not shown, the thickness of the second transition portion 255 may increase more slowly where the central major surface 211 meets the second transition portion 255 than in the middle of the second transition portion 255. In some embodiments, although not shown, the thickness of the second transition portion 255 may increase more slowly where the second portion 231 meets the second transition portion 255 than in the middle of the second transition portion 255. In some embodiments, as shown in FIG. 3, the central portion 251 may not comprise a second transition portion.

As shown in FIG. 2, a width 254a of the first transition portion 253 can be defined between the central major surface 211 and the first portion 221 in the direction 106 of the length 105 of the foldable apparatus 101. A width 254b of the second transition portion 255 can be defined between the central major surface 211 and the second portion 231 in the direction 106 of the length 105 of the foldable apparatus 101. In some embodiments, the width 254a of the first transition portion 253 and/or the width 254b of the second transition portion 255 can be sufficiently large (e.g., 1 mm or more) to avoid optical distortions that may otherwise occur at a step transition or small transition width (e.g., less than 1 mm) between the first and central thickness. Providing a sufficiently small length of the transition regions (e.g., about 5 mm or less) reduces the amount of the foldable substrate having an intermediate thickness that may have reduced impact resistance and/or reduced puncture resistance, for example, in a range from about 50 µm to about 80 µm based on the Pen Drop Test discussed below with reference to FIG. 42. In some embodiments, to enhance puncture resistance of the foldable substrate while also avoiding optical distortions, the width 254a of the first transition portion 253 and/or the width 254b of the second transition portion 255 can be about 1 mm or more, about 2 mm or more, about 3 mm or more, about 5 mm or less, about 4 mm or less, or about 3 mm or less. In some embodiments, the width 254a of the first transition portion 253 and/or the width 254b of the second transition portion 255 can be in a range from about 1 mm to about 5 mm, from about 1 mm to about 4 mm, from about 1 mm to about 3 mm, from about 2 mm to about 5 mm, from about 2 mm to about 4 mm, from about 2 mm to about 3 mm, from about 3 mm to about 5 mm, from about 3 mm to about 4 mm, or any range or subrange therebetween.

As used herein, if a first layer and/or component is described as "disposed over" a second layer and/or component, other layers may or may not be present between the first layer and/or component and the second layer and/or component. Furthermore, as used herein, "disposed over" does not refer to a relative position with reference to gravity. For example, a first layer and/or component can be considered "disposed over" a second layer and/or component, for example, when the first layer and/or component is positioned underneath, above, or to one side of a second layer and/or component. As used herein, a first layer and/or component described as "bonded to" a second layer and/or component means that the layers and/or components are bonded to each other, either by direct contact and/or bonding between the two layers and/or components or via an adhesive layer. As used herein, a first layer and/or component described as "contacting" or "in contact with" a second layer and/or components refers to direct contact and includes the situations where the layers and/or components are bonded to each other.

As shown in FIGS. 2-3 and 6-7, the foldable apparatus 101 and/or 301 and/or test foldable apparatus 602 can comprise an adhesive layer 261. As shown, the adhesive layer 261 can comprise a first contact surface 263 and a second contact surface 265 that can be opposite the first contact surface 263. In some embodiments, as shown, the second contact surface 265 of the adhesive layer 261 can comprise a planar surface. An adhesive thickness 267 of the adhesive layer 261 can be defined between the first contact surface 263 and the second contact surface 265. In some embodiments, the adhesive thickness 267 of the adhesive layer 261 can be about 1 µm or more, about 5 µm or more, about 10 µm or more, about 100 µm or less, about 60 µm or less, about 30 µm or less, or about 20 µm or less. In some embodiments, the adhesive thickness 267 of the adhesive layer 261 can be in a range from about 1 µm to about 100 µm, from about 5 µm to about 100 µm, from about 5 µm to about 60 µm, from about 5 µm to about 30 µm, from about 10 µm to about 30 µm, from about 10 µm to about 20 µm, or any range or subrange therebetween.

In some embodiments, as shown in FIG. 2, the first contact surface 263 of the adhesive layer 261 can face the first major surface 273 of a release liner 271 (described below). In further embodiments, as shown, the first contact surface 263 of the adhesive layer 261 can contact the first major surface 273 the release liner 271. In some embodiments, as shown in FIGS. 3 and 6-7, the first contact surface 263 of the adhesive layer 261 can face the first major surface 303 of the display device 307. In further embodiments, as shown, the first contact surface 263 of the adhesive layer 261 can contact the first major surface 303 of the display device 307.

The adhesive layer 261 will now be described with reference to the foldable apparatus 101 of FIG. 2 with the understanding that such description of the adhesive layer 261 can also apply to the foldable apparatus 301 and/or foldable substrate 201 illustrated in FIGS. 3 and 6-7. In some embodiments, as shown in FIG. 2, the second contact surface 265 of the adhesive layer 261 can face the first surface area 223 of the first portion 221. In further embodiments, as shown, the second contact surface 265 of the adhesive layer 261 can contact the first surface area 223 of the first portion 221. In some embodiments, as shown, the second contact surface 265 of the adhesive layer 261 can face the third surface area 233 of the second portion 231. In further embodiments, as shown, the second contact surface 265 of the adhesive layer 261 can contact the third surface area 233 of the second portion 231.

In some embodiments, the adhesive layer 261 can comprise one or more of a polyolefin, a polyamide, a halide-containing polymer (e.g., polyvinylchloride or a fluorine-containing polymer), an elastomer, a urethane, phenolic resin, parylene, polyethylene terephthalate (PET), and polyether ether ketone (PEEK). Example embodiments of polyolefins include low molecular weight polyethylene (LDPE), high molecular weight polyethylene (HDPE), ultra-high molecular weight polyethylene (UHMWPE), and polypropylene (PP). Example embodiments of fluorine-containing polymers include polytetrafluoroethylene (PTFE), polyvinylfluoride (PVF), polyvinylidene fluoride (PVDF), perfluoropolyether (PFPE), perfluorosulfonic acid (PFSA), a perfluoroalkoxy (PFA), fluorinated ethylene propylene (FEP) polymers, and ethylene tetrafluoro ethylene (ETFE) polymers. Example embodiments of elastomers include rubbers (e.g., polybutadiene, polyisoprene, chloroprene rubber, butyl rubber, nitrile rubber) and block copolymers (e.g., styrene-butadiene, high-impact polystyrene, poly(dichlorophosphazene). In further embodiments, the adhesive layer 261 can comprise an optically clear adhesive. In even further embodiments, the optically clear adhesive can comprise one or more optically transparent polymers: an acrylic (e.g., polymethylmethacrylate (PMMA)), an epoxy, silicone and/or a polyurethane. Examples of epoxies include bisphenol-based epoxy resins, novolac-based epoxies, cycloaliphatic-based epoxies, and glycidylamine-based epoxies. In even further embodiments, the optically clear adhesive can comprise, but is not limited to, acrylic adhesives, for example, 3M 8212 adhesive, or an optically transparent liquid adhesive, for example, a LOCTITE optically transparent liquid adhesive. Exemplary embodiments of optically clear adhesives comprise transparent acrylics, epoxies, silicones, and polyurethanes. For example, the optically transparent liquid adhesive could comprise one or more of LOCTITE AD 8650, LOCTITE AA 3922, LOCTITE EA E-05MR, LOCTITE UK U-09LV, which are all available from Henkel.

As shown in FIG. 2, at least a portion of the adhesive layer 261 of the foldable apparatus 101 can be positioned between the first portion 221 and the second portion 231. In some embodiments, as shown, a recess 219 can be defined between the first central surface area 209 and the first plane 204a. In some embodiments, the recess 219 can be defined between the third plane 204c and the first plane 204a. In some embodiments, as shown, the adhesive layer 261 can be at least partially positioned in the recess 219. In further embodiments, as shown, the polymer-based portion 241 can fill the recess 219. In some embodiments, although not shown, the recess may not be totally filled, for example, to leave room for electronic devices and/or mechanical devices.

As shown in FIGS. 3 and 6-7, the polymer-based portion 241 of the foldable apparatus 301 and/or test foldable apparatus 602 can be positioned between the first portion 221 and the second portion 231. In some embodiments, as shown, a recess 219 can be defined between the first central surface area 209 and the first plane 204a. In some embodiments, the recess 219 can be defined between the third plane 204c and the first plane 204a. In some embodiments, as shown, the polymer-based portion 241 can be at least partially positioned in the recess 219. In further embodiments, as shown, the polymer-based portion 241 can fill the recess 219. In even further embodiments, the polymer-based portion 241 can comprise the same material as the adhesive layer 261 such that the adhesive layer 261 can fill the recess. In some embodiments, although not shown, the adhesive layer 261 can extend into the recess in place of the polymer-based portion 241 and/or the adhesive layer 261 can fill the recess. In some embodiments, although not shown, the recess may not be totally filled, for example, to leave room for electronic devices and/or mechanical devices.

As shown in FIG. 3, the polymer-based portion 241 can comprise a fourth contact surface 247 opposite the third contact surface 245. In some embodiments, as shown, the fourth contact surface 247 can comprise a planar surface. In further embodiments, the fourth contact surface 247 may be substantially coplanar (e.g., extend along a common plane, first plane 204a) with the first surface area 223 and the third surface area 233. In some embodiments, the third contact surface 245 can comprise a planar surface. In some embodiments, in addition to the fourth contact surface 247 being substantially coplanar with the first surface area 223 and the third surface area 233, the third contact surface 245 can be substantially coplanar (e.g., extend along a common plane, third plane 204c) with the first central surface area 209 (e.g., central major surface 211). The polymer-based portion 241 may extend in a direction 202 of the substrate thickness 227 (e.g., first thickness of the first portion 221) that is substantially equal to a difference between the substrate thickness 227 (e.g., first thickness of the first portion 221) and the central thickness 217.

In some embodiments, the second contact surface 265 of the adhesive layer 261 can face the fourth contact surface 247 of the polymer-based portion 241. In further embodiments, as shown, the second contact surface 265 of the adhesive layer 261 can contact the fourth contact surface 247 of the polymer-based portion 241. In even further embodiments, as shown in FIG. 2, the adhesive layer 261 may occupy the recess 219 instead of the polymer-based portion 241. In some embodiments, although not shown, the adhesive layer 261 may not be present and instead the polymer-based portion 241 may occupy the region occupied by the adhesive layer 261.

In some embodiments, the polymer-based portion 241 comprises a polymer (e.g., optically transparent polymer). In further embodiments, the polymer-based portion 241 can comprise one or more of an optically transparent: an acrylic (e.g., polymethylmethacrylate (PMMA)), an epoxy, a silicone, and/or a polyurethane. Examples of epoxies include bisphenol-based epoxy resins, novolac-based epoxies, cycloaliphatic-based epoxies, and glycidylamine-based epoxies. In further embodiments, the polymer-based portion 241 can comprise one or more of a polyolefin, a polyamide, a halide-containing polymer (e.g., polyvinylchloride or a fluorine-containing polymer), an elastomer, a urethane, phenolic resin, parylene, polyethylene terephthalate (PET), and polyether ether ketone (PEEK). Example embodiments of polyolefins include low molecular weight polyethylene (LDPE), high molecular weight polyethylene (HDPE), ultra-high molecular weight polyethylene (UHMWPE), and polypropylene (PP). Example embodiments of fluorine-containing polymers include polytetrafluoroethylene (PTFE), polyvinylfluoride (PVF), polyvinylidene fluoride (PVDF), perfluoropolyether (PFPE), perfluorosulfonic acid (PFSA), a perfluoroalkoxy (PFA), fluorinated ethylene propylene (FEP) polymers, and ethylene tetrafluoro ethylene (ETFE) polymers. Example embodiments of elastomers include rubbers (e.g., polybutadiene, polyisoprene, chloroprene rubber, butyl rubber, nitrile rubber) and block copolymers (e.g., styrene-butadiene, high-impact polystyrene, poly(dichlorophosphazene), for example, comprising one or more of polystyrene, polydichlorophosphazene, and poly(5-ethylidene-2-norbornene). In some embodiments, the polymer-based portion can comprise a sol-gel material. Example embodiments of polyurethanes comprise thermoset polyurethanes, for example, Dispurez 102 available from Incorez and thermoplastic polyurethanes, for example, KrystalFlex PE505 available from Huntsman. In even further embodiments, the second portion can comprise an ethylene acid copolymer. An exemplary embodiment of an ethylene acid copolymer includes SURLYN available from Dow (e.g., Surlyn PC-2000, Surlyn 8940, Surlyn 8150). An additional exemplary embodiment for the second portion comprises Eleglass w802-GL044 available from Axalta with from 1 wt % to 2 wt % cross-linker. In some embodiments, the polymer-based portion 241 can further comprise nanoparticles, for example, carbon black, carbon nanotubes, silica nanoparticles, or nanoparticles comprising a polymer. In some embodiments, the polymer-based portion can further comprise fibers to form a polymer-fiber composite.

In some embodiments, the polymer-based portion 241 can comprise a coefficient of thermal expansion (CTE). As used herein, a coefficient of thermal expansion is measured in accordance with ASTM E289-17 using a Picoscale Michelson Interferometer between $-20°$ C. and $40°$ C. In some embodiments, the polymer-based portion 241 can comprise particles of one or more of copper oxide, beta-quartz, a tungstate, a vanadate, a pyrophosphate, and/or a nickel-titanium alloy.

In some embodiments, the polymer-based portion 241 can comprise a CTE of about $-20\times10^{-7}$ $1/°$ C. or more, about $-10\times10^{-7}$ $1/°$ C. or more, about $-5\times10^{-7}$ $1/°$ C. or more, about $-2\times10^{-7}$ $1/°$ C. or more, about $10\times10^{-7}$ $1/°$ C. or less, about $5\times10^{-7}$ $1/°$ C. or less, about $2\times10^{-7}$ $1/°$ C. or less, about $1\times10^{-7}$ $1/°$ C. or less, or $0$ $1/°$ C. or less. In some embodiments, the polymer-based portion 241 can comprise a CTE in a range from about $-20\times10^{-7}$ $1/°$ C. to about $10\times10^{-7}$ $1/°$ C., from about $-20\times10^{-7}$ $1/°$ C. to about $5\times10^{-7}$ $1/°$ C., from about $-10\times10^{-7}$ $1/°$ C. to about $-5\times10^{-7}$ $1/°$ C., from about $-10\times10^{-7}$ $1/°$ C. to about $2\times10^{-7}$ $1/°$ C., from about $-10\times10^{-7}$ $1/°$ C. to $0$ $1/°$ C., from about $-5\times10^{-7}$ $1/°$ C. to $0$ $1/°$ C., from about $-2\times10^{-7}$ $1/°$ C. to about $0$ $1/°$ C., or any range or subrange therebetween. By providing a polymer-based portion comprising a low (e.g., negative) coefficient of thermal expansion, warp caused by volume changes during curing of the polymer-based portion can be mitigated.

In some embodiments, the polymer-based portion 241 can comprise an elastic modulus of about 0.01 MegaPascals (MPa) or more, about 1 MPa or more, about 10 MPa or more, about 20 MPa or more, about 100 MPa or more, about 200 MPa or more, about 1,000 MPa or more, about 5,000 MPa or less, about 3,000 MPa or less, about 1,000 MPa or less, about 500 MPa or less, or about 200 MPa or less. In some embodiments, the polymer-based portion 241 can comprise an elastic modulus in a range from about 0.001 MPa to about 5,000 MPa, from about 0.01 MPa to about 3,000 MPa, from about 0.01 MPa to about 1,000 MPa, from about 0.01 MPa to about 500 MPa, from about 0.01 MPa to about 200 MPa, from about 1 MPa to about 5,000 MPa, from about 1 MPa to about 1,000 MPa, from about 1 MPa to about 1,000 MPa, from about 1 MPa to about 200 MPa, from about 10 MPa to about 5,000 MPa, from about 10 MPa to about 1,000 MPa, from about 10 MPa to about 200 MPa, from about 20 MPa to about 3,000 MPa, from about 20 MPa to about 1,000 MPa, from about 20 MPa to about 200 MPa, from about 100 MPa to about 3,000 MPa, from about 100 MPa to about 1,000 MPa, from about 100 MPa to about 200 MPa, from about 200 MPa to about 5,000 MPa, from about 200 MPa to about 3,000 MPa, from about 200 MPa to about 1,000 MPa, or any range or subrange therebetween. In some embodiments, the elastic modulus of the polymer-based portion 241 can be in a range from about 1 GPa to about 20 GPa, from about 1 GPa to about 18 GPa, from about 1 GPa to about 10 GPa, from about 1 GPa to about 5 GPa, from about 1 GPa to about 3 GPa, or any range or subrange therebetween. By providing a polymer-based portion 241 with an elastic modulus in a range from about 0.01 MPa to about 3,000 MPa (e.g., in a range from about 20 MPa to about 3 GPa), folding of the foldable apparatus without failure can be facilitated. In some embodiments, the adhesive layer 261 comprises an elastic modulus greater than the elastic modulus of the polymer-based portion 241, which arrangement provides improved performance in puncture resistance. In some embodiments, the elastic modulus of the polymer-based portion 241 can be less than the elastic modulus of the foldable substrate 201. In some embodiments, the adhesive layer 261 may comprise an elastic modulus within the ranges listed above in this paragraph. In further embodiments, the adhesive layer 261 may comprise substantially the same elastic modulus as the elastic modulus of the polymer-based portion 241. In further embodiments, the elastic modulus of the adhesive layer 261 can be in a range from about 1 GPa to about 20 GPa, from about 1 GPa to about 18 GPa, from about 1 GPa to about 10 GPa, from about 1 GPa to about 5 GPa, from about 1 GPa to about 3 GPa, or any range or subrange therebetween. In some embodiments, the elastic modulus of the polymer-based portion 241 can be less than the elastic modulus of the first portion 221. In some embodiments, the elastic modulus of the polymer-based portion 241 can be less than the elastic modulus of the second portion 231.

In some embodiments, the adhesive layer 261 can comprise an elastic modulus of about 0.001 MegaPascals (MPa) or more, about 0.01 MPa or more, about 0.1 MPa or more, about 1 MPa or less, about 0.5 MPa or less, about 0.1 MPa or less, or about 0.05 MPa or less. In some embodiments, the adhesive layer 261 can comprise an elastic modulus in a range from about 0.001 MPa to about 1 MPa, from about 0.01 MPa to about 1 MPa, from about 0.01 MPa to about 0.5 MPa, from about 0.05 MPa to about 0.5 MPa, from about 0.05 MPa to about 0.1 MPa to about 0.5 MPa, from about 0.001 MPa to about 0.5 MPa, from about 0.001 MPa to about 0.01 MPa, or any range or subrange therebetween. In some embodiments, the adhesive layer can comprise an elastic modulus within one or more of the ranges discussed above for the elastic modulus of the polymer-based portion 241.

In some embodiments, as shown in FIG. 2, a coating 281 can be disposed over the second major surface 205 of the foldable substrate 201. In further embodiments, the coating 281 can be disposed over the first portion 221, the second portion 231, and the central portion 251. In some embodiments, the coating 281 can comprise a third major surface 283 and a fourth major surface 285 opposite the third major surface 283. In further embodiments, the coating 281 (e.g., third major surface 283) can contact the foldable substrate 201 (e.g., second major surface 205). In further embodiments, the coating 281 can comprise a coating thickness 287 defined between the third major surface 283 and the fourth major surface 285. In further embodiments, the coating thickness 287 can be about 0.1 μm or more, about 1 μm or more, about 5 μm or more, about 10 μm or more, about 15 μm or more, about 20 μm or more, about 25 μm or more, about 40 μm or more, about 50 μm or more, about 60 μm or more, about 70 μm or more, about 80 μm or more, about 90 μm or more, about 200 μm or less, about 100 μm or less, or about 50 μm or less, about 30 μm or less, about 25 μm or less, about 20 μm or less, about 20 μm or less, about 15 μm or less, or about 10 μm or less. In some embodiments, the coating thickness 287 can be in a range from about 0.1 μm to about 200 μm, from about 1 μm to about 200 μm, from about 10 μm to about 200 μm, from about 50 μm to about 200 μm, from about 0.1 μm to about 100 μm, from about 1 μm to about 100 μm, from about 10 μm to about 100 μm, from about 20 μm to about 100 μm, from about 30 μm to about 100 μm, from about 40 μm to about 100 μm, from about 50 μm to about 100 μm, from about 60 μm to about 100 μm, from about 70 μm to about 100 μm, from about 80 μm to about 100 μm, from about 90 μm to about 100 μm, from about 0.1 μm to about 50 μm, from about 1 μm to about 50 μm, from about 10 μm to about 50 μm, or any range or subrange therebetween. In further embodiments, the coating thickness 287 can be in a range from about 0.1 μm to about 50 μm, from about 0.1 μm to about 30 μm, from about 0.1 μm to about 25 μm, from about 0.1 μm to about 20 μm, from about 0.1 μm to about 15 μm, from about 0.1 μm to about 10 μm, from about 1 μm to about 30 μm, from about 1 μm to about 25 μm, from about 1 μm to about 20 μm, from about 1 μm to about 15 μm, from about 1 μm to about 10 μm, from about 5 μm to about 30 μm, from about 5 μm to about 25 μm, from about 5 μm to about 20 μm, from about 5 μm to about 15 μm, from about 5 μm to about 10 μm, from about 10 μm to about 30 μm, from about 10 μm to about 25 μm, from about 10 μm to about 20 μm, from about 10 μm to about 15 μm, from about 15 μm to about 30 μm, from about 15 μm to about 25 μm, from about 15 μm to about 20 μm, from about 20 μm to about 30 μm, from about 20 μm to about 25 μm, or any range or subrange therebetween.

In some embodiments, the coating 281 can comprise a polymeric hard coating. In further embodiments, the polymeric hard coating can comprise one or more of an ethylene-acid copolymer, a polyurethane-based polymer, an acrylate resin, and a mercapto-ester resin. Example embodiments of ethylene-acid copolymers include ethylene-acrylic acid copolymers, ethylene-methacrylic acid copolymers, and ethylene-acrylic-methacrylic acid terpolymers (e.g., Nucrel, manufactured by DuPont), ionomers of ethylene acid copolymers (e.g., Surlyn, manufactured by DuPont), and ethylene-acrylic acid copolymer amine dispersions (e.g., Aquacer, manufactured by BYK). Example embodiments of polyurethane-based polymers include aqueous modified polyurethane dispersions (e.g., Eleglas®, manufactured by Axalta). Example embodiments of acrylate resins which can be UV curable include acrylate resins (e.g., Uvekol® resin, manufactured by Allnex), cyanoacrylate adhesives (e.g., Permabond® UV620, manufactured by Krayden), and UV radical acrylic resins (e.g., Ultrabond windshield repair resin, for example, Ultrabond (45CPS)). Example embodiments of mercapto-ester resins include mercapto-ester triallyl isocyanuates (e.g., Norland optical adhesive NOA 61). In further embodiments, the polymeric hard coating can comprise ethylene-acrylic acid copolymers and ethylene-methacrylic acid copolymers, which may be ionomerized to form ionomer resins through neutralization of the carboxylic acid residue with typically alkali metal ions, for example, sodium and potassium, and also zinc. Such ethylene-acrylic acid and ethylene-methacrylic acid ionomers may be dispersed within water and coated onto the substrate to form an ionomer coating. Alternatively, such acid copolymers may be neutralized with ammonia which, after coating and drying liberates the ammonia to reform the acid copolymer as the coating. By providing a coating comprising a polymeric coating, the foldable apparatus can comprise low energy fracture.

In some embodiments, the coating can comprise a polymeric hard coating comprising an optically transparent polymeric hard-coat layer. Suitable materials for an optically transparent polymeric hard-coat layer include, but are not limited to: a cured acrylate resin material, an inorganic-organic hybrid polymeric material, an aliphatic or aromatic hexafunctional urethane acrylate, a siloxane-based hybrid material, and a nanocomposite material, for example, an epoxy and urethane material with nanosilicate. In some embodiments, an optically transparent polymeric hard-coat layer may consist essentially of one or more of these materials. In some embodiments, an optically transparent polymeric hard-coat layer may consist of one or more of these materials. As used herein, "inorganic-organic hybrid polymeric material" means a polymeric material comprising monomers with inorganic and organic components. An inorganic-organic hybrid polymer is obtained by a polymerization reaction between monomers having an inorganic group and an organic group. An inorganic-organic hybrid polymer is not a nanocomposite material comprising separate inorganic and organic constituents or phases, for example, inorganic particulates dispersed within an organic matrix. More specifically, suitable materials for an optically transparent polymeric (OTP) hard-coat layer include, but are not limited to, a polyimide, a polyethylene terephthalate (PET), a polycarbonate (PC), a poly methyl methacrylate (PMMA), organic polymer materials, inorganic-organic hybrid polymeric materials, and aliphatic or aromatic hexafunctional urethane acrylates. In some embodiments, an OTP hard-coat layer may consist essentially of an organic polymer material, an inorganic-organic hybrid polymeric material, or aliphatic or aromatic hexafunctional urethane acrylate. In some embodiments, an OTP hard-coat layer may consist of a polyimide, an organic polymer material, an inorganic-organic hybrid polymeric material, or aliphatic or aromatic hexafunctional urethane acrylate. In some embodiments, an OTP hard-coat layer may include a nanocomposite material. In some embodiments, an OTP hard-coat layer may include a nano-silicate at least one of epoxy and urethane materials. Suitable compositions for such an OTP hard-coat layer are described in U.S. Pat. Pub. No. 2015/0110990, which is hereby incorporated by reference in its entirety by reference thereto. As used herein, "organic polymer material" means a polymeric material comprising monomers with only organic components. In some embodiments, an OTP hard-coat layer may comprise an organic polymer material manufactured by Gunze Limited and having a hardness of 9H, for example Gunze's "Highly Durable Transparent Film." As used herein, "inorganic-organic hybrid polymeric material" means a polymeric material comprising monomers with inorganic and organic components. An inorganic-organic hybrid polymer is obtained by a polymerization reaction between monomers having an inorganic group and an organic group. An inorganic-organic hybrid polymer is not a nanocomposite material comprising separate inorganic and organic constituents or phases, for example, inorganic particulates dispersed within an organic matrix. In some embodiments, the inorganic-organic hybrid polymeric material may include polymerized monomers comprising an inorganic silicon-based group, for example, a silsesquioxane polymer. A silsesquioxane polymer may be, for example, an alky-silsesquioxane, an aryl-silsesquioxane, or an aryl alkyl-silsesquioxane having the following chemical structure: $(RSiO_{1.5})_n$, where R is an organic group for example, but not limited to, methyl or phenyl. In some embodiments, an OTP hard-coat layer may comprise a silsesquioxane polymer combined with an organic matrix, for example, SILPLUS manufactured by Nippon Steel Chemical Co., Ltd. In some embodiments, an OTP hard-coat layer may comprise 90 wt % to 95 wt % aromatic hexafunctional urethane acrylate (e.g., PU662NT (Aromatic hexafunctional urethane acrylate) manufactured by Miwon Specialty Chemical Co.) and 10 wt % to 5 wt % photo-initiator (e.g., Darocur 1173 manufactured by Ciba Specialty Chemicals Corporation) with a hardness of 8H or more. In some embodiments, an OTP hard-coat layer composed of an aliphatic or aromatic hexafunctional urethane acrylate may be formed as a stand-alone layer by spin-coating the layer on a polyethylene terephthalate (PET) substrate, curing the urethane acrylate, and removing the urethane acrylate layer from the PET substrate. An OTP hard-coat layer may have a coating thickness (e.g., coating thickness 287) in a range of 1 μm to 150 μm, including subranges. For example, the coating thickness (e.g., coating thickness 287) can be in a range from 10 μm to 140 μm, from 20 μm to 130 μm, 30 μm to 120 μm, from 40 μm to 110 μm from 50 μm to 100 μm from 60 μm to 90 μm, 70 μm, 80 μm, 2 μm to 140 μm, from 4 μm to 130 μm, 6 μm to 120 μm, from 8 μm to 110 μm, from 10 μm to 100 μm, from 10 μm to 90 μm, 10 μm, 80 μm, 10 μm, 70 μm, 10 μm, 60 μm, 10 μm, 50 μm, or within a range having any two of these values as endpoints. In some embodiments, an OTP hard-coat layer may be a single monolithic layer. In some embodiments, an OTP hard-coat layer may be an inorganic-organic hybrid polymeric material layer or an organic polymer material layer having a thickness in the range of 80 μm to 120 μm, including subranges. For example, an OTP hard-coat layer comprising an inorganic-organic hybrid polymeric material or an organic polymer material may have a thickness of from 80 μm to 110 μm, 90 μm to 100 μm, or within a range having any two of these values as endpoints. In some embodiments, an OTP hard-coat layer may be an aliphatic or aromatic hexafunctional urethane acrylate material layer having a thickness in the range of 10 μm to 60 μm, including subranges. For example, an OTP hard-coat layer comprising an aliphatic or aromatic hexafunctional urethane acrylate material may have a thickness of 10 μm to 55 μm, 10 μm to 50 μm, 10 μm to 40 μm, 10 μm to 45 μm, 10 μm to 40 μm, 10 μm to 35 μm, 10 μm to 30 μm, 10 μm to 25 μm, 10 μm to 20 μm, or within a range having any two of these values as endpoints.

In some embodiments, the coating 281, if provided, may also comprise one or more of an easy-to-clean coating, a low-friction coating, an oleophobic coating, a diamond-like coating, a scratch-resistant coating, or an abrasion-resistant coating. A scratch-resistant coating may comprise an oxynitride, for example, aluminum oxynitride or silicon oxynitride with a thickness of about 500 micrometers or more. In such embodiments, the abrasion-resistant layer may comprise the same material as the scratch-resistant layer. In some embodiments, a low friction coating may comprise a highly fluorinated silane coupling agent, for example, an alkyl fluorosilane with oxymethyl groups pendant on the silicon atom. In such embodiments, an easy-to-clean coating may comprise the same material as the low friction coating. In other embodiments, the easy-to-clean coating may comprise a protonatable group, for example an amine, for example, an alkyl aminosilane with oxymethyl groups pendant on the silicon atom. In such embodiments, the oleophobic coating may comprise the same material as the easy-to-clean coating. In some embodiments, a diamond-like coating comprises carbon and may be created by applying a high voltage potential in the presence of a hydrocarbon plasma.

In some embodiments, as shown in FIG. 2, the foldable apparatus 101 can comprise the release liner 271 although other substrates (e.g., glass-based substrate and/or ceramic-based substrate discussed throughout the application) may be used in further embodiments rather than the illustrated release liner 271. In further embodiments, as shown, the release liner 271, or another substrate, can be disposed over the adhesive layer 261. In even further embodiments, as shown, the release liner 271, or another substrate, can directly contact the first contact surface 263 of the adhesive layer 261. The release liner 271, or another substrate, can comprise a first major surface 273 and a second major surface 275 opposite the first major surface 273. As shown, the release liner 271, or another substrate, can be disposed on the adhesive layer 261 by attaching the first contact surface 263 of the adhesive layer 261 to the second major surface 275 of the release liner 271, or another substrate. In some embodiments, as shown, the first major surface 273 of the release liner 271, or another substrate, can comprise a planar surface. In some embodiments, as shown, the second major surface 275 of the release liner 271, or another substrate, can comprise a planar surface. The release liner 271 can comprise a paper and/or a polymer. Exemplary embodiments of paper comprise kraft paper, machine-finished paper, polycoated paper (e.g., polymer-coated, glassine paper, siliconized paper), or clay-coated paper. Exemplary embodiments of polymers comprise polyesters (e.g., polyethylene terephthalate (PET)) and polyolefins (e.g., low-density polyethylene (LDPE), high-density polyethylene (HDPE), polypropylene (PP)).

In some embodiments, as shown in FIGS. 3 and 7, the foldable apparatus 301 can comprise the display device 307. In further embodiments, as shown, the display device 307 can be disposed over the adhesive layer 261. In further embodiments, as shown, the display device 307 can contact to the first contact surface 263 of the adhesive layer 261. In some embodiments, producing the foldable apparatus 301 may be achieved by removing the release liner 271 of the foldable apparatus 101 of FIG. 2 and attaching the display device 307 to the first contact surface 263 of the adhesive layer 261. Alternatively, the foldable apparatus 301 may be produced without the extra step of removing a release liner 271 before attaching the display device 307 to the first contact surface 263 of the adhesive layer 261, for example, when a release liner 271 is not applied to the first contact surface 263 of the adhesive layer 261. The display device 307 can comprise a first major surface 303 and a second major surface 305 opposite the first major surface 303. As shown, the display device 307 can be disposed on the adhesive layer 261 by attaching the first contact surface 263 of the adhesive layer 261 to the second major surface 305 of the display device 307. In some embodiments, as shown, the first major surface 303 of the display device 307 can comprise a planar surface. In some embodiments, as shown, the second major surface 305 of the display device 307 can comprise a planar surface. The display device 307 can comprise liquid crystal display (LCD), an electrophoretic displays (EPD), an organic light emitting diode (OLED) display, or a plasma display panel (PDP). In some embodiments, the display device 307 can be part of a portable electronic device, for example, a consumer electronic product, a smartphone, a tablet, a wearable device, or a laptop.

Embodiments of the disclosure can comprise a consumer electronic product. The consumer electronic product can comprise a front surface, a back surface, and side surfaces. The consumer electronic product can further comprise electrical components at least partially within the housing. The electrical components can comprise a controller, a memory, and a display. The display can be at or adjacent to the front surface of the housing. The consumer electronic product can comprise a cover substrate disposed over the display. In some embodiments, at least one of a portion of the housing or the cover substrate comprises the foldable apparatus discussed throughout the disclosure.

Figure 8:
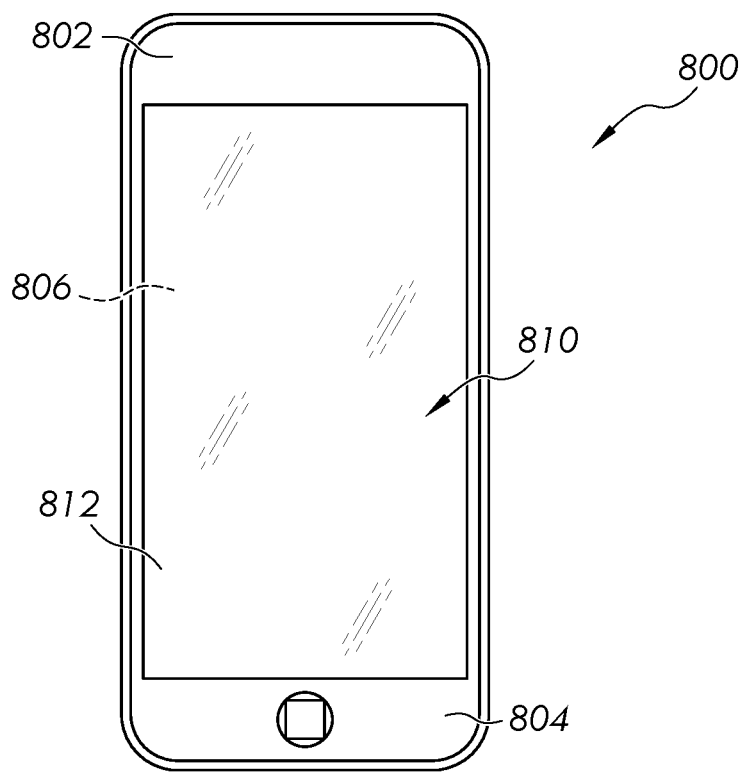
FIG. 8 is a schematic plan view of an example consumer electronic device according to some embodiments.
Figure 9:
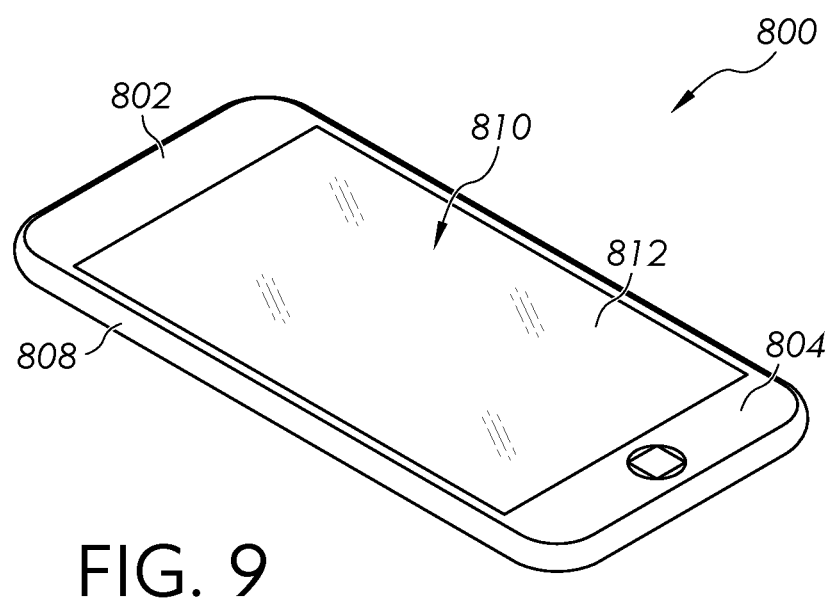
FIG. 9 is a schematic perspective view of the example consumer electronic device of FIG. 8.

The foldable apparatus disclosed herein may be incorporated into another article, for example, an article with a display (or display articles) (e.g., consumer electronics, including mobile phones, tablets, computers, navigation systems, wearable devices (e.g., watches) and the like), architectural articles, transportation articles (e.g., automotive, trains, aircraft, sea craft, etc.), appliance articles, or any article that may benefit from some transparency, scratch-resistance, abrasion resistance or a combination thereof. An exemplary article incorporating any of the foldable apparatus disclosed herein is shown in FIGS. 8-9. Specifically, FIGS. 8-9 show a consumer electronic device 800 including a housing 802 having front 804, back 806, and side surfaces 808; electrical components (not shown) that are at least partially inside or entirely within the housing and including at least a controller, a memory, and a display 810 at or adjacent to the front surface of the housing; and a cover substrate 812 at or over the front surface of the housing such that it is over the display. In some embodiments, at least one of the cover substrate 812 or a portion of housing 802 may include any of the foldable apparatus disclosed herein, for example, the foldable substrate.

In some embodiments, the foldable apparatus 101 and 301 and/or the test foldable apparatus 602 may be substantially symmetric about a plane (e.g., see plane 109 in FIGS. 1-3). The plane 109, in some embodiments, may comprise a central axis 107 of the foldable apparatus that can be positioned at the second major surface 205 of the foldable substrate 201. As further illustrated, in some embodiments, the plane 109 may comprise the pivot axis 102 of the foldable apparatus. In some embodiments, the foldable apparatus can be folded in a direction 111 (e.g., see FIG. 1) about the pivot axis 102 to form a folded configuration (e.g., see FIGS. 6-7). As shown, the foldable apparatus may include a single pivot axis to allow the foldable apparatus to comprise a bifold wherein, for example, the foldable apparatus may be folded in half. In further embodiments, the foldable apparatus may include two or more pivot axes with each pivot axis including a corresponding intermediate portion similar or identical to the central portion 251 discussed above. For example, providing two pivot axes can allow the foldable apparatus to comprise a trifold wherein, for example, the foldable apparatus may be folded with three portions comprising the first portion 221, the second portion 231 and a third portion similar or identical to the first or second portion.

In some embodiments, the foldable substrate 201 can comprise a glass-based substrate and/or a ceramic-based substrate, and the first portion 221, the second portion 231, and/or the central portion 251 can comprise one or more compressive stress regions. In some embodiments, a compressive stress region may be created by chemically strengthening. Chemically strengthening may comprise an ion exchange process, where ions in a surface layer are replaced by—or exchanged with—larger ions having the same valence or oxidation state. Methods of chemically strengthening will be discussed later. Without wishing to be bound by theory, chemically strengthening the first portion 221, the second portion 231, and/or the central portion 251 can enable good impact and/or puncture resistance (e.g., resists failure for a pen drop height of about 15 centimeters (cm) or more, about 20 cm or more, about 50 cm or more). Without wishing to be bound by theory, chemically strengthening the first portion 221, the second portion 231, and/or the central portion 251 can enable small (e.g., smaller than about 10 mm or less) bend radii because the compressive stress from the chemical strengthening can counteract the bend-induced tensile stress on the outermost surface of the substrate. A compressive stress region may extend into a portion of the first portion and/or the second portion for a depth called the depth of compression. As used herein, depth of compression means the depth at which the stress in the chemically strengthened substrates and/or portions described herein changes from compressive stress to tensile stress. Depth of compression may be measured by a surface stress meter or a scattered light polariscope (SCALP, wherein values reported herein were made using SCALP-5 made by Glasstress Co., Estonia) depending on the ion exchange treatment and the thickness of the article being measured. Where the stress in the substrate and/or portion is generated by exchanging potassium ions into the substrate, a surface stress meter, for example, the FSM-6000 (Orihara Industrial Co., Ltd. (Japan)), is used to measure depth of compression. Unless specified otherwise, compressive stress (including surface CS) is measured by surface stress meter (FSM) using commercially available instruments, for example the FSM-6000, manufactured by Orihara. Surface stress measurements rely upon the accurate measurement of the stress optical coefficient (SOC), which is related to the birefringence of the glass. Unless specified otherwise, SOC is measured according to Procedure C (Glass Disc Method) described in ASTM standard C770-16, entitled "Standard Test Method for Measurement of Glass Stress-Optical Coefficient," the contents of which are incorporated herein by reference in their entirety. Where the stress is generated by exchanging sodium ions into the substrate, and the article being measured is thicker than about 400 µm, SCALP is used to measure the depth of compression and central tension (CT). Where the stress in the substrate and/or portion is generated by exchanging both potassium and sodium ions into the substrate and/or portion, and the article being measured is thicker than about 400 µm, the depth of compression and CT are measured by SCALP. Without wishing to be bound by theory, the exchange depth of sodium may indicate the depth of compression while the exchange depth of potassium ions may indicate a change in the magnitude of the compressive stress (but not the change in stress from compressive to tensile). The refracted near-field (RNF; the RNF method is described in U.S. Pat. No. 8,854,623, entitled "Systems and methods for measuring a profile characteristic of a glass sample", which is incorporated herein by reference in its entirety) method also may be used to derive a graphical representation of the stress profile. When the RNF method is utilized to derive a graphical representation of the stress profile, the maximum central tension value provided by SCALP is utilized in the RNF method. The graphical representation of the stress profile derived by RNF is force balanced and calibrated to the maximum central tension value provided by a SCALP measurement. As used herein, "depth of layer" (DOL) means the depth that the ions have exchanged into the substrate and/or portion (e.g., sodium, potassium). Through the disclosure, when the maximum central tension cannot be measured directly by SCALP (as when the article being measured is thinner than about 400 µm) the maximum central tension can be approximated by a product of a maximum compressive stress and a depth of compression divided by the difference between the thickness of the substrate and twice the depth of compression, wherein the compressive stress and depth of compression are measured by FSM.

In some embodiments, the first portion 221 comprising the glass-based portion and/or ceramic-based portion may comprise a first compressive stress region at the first surface area 223 that can extend to a first depth of compression from the first surface area 223. In some embodiments, the first portion 221 comprising a first glass-based and/or ceramic-based portion may comprise a second compressive stress region at the second surface area 225 that can extend to a second depth of compression from the second surface area 225. In some embodiments, the first depth of compression and/or the second depth of compression as a percentage of the substrate thickness 227 (e.g., first thickness) can be about 1% or more, about 5% or more, about 10% or more, about 30% or less, about 25% or less, or about 20% or less. In some embodiments, the first depth of compression and/or the second depth of compression as a percentage of the substrate thickness 227 (e.g., first thickness) can be in a range from about 1% to about 30%, from about 5% to about 30%, from about 5% to about 25%, from about 5% to about 20%, from about 10% to about 30%, from about 10% to about 25%, from about 10% to about 20%, or any range or subrange therebetween. In further embodiments, the first depth of compression and/or the second depth of compression as a percentage of the substrate thickness 227 (e.g., first thickness) can be about 10% or less, for example, from about 1% to about 10%, from about 1% to about 8%, from about 3% to about 8%, from about 5% to about 8%, or any range or subrange therebetween.

In further embodiments, the first depth of compression can be substantially equal to the second depth of compression. In some embodiments, the first depth of compression and/or the second depth of compression can be about 1 µm or more, about 10 µm or more, about 30 µm or more, about 50 µm or more, about 200 µm or less, about 150 µm or less, about 100 µm or less, or about 60 µm or less. In some embodiments, the first depth of compression and/or the second depth of compression can be in a range from about 1 µm to about 200 µm, from about 1 µm to about 150 µm, from about 10 µm to about 150 µm, from about 10 µm to about 100 µm, from about 30 µm to about 100 µm, from about 30 µm to about 60 µm, from about 50 µm to about 60

µm, or any range or subrange therebetween. By providing a first portion comprising a first glass-based and/or ceramic-based portion comprising a first depth of compression and/or a second depth of compression in a range from about 1% to about 30% of the first thickness, good impact and/or puncture resistance can be enabled.

In some embodiments, the first compressive stress region can comprise a first maximum compressive stress. In some embodiments, the second compressive stress region can comprise a second maximum compressive stress. In further embodiments, the first maximum compressive stress and/or the second maximum compressive stress can be about 100 MegaPascals (MPa) or more, about 300 MPa or more, about 500 MPa or more, about 600 MPa or more, about 700 MPa or more, about 1,500 MPa or less, about 1,200 MPa or less, about 1,000 MPa or less, or about 800 MPa or less. In further embodiments, the first maximum compressive stress and/or the second maximum compressive stress can be in a range from about 100 MPa to about 1,500 MPa, from about 100 MPa to about 1,200 MPa, from about 300 MPa to about 1,200 MPa, from about 300 MPa to about 1,000 MPa, from about 500 MPa to about 1,000 MPa, from about 600 MPa to about 1,000 MPa, from about 600 MPa to about 1,000 MPa, from about 700 MPa to about 1,000 MPa, from about 700 MPa to about 800 MPa, or any range or subrange therebetween. By providing a first maximum compressive stress and/or a second maximum compressive stress in a range from about 100 MPa to about 1,500 MPa, good impact and/or puncture resistance can be enabled.

In some embodiments, the first portion 221 can comprise a first depth of layer of one or more alkali metal ions associated with the first compressive stress region and the first depth of layer. In some embodiments, the first portion 221 can comprise a second depth of layer of one or more alkali metal ions associated with the second compressive stress region and the second depth of layer. As used herein, the one or more alkali metal ions of a depth of layer of one or more alkali metal ions can include sodium, potassium, rubidium, cesium, and/or francium. In some embodiments, the one or more alkali ions of the first depth of layer of the one or more alkali ions and/or the second depth of layer of the one or more alkali ions comprises potassium. In some embodiments, the first depth of layer and/or the second depth of layer as a percentage of the substrate thickness 227 (e.g., first thickness) can be about 1% or more, about 5% or more, about 10% or more, about 40% or less, about 35% or less, about 30% or less, about 25% or less, or about 20% or less. In some embodiments, the first depth of layer and/or the second depth of layer as a percentage of the substrate thickness 227 (e.g., first thickness) can be in a range from about 1% to about 40%, from about 1% to about 35%, from about 1% to about 30%, from about 1% to about 25%, from about 1% to about 20%, from about 5% to about 30%, from about 5% to about 25%, from about 5% to about 20%, from about 10% to about 30%, from about 10% to about 25%, from about 10% to about 20%, or any range or subrange therebetween. In further embodiments, the first depth of layer of the one or more alkali metal ions and/or the second depth of layer of the one or more alkali metal ions as a percentage of the substrate thickness 227 (e.g., first thickness) can be about 10% or less, for example, from about 1% to about 10%, from about 1% to about 8%, from about 3% to about 8%, from about 5% to about 8%, or any range or subrange therebetween. In some embodiments, the first depth of layer of the one or more alkali metal ions and/or the second depth of layer of the one or more alkali metal ions can be about 1 µm or more, about 10 µm or more, about 30 µm or more, about 50 µm or more, about 200 µm or less, about 150 µm or less, about 100 µm or less, or about 60 µm or less. In some embodiments, the first depth of layer of the one or more alkali metal ions and/or the second depth of layer of the one or more alkali metal ions can be in a range from about 1 µm to about 200 µm, from about 1 µm to about 150 µm, from about 10 µm to about 150 µm, from about 10 µm to about 100 µm, from about 30 µm to about 100 µm, from about 30 µm to about 60 µm, from about 50 µm to about 60 µm, or any range or subrange therebetween.

In some embodiments, the first portion 221 may comprise a first tensile stress region. In some embodiments, the first tensile stress region can be positioned between the first compressive stress region and the second compressive stress region. In some embodiments, the first tensile stress region can comprise a first maximum tensile stress. In further embodiments, the first maximum tensile stress can be about 10 MPa or more, about 20 MPa or more, about 30 MPa or more, about 100 MPa or less, about 80 MPa or less, or about 60 MPa or less. In further embodiments, the first maximum tensile stress can be in a range from about 10 MPa to about 100 MPa, from about 10 MPa to about 80 MPa, from about 10 MPa to about 60 MPa, from about 20 MPa to about 100 MPa, from about 20 MPa to about 80 MPa, from about 20 MPa to about 60 MPa, from about 30 MPa to about 100 MPa, from about 30 MPa to about 80 MPa, from about 30 MPa to about 60 MPa, or any range or subrange therebetween. Providing a first maximum tensile stress in a range from about 10 MPa to about 100 MPa can enable good impact and/or puncture resistance while providing low energy fractures, as discussed below.

In some embodiments, the first portion 221 can comprise a first average concentration of potassium on an oxide basis. As used herein, "on an oxide basis" means the component is measured as if the non-oxygen components in the compound were converted into a specified oxide form or a fully oxidized oxide if a specific oxide form is not specified. For example, sodium (Na) on an oxide basis refers to amounts in terms of sodium oxide ($Na_2O$) while potassium on an oxide basis refers to amounts in terms of potassium oxide ($K_2O$). As such, a component need not actually be in the specified oxide form or in the fully oxidized oxide form in order for the component to count in measures on "an oxide basis." As such, a measurement "an oxide basis" for a specific component comprises conceptually converting materials comprising the non-oxygen element of the specific component into the specified oxide form or the fully oxidized oxide if a specific oxide form is not specified before calculating the concentration on an oxide basis. In some embodiments, the first average concentration of potassium on an oxide basis can be about 10 parts per million (ppm) or more, about 50 ppm or more, about 200 ppm or more, about 500 ppm or more, about 1,000 ppm or more, about 2,000 ppm or more, about 300,000 or less, about 100,000 ppm or less, about 50,000 ppm or less, about 20,000 ppm or less, about 10,000 ppm or less, or about 5,000 ppm or less. In some embodiments, the first average concentration of potassium on an oxide basis can be in a range from about 10 ppm to about 300,000 ppm, from about 50 ppm to about 300,000, from about 50 ppm to about 100,000, from about 200 ppm to about 100,000, from about 200 ppm to about 50,000 ppm, from about 500 ppm to about 50,000, from about 500 ppm to about 20,000 ppm, from about 1,000 ppm to about 20,000 ppm, from about 2,000 ppm to about 10,000 ppm, from about 2,000 ppm to about 5,000 ppm, or any range or subrange therebetween. Without wishing to be bound by theory, the average concentration of potassium comprises potassium introduce through chemically strengthening and potassium in the as-formed foldable substrate.

In some embodiments, the second portion 231 comprising a second glass-based and/or ceramic-based portion may comprise a third compressive stress region at the third surface area 233 that can extend to a third depth of compression from the third surface area 233. In some embodiments, the second portion 231 comprising a second glass-based and/or ceramic-based portion may comprise a fourth compressive stress region at the fourth surface area 235 that can extend to a fourth depth of compression from the fourth surface area 235. In some embodiments, the third depth of compression and/or the fourth depth of compression as a percentage of the substrate thickness 227 (e.g., second thickness 237) can be about 1% or more, about 5% or more, about 10% or more, about 30% or less, about 25% or less, or about 20% or less. In some embodiments, the third depth of compression and/or the fourth depth of compression as a percentage of the substrate thickness 227 (e.g., second thickness 237) can be in a range from about 1% to about 30%, from about 5% to about 30%, from about 5% to about 25%, from about 5% to about 20%, from about 10% to about 30%, from about 10% to about 25%, from about 10% to about 20%, or any range or subrange therebetween. In further embodiments, the third depth of compression can be substantially equal to the fourth depth of compression. In some embodiments, the third depth of compression and/or the fourth depth of compression can be about 1 µm or more, about 10 µm or more, about 30 µm or more, about 50 µm or more, about 200 µm or less, about 150 µm or less, about 100 µm or less, or about 60 µm or less. In some embodiments, the third depth of compression and/or the fourth depth of compression can be in a range from about 1 µm to about 200 µm, from about 1 µm to about 150 µm, from about 10 µm to about 150 µm, from about 10 µm to about 100 µm, from about 30 µm to about 100 µm, from about 30 µm to about 60 µm, from about 50 µm to about 60 µm, or any range or subrange therebetween. By providing a second portion comprising a glass-based and/or ceramic-based portion comprising a third depth of compression and/or a fourth depth of compression in a range from about 1% to about 30% of the substrate thickness, good impact and/or puncture resistance can be enabled.

In some embodiments, the third compressive stress region can comprise a third maximum compressive stress. In some embodiments, the fourth compressive stress region can comprise a fourth maximum compressive stress. In further embodiments, the third maximum compressive stress and/or the fourth maximum compressive stress can be about 100 MegaPascals (MPa) or more, about 300 MPa or more, about 500 MPa or more, about 600 MPa or more, about 700 MPa or more, about 1,500 MPa or less, about 1,200 MPa or less, about 1,000 MPa or less, or about 800 MPa or less. In further embodiments, the third maximum compressive stress and/or the fourth maximum compressive stress can be in a range from about 100 MPa to about 1,500 MPa, from about 100 MPa to about 1,200 MPa, from about 300 MPa to about 1,200 MPa, from about 300 MPa to about 1,000 MPa, from about 500 MPa to about 1,000 MPa, from about 600 MPa to about 1,000 MPa, from about 600 MPa to about 1,000 MPa, from about 700 MPa to about 1,000 MPa, from about 700 MPa to about 800 MPa, or any range or subrange therebetween. By providing a third maximum compressive stress and/or a fourth maximum compressive stress in a range from about 100 MPa to about 1,500 MPa, good impact and/or puncture resistance can be enabled.

In some embodiments, the second portion 231 can comprise a third depth of layer of one or more alkali metal ions associated with the third compressive stress region and the third depth of layer. In some embodiments, the second portion 231 can comprise a fourth depth of layer of one or more alkali metal ions associated with the fourth compressive stress region and the fourth depth of compression. In some embodiments, the one or more alkali ions of the third depth of layer of the one or more alkali ions and/or the fourth depth of layer of the one or more alkali ions comprises potassium. In some embodiments, the third depth of layer and/or the fourth depth of layer as a percentage of the substrate thickness 227 (e.g., first thickness, second thickness 237) can be about 1% or more, about 5% or more, about 10% or more, about 40% or less, about 35% or less, about 30% or less, about 25% or less, or about 20% or less. In some embodiments, the third depth of compression and/or the fourth depth of compression as a percentage of the substrate thickness 227 (e.g., first thickness, second thickness 237) can be in a range from about 1% to about 40%, from about 1% to about 35%, from about 1% to about 30%, from about 1% to about 25%, from about 1% to about 20%, from about 5% to about 30%, from about 5% to about 25%, from about 5% to about 20%, from about 10% to about 30%, from about 10% to about 25%, from about 10% to about 20%, or any range or subrange therebetween. In further embodiments, the third depth of layer of the one or more alkali metal ions and/or the fourth depth of layer of the one or more alkali metal ions as a percentage of the substrate thickness 227 (e.g., first thickness, second thickness 237) can be about 10% or less, for example, from about 1% to about 10%, from about 1% to about 8%, from about 3% to about 8%, from about 5% to about 8%, or any range or subrange therebetween. In some embodiments, the third depth of layer of the one or more alkali metal ions and/or the fourth depth of layer of the one or more alkali metal ions can be about 1 µm or more, about 10 µm or more, about 30 µm or more, about 50 µm or more, about 200 µm or less, about 150 µm or less, about 100 µm or less, or about 60 µm or less. In some embodiments, the third depth of layer of the one or more alkali metal ions and/or the fourth depth of layer of the one or more alkali metal ions can be in a range from about 1 µm to about 200 µm, from about 1 µm to about 150 µm, from about 10 µm to about 150 µm, from about 10 µm to about 100 µm, from about 30 µm to about 100 µm, from about 30 µm to about 60 µm, from about 50 µm to about 60 µm, or any range or subrange therebetween.

In some embodiments, the second portion 231 may comprise a second tensile stress region. In some embodiments, the second tensile stress region can be positioned between the third compressive stress region and the fourth compressive stress region. In some embodiments, the second tensile stress region can comprise a second maximum tensile stress. In further embodiments, the second maximum tensile stress can be about 10 MPa or more, about 20 MPa or more, about 30 MPa or more, about 100 MPa or less, about 80 MPa or less, or about 60 MPa or less. In further embodiments, the second maximum tensile stress can be in a range from about 10 MPa to about 100 MPa, from about 10 MPa to about 80 MPa, from about 10 MPa to about 60 MPa, from about 20 MPa to about 100 MPa, from about 20 MPa to about 80 MPa, from about 20 MPa to about 60 MPa, from about 30 MPa to about 100 MPa, from about 30 MPa to about 80 MPa, from about 30 MPa to about 60 MPa, or any range or subrange therebetween. Providing a second maximum tensile stress in a range from about 10 MPa to about 100 MPa can enable good impact and/or puncture resistance while providing low energy fractures, as discussed below.

In some embodiments, the second portion 231 can comprise a second average concentration of potassium on an oxide basis. In some embodiments, the second average concentration of potassium on an oxide basis can be about 10 parts per million (ppm) or more, about 50 ppm or more, about 200 ppm or more, about 500 ppm or more, about 1,000 ppm or more, about 2,000 ppm or more, about 300,000 or less, about 100,000 ppm or less, about 50,000 ppm or less, about 20,000 ppm or less, about 10,000 ppm or less, or about 5,000 ppm or less. In some embodiments, the second average concentration of potassium on an oxide basis can be in a range from about 10 ppm to about 300,000 ppm, from about 50 ppm to about 300,000, from about 50 ppm to about 100,000, from about 200 ppm to about 100,000, from about 200 ppm to about 50,000 ppm, from about 500 ppm to about 50,000, from about 500 ppm to about 20,000 ppm, from about 1,000 ppm to about 20,000 ppm, from about 2,000 ppm to about 10,000 ppm, from about 2,000 ppm to about 5,000 ppm, or any range or subrange therebetween.

In some embodiments, the first depth of compression can be substantially equal to the third depth of compression. In some embodiments, the second depth of compression can be substantially equal to the fourth depth of compression. In some embodiments, the first maximum compressive stress can be substantially equal to the third maximum compressive stress. In some embodiments, the second maximum compressive stress can be substantially equal to the fourth maximum compressive stress. In some embodiments, the first depth of layer of one or more alkali metal ions can be substantially equal to the third depth of layer of one or more alkali metal ions. In some embodiments, the second depth of layer of one or more alkali metal ions can be substantially equal to the fourth depth of layer of one or more alkali metal ions. In some embodiments, the first average concentration of potassium can be substantially equal to the second average concentration of potassium.

In some embodiments, the central portion 251 comprising the glass-based portion and/or ceramic-based portion may comprise a first central compressive stress region at the first central surface area 209 that can extend to first central depth of compression from the first central surface area 209. In some embodiments, the central portion 251 comprising the glass-based and/or ceramic-based portion may comprise a second central compressive stress region at the second central surface area 213 that can extend to a second central depth of compression from the second central surface area 213. In some embodiments, the first central depth of compression and/or the second central depth of compression as a percentage of the central thickness 217 can be about 1% or more, about 5% or more, about 10% or more, about 30% or less, about 25% or less, or about 20% or less. In some embodiments, the first central depth of compression and/or the second central depth of compression as a percentage of the central thickness 217 can be in a range from about 1% to about 30%, from about 5% to about 30%, from about 5% to about 25%, from about 5% to about 20%, from about 10% to about 30%, from about 10% to about 25%, from about 10% to about 20%, or any range or subrange therebetween. In further embodiments, the first central depth of compression and/or the second central depth of compression as a percentage of the central thickness 217 can be about 10% or more, for example, from about 10% to about 30%, from about 10% to about 25%, from about 15% to about 25%, from about 15% to about 20%, or any range or subrange therebetween.

In further embodiments, the first central depth of compression can be substantially equal to the second central depth of compression. In some embodiments, the first central depth of compression and/or the second central depth of compression can be about 1 μm or more, about 10 μm or more, about 30 μm or more, about 50 μm or more, about 200 μm or less, about 150 μm or less, about 100 μm or less, or about 60 μm or less. In some embodiments, the first central depth of compression and/or the second central depth of compression can be in a range from about 1 μm to about 200 μm, from about 1 μm to about 150 μm, from about 10 μm to about 150 μm, from about 10 μm to about 100 μm, from about 30 μm to about 100 μm, from about 30 μm to about 60 μm, from about 50 μm to about 60 μm, or any range or subrange therebetween. By providing a central portion comprising a glass-based and/or ceramic-based portion comprising a first central depth of compression and/or a second central depth of compression in a range from about 1% to about 30% of the central thickness, good impact and/or puncture resistance can be enabled.

In some embodiments, the first central compressive stress region can comprise a first central maximum compressive stress. In some embodiments, the second central compressive stress region can comprise a second central maximum compressive stress. In further embodiments, the first central maximum compressive stress and/or the second central maximum compressive stress can be about 100 MegaPascals (MPa) or more, about 300 MPa or more, about 500 MPa or more, about 600 MPa or more, about 700 MPa or more, about 1,500 MPa or less, about 1,200 MPa or less, about 1,000 MPa or less, or about 800 MPa or less. In further embodiments, the first central maximum compressive stress and/or the second central maximum compressive stress can be in a range from about 100 MPa to about 1,500 MPa, from about 100 MPa to about 1,200 MPa, from about 300 MPa to about 1,200 MPa, from about 300 MPa to about 1,000 MPa, from about 500 MPa to about 1,000 MPa, from about 600 MPa to about 1,000 MPa, from about 600 MPa to about 1,000 MPa, from about 700 MPa to about 1,000 MPa, from about 700 MPa to about 800 MPa, or any range or subrange therebetween. By providing a first central maximum compressive stress and/or a second central maximum compressive stress in a range from about 100 MPa to about 1,500 MPa, good impact and/or puncture resistance can be enabled.

In some embodiments, the central portion 251 can comprise a first central depth of layer of one or more alkali metal ions associated with the first central compressive stress region and the first central depth of layer. In some embodiments, the central portion 251 can comprise a second central depth of layer of one or more alkali metal ions associated with the second central compressive stress region and the second central depth of layer. In some embodiments, the one or more alkali ions of the first central depth of layer of the one or more alkali ions and/or the second central depth of layer of the one or more alkali ions comprises potassium. In some embodiments, the first central depth of layer and/or the second central depth of layer as a percentage of the central thickness 217 can be about 1% or more, about 5% or more, about 10% or more, about 40% or less, about 35% or less, about 30% or less, about 25% or less, or about 20% or less. In some embodiments, the first central depth of depth of layer and/or the second central depth of layer as a percentage of the central thickness 217 can be in a range from about 1% to about 40%, from about 1% to about 35%, from about 1% to about 30%, from about 1% to about 25%, from about 1% to about 20%, from about 5% to about 30%, from about 5% to about 25%, from about 5% to about 20%, from about 10% to about 30%, from about 10% to about 25%, from about 10% to about 20%, or any range or subrange therebetween. In further embodiments, the first central depth of layer of the one or more alkali metal ions and/or the second central depth of layer of the one or more alkali metal ions as a percentage of the central thickness 217 can be about 10% or less, for example, from about 1% to about 10%, from about 1% to about 8%, from about 3% to about 8%, from about 5% to about 8%, or any range or subrange therebetween. In some embodiments, the first central depth of layer of the one or more alkali metal ions and/or the second central depth of layer of the one or more alkali metal ions can be about 1 μm or more, about 10 μm or more, about 30 μm or more, about 50 μm or more, about 200 μm or less, about 150 μm or less, about 100 μm or less, or about 60 μm or less. In some embodiments, the first central depth of layer of the one or more alkali metal ions and/or the second central depth of layer of the one or more alkali metal ions can be in a range from about 1 μm to about 200 μm, from about 1 μm to about 150 μm, from about 10 μm to about 150 μm, from about 10 μm to about 100 μm, from about 30 μm to about 100 μm, from about 30 μm to about 60 μm, from about 50 μm to about 60 μm, or any range or subrange therebetween.

In some embodiments, the first depth of compression and/or the third depth of compression can be greater than the first central depth of compression. In some embodiments, the second depth of compression and/or the fourth depth of compression can be greater than the second central depth of compression. In some embodiments, the first depth of layer and/or the third depth of layer can be greater than the first central depth of layer. In some embodiments, the second depth of layer and/or the fourth depth of layer can be greater than the second central depth of layer.

In some embodiments, the central portion 251 may comprise a central tensile stress region. In some embodiments, the central tensile stress region can be positioned between the first central compressive stress region and the second central compressive stress region. In some embodiments, the central tensile stress region can comprise a central maximum tensile stress. In further embodiments, the central maximum tensile stress can be about 125 MPa or more, about 150 MPa or more, about 200 MPa or more, about 375 MPa or less, about 300 MPa or less, or about 250 MPa or less. In further embodiments, the central maximum tensile stress can be in a range from about 125 MPa to about 375 MPa, from about 125 MPa to about 300 MPa, from about 125 MPa to about 250 MPa, from about 150 MPa to about 375 MPa, from about 150 MPa to about 300 MPa, from about 150 MPa to about 250 MPa, from about 200 MPa to about 375 MPa, from about 200 MPa to about 300 MPa, from about 200 MPa to about 250 MPa, or any range or subrange therebetween. Providing a central maximum tensile stress in a range from about 125 MPa to about 375 MPa can enable low minimum bend radii.

In some embodiments, the first maximum tensile stress and the second maximum tensile stress can be less than the central maximum tensile stress. Providing a first maximum tensile stress and a second maximum tensile stress less than a central maximum tensile stress in a central portion can enable low energy fracture while simultaneously enabling lower minimum bend radii. In further embodiments, the first depth of compression can be substantially equal to the first central depth of compression. In even further embodiments, the third depth of compression can be substantially equal to the first central depth of compression. In further embodiments, the second depth of compression can be substantially equal to the second central depth of compression. In even further embodiments, the fourth depth of compression can be substantially equal to the second central depth of compression. As discussed above, the central thickness can be less than the substrate thickness (e.g., in a range from about 0.5% to about 13%), which can enable the central maximum central tension to be greater than the first maximum central tension and the second maximum central tension even though the depth of compression(s) for the first portion, the second portion, and the central portion may be substantially the same.

In some embodiments, the central portion 251 can comprise a central average concentration of potassium on an oxide basis. In some embodiments, the central average concentration of potassium on an oxide basis can be about 10 parts per million (ppm) or more, about 50 ppm or more, about 200 ppm or more, about 500 ppm or more, about 1,000 ppm or more, about 2,000 ppm or more, about 300,000 or less, about 100,000 ppm or less, about 50,000 ppm or less, about 20,000 ppm or less, about 10,000 ppm or less, or about 5,000 ppm or less. In some embodiments, the central average concentration of potassium on an oxide basis can be in a range from about 10 ppm to about 300,000 ppm, from about 50 ppm to about 300,000, from about 50 ppm to about 100,000, from about 200 ppm to about 100,000, from about 200 ppm to about 50,000, from about 500 ppm to about 50,000, from about 500 ppm to about 20,000 ppm, from about 1,000 ppm to about 20,000 ppm, from about 2,000 ppm to about 10,000 ppm, from about 2,000 ppm to about 5,000 ppm, or any range or subrange therebetween.

Figure 43:
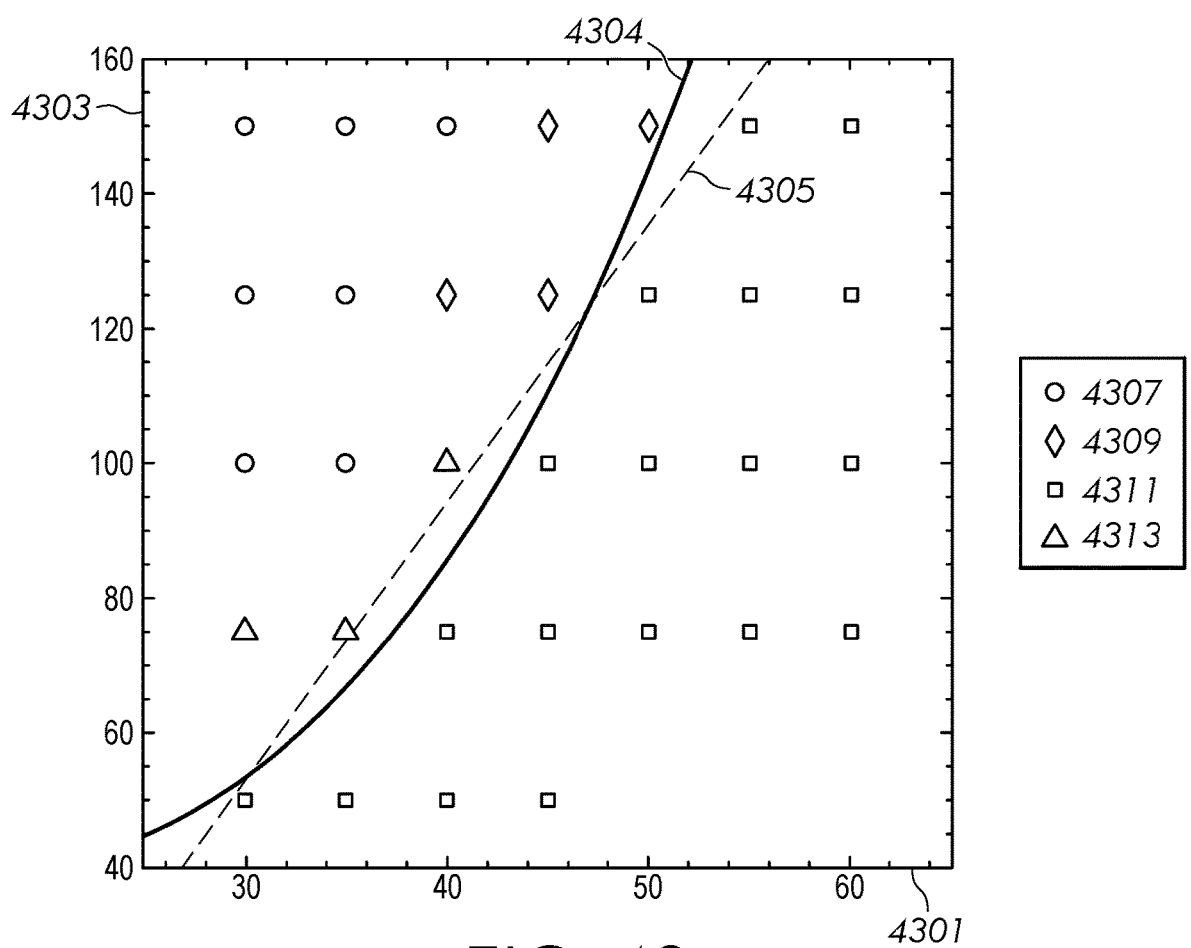
FIG. 43 shows types of mechanical instabilities observed for foldable apparatus as a function of the substrate thickness and the central thickness.

Foldable substrates (e.g., foldable substrate 201) can be subject to a variety of types of mechanical instabilities. Throughout the disclosure, mechanical instabilities include localized mechanical instabilities as well as systemic mechanical instabilities. As used herein, a localized mechanical instability manifests as a deviation (e.g., a plurality of deviations) from a plane of a surface (e.g., first central surface area) without distorting the surface as a whole, for example, buckling and/or wrinkling. As used herein, a systemic mechanical instability manifests as a distortion of an entire surface from a plane, for example, warpage. As shown in FIG. 43, the horizontal axis 4301 (e.g., x-axis) comprises the central thickness (e.g., central thickness 217) and the vertical axis 4303 (e.g., y-axis) comprises the substrate thickness 227 (e.g., first thickness, second thickness 237). The shapes plotted in FIG. 43 correspond to the type (or types) of mechanical instability observed for the combination of central thickness and substrate thickness at that location. Diamonds 4309 correspond to buckling. Circles 4307 correspond to buckling and wrinkling. Triangles 4313 correspond to warpage and wrinkling. Squares 4311 correspond to warpage. Curves 4304 and 4305 separate combinations of central thickness and substrate thickness where only broad instabilities (e.g., warpage) occurs as opposed to combinations where localized instabilities occur. Curve 4305 is a line indicating that localized instabilities may be observed when the substrate thickness is greater than about 4 times the central thickness minus 71 micrometers. More specifically, curve 4305 indicates that localized instabilities may be observed when the substrate thickness is greater than about 4.1 times the central thickness minus 71.37 micrometers. Curves 4304 and 4305 indicate that some instabilities (e.g., localized mechanical instabilities) encountered for thinner foldable substrates (e.g., above curve 4304 and/or 4305) can be different than those encountered for thicker foldable substrates (e.g., below curve 4304 and/or 4305).

An onset of mechanical instability (e.g., localized mechanical instability) may occur when a critical strain (e.g., critical buckling strain) of a portion (e.g., central portion) of the foldable substrate is exceeded. For example, a critical buckling strain of a central portion resembling the foldable substrate 201 of FIG. 3 comprising a width 252 of the central portion 251 of 20 mm can be approximated by $10^6$ times the central thickness squared minus 23 times the central thickness plus 0.0006. For example, without wishing to be bound by theory, a critical buckling strain of a central portion resembling the foldable substrate 201 of FIG. 3 comprising a central thickness 217 of 30 μm can be approximated by $3 \times 10^{-7}$ divided by a square of the width 252 of the central portion 251.

A chemically strengthening induced compressive strain of the central portion of the foldable substrate resulting from chemically strengthening the foldable substrate can be proportional to a product of the network dilation coefficient (B), a concentration difference (C), and a difference between a depth of layer of the central portion divided by the central thickness and a depth of layer of the first portion (or second portion) divided by the substrate thickness. In some embodiments, the compressive strain of the chemically strengthening induced compressive strain of the central portion can be reduced (e.g., to a level below the critical buckling strain) by minimizing the concentration difference and/or minimizing the difference between a depth of layer of the central portion divided by the central thickness and a depth of layer of the first portion (or second portion) divided by the substrate thickness. As used herein, a network dilation coefficient refers to how much a volume of a foldable substrate (e.g., first portion, second portion, central portion) expands as a result of an increase in the concentration of one or more alkali ions (e.g., as a result of chemical strengthening). In some embodiments, a network dilation constant of the first portion and/or a network dilation constant of the second portion can be substantially equal to a network dilation constant of the central portion, for example, if the first portion and/or the second portion and the central portion all comprise the same material prior to the chemically strengthening.

As used herein, a concentration difference of a portion refers to a difference between a concentration at a surface of the portion and a concentration in a bulk of the portion. Unless indicated otherwise, the concentration and concentration difference refer to concentrations of one or more alkali metal ions associated with chemically strengthening and/or a compressive stress region. In some embodiments, the concentration and/or concentration difference can refer to a concentration of potassium on an oxide basis. In some embodiments, a concentration in a bulk of the first portion and/or a concentration of in a bulk of the second portion can be substantially equal to a concentration in a bulk of the central portion, for example, if the first portion and/or the second portion and the central portion comprise the same material prior to the chemically strengthening and/or if a depth of layer of a portion is less than about 45% of the thickness of the corresponding portion. In some embodiments, the first average concentration of potassium on an oxide basis of the first portion can be greater than a concentration of potassium on an oxide basis in the bulk of the first portion. In some embodiments, the second average concentration of potassium on an oxide basis of the second portion can be greater than a concentration of potassium on an oxide basis in the bulk of the second portion. In some embodiments, the central average concentration of potassium on an oxide basis of the central portion can be greater than a concentration of potassium on an oxide basis in the bulk of the central portion.

As used herein, a concentration difference between portions means a difference between one average concentration and another average concentration. Unless indicated otherwise, the concentration and concentration difference refer to concentrations of one or more alkali metal ions associated with chemically strengthening and/or a compressive stress region. In some embodiments, the concentration and/or concentration difference can refer to a concentration of potassium on an oxide basis. In some embodiments, an absolute difference between the first average concentration of potassium on an oxide basis and the central average concentration of potassium on an oxide basis can be about 1 ppm or more, about 10 ppm or more, about 20 ppm or more, about 50 ppm or more, about 70 ppm, about 500 ppm or less, about 200 ppm or less, about 100 ppm or less, or about 85 ppm or less. In some embodiments, an absolute difference between the first average concentration of the potassium on an oxide basis and the central average concentration of potassium on an oxide basis can be in a range from about 1 ppm to about 500 ppm, from about 10 ppm to about 500 ppm, from about 10 ppm to about 200 ppm, from about 20 ppm to about 200 ppm, from about 20 ppm to about 100 ppm, from about 50 ppm to about 100 ppm, from about 70 ppm to about 100 ppm, from about 70 ppm to about 85 ppm, or any range or subrange therebetween. In some embodiments, an absolute difference between the second average concentration of potassium on an oxide basis and the central average concentration of potassium on an oxide basis can be about 1 ppm or more, about 10 ppm or more, about 20 ppm or more, about 50 ppm or more, about 70 ppm, about 500 ppm or less, about 200 ppm or less, about 100 ppm or less, or about 85 ppm or less. In some embodiments, an absolute difference between the second average concentration of the potassium on an oxide basis and the central average concentration of potassium on an oxide basis can be in a range from about 1 ppm to about 500 ppm, from about 10 ppm to about 500 ppm, from about 10 ppm to about 200 ppm, from about 20 ppm to about 200 ppm, from about 20 ppm to about 100 ppm, from about 50 ppm to about 100 ppm, from about 70 ppm to about 100 ppm, from about 70 ppm to about 85 ppm, or any range or subrange therebetween. For example, a chemically strengthening induced strain can be less than a critical buckling strain for a foldable substrate comprising a central thickness of 30 μm and a central width of 20 mm when the absolute difference of a difference in average concentrations is about 75 ppm or less. In some embodiments, an absolute difference between the first average concentration of the potassium on an oxide basis and the central average concentration of potassium on an oxide basis can be less than 70 ppm, for example, in a range from about 0.1 ppm to about 50 ppm, from about 0.1 ppm to about 20 ppm, from about 0.5 ppm to about 20 ppm, from about 0.5 ppm to about 10 ppm, from about 1 ppm to about 10 ppm, from about 5 ppm to about 10 ppm, or any range or subrange therebetween. In some embodiments, an absolute difference between the second average concentration of the potassium on an oxide basis and the central average concentration of potassium on an oxide basis can be less than 70 ppm, for example, in a range from about 0.1 ppm to about 60 ppm, from about 0.1 ppm to about 50 ppm, from about 0.1 ppm to about 40 ppm, from about 0.1 ppm to about 30 ppm, from about 0.1 ppm to about 20 ppm, from about 0.5 ppm to about 20 ppm, from about 0.5 ppm to about 10 ppm, from about 1 ppm to about 10 ppm, from about 5 ppm to about 10 ppm, or any range or subrange therebetween. Providing an absolute difference between a first average concentration and/or a second average concentration and the central average concentration of potassium on an oxide basis can provide reduced chemically strengthening induced strain (e.g., below a critical buckling strain) and/or reduce an incidence of mechanical instabilities in the foldable substrate and/or foldable apparatus.

In some embodiments, an absolute difference between the first depth of layer divided by the substrate thickness and the first central depth of layer divided by the central thickness can be about 0.001% or more, about 0.002% or more, about 0.005% or more, about 1% or less, about 0.2% or less, about 0.1% or less, or about 0.05% or less, about 0.01% or less, or about 0.008% or less. In some embodiments, an absolute difference between the first depth of layer divided by the substrate thickness and the first central depth of layer divided by the central thickness can be in a range from about 0.001% to about 1%, from about 0.002% to about 1%, from about 0.002% to about 0.2%, from about 0.005% to about 0.2%, from about 0.005% to about 0.1%, from about 0.005% to about 0.1%, from about 0.005% to about 0.05%, from about 0.005% to about 0.01%, from about 0.005% to about 0.008%, or any range or subrange therebetween. In some embodiments, an absolute difference between the third depth of layer divided by the substrate thickness and the first central depth of layer divided by the central thickness can be about 0.001% or more, about 0.002% or more, about 0.005% or more, about 1% or less, about 0.2% or less, about 0.1% or less, or about 0.05% or less, about 0.01% or less, or about 0.008% or less. In some embodiments, an absolute difference between the third depth of layer divided by the substrate thickness and the first central depth of layer divided by the central thickness can be in a range from about 0.001% to about 1%, from about 0.002% to about 1%, from about 0.002% to about 0.2%, from about 0.005% to about 0.2%, from about 0.005% to about 0.1%, from about 0.005% to about 0.1%, from about 0.005% to about 0.05%, from about 0.005% to about 0.01%, from about 0.005% to about 0.008%, or any range or subrange therebetween.

In some embodiments, an absolute difference between the second depth of layer divided by the substrate thickness and the second central depth of layer divided by the central thickness can be about 0.001% or more, about 0.002% or more, about 0.005% or more, about 1% or less, about 0.2% or less, about 0.1% or less, or about 0.05% or less, about 0.01% or less, or about 0.008% or less. In some embodiments, an absolute difference between the second depth of layer divided by the substrate thickness and the second central depth of layer divided by the central thickness can be in a range from about 0.001% to about 1%, from about 0.002% to about 1%, from about 0.002% to about 0.2%, from about 0.005% to about 0.2%, from about 0.005% to about 0.1%, from about 0.005% to about 0.1%, from about 0.005% to about 0.05%, from about 0.005% to about 0.01%, from about 0.005% to about 0.008%, or any range or subrange therebetween. In some embodiments, an absolute difference between the fourth depth of layer divided by the substrate thickness and the second central depth of layer divided by the central thickness can be about 0.001% or more, about 0.002% or more, about 0.005% or more, about 1% or less, about 0.2% or less, about 0.1% or less, or about 0.05% or less, about 0.01% or less, or about 0.008% or less. In some embodiments, an absolute difference between the fourth depth of layer divided by the substrate thickness and the second central depth of layer divided by the central thickness can be in a range from about 0.001% to about 1%, from about 0.002% to about 1%, from about 0.002% to about 0.2%, from about 0.005% to about 0.2%, from about 0.005% to about 0.1%, from about 0.005% to about 0.1%, from about 0.005% to about 0.05%, from about 0.005% to about 0.01%, from about 0.005% to about 0.008%, or any range or subrange therebetween. For example, a chemically strengthening induced strain can be less than a critical buckling strain for a foldable substrate comprising a central thickness of 30 μm and a central width of 20 mm when the absolute difference between a depth of layer associated with the first portion or second portion divided by the substrate thickness and a depth of layer associated with the central portion divided by the central thickness is about 0.075% or less. In some embodiments, an absolute difference between one of the first depth of layer, second depth of layer, third depth of layer, or fourth depth of layer divided by the substrate thickness and the first central depth of layer or second central depth of layer divided by the central thickness can be less than 0.07%, for example, in a range from about 0.001% to about 0.07%, from about 0.01% to about 0.07%, from about 0.01% to about 0.05%, from about 0.01% to about 0.02% or any range or subrange therebetween. Providing an absolute difference between a first depth of layer, second depth of layer, third depth of layer, and/or fourth depth of layer divided by the substrate thickness and the first central depth of layer, and/or the second central depth of layer divided by the central thickness (e.g., depths of layer of potassium) can provide reduced chemically strengthening induced strain (e.g., below a critical buckling strain) and/or reduce an incidence of mechanical instabilities in the foldable substrate and/or foldable apparatus.

A depth of compression can be proportional to a corresponding depth of layer. In some embodiments, an absolute difference between the first depth of compression divided by the substrate thickness and the first central depth of compression divided by the central thickness can be about 0.001% or more, about 0.002% or more, about 0.005% or more, about 1% or less, about 0.2% or less, about 0.1% or less, or about 0.05% or less, about 0.01% or less, or about 0.008% or less. In some embodiments, an absolute difference between the first depth of compression divided by the substrate thickness and the first central depth of compression divided by the central thickness can be in a range from about 0.001% to about 1%, from about 0.002% to about 1%, from about 0.002% to about 0.2%, from about 0.005% to about 0.2%, from about 0.005% to about 0.1%, from about 0.005% to about 0.1%, from about 0.005% to about 0.05%, from about 0.005% to about 0.01%, from about 0.005% to about 0.008%, or any range or subrange therebetween. In some embodiments, an absolute difference between the third depth of compression divided by the substrate thickness and the first central depth of compression divided by the central thickness can be about 0.001% or more, about 0.002% or more, about 0.005% or more, about 1% or less, about 0.2% or less, about 0.1% or less, or about 0.05% or less, about 0.01% or less, or about 0.008% or less. In some embodiments, an absolute difference between the third depth of compression divided by the substrate thickness and the first central depth of compression divided by the central thickness can be in a range from about 0.001% to about 1%, from about 0.002% to about 1%, from about 0.002% to about 0.2%, from about 0.005% to about 0.2%, from about 0.005% to about 0.1%, from about 0.005% to about 0.1%, from about 0.005% to about 0.05%, from about 0.005% to about 0.01%, from about 0.005% to about 0.008%, or any range or subrange therebetween.

In some embodiments, an absolute difference between the second depth of compression divided by the substrate thickness and the second central depth of compression divided by the central thickness can be about 0.001% or more, about 0.002% or more, about 0.005% or more, about 1% or less, about 0.2% or less, about 0.1% or less, or about 0.05% or less, about 0.01% or less, or about 0.008% or less. In some embodiments, an absolute difference between the second depth of compression divided by the substrate thickness and the second central depth of compression divided by the central thickness can be in a range from about 0.001% to about 1%, from about 0.002% to about 1%, from about 0.002% to about 0.2%, from about 0.005% to about 0.2%, from about 0.005% to about 0.1%, from about 0.005% to about 0.1%, from about 0.005% to about 0.05%, from about 0.005% to about 0.01%, from about 0.005% to about 0.008%, or any range or subrange therebetween. In some embodiments, an absolute difference between the fourth depth of compression divided by the substrate thickness and the second central depth of compression divided by the central thickness can be about 0.001% or more, about 0.002% or more, about 0.005% or more, about 1% or less, about 0.2% or less, about 0.1% or less, or about 0.05% or less, about 0.01% or less, or about 0.008% or less. In some embodiments, an absolute difference between the fourth depth of compression divided by the substrate thickness and the second central depth of compression divided by the central thickness can be in a range from about 0.001% to about 1%, from about 0.002% to about 1%, from about 0.002% to about 0.2%, from about 0.005% to about 0.2%, from about 0.005% to about 0.1%, from about 0.005% to about 0.1%, from about 0.005% to about 0.05%, from about 0.005% to about 0.01%, from about 0.005% to about 0.008%, or any range or subrange therebetween. For example, a chemically strengthening induced strain can be less than a critical buckling strain for a foldable substrate comprising a central thickness of 30 μm and a central width of 20 mm when the absolute difference between a depth of compression associated with the first portion or second portion divided by the substrate thickness and a depth of compression associated with the central portion divided by the central thickness is about 0.075% or less. In some embodiments, an absolute difference between one of the first depth of compression, second depth of compression, third depth of compression, or fourth depth of compression divided by the substrate thickness and the first central depth of compression or second central depth of compression divided by the central thickness can be less than 0.07%, for example, in a range from about 0.001% to about 0.07%, from about 0.01% to about 0.07%, from about 0.01% to about 0.05%, from about 0.01% to about 0.02% or any range or subrange therebetween. Providing an absolute difference between a first depth of compression, second depth of compression, third depth of compression, and/or fourth depth of compression divided by the substrate thickness and the first central depth of compression and/or the second central depth of compression divided by the central thickness can provide reduced chemically strengthening induced strain (e.g., below a critical buckling strain) and/or reduce an incidence of mechanical instabilities in the foldable substrate and/or foldable apparatus.

In some embodiments, chemically strengthening induced strain and/or stress can be observed in an optical retardation profile of the foldable substrate. As used herein, the optical retardation profile is measured using a gray-field polarimeter that detects light emitted from green LEDs comprising an optical wavelength of about 553 nm through the foldable substrate. Without wishing to be bound by theory, spatial differences in optical retardation can correspond to differences in stress (e.g., in-plane strain) in the foldable substrate, for example, as stress-induced birefringence. In some embodiments, an optical retardation of the central portion along a centerline midway between the first portion and the second portion, an absolute difference between a maximum value of the optical retardation along the centerline and a minimum value of the optical retardation along the centerline can be about 0.1 nm or more, about 0.5 nm or more, about 1 nm or more, about 3 nm or less, about 2 nanometers or less, or about 1.5 nm or less. In some embodiments, an absolute difference between a maximum value of the optical retardation along the centerline and a minimum value of the optical retardation along the centerline can be in a range from about 0.1 nm to about 3 nm, from about 0.1 nm to about 2 nm, from about 0.5 nm to about 2 nm, from about 0.5 to about 1.5 nm, from about 1 nm to about 1.5 nm, or any range or subrange therebetween.

In some embodiments, a maximum difference between an optical retardation of the central portion 251 and a minimum optical retardation of the first portion 221 and/or the second portion 231 can be about 0.1 nm or more, about 0.5 nm or more, about 1 nm or more, about 2 nm or more, about 3 nm or more, about 8 nm or less, about 6 nm or less, about 5 nm or less, or about 4 nm or less. In some embodiments, a maximum difference between an optical retardation of the central portion 251 and a minimum optical retardation of the first portion 221 and/or the second portion 231 can be in a range from about 0.1 nm to about 8 nm, from about 0.1 nm to about 6 nm, from about 0.5 nm to about 6 nm, from about 0.5 nm to about 5 nm, from about 1 nm to about 5 nm, from about 2 nm to about 5 nm, from about 2 nm to about 5 nm, from about 2 nm to about 4 nm, or any range or subrange therebetween. For example, a foldable substrate comprising a central thickness of about 30 μm can avoid mechanical instabilities when the maximum difference between an optical retardation of the central portion 251 and a minimum optical retardation of the first portion 221 and/or the second portion 231 is about 4.6 nm or less. For example, a foldable substrate comprising a central thickness of about 40 μm can avoid mechanical instabilities when the maximum difference between an optical retardation of the central portion 251 and a minimum optical retardation of the first portion 221 and/or the second portion 231 is about 5.9 nm or less.

Figure 44:
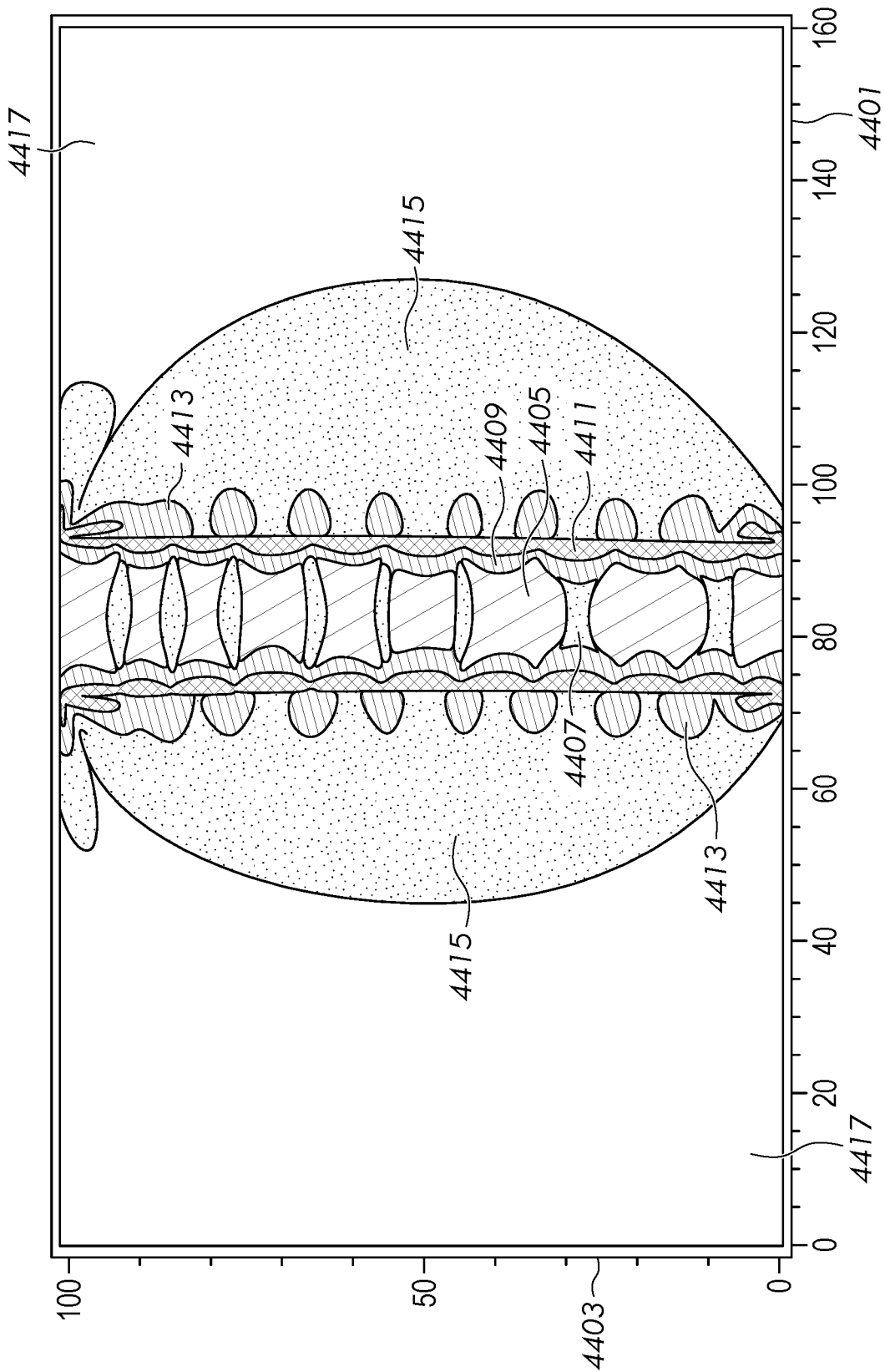
FIG. 44 schematically shows optical retardation measurements for a foldable substrate of embodiments of the disclosure.

FIG. 44 schematically shows optical retardation measurements for a foldable substrate without an adhesive, polymer-based portion, release liner, display device, and PET sheet. In FIG. 44, the horizontal axis 4401 (e.g., x-axis) is a position along a direction 106 of the length 105, and the vertical axis 4403 (e.g., y-axis) is a position along a direction 104 of the width 103. Region 4411, corresponding to the greatest optical retardation, is in the central portion 251 along the interface between the central portion 251 and the first portion 221 and/or the second portion 231. Region 4409 is adjacent to region 4411 in the central portion and corresponds to slightly less optical retardation. The central portion 251 between regions 4411 comprise alternating portions of region 4405 and region 4407, where region 4405 comprises the lowest optical retardation in the central portion 251 and region 4407 comprises an optical retardation intermediate between that of regions 4405 and 4411. A centerline would roughly bisect regions 4405 and 4407 (parallel to the vertical axis 2903) with region 4405 comprising the minimum value of optical retardation along the centerline and region 4407 comprising the maximum value of optical retardation along the centerline. Without wishing to be bound by theory, localized instabilities are likely to occur when the alternating pattern along the centerline is too large. Outside of the central portion 251, region 4413 comprises a series of portions that roughly corresponds to the alternating pattern between regions 4405 and 4407. Region 4413 comprises optical retardation similar to that of region 4409. In the first portion 221 and the second portion 231, region 4417 comprises the lowest optical retardation in the first portion 221 and the second portion 231. Region 4415 comprises optical retardation values intermediate between that of regions 4413 and 4417.

In some embodiments, the polymer-based portion 241 can be optically clear. The polymer-based portion 241 can comprise a first index of refraction. The first refractive index may be a function of a wavelength of light passing through the optically clear adhesive. For light of a first wavelength, a refractive index of a material is defined as the ratio between the speed of light in a vacuum and the speed of light in the corresponding material. Without wishing to be bound by theory, a refractive index of the optically clear adhesive can be determined using a ratio of a sine of a first angle to a sine of a second angle, where light of the first wavelength is incident from air on a surface of the optically clear adhesive at the first angle and refracts at the surface of the optically clear adhesive to propagate light within the optically clear adhesive at a second angle. The first angle and the second angle are both measured relative to a normal of a surface of the optically clear adhesive. As used herein, the refractive index is measured in accordance with ASTM E1967-19, where the first wavelength comprises 589 nm. In some embodiments, the first refractive index of the polymer-based portion 241 may be about 1 or more, about 1.3 or more, about 1.4 or more, about 1.45 or more, about 1.49 or more, about 3 or less, about 2 or less, or about 1.7 or less, about 1.6 or less, or about 1.55 or less. In some embodiments, the first refractive index of the polymer-based portion 241 can be in a range from about 1 to about 3, from about 1 to about 2 from about 1 to about 1.7, from about 1.3 to about 1.7, from about 1.4 to about 1.7, from about 1.4 to about 1.6, from about 1.45 to about 1.55, from about 1.49 to about 1.55, or any range or subrange therebetween.

In some embodiments, the foldable substrate 201 can comprise a second index of refraction. In some embodiments, the second refractive index of the foldable substrate 201 may be about 1 or more, about 1.3 or more, about 1.4 or more, about 1.45 or more, about 1.49 or more, about 3 or less, about 2 or less, or about 1.7 or less, about 1.6 or less, or about 1.55 or less. In some embodiments, the second refractive index of the foldable substrate 201 can be in a range from about 1 to about 3, from about 1 to about 2 from about 1 to about 1.7, from about 1.3 to about 1.7, from about 1.4 to about 1.7, from about 1.4 to about 1.6, from about 1.45 to about 1.55, from about 1.49 to about 1.55, or any range or subrange therebetween. In some embodiments, a differential equal to the absolute value of the difference between the second index of refraction of the foldable substrate 201 and the first index of refraction of the polymer-based portion 241 can be about 0.1 or less, about 0.07 or less, about 0.05 or less, about 0.001 or more, about 0.01 or more, or about 0.02 or more. In some embodiments, the differential is in a range from about 0.001 to about 0.1, from about 0.001 to about 0.07, from about 0.001 to about 0.05, from about 0.01 to about 0.1, from about 0.01 to about 0.07, from about 0.01 to about 0.05, from about 0.02 to about 0.1, from about 0.02 to about 0.07, from about 0.02 to about 0.05, or any range or subrange therebetween. In some embodiments, the second index of refraction of the foldable substrate 201 may be greater than the first index of refraction of the polymer-based portion 241. In some embodiments, the second index of refraction of the foldable substrate 201 may be less than the first index of refraction of the polymer-based portion 241.

In some embodiments, the adhesive layer 261 can comprise a third index of refraction. In some embodiments, the third index of refraction of the adhesive layer 261 can be within one or more of the ranges discussed above with regards to the first index of refraction of the polymer-based portion 241. In some embodiments, a differential equal to the absolute value of the difference between the third index of refraction of the adhesive layer 261 and the first index of refraction of the polymer-based portion 241 can be about 0.1 or less, about 0.07 or less, about 0.05 or less, about 0.001 or more, about 0.01 or more, or about 0.02 or more. In some embodiments, the differential is in a range from about 0.001 to about 0.1, from about 0.001 to about 0.07, from about 0.001 to about 0.05, from about 0.01 to about 0.1, from about 0.01 to about 0.07, from about 0.01 to about 0.05, from about 0.02 to about 0.1, from about 0.02 to about 0.07, from about 0.02 to about 0.05, or any range or subrange therebetween. In some embodiments, the third index of refraction of the adhesive layer 261 may be greater than the first index of refraction of the polymer-based portion 241. In some embodiments, the third index of refraction of the adhesive layer 261 may be less than the first index of refraction of the polymer-based portion 241.

In some embodiments, a differential equal to the absolute value of the difference between the third index of refraction of the adhesive layer 261 and the second index of refraction of the foldable substrate 201 can be about 0.1 or less, about 0.07 or less, about 0.05 or less, about 0.001 or more, about 0.01 or more, or about 0.02 or more. In some embodiments, the differential is in a range from about 0.001 to about 0.1, from about 0.001 to about 0.07, from about 0.001 to about 0.05, from about 0.01 to about 0.1, from about 0.01 to about 0.07, from about 0.01 to about 0.05, from about 0.02 to about 0.1, from about 0.02 to about 0.07, from about 0.02 to about 0.05, or any range or subrange therebetween. In some embodiments, the third index of refraction of the adhesive layer 261 may be greater than the second index of refraction of the foldable substrate 201. In some embodiments, the third index of refraction of the adhesive layer 261 may be less than the second index of refraction of the foldable substrate 201.

The foldable apparatus and/or foldable substrate may have a failure mode that can be described as a low energy failure or a high energy failure. The failure mode of the foldable substrate can be measured using the parallel plate apparatus 501 in FIG. 5. As described below for the effective minimum bend radius, the parallel rigid stainless-steel plates 503, 505 are moved together at a rate of 50 μm/second until the target parallel plate distance 507 is achieved. The target parallel plate distance 507 is the larger of 4 mm or twice the effective minimum bend radius of the foldable apparatus and/or foldable substrate. Then, a tungsten carbide sharp contact probe impinges on the foldable substrate 201 at an impact location 511 that is a distance 509 of 30 mm from the outermost periphery of the foldable substrate 201. As used herein, a fracture is high energy if particles are ejected from the foldable substrate 201 during fracture at 1 meter per second (m/s) or more and the fracture results in more than 2 crack branches. As used herein, a fracture is low energy if the fracture results in 2 or less crack branches or does not result in ejection of particles from the foldable substrate 201 during fracture at 1 m/s or more. The average velocity of ejected particles may be measured by capturing high-speed video of the foldable apparatus from when the sharp contact probe contacts the impact location to 5,000 microseconds afterward.

FIGS. 4 and 6-7 schematically illustrate some embodiments of a test foldable apparatus 602 and/or foldable apparatus 101 and 301 in accordance with embodiments of the disclosure in a folded configuration. As shown in FIG. 6, the test foldable apparatus 602 is folded such that the second major surface 205 of the foldable substrate 201 is on the inside of the folded test foldable apparatus 602. In the folded configuration shown in FIG. 6, a user would view the display device 307 in place of a PET sheet 607 through the foldable substrate 201 and, thus, would be positioned on the side of the second major surface 205. As shown in FIG. 7, the foldable apparatus 301 is folded such that the second major surface 205 of the foldable substrate 201 is on the outside of the folded foldable apparatus 301. In FIG. 7, a user would view the display device 307 through the foldable substrate 201 and, thus, would be positioned on the side of the second major surface 205. In some embodiments, although not shown in a folded configuration, a foldable apparatus can comprise a coating 281 (see FIG. 2) disposed over the polymer-based portion 241. In further embodiments, the polymer-based portion 241 can be disposed over an additional substrate (e.g., glass-based substrate and/or ceramic-based substrate in place of release liner 271), and the additional substrate can be disposed over a display device 307. In further embodiments, a user would view the display device 307 through the coating 281.

As used herein, "foldable" includes complete folding, partial folding, bending, flexing, or multiple capabilities. As used herein, the terms "fail," "failure" and the like refer to breakage, destruction, delamination, or crack propagation. A foldable apparatus achieves an effective bend radius of "X," or has an effective bend radius of "X," or comprises an effective bend radius of "X" if it resists failure when the foldable apparatus is held at "X" radius for 24 hours at about 85° C. and about 85% relative humidity. Likewise, a foldable apparatus achieves a parallel plate distance of "X," or has a parallel plate distance of "X," or comprises a parallel plate distance of "X" if it resists failure when the foldable apparatus is held at a parallel plate distance of "X" for 24 hours at about 85° C. and about 85% relative humidity.

As used herein, the "effective minimum bend radius" and "parallel plate distance" of a foldable apparatus is measured with the following test configuration and process using a parallel plate apparatus 601 (see FIG. 6) that comprises a pair of parallel rigid stainless-steel plates 603, 605 comprising a first rigid stainless-steel plate 603 and a second rigid stainless-steel plate 605. When measuring the "effective minimum bend radius" or the "parallel plate distance", the test adhesive layer 609 comprises a thickness of 50 μm (e.g., instead of adhesive layer 261 in FIGS. 2-3 and 7). When measuring the "effective minimum bend radius" or the "parallel plate distance", the test is conducted with a 100 μm thick sheet 607 of polyethylene terephthalate (PET) rather than the release liner 271 of FIG. 2 or the display device 307 shown in FIG. 3. Thus, during the test to determine the "effective minimum bend radius" or the "parallel plate distance" of a configuration of a foldable apparatus, the test foldable apparatus 602 is produced by using the 100 μm thick sheet 607 of polyethylene terephthalate (PET) rather than the release liner 271 of FIG. 2 or the display device 307 shown in FIG. 3. When preparing the test foldable apparatus 602, the 100 μm thick sheet 607 of polyethylene terephthalate (PET) is attached to the test adhesive layer 609 in an identical manner that the release liner 271 is attached to the first contact surface 263 of the adhesive layer 261 as shown in FIG. 2 or the display device 307 is attached to the first contact surface 263 of the adhesive layer 261 as shown in FIG. 3. To test the foldable apparatus 101 and/or 301 of FIGS. 3-4, the test adhesive layer 609 and the sheet 607 can likewise be installed as shown in the configuration of FIG. 6 to conduct the test on the test foldable apparatus 602. The test foldable apparatus 602 is placed between the pair of parallel rigid stainless-steel plates 603, 605 such that the foldable substrate 201 will be on the inside of the bend, similar to the configuration shown in FIG. 6. For determining a "parallel plate distance", the distance between the parallel plates is reduced at a rate of 50 μm/second until the parallel plate distance 611 is equal to the "parallel plate distance" to be tested. Then, the parallel plates are held at the "parallel plate distance" to be tested for 24 hours at about 85° C. and about 85% relative humidity. As used herein, the "minimum parallel plate distance" is the smallest parallel plate distance that the foldable apparatus can withstand without failure under the conditions and configuration described above. For determining the "effective minimum bend radius", the distance between the parallel plates is reduced at a rate of 50 μm/second until the parallel plate distance 611 is equal to twice the "effective minimum bend radius" to be tested. Then, the parallel plates are held at twice the effective minimum bend radius to be tested for 24 hours at about 85° C. and about 85% relative humidity. As used herein, the "effective minimum bend radius" is the smallest effective bend radius that the foldable apparatus can withstand without failure under the conditions and configuration described above.

In some embodiments, the foldable apparatus 101 and/or 301 and/or test foldable apparatus 602 can achieve a parallel plate distance of 200 mm or less, 100 mm or less, 50 mm or less, 20 mm or less, 10 mm or less, 5 mm or less, or 3 mm or less. In further embodiments, the foldable apparatus 101 and/or 301 and/or test foldable apparatus 602 can achieve a parallel plate distance of 50 millimeters (mm), or 20 mm, or 10 mm, of 5 mm, or 3 mm. In some embodiments, the foldable apparatus 101 and/or 301 and/or test foldable apparatus 602 can comprise a minimum parallel plate distance of about 40 mm or less, about 20 mm or less, about 10 mm or less, about 5 mm or less, about 3 mm or less, about 1 mm or less, about 1 mm or more, about 3 mm or more, about 5 mm or more, or about 10 mm or more. In some embodiments, the foldable apparatus 101 and/or 301, test foldable apparatus 602, and/or foldable substrate 201 can achieve a parallel plate distance of 20 mm, 18 mm, 15 mm, 4 mm, 12 mm, 10 mm, 8 mm, 6 mm, 5 mm, 4 mm, and/or 3 mm. In some embodiments, the foldable apparatus 101 and/or 301 and/or test foldable apparatus 602 can comprise an effective minimum bend radius in a range from about 1 mm to about 100 mm, from about 1 mm to about 60 mm, from about 1 mm to about 40 mm, from about 1 mm to about 20 mm, from about 1 mm to about 10 mm, from about 1 mm to about 5 mm, from about 1 mm to about 3 mm, from about 3 mm to about 40 mm, from about 3 mm to about 40 mm, from about 3 mm to about 20 mm, from about 3 mm to about 10 mm, from about 3 mm to about 5 mm, from about 5 mm to about 10 mm, or any range or subrange therebetween. In some embodiments, the foldable apparatus 101 and/or 301, test foldable apparatus 602, and/or foldable substrate 201 can achieve an effective bend radius of 10 mm, 9 mm, 8 mm, 7 mm, 6 mm, 5 mm, 4 mm, 3 mm, 2 mm, and/or 1 mm.

In some embodiments, a width 252 of the central portion 251 of the foldable substrate 201 defined between the first portion 221 and the second portion 231 in the direction 106 of the length 105. In some embodiments, the width 252 of the central portion 251 of the foldable substrate 201 can extend from the first portion 221 to the second portion 231. As shown in FIG. 2, the width 252 of the central portion 251 can include the width 254a of the first transition portion 253 and/or the width 254b of the second transition portion 255, if present. In some embodiments, the width 252 of the central portion 251 of the foldable substrate 201 defined between the first portion 221 and the second portion 231 in the direction 106 of the length 105 can be about 2.8 times or more, about 3 times or more, about 4 times or more, about 6 times or less, about 5 times or less, or about 4 times or less the effective minimum bend radius. In some embodiments, the width 252 of the central portion 251 as a multiple of the effective minimum bend radius can be in a range from about 2.8 times to about 6 times, from about 2.8 times to about 5 times, from about 2.8 times to about 4 times, from about 3 times to about 6 times, from about 3 times to about 5 times, from about 3 times to about 4 times, from about 4 times to about 6 times, from about 4 times to about 5 times, or any range or subrange therebetween. It is to be understood that in some embodiments the central major surface 211 of the central portion 251 extending along a third plane 204c parallel to the second plane 204b can comprise a width that is about 3 times or more (e.g., about 3.2 times or more, about 4.4 times or more) the effective minimum bend radius (e.g., bend length) to provide reduce stress concentrations and damage in the bending region of the foldable apparatus.

Without wishing to be bound by theory, the length of a bent portion in a circular configuration between parallel plates can be about 1.6 times the parallel plate distance 507 or 611 (e.g., about 3 times the effective minimum bend radius, about 3.2 times the effective minimum bend radius). In some embodiments, the width 252 of the central portion 251 of the foldable substrate 201. In some embodiments, the width 252 of the central portion 251 of the foldable substrate 201 can be about 2.8 mm or more, about 6 mm or more, about 9 mm or more, about 60 mm or less, about 40 mm, or less, or about 24 mm or less. In some embodiments, the width 252 of the central portion 251 of the foldable substrate 201 can be in a range from about 2.8 mm to about 60 mm, from about 2.8 mm to about 40 mm, from about 2.8 mm to about 24 mm, from about 6 mm to about 60 mm, from about 6 mm to about 40 mm, from about 6 mm to about 24 mm, from about 9 mm to about 60 mm, from about 9 mm to about 40 mm, from about 9 mm to about 24 mm, or any range of subrange therebetween. By providing a width of the central portion between the first portion and the second portion, folding of the foldable apparatus without failure can be facilitated.

Without wishing to be bound by theory, the length of a bent portion in an elliptical configuration between parallel plates can be about 2.2 times the parallel plate distance 507 or 611 (e.g., about 4.4 times the effective minimum bend radius). In some embodiments, the width 232 of the central portion 251 of the foldable substrate 201 can be substantially equal to or greater than the bend length of the foldable substrate or the foldable apparatus at its effective minimum bend radius. In some embodiments, the width 252 of the central portion 251 of the foldable substrate 201 can be about 4 mm or more, about 10 mm or more, about 20 mm or more, about 45 mm or less, about 40 mm or less, or about 30 mm or less. In some embodiments, the width 252 of the central portion 251 of the foldable substrate 201 can be in a range from about 4 mm to about 45 mm, from about 4 mm to about 40 mm, from about 4 mm to about 30 mm, from about 4 mm to about 20 mm, from about 4 mm to about 10 mm, from about 10 mm to about 45 mm, from about 10 mm to about 40 mm, from about 10 mm to about 30 mm, from about 10 mm to about 20 mm, from about 20 mm to about 45 mm, from about 20 mm to about 40 mm, from about 20 mm to about 30 mm, from about 30 mm to about 45 mm, from about 30 mm to about 40 mm, from about 40 mm to about 45 mm, or any range of subrange therebetween.

The foldable apparatus may have an impact resistance defined by the capability of a region of the foldable apparatus (e.g., a region comprising the first portion 221, a region comprising the second portion 231, a region comprising the polymer-based portion 241 and/or central portion 251) to avoid failure at a pen drop height (e.g., 5 centimeters (cm) or more, 10 centimeters or more, 20 cm or more), when measured according to the "Pen Drop Test." As used herein, the "Pen Drop Test" is conducted such that samples of foldable apparatus are tested with the load (i.e., from a pen dropped from a certain height) imparted to a major surface (e.g., second major surface 205 or first major surface 203 of the foldable substrate 201) configured as in the parallel plate test with 100 μm thick sheet 607 of PET attached to the test adhesive layer 609 having a thickness of 50 μm instead of the display device 307 shown in FIG. 3. As such, the PET layer in the Pen Drop Test is meant to simulate a foldable electronic display device (e.g., an OLED device). During testing, the foldable apparatus bonded to the PET layer is placed on an aluminum plate (6063 aluminum alloy, as polished to a surface roughness with 400 grit paper) with the PET layer in contact with the aluminum plate. No tape is used on the side of the sample resting on the aluminum plate.

Figure 41:
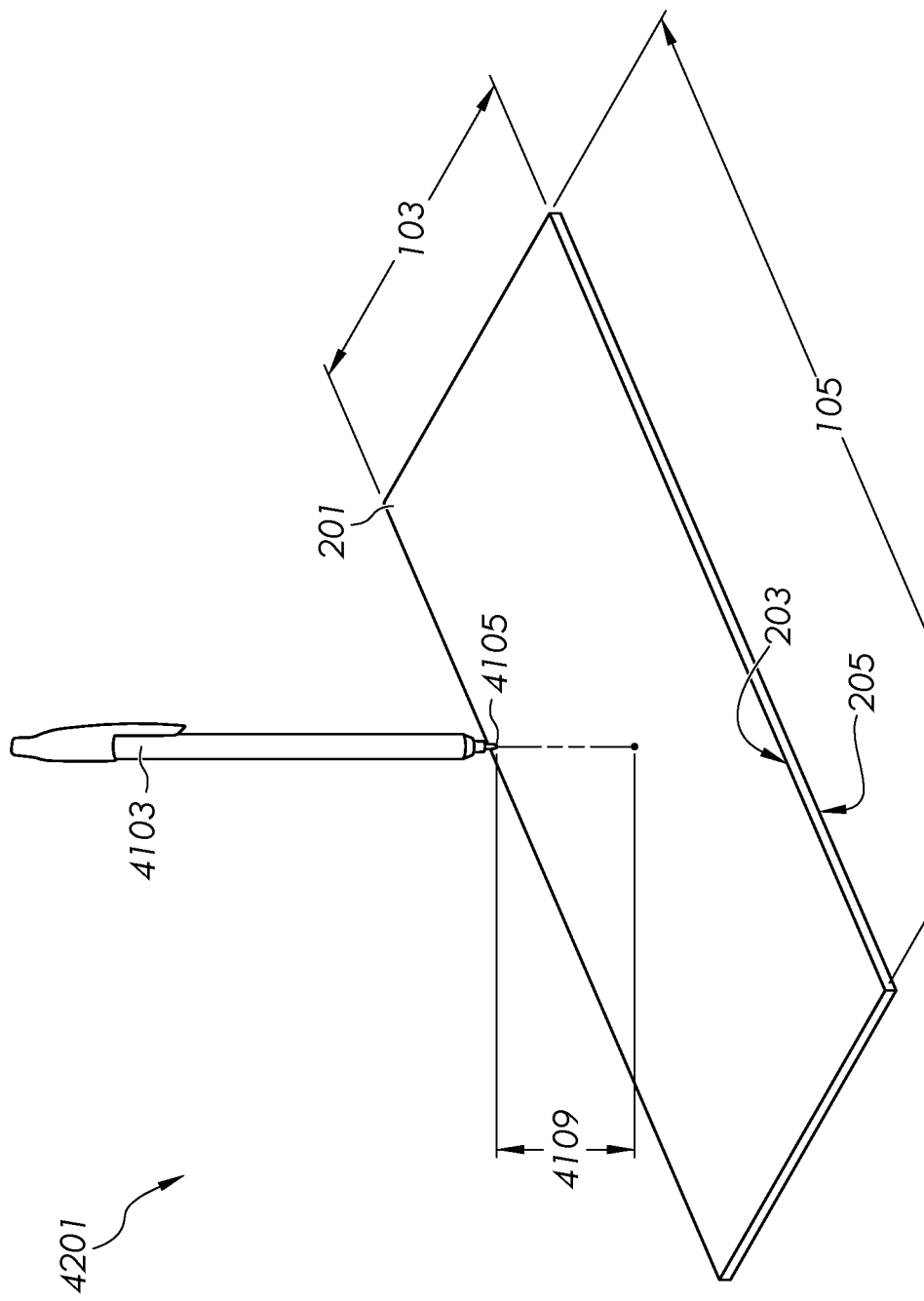
FIG. 41 is a schematic perspective view of a pen drop apparatus.

As shown in FIG. 41, the pen drop apparatus 4101 comprises the ballpoint pen 4103. The pen employed in Pen Drop Test is a BIC Easy Glide Pen, Fine comprising a tungsten carbide ballpoint tip 4105 of 0.7 mm (0.68 mm) diameter, and a weight of 5.73 grams (g) including the cap (4.68 g without the cap). The ballpoint pen 4103 is held a predetermined height 4109 from the first major surface 203 of the foldable substrate 201. A tube (not shown for clarity) is used for the Pen Drop Test to guide the ballpoint pen 4103 to the first major surface 203 of the foldable substrate 201, and the tube is placed in contact with the first major surface 203 of the foldable substrate 201 so that the longitudinal axis of the tube is substantially perpendicular to the first major surface 203 of the foldable substrate 201. The tube has an outside diameter of 1 inch (2.54 cm), an inside diameter of nine-sixteenths of an inch (1.4 cm) and a length of 90 cm. An acrylonitrile butadiene ("ABS") shim is employed to hold the ballpoint pen 4103 at a predetermined height 4109 for each test. After each drop, the tube is relocated relative to the foldable substrate 201 to guide the ballpoint pen 4103 to a different impact location on the foldable substrate 201. Although not shown, it is to be understood that the Pen Drop Test can be used for any of the foldable substrates shown in FIG. 1-4 or 6-7.

A tube is used for the Pen Drop Test to guide a pen to an outer surface of the foldable apparatus. For the foldable apparatus 101 and/or 301 and/or test foldable apparatus 602 shown in FIGS. 2-3 and 6-7, the pen is guided to the second major surface 205 of the foldable substrate 201, and the tube is placed in contact with the second major surface 205 of the foldable substrate 201 so that the longitudinal axis of the tube is substantially perpendicular to the second major surface 205 with the longitudinal axis of the tube extending in the direction of gravity. The tube has an outside diameter of 1 inch (2.54 cm), an inside diameter of nine-sixteenths of an inch (1.4 cm) and a length of 90 cm. An acrylonitrile butadiene (ABS) shim is employed to hold the pen at a predetermined height for each test. After each drop, the tube is relocated relative to the sample to guide the pen to a different impact location on the sample. The pen employed in Pen Drop Test is a BIC Easy Glide Pen, Fine, having a tungsten carbide ballpoint tip of 0.7 mm (0.68 mm) diameter, and a weight of 5.73 grams (g) including the cap (4.68 g without the cap).

For the Pen Drop Test, the ballpoint pen 4103 is dropped with the cap attached to the top end (i.e., the end opposite the tip) so that the ballpoint tip 4105 can interact with the first major surface 203 of the foldable substrate 201. In a drop sequence according to the Pen Drop Test, one pen drop is conducted at an initial height of 1 cm, followed by successive drops in 0.5 cm increments up to 20 cm, and then after 20 cm, 2 cm increments until failure of the foldable substrate 201. After each drop is conducted, the presence of any observable fracture, failure, or other evidence of damage to the foldable substrate 201 is recorded along with the particular predetermined height 4109 for the pen drop. Using the Pen Drop Test, multiple foldable substrates (e.g., samples) can be tested according to the same drop sequence to generate a population with improved statistical accuracy. For the Pen Drop Test, the ballpoint pen 4103 is to be changed to a new pen after every 5 drops, and for each new foldable substrate 201 tested. In addition, all pen drops are conducted at random locations on the foldable substrate 201 at or near the center of the foldable substrate 201, with no pen drops near or on the edge of the foldable substrate 201.

For purposes of the Pen Drop Test, "failure" means the formation of a visible mechanical defect in a laminate. The mechanical defect may be a crack or plastic deformation (e.g., surface indentation). The crack may be a surface crack or a through crack. The crack may be formed on an interior or exterior surface of a laminate. The crack may extend through all or a portion of the foldable substrate 201 and/or coating 281. A visible mechanical defect has a minimum dimension of 0.2 mm or more.

Figure 42:
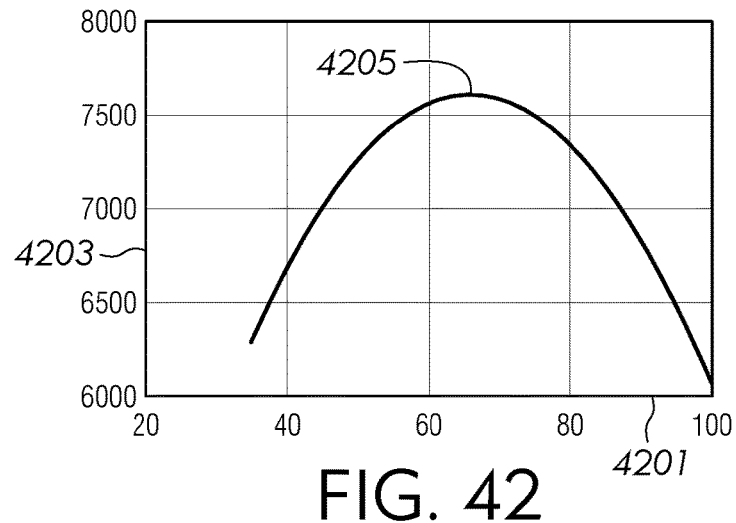
FIG. 42 shows experimental results of the Pen Drop Test of glass-based substrates that shows the maximum principal stress on a major surface of the glass-based substrate as a function of a thickness of a glass-based substrate.

FIG. 42 shows a curve 4205 of the maximum principal stress 4203 in MegaPascals (MPa) on the first major surface of a glass-based substrate as a function of a thickness 4201 in micrometers of the glass-based substrate based on a pen drop height of 2 cm onto the second major surface of a glass-based substrate. As shown in FIG. 42, the maximum principal stress on the first major surface of the glass-based substrate is greatest around 65 μm. This suggests that pen drop performance can be improved by avoiding thicknesses around 65 μm, for example, less than about 50 μm or greater than about 80 μm.

In some embodiments, the foldable apparatus can resist failure for a pen drop in a region comprising the first portion 221 or the second portion 231 at a pen drop height of 10 centimeters (cm), 12 cm, 14 cm, 16 cm, or 20 cm. In some embodiments, a maximum pen drop height that the foldable apparatus can withstand without failure over a region comprising the first portion 221 or the second portion 231 may be about 10 cm or more, about 12 cm or more, about 14 cm or more, about 16 cm or more, about 40 cm or less, or about 30 cm or less, about 20 cm or less, about 18 cm or less. In some embodiments, a maximum pen drop height that the foldable apparatus can withstand without failure over a region comprising the first portion 221 or the second portion 231 can be in a range from about 10 cm to about 40 cm, from about 12 cm to about 40 cm, from about 12 cm to about 30 cm, from about 14 cm to about 30 cm, from about 14 cm to about 20 cm, from about 16 cm to about 20 cm, from about 18 cm to about 20 cm, or any range or subrange therebetween.

In some embodiments, the foldable apparatus can resist failure for a pen drop in a region (e.g., central portion 251, see FIG. 3) comprising the polymer-based portion 241 between the first portion 221 and the second portion 231 at a pen drop height of 1 cm, 2 cm, 3 cm, 4 cm, 5 cm, or more. In some embodiments, a maximum pen drop height that the foldable apparatus can withstand without failure over a region comprising the polymer-based portion 241 between the first portion 221 and the second portion 231 may be about 1 cm or more, about 2 cm or more, about 3 cm or more, about 4 cm or more, about 20 cm or less, about 10 cm or less, about 8 cm or less, or about 6 cm or less. In some embodiments, a maximum pen drop height that the foldable apparatus can withstand without failure over a region comprising the polymer-based portion 241 between the first portion 221 and the second portion 231 can be in a range from about 1 cm to about 20 cm, from about 2 cm to about 20 cm, from about 2 cm to about 10 cm, from about 3 cm to about 10 cm, from about 3 cm to about 8 cm, from about 4 cm to about 8 cm, from about 4 cm to about 6 cm, or any range or subrange therebetween. In some embodiments, a maximum pen drop height that the foldable apparatus can withstand without failure of a region comprising the polymer-based portion 241 between the first portion 221 and the second portion 231 can be in a range from about 1 cm to about 10 cm, from about 1 cm to about 8 cm, from about 1 cm to about 5 cm, from about 2 cm to about 5 cm, from about 3 cm to about 5 cm, from about 4 cm to about 5 cm, or any range or subrange therebetween.

A minimum force may be used to achieve a predetermined parallel plate distance with the foldable apparatus. The parallel plate apparatus 601 of FIG. 6, described above, is used to measure the "closing force" of a foldable apparatus of embodiments of the disclosure. The force to go from a flat configuration (e.g., see FIG. 1) to a bent (e.g., folded) configuration (e.g., see FIGS. 6-7) comprising the predetermined parallel plate distance is measured. In some embodiments, the force to bend the foldable apparatus from a flat configuration to a parallel plate distance of 10 mm can be about 20 Newtons (N) or less, 15 N or less, about 12 N or less, about 10 N or less, about 0.1 N or more, about 0.5 N or more, about 1 N or more, about 2 N or more, about 5 N or more. In some embodiments, the force to bend the foldable apparatus from a flat configuration to a parallel plate distance of 10 mm can be in a range from about 0.1 N to about 20 N, from about 0.5 N to about 20 N, from about 0.5 N to about 15 N, from about 1 N to about 15 N, from about 1 N to about 12 N, from about 2 N to about 12 N, from about 2 N to about 10 N, from about 5 N to about 10 N, or any range or subrange therebetween. In some embodiments, the force to bend the foldable apparatus from a flat configuration to a parallel plate distance of 3 mm can be about 10 N or less, about 8 N or less, about 6 N or less, about 4 N or less, about 3 N or less, about 0.05 N or more about 0.1 N or more, about 0.5 N or more, about 1 N or more, about 2 N or more, about 3 N or more. In some embodiments, the force to bend the foldable apparatus from a flat configuration to a parallel plate distance of 3 mm can be in a range from about 0.05 N to about 10 N, from about 0.1 N to about 10 N, from about 0.1 N to about 8 N, from about 0.5 N to about 8 N, from about 0.5 N to about 6 N, from about 1 N to about 6 N, from about 1 N to about 4 N, from about 2 N to about 4 N, from about 2 N to about 3 N, or any range or subrange therebetween.

In some embodiments, the force per width 103 of the foldable apparatus to bend the foldable apparatus from a flat configuration to a parallel plate distance of 10 mm can be about 20 Newtons per millimeter (N/mm) or less, 0.15 N/mm or less, about 0.12 N/mm or less, about 0.10 N/mm or less, about 0.001 N/mm or more, about 0.005 N/mm or more, about 0.01 N/mm or more, about 0.02 N/mm or more, about 0.05 N/mm or more. In some embodiments, the force per width 103 of the foldable apparatus to bend the foldable apparatus from a flat configuration to a parallel plate distance of 0.10/mm can be in a range from about 0.001 N/mm to about 0.20 N/mm, from about 0.005 N/mm to about 0.20 N/mm, from about 0.005 N/mm to about 0.15 N/mm, from about 0.01 N/mm to about 0.15 N/mm, from about 0.01 N/mm to about 0.12 N/mm, from about 0.02 N/mm to about 0.12 N/mm, from about 0.02 N/mm to about 0.10 N/mm, from about 0.05 N/mm to about 0.10 N/mm, or any range or subrange therebetween. In some embodiments, the force per width 103 of the foldable apparatus to bend the foldable apparatus from a flat configuration to a parallel plate distance of 3 mm can be about 0.10 N/mm or less, about 0.08 N/mm or less, about 0.06 N/mm or less, about 0.04 N/mm or less, about 0.03 N/mm or less, about 0.0005 N/mm or more about 0.001 N/mm or more, about 0.005 N/mm or more, about 0.01 N/mm or more, about 0.02 N/mm or more, about 0.03 N/mm or more. In some embodiments, the force per width 103 of the foldable apparatus to bend the foldable apparatus from a flat configuration to a parallel plate distance of 3 mm can be in a range from about 0.0005 N/mm to about 0.10 N/mm, from about 0.001 N/mm to about 0.10 N/mm, from about 0.001 N/mm to about 0.08 N/mm, from about 0.005 N/mm to about 0.08 N/mm, from about 0.005 N/mm to about 0.06 N/mm, from about 0.01 N/mm to about 0.06 N/mm, from about 0.01 N/mm to about 0.04 N/mm, from about 0.02 N/mm to about 0.04 N/mm, from about 0.02 N/mm to about 0.03 N/mm, or any range or subrange therebetween.

Providing a coating can enable low forces to achieve small parallel plate distances. Without wishing to be bound by theory, a coating comprising a modulus less than a modulus of a foldable substrate can result in a neutral axis of the foldable substrate that is shifted away from the coating (e.g., surface facing the user) than if a glass-based substrate and/or a ceramic-based substrate was used. Without wishing to be bound by theory, providing a coating with a thickness of about 200 μm or less can result in a neutral axis of the foldable substrate that is shifted away from the coating (e.g., surface facing the user) than if a thicker substrate was used. Without wishing to be bound by theory, a neutral axis of the foldable substrate shifted away from the coating (e.g., surface facing the user) can enable low forces to achieve small parallel plate distances because it reduces the concentration of tensile stress and resulting deformation of a portion of the foldable substrate since the tensile stress is spread over a larger portion of the foldable substrate.

Figure 38:
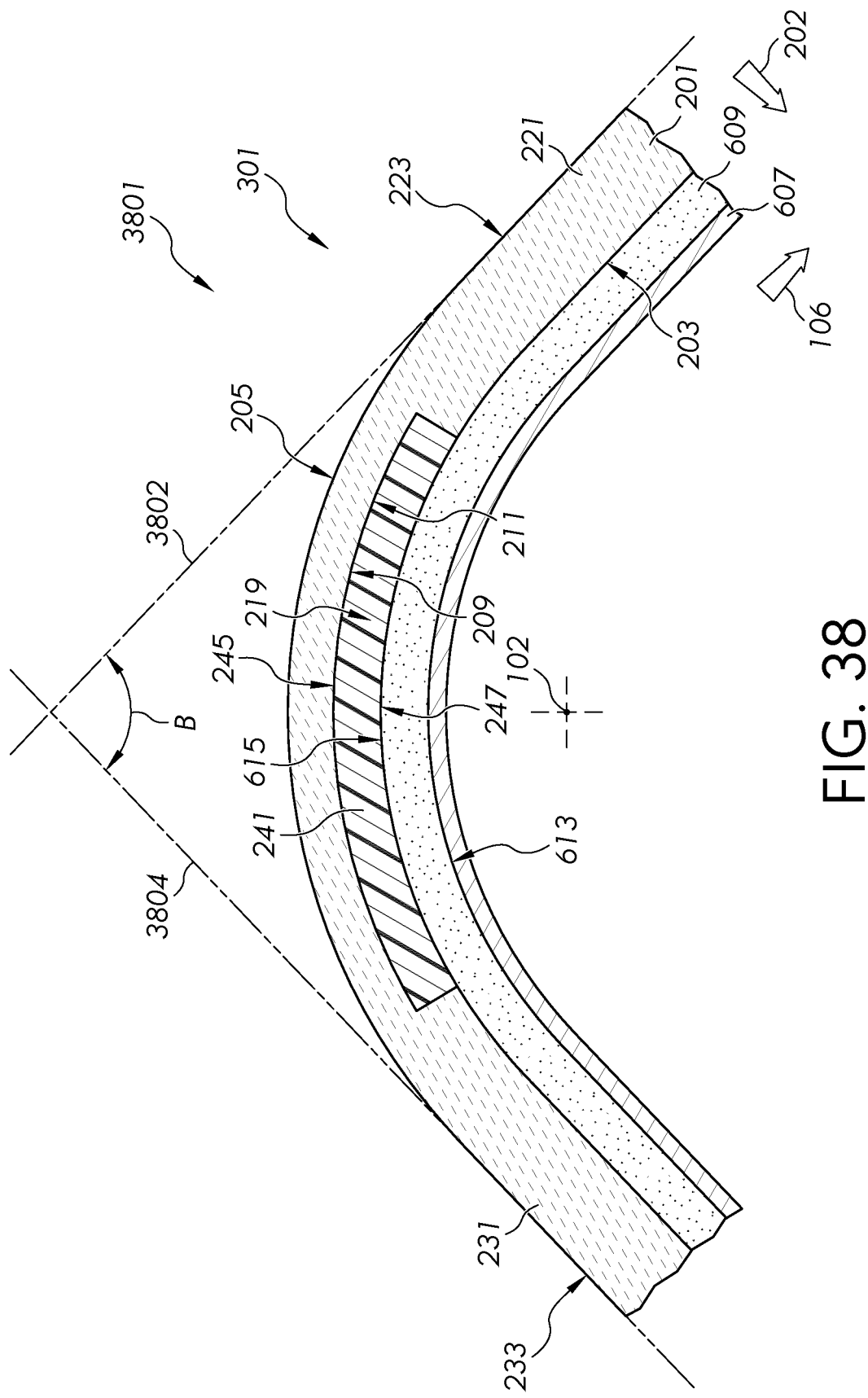
FIG. 38 schematically illustrates a foldable apparatus, resembling the foldable apparatus of FIG. 3, in a neutral stress configuration.

The foldable apparatus 101 or 301 and/or the test foldable apparatus 602 can comprise a neutral stress configuration. Throughout the disclosure, the "neutral stress configuration" is measured with the following test configuration and process. When measuring the "neutral stress configuration", the test foldable apparatus 3801 as shown in FIG. 38 comprises the test adhesive layer 609 comprising a thickness of 50 μm between a fifth contact surface 613 of the test adhesive layer 609 and a sixth contact surface 615 of the test adhesive layer 609 as well as a 100 μm thick sheet 607 of polyethylene terephthalate (PET) rather than the release liner 271 of FIG. 2 or the display device 307 shown in FIGS. 3 and 7. For example, a foldable apparatus comprising the foldable substrate 201, the test foldable apparatus 3801, as shown in FIG. 38, can resemble the parallel plate apparatus 601 shown in FIG. 6 for measuring the "effective bend radius." As shown in FIG. 38, a material (e.g., polymer-based portion 241) positioned in the recess 219 of the foldable substrate 201 can be kept in place when disposing the test adhesive layer 609 over the first major surface 203 of the foldable substrate 201. To test the test foldable apparatus 3801, the test foldable apparatus 3801 is placed on its side such that a cross-section taking perpendicular to the direction of gravity resembles FIG. 38. The test foldable apparatus 3801 rests on a surface comprising SAE grade 304 (e.g., ISO A2) stainless steel with an arithmetic mean deviation of the surface (surface roughness (Ra)) of 3 μm or less (e.g., 2.40 μm, mill finish number 3). As shown, a plane substantially comprising the direction 202 of the substrate thickness 227 and the direction 106 of the length 105 of the foldable substrate 201 is substantially perpendicular to the direction of gravity and the direction 104 (see FIG. 1) of the fold axis 102 is also the direction of gravity. Then, the test foldable apparatus is allowed to relax 1 hour to achieve an equilibrium configuration, as shown in FIG. 38.

In some embodiments, as shown in FIG. 38, the neutral stress configuration can comprise a bend configuration. As used herein a bent configuration is a non-flat configuration (in contrast to the flat configuration shown in FIGS. 1-3). In further embodiments, as shown in FIG. 38, the first major surface 203 and/or the second major surface 205 of the foldable substrate 201 may substantially deviate from a shape of a plane.

Figure 39:
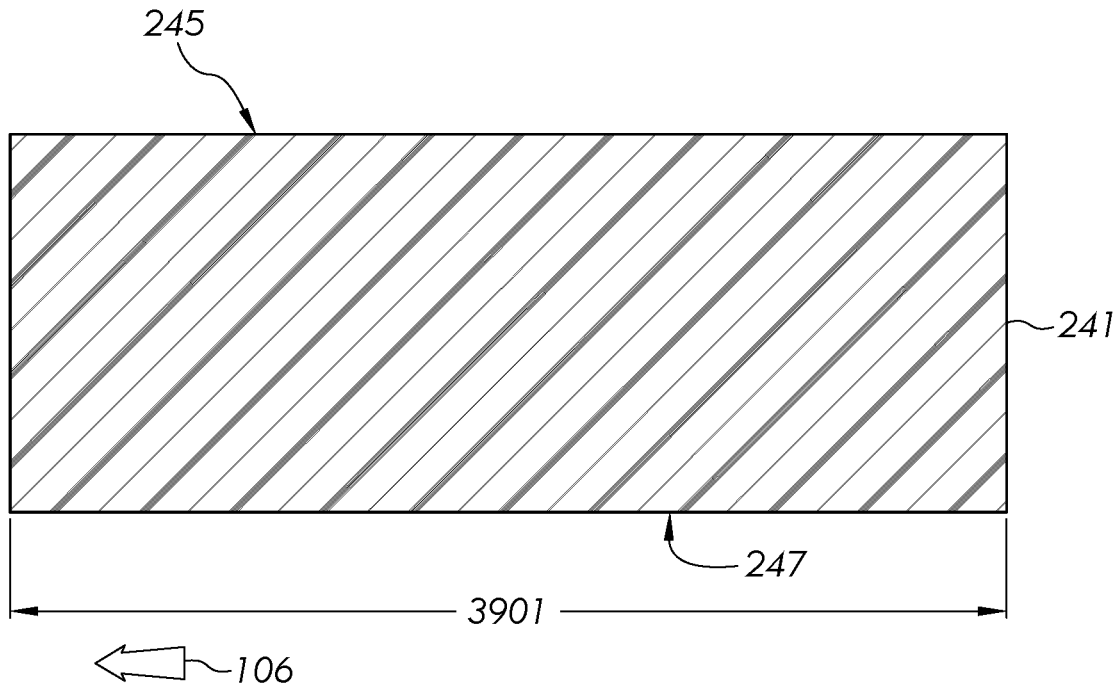
FIG. 39 schematically illustrates the polymer-based portion when the foldable apparatus is in a flat configuration.
Figure 40:
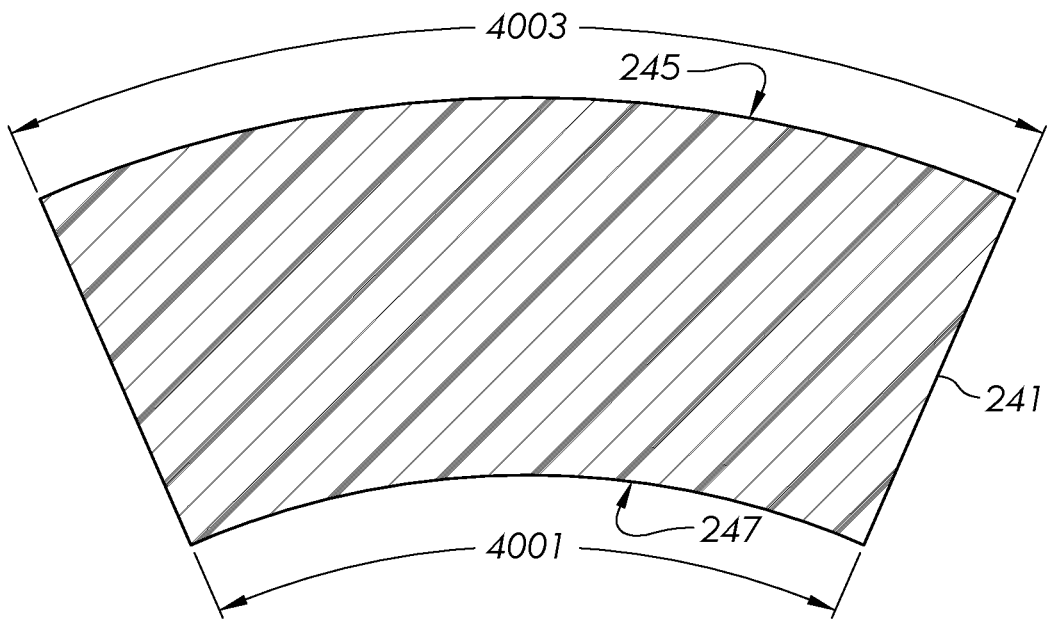
FIG. 40 schematically illustrates the polymer-based portion when the foldable apparatus is in the neutral stress configuration.

In some embodiments, the deviation of the neutral stress configuration from the flat configuration can be quantified using a maximum magnitude of a deviatoric strain. As used herein, "deviatoric strain" means the shape changing component of the strain tensor (e.g., the strain tensor minus the as the hydrostatic strain—average of the on-diagonal components of the strain tensor). The strain tensor can be measured using digital image recognition and/or topography of a portion (e.g., polymer-based portion) of the folded apparatus to compare the shape and dimensions between the flat configuration and the neutral stress configuration. For example, as shown in FIG. 39, an example polymer-based portion 241 is shown in a flat configuration. In this flat configuration, the length 3901 of the polymer-based portion (e.g., measured in the direction 106 of the length of the foldable apparatus) is substantially equal when measured at the third contact surface 245 and the fourth contact surface 247. For example, as shown in FIGS. 38 and 40, an example polymer-based portion 241 is shown in the neutral stress configuration. For ease of comprehension, the volume of the polymer-based portion 241 in FIGS. 39-40 is the same, which would be the case after removing the hydrostatic strain from the digitally captured shape and dimensions of the neutral stress configuration. As shown in FIG. 40, a first length 4003 measured along the third contact surface 245 is different (e.g., greater than) a second length 4001 measured along the fourth contact surface 247. As used herein, strain means the difference in length of a portion between a flat configuration and a neutral stress configuration divided by a reference length from the flat configuration. For example, a strain (e.g., deviatoric strain when the hydrostatic strain is removed as discussed above) between FIGS. 39-40 measured at the third contact surface 245 would be equal to the difference of the first length 4003 in the neutral stress configuration and the length 3901 in the flat configuration divided by the length 3901 in the flat configuration. For example, a strain (e.g., deviatoric strain when the hydrostatic strain is removed as discussed above) between FIGS. 39-40 measured at the fourth contact surface 247 would be equal to the difference of the second length 4001 in the neutral stress configuration and the length 3901 in the flat configuration divided by the length 3901 in the flat configuration. As used herein, the magnitude of a value (e.g., scalar value) is the absolute value of the value. As used herein, the maximum magnitude of a tensor (e.g., strain tensor, deviatoric strain tensor) means the component of the tensor (e.g., deviatoric strain tensor) with the largest (e.g., maximum) value. As used herein, the maximum magnitude of the deviatoric strain of the polymer-based portion 241, means the larges value of the maximum magnitude of the deviatoric strain calculated at the third contact surface 245 and the fourth contact surface 247 of the polymer-based portion. In some embodiments, the maximum magnitude of the deviatoric strain of the polymer-based portion 241 can be about 1% or more, about 2% or more, about 3% or more, about 4% or more, about 10% or less, about 8% or less, about 7% or less, about 6% or less, or about 5% or less. In some embodiments, the maximum magnitude of the deviatoric strain of the polymer-based portion 241 can be in a range from about 1% to about 10%, from about 1% to about 8%, from about 1% to about 7%, from about 2% to about 7%, from about 2% to about 6%, from about 2% to about 5%, from about 3% to about 5%, from about 3% to about 4%, from about 2% to about 10%, from about 2% to about 8%, from about 3% to about 8%, from about 4% to about 8%, from about 4% to about 7%, from about 4% to about 6%, or any range or subrange therebetween.

In some embodiments, the deviation of the neutral stress configuration from the flat configuration can be quantified using an angle "B" measured between a first line extending in the direction of the length from the first portion and a second line extending in the direction of the length from the second portion. For example, with reference to FIG. 38, the angle "B" is measured between a first line 3802 and a second line 3804. The first line 3802 extends in the direction 106 of the length of the test foldable apparatus 3801 (e.g., direction 106 of the length of the foldable apparatus 301) at and from the first portion 221 of the foldable substrate 201 (e.g., first surface area 223). In some embodiments, as shown in FIG. 38, the first line 3802 can extend along a plane that the first surface area 223 can extend along. The second line 3804 extends in the direction 106 of the length of the test foldable apparatus 3801 (e.g., direction 106 of the length of the foldable apparatus 301) at and from the second portion 231 of the foldable substrate 201 (e.g., third surface area 233). In some embodiments, as shown in FIG. 38, the second line 3804 can extend along a plane that the third surface area 233 can extend along. In some embodiments, the magnitude of the difference between the angle "B" in the neutral stress configuration and the flat configuration (e.g., 180°) can be about 1° or more, about 2° or more, about 5° or more, about 10° or more, about 40° or less, about 20° or less, about 15° or less, or about 8° or less. In some embodiments, the magnitude of the difference between the angle "B" in the neutral stress configuration and the flat configuration (e.g., 180°) can be in a range from about 1° to about 40°, from about 1° to about 20°, from about 2° to about 20°, from about 5° to about 20°, from about 5° to about 15°, from about 10° to about 15°, from about 2° to about 15°, from about 5° to about 15°, from about 5° to about 8°, from about 1° to about 8°, from about 2° to about 8°, or any range or subrange therebetween.

By providing a neutral stress configuration when the foldable apparatus is in a bent configuration, the force to bend the foldable apparatus to a predetermined parallel plate distance can be reduced. Further, providing a neutral stress configuration when the foldable apparatus is in a bent state can reduce the maximum stress and/or strain experienced by the polymer-based portion during normal use conditions, which can, for example, enable increased durability and/or reduced fatigue of the foldable apparatus. In some embodiments, the neutral stress configuration can be generated by providing a polymer-based portion that expands as a result of curing. In some embodiments, the neutral stress configuration can be generated by curing the polymer-based portion in a bent configuration. In some embodiments, the neutral stress configuration can be generated by bending a foldable substrate at an elevated temperature (e.g., when the foldable substrate comprises a viscosity in a range from about $10^4$ Pascal-seconds to about $10^7$ Pascal-seconds).

Figure 27:
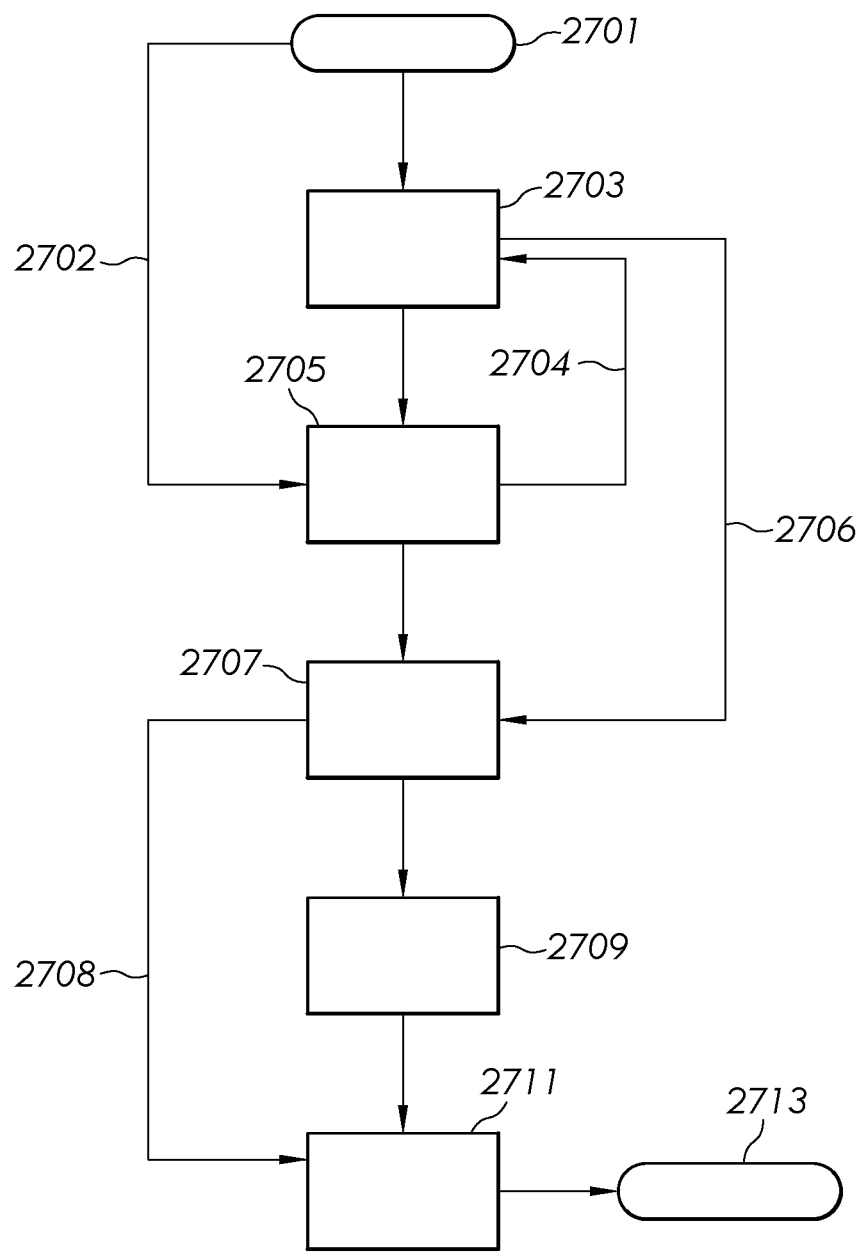
FIG. 27 is a flow chart illustrating example methods making a foldable substrate and/or foldable apparatus in accordance with embodiments of the disclosure.

Embodiments of methods of making the foldable apparatus and/or foldable substrate in accordance with embodiments of the disclosure will be discussed with reference to the flow charts in FIGS. 10-11 and 27 and example method steps illustrated in FIGS. 12-26 and 28-37.

Example embodiments of making the foldable apparatus 101 and/or 301, test foldable apparatus 602, and/or foldable substrate 201 illustrated in FIGS. 2-3 and 5-7 will now be discussed with reference to FIGS. 12-18, 24-26, and 32-34 and the flow chart in FIG. 10. In a first step 1001 of methods of the disclosure, methods can start with providing a foldable substrate 201. In some embodiments, the foldable substrate 201 may be provided by purchase or otherwise obtaining a substrate or by forming the foldable substrate. In some embodiments, the foldable substrate 201 can comprise a glass-based substrate and/or a ceramic-based substrate. In further embodiments, glass-based substrates and/or ceramic-based substrates can be provided by forming them with a variety of ribbon forming processes, for example, slot draw, down-draw, fusion down-draw, up-draw, press roll, redraw or float. In further embodiments, ceramic-based substrates can be provided by heating a glass-based substrate to crystallize one or more ceramic crystals. The foldable substrate 201 may comprise a second major surface 205 (see FIG. 12) that can extend along a plane. The second major surface 205 can be opposite a first major surface 203. In some embodiments, as shown in FIG. 34, the foldable substrate 201 can be bent (e.g., comprise a bent configuration). In further embodiments, the foldable substrate 201 can comprise a bent configuration as a result of bending the foldable substrate 201 into a bent configuration while the foldable substrate 201 comprises a viscosity in a range from about $10^4$ Pascal-seconds to about $10^7$ Pascal-seconds (e.g., in a working range of the foldable substrate 201, between a softening point of the foldable substrate 201 and a working point of the foldable substrate 201).

Figure 12:
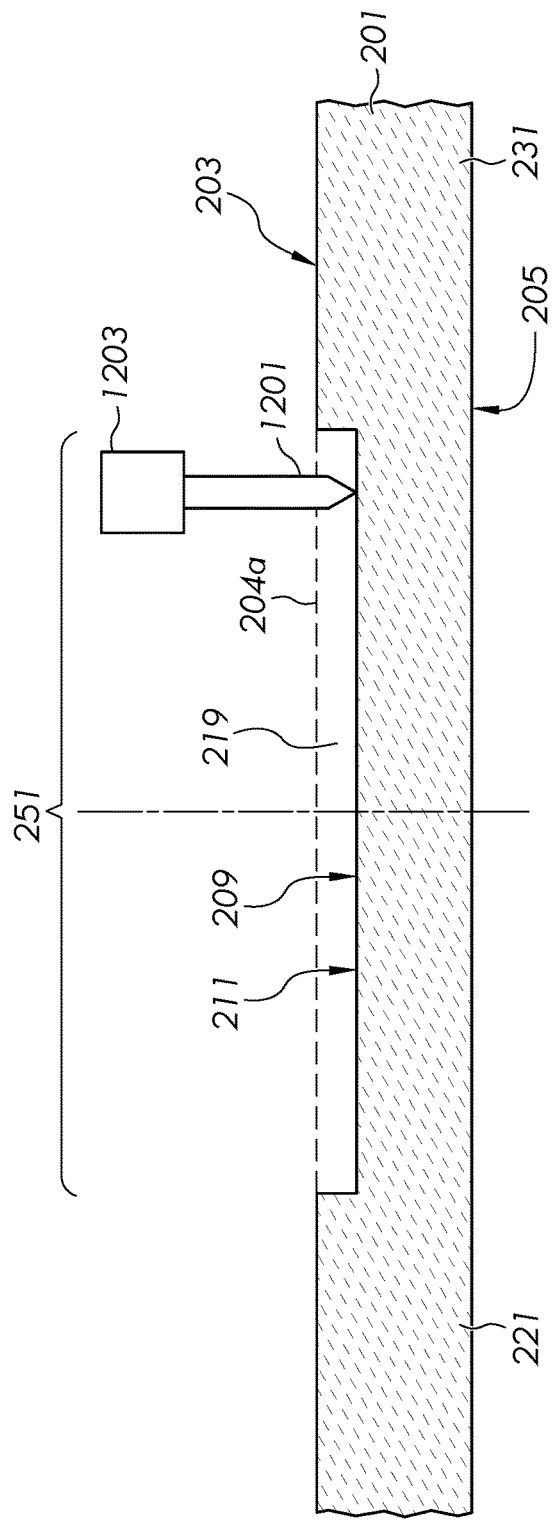

In some embodiments, the foldable substrate 201 can comprise a recess 219 in the first major surface 203 of the foldable substrate 201 exposing the first central surface area 209. In further embodiments, the recess 219 may be formed by etching, laser ablation or mechanically working the first major surface 203. For example, the first major surface 203 may be mechanically worked by diamond engraving to produce very precise patterns in glass-based substrates and/or ceramic-based substrates. As shown in FIG. 12, diamond engraving can be used to create the recess 219 in the first major surface 203 of the foldable substrate 201 where a diamond-tip probe 1201 can be controlled using a computer numerical control (CNC) machine 1203. Materials other than diamond can be used for engraving with a CNC machine. Furthermore, other methods of forming the recess include lithography, etching, and laser ablation. For example, etching can comprise disposing a mask over the first surface area 223 and the third surface area 233, exposing the first major surface 203 of the foldable substrate 201 to an etchant to form the recess 219, and then removing the mask. Forming the recess 219 in the first major surface 203 can provide a central portion 251 between a first portion 221 and a second portion 231 of the foldable substrate 201. The central portion 251 can comprise a first central surface area 209 wherein the recess 219 can be defined between the first central surface area 209 and the first plane 204a along which the first major surface 203 extends in the flat configuration shown in FIG. 12. The first central surface area 209 can attach the first portion 221 to the second portion 231. As shown in FIG. 2, the central portion 251 can also comprise a first transition portion 253 attaching the first portion 221 to a central major surface 211 and a second transition portion 255 attaching the second portion 231 to the central major surface 211. In some embodiments, a thickness of the first transition portion 253 can continuously increase from the central major surface 211 to the first portion 221. In further embodiments, a thickness of the second transition portion 255 can continuously increase from the central major surface 211 to the second portion 231. As shown in FIG. 12, in some embodiments, the first central surface area 209 can comprise the central major surface 211 of the central portion 251 that, as shown, may be planar although nonplanar configurations may be provided in further embodiments. Furthermore, the central major surface 211 can be parallel with respect to the first plane 204a and/or the second major surface 205 as shown in FIG. 12.

In some embodiments, although not shown for the apparatus of FIG. 12, step 1001 can further comprise reducing a thickness of the foldable substrate 201. In further embodiments, the thickness of the foldable substrate 201 can be reduced by mechanically working (e.g., grinding). In further embodiments, the thickness of the foldable substrate 201 can be reduced using chemical etching. In even further embodiments, chemical etching can comprise contacting the foldable substrate 201 with an etching solution contained in an etching bath. In even further embodiments, the etching solution can comprise one or more mineral acids (e.g., HCl, HF, $H_2SO_4$, $HNO_3$). For example, with reference to the foldable substrate 201 shown in FIG. 29, the thickness of the foldable substrate 201 can be reduced using chemical etching, which can comprise contacting the foldable substrate 201 with an etching solution 2903 contained in an etching bath 2901 comprising one or more mineral acids (e.g., HCl, HF, $H_2SO_4$, $HNO_3$). In some embodiments, the thickness of the foldable substrate 201 can be reduced by removing a layer from the first major surface 203 of the foldable substrate 201 to expose a new first major surface that can comprise the first major surface 203 illustrated in FIGS. 2-3 and 5-7. In addition, or alternatively, the thickness of the foldable substrate 201 can be reduced by removing a layer from the second major surface 205 of the foldable substrate 201 to expose a new second major surface that can comprise the second major surface 205 illustrated in FIGS. 2-3 and 5-7.

In some embodiments, the second major surface 205 (e.g., the entire second major surface 205) may be covered with the optional mask (e.g., mask 2905 in FIG. 29) such that the second major surface 205 is not etched and may provide the second major surface 205 as the second major surface 205 discussed with respect to FIGS. 2-3 and 5-7 above. Preventing etching of the second major surface 205 may be beneficial to preserve a pristine nature of the second major surface 205 that may exist with some processing techniques (e.g., up draw or down draw, for example, by overflow or fusion). Maintaining the pristine surface may present a particularly smooth surface for the second major surface 205 that may form the outermost surface of the foldable apparatus that may be observed and/or touched by a user of the foldable apparatus. Alternatively, the thickness of the foldable substrate 201 can be reduced by removing the layer from the second major surface 205, for example, to remove the skin layer to expose a central layer with more consistent optical properties across the length of foldable substrate 201 (e.g., glass-based substrate and/or ceramic-based substrate), as discussed above. In some embodiments, the layer can be removed from the first major surface 203 to expose the new first major surface that can comprise the first major surface 203 illustrated in FIGS. 2-3 and 5-7 and the layer can be removed from the second major surface 205 to expose the new second major surface that can comprise the second major surface 205 illustrated in FIGS. 2-3 and 5-7. Removing the layers from both the first major surface and the second major surface can remove the outer layers of the foldable substrate 201 (e.g., glass-based substrate and/or ceramic-based substrate) that may have inconsistent optical properties than the underlying interior portions of the foldable substrate 201 (e.g., glass-based substrate and/or ceramic-based substrate). Consequently, the entire thickness throughout the length and the width of the foldable substrate 201 may have more consistent optical properties to provide consistent optical performance with little or no distortions across the entire foldable substrate 201 (e.g., glass-based substrate and/or ceramic-based substrate).

In some embodiments, removing the layer from the first major surface 203 can be beneficial to remove surface imperfections generated during formation of the recess 219. For example, mechanically working the first major surface 203 (e.g., with a diamond tip probe) to generate the recess 219 may generate micro-crack surface flaws or other imperfections that can present points of weakness where catastrophic failure of the foldable substrate 201 may occur upon folding. Thus, by removing the layer from the first major surface 203, surface imperfections generated in the layer during formation of the recess 219 may be removed where a new first major surface 203 with fewer surface imperfections can be presented. As fewer surface imperfections are present, a smaller bend radius may be achieved without failure of the foldable substrate. For example, some processing of foldable substrates may present differences in glass-based material properties and/or ceramic-based material properties at the first major surface and second major surface of the foldable substrate than central portions of the foldable substrate. For example, during a down-draw process, properties of a glass-based material and/or a ceramic-based material at the major surfaces may be different than central portions. Thus, by removing the layer from the first major surface 203 at the first portion 221 and the second portion 231, the new first major surface 203 of these portions can have the same properties as the first central surface area 209 to provide consistent optical properties across the length of the foldable substrate 201, for example, if the foldable substrate 201 comprises a glass-based substrate and/or a ceramic-based substrate.

Figure 13:
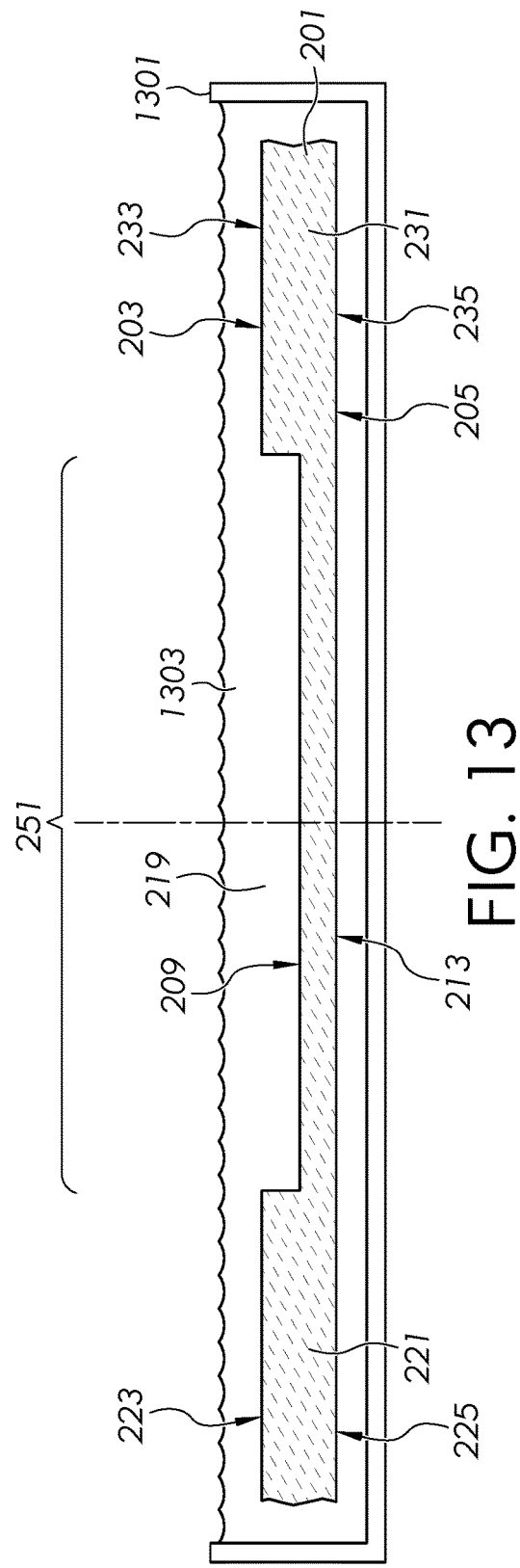

After step 1001, as shown in FIG. 13, the method can proceed to step 1003 comprising chemically strengthening the foldable substrate 201. Chemically strengthening a foldable substrate 201 (e.g., glass-based substrate, ceramic-based substrate) by ion exchange can occur when a first cation within a depth of a surface of a foldable substrate 201 is exchanged with a second cation within a molten salt or salt solution 1303 that has a larger radius than the first cation.

For example, a lithium cation within the depth of the surface of the foldable substrate 201 can be exchanged with a sodium cation or potassium cation within a salt solution 1303. Consequently, the surface of the foldable substrate 201 is placed in compression and thereby chemically strengthened by the ion exchange process since the lithium cation has a smaller radius than the radius of the exchanged sodium cation or potassium cation within the salt solution 1303. Chemically strengthening the foldable substrate 201 can comprise contacting at least a portion of a foldable substrate 201 comprising lithium cations and/or sodium cations with a salt bath 1301 comprising salt solution 1303 comprising potassium nitrate, potassium phosphate, potassium chloride, potassium sulfate, sodium chloride, sodium sulfate, sodium nitrate, and/or sodium phosphate, whereby lithium cations and/or sodium cations diffuse from the foldable substrate 201 to the salt solution 1303 contained in the salt bath 1301. In some embodiments, the temperature of the salt solution 1303 can be about 300° C. or more, about 360° C. or more, about 400° C. or more, about 500° C. or less, about 460° C. or less, or about 400° C. or less. In some embodiments, the temperature of the salt solution 1303 can be in a range from about 300° C. to about 500° C., from about 360° C. to about 500° C., from about 400° C. to about 500° C., from about 300° C. to about 460° C., from about 360° C. to about 460° C., from about 400° C. to about 460° C., from about 300° C. to about 400° C., from about 360° C. to about 400° C., or any range or subrange therebetween. In some embodiments, the foldable substrate 201 can be in contact with the salt solution 1303 for about 15 minutes or more, about 1 hour or more, about 3 hours or more, about 48 hours or less, about 24 hours or less, or about 8 hours or less. In some embodiments, the foldable substrate 201 can be in contact with the salt solution 1303 for a time in a range from about 15 minutes to about 48 hours, from about 1 hour to about 48 hours, from about 3 hours to about 48 hours, from about 15 minutes to about 24 hours, from about 1 hour to about 24 hours, from about 3 hours to about 48 hours, from about 3 hours to about 24 hours, from about 3 hours to about 8 hours, or any range or subrange therebetween.

Chemically strengthening the foldable substrate 201 can comprise chemically strengthening the first central surface area 209, chemically strengthening the first surface area 223 of the first portion 221 of the first major surface 203, chemically strengthening the third surface area 233 of the second portion 231 of the first major surface 203, and the second major surface 205 of the foldable substrate 201. In some embodiments, chemically strengthening can comprise chemically strengthening the first portion 221 to an initial first depth of compression from the first surface area 223 of the first major surface 203, chemically strengthening the second portion 231 to an initial third depth of compression from the third surface area 233 of the first major surface 203, and chemically strengthening the central portion 251 to an initial first central depth of compression from the first central surface area 209. In some embodiments, chemically strengthening the second major surface 205 of the foldable substrate 201 can comprise chemically strengthening the second surface area 225 of the first portion 221 of the second major surface 205, chemically strengthening the fourth surface area 235 of the second portion 231 of the second major surface 205, and chemically strengthening the second central surface area 213 of the central portion 251 of second major surface 205. In some embodiments, chemically strengthening the second major surface 205 can comprise chemically strengthening the first portion 221 to an initial second depth of compression from the second surface area 225 of the second major surface 205, chemically strengthening the second portion 231 to an initial fourth depth of compression from the fourth surface area 235 of the second major surface 205, and chemically strengthening the central portion 251 to an initial second central depth of compression from the second central surface area 213 of the second major surface 205.

Figure 14:
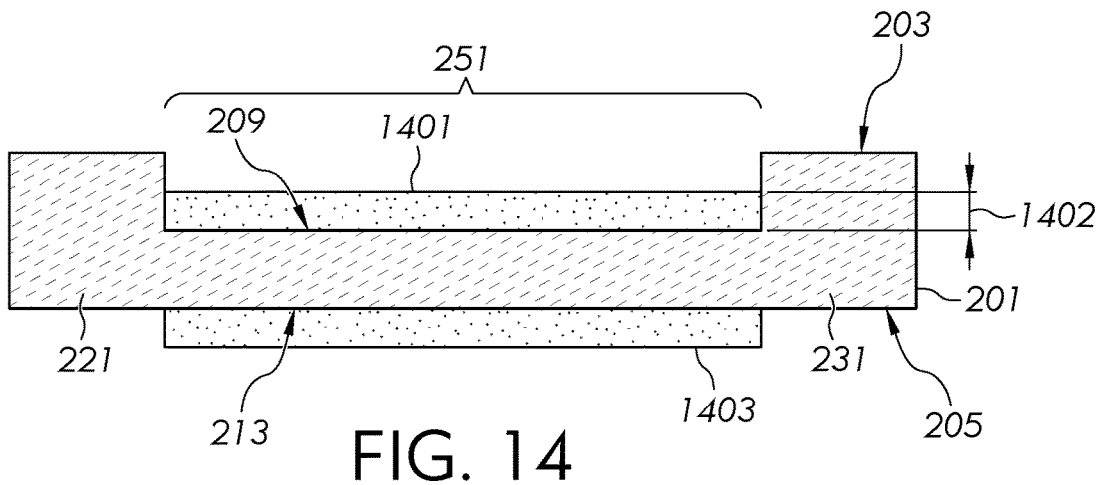
Figure 15:
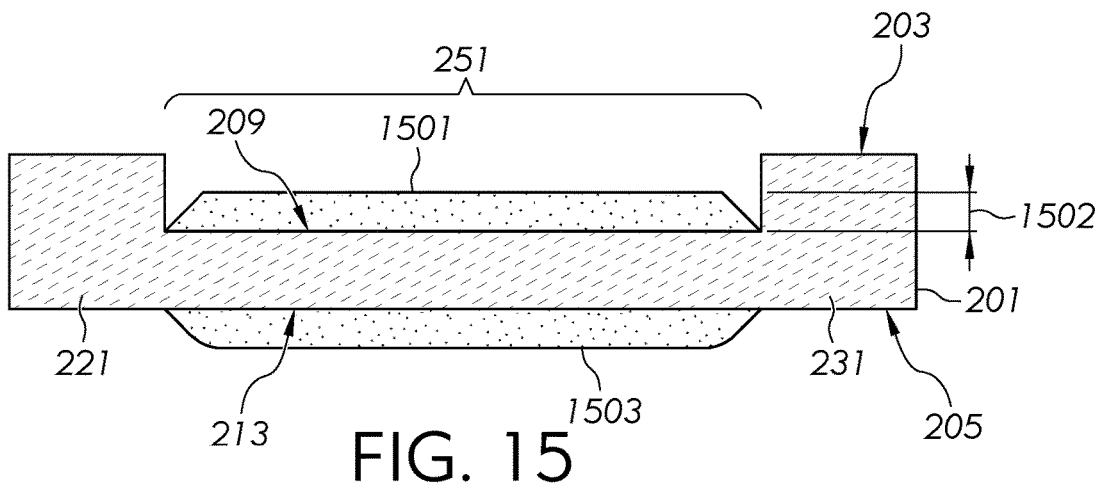

After step 1003, as shown in FIGS. 14-15, methods can proceed to step 1005 comprising disposing a layer over the central portion 251. In some embodiments, disposing a layer can comprise disposing a material using chemical vapor deposition (CVD) (e.g., low-pressure CVD, plasma-enhanced CVD), physical vapor deposition (PVD) (e.g., evaporation, molecular beam epitaxy, ion plating), atomic layer deposition (ALD), sputtering, spray pyrolysis, chemical bath deposition, and/or sol-gel deposition. In some embodiments, the layer can comprise a material comprising a diffusivity for one or more alkali metal ions. In further embodiments, the diffusivity of the layer can be less than a corresponding diffusivity of the foldable substrate. Without wishing to be bound by theory, a layer with a decreased diffusivity relative to a foldable substrate can limit (e.g., decrease) the extent of chemically strengthening of a portion of the foldable substrate that the layer is disposed over, for example, by decreasing the concentration of the one or more alkali ions at a surface of the foldable substrate in the portion relative to another portion of the foldable substrate that the layer is not disposed over. In further embodiments, the diffusivity of the layer relative to the diffusivity of the foldable substrate can be about 5% or more, about 10% or more about 20% or more, about 25% or more, about 80% or less, about 60% or less, about 50% or less, about 40% or less, or about 30% or less. In further embodiments, the diffusivity of the layer relative to the diffusivity of the foldable substrate can be in a range from about 5% to about 80%, from about 5% to about 60%, from about 10% to about 60%, from about 10% to about 50%, from about 20% to about 50%, from about 25% to about 50%, from about 25% to about 40%, from about 25% to about 30%, or any range or subrange therebetween. In some embodiments, the layer can comprise titanium dioxide ($TiO_2$), zirconia ($ZrO_2$), tin oxide ($SnO_2$), alumina ($Al_2O_3$), silica ($SiO_2$), silicon nitride ($Si_3N_4$), and/or combinations thereof. An exemplary embodiment comprises disposing a layer of $SiO_2$ using PVD. Providing a layer comprising a decreased (but still substantial) diffusivity relative to a foldable substrate can reduce chemically strengthening induced instabilities while keeping the number of required chemically strengthening steps low, keeping down processing costs and processing time.

In some embodiments, as shown, a first layer 1401 or 1501 can be disposed over the first central surface area 209. In further embodiments, the first layer 1401 or 1501 can contact the first central surface area 209. In further embodiments, as shown, the first layer 1401 or 1501 can be disposed over the first central surface area 209 without being disposed over the first surface area 223 and/or the third surface area 233. In further embodiments, the first layer 1401 or 1501 can cover substantially the entire first central surface area 209. In further embodiments, the first layer 1401 or 1501 can comprise a first layer thickness 1402 or 1502 defined as an average depth of the first layer 1401 or 1501 disposed over the first central surface area 209 from measurements at 5 (five) points equally spaced along the first central surface area 209 in the direction shown (e.g., direction 106 in FIGS. 2-3). In even further embodiments, the first layer thickness 1402 and 1502 can be about 0.5 nm or more, about 1 nm or more, about 5 nm or more, about 10 nm or more, about 20 nm or more, about 250 nm or less, about 200 nm or less, about 150 nm or less, about 100 nm or less, or about 50 nm or less. In even further embodiments, the first layer thickness 1402 and 1502 can be in a range from about 0.5 nm to about 250 nm, from about 0.5 nm to about 200 nm, from about 1 nm to about 200 nm, from about 1 nm to about 150 nm, from about 5 nm to about 150 nm, from about 5 nm to about 100 nm, from about 10 nm to about 100 nm, from about 10 nm to about 50 nm, from about 20 nm to about 50 nm, or any range or subrange therebetween. In even further embodiments, as shown in FIG. 14, the first layer 1401 can comprise a substantially constant thickness across the first central surface area 209 (e.g., in the direction 106 of the length 105 of the foldable apparatus and/or in the direction 104 of the width 103 of the foldable apparatus). In even further embodiments, as shown in FIG. 15, the first layer 1501 can comprise a varying thickness across the first central surface area 209 (e.g., in the direction 106 of the length 105 of the foldable apparatus and/or in the direction 104 of the width 103 of the foldable apparatus). In still further embodiments, as shown, the thickness of the first layer 1501 near an interface between the central portion 251 and the first portion 221 and/or the second portion 231 can be less than a thickness away from the corresponding interface. Providing a decreased thickness near an interface can reduce stress concentrations at the interface resulting from the chemically strengthening.

In some embodiments, as shown in FIGS. 14-15, a second layer 1403 or 1503 can be disposed over the second central surface area 213. In further embodiments, the second layer 1403 or 1503 can contact the second central surface area 213. In further embodiments, as shown, the second layer 1403 or 1503 can be disposed over the second central surface area 213 without being disposed over the second surface area 225 and/or the fourth surface area 235. In further embodiments, the second layer 1403 or 1503 can cover substantially the entire second central surface area 213. In further embodiments, the second layer 1403 or 1503 can comprise a second layer thickness defined as an average depth of the second layer 1403 or 1503 disposed over the second central surface area 213. In even further embodiments, the second layer thickness can be within one or more of the ranges discussed above for the first layer thickness 1402 and 1502. In still further embodiments, the second layer thickness can be substantially equal to the first layer thickness 1402 and 1502. In even further embodiments, as shown in FIG. 14, the second layer 1403 can comprise a substantially constant thickness across the second central surface area 213 (e.g., in the direction 106 of the length 105 of the foldable apparatus and/or in the direction 104 of the width 103 of the foldable apparatus). In even further embodiments, as shown in FIG. 15, the second layer 1503 can comprise a varying thickness across the second central surface area 213 (e.g., in the direction 106 of the length 105 of the foldable apparatus and/or in the direction 104 of the width 103 of the foldable apparatus). In still further embodiments, as shown, the thickness of the second layer 1503 near an interface between the central portion 251 and the first portion 221 and/or the second portion 231 can be less than a thickness away from the corresponding interface. Providing a decreased thickness near an interface can reduce stress concentrations at the interface resulting from the chemically strengthening. Further discussion of methods of embodiments of the disclosure will be shown with the first layer 1401 and the second layer 1403 shown in FIG. 14 with the understanding that such methods can apply in a similar or identical fashion for the first layer 1501 and the second layer 1503 shown in FIG. 15.

Figure 16:
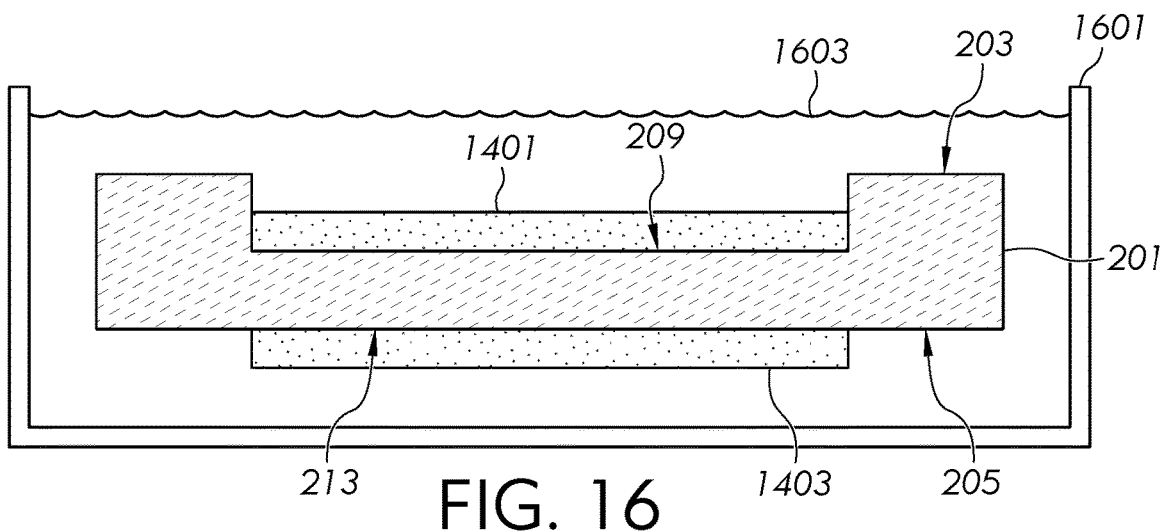

After step 1005, as shown in FIG. 16, methods can proceed to step 1007 comprising chemically strengthening the foldable substrate 201 for a first period of time. As used herein, the first period of time when at least a portion of the foldable substrate 201 is in contact with the one or more alkali metals (e.g., sodium ions, potassium ions) discussed with regards to salt solution 1303. In some embodiments, as shown in FIG. 16, the chemically strengthening in step 1007 can comprise contacting at least a portion of a foldable substrate 201, a first layer 1401, and/or a second layer 1403 comprising lithium cations and/or sodium cations with a salt bath 1601 comprising salt solution 1603 similar to or identical to salt solution 1303 discussed above. In some embodiments, the salt solution 1603 can comprise a temperature within one or more of the ranges discussed above for the temperature of the salt solution 1303 discussed above. In further embodiments, the temperature of the salt solution 1603 can be substantially identical to the temperature of the salt solution 1303. In some embodiments, the first period of time of the chemically strengthening in step 1007 can be within one or more of the ranges discussed above for the time of contact with the salt solution 1303 with respect to step 1007. Relationships between the first period of time in step 1007 and the time of contact with an alkali metal (e.g., salt solution) in step 1003 and/or step 1011 will be discussed below.

Figure 17:
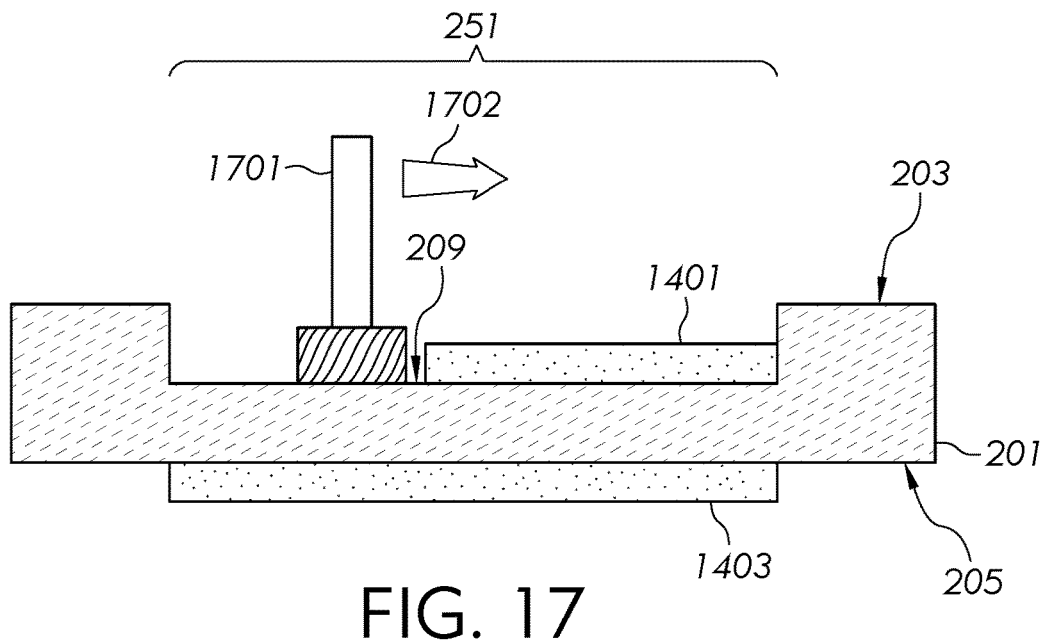

After step 1007, as shown in FIGS. 17, methods can proceed to step 1009 comprising removing the layer disposed over the central portion 251. In some embodiments, removing the layer can comprise removing the first layer 1401 disposed over the first central surface area 209 of the central portion 251. In further embodiments, removing the layer can further comprise removing the second layer 1403 disposed over the second central surface area 213 of the central portion 251. In further embodiments, as shown, removing the first layer 1401 and/or the second layer 1403 can comprise moving a grinding tool 1701 in a direction 1702 across the surface (e.g., first central surface area 209, second central surface area 213). In even further embodiments, using the tool may comprise sweeping, scraping, grinding, pushing, etc. In further embodiments, the first layer 1401 and/or the second layer 1403 can be removed by washing the surface (e.g., first central surface area 209, second central surface area 213) with a solvent.

Figure 18:
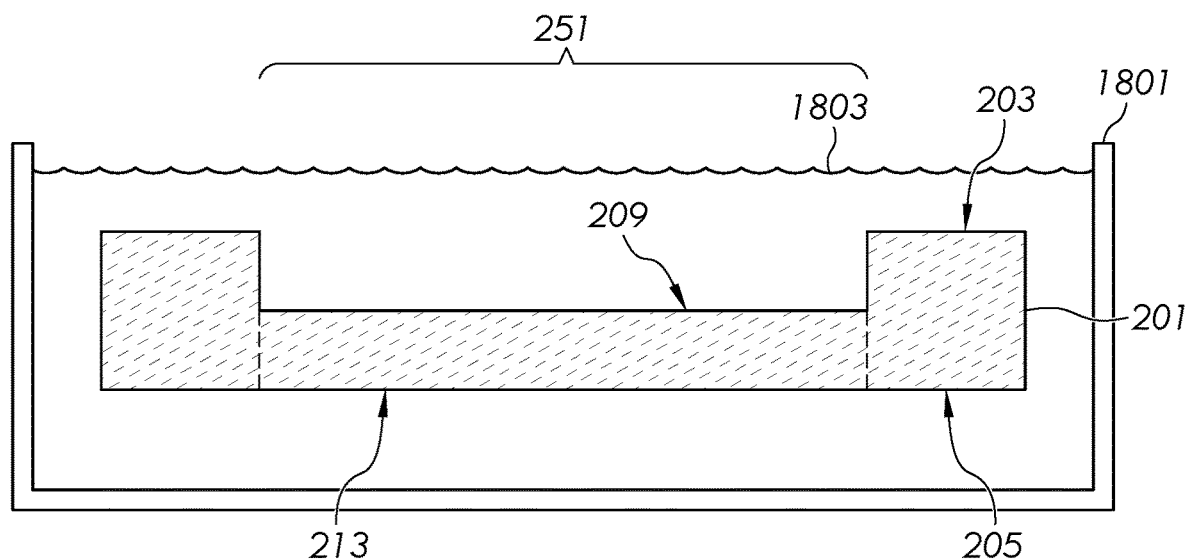

In some embodiments, after step 1009, as shown in FIG. 18, the method can proceed to step 1011 comprising further chemically strengthening the foldable substrate 201. As used herein, the further chemically strengthening the foldable substrate 201 can be for a second period of time. As used herein, the second period of time can be the total of time of steps 1003 and 1013, if present in the method, when at least a portion of the foldable substrate 201 is in contact with the one or more alkali metals (e.g., sodium ions, potassium ions) discussed with regards to salt solution 1303. Consequently, a period of time in step 1013 when the foldable substrate 201 is in contact with the one or more alkali metals (e.g., sodium ions, potassium ions) can be less than or equal to the second period of time. In some embodiments, a period of time in step 1013 when the foldable substrate 201 is in contact with the one or more alkali metals (e.g., sodium ions, potassium ions) can be within one or more of the ranges discussed above with regards to step 1003. In some embodiments, the second period of time can be greater than the first period of time. In further embodiments, the second period of time as a percentage of the first period time can be about 103% or more, about 110% or more, about 120% or more, about 135% or more, about 200% or less, about 175% or less, about 160% or less, or about 150% or less. In further embodiments, the second period of time as a percentage of the first period time can be in a range from about 103% to about 200%, from about 103% to about 175%, from about 110% to about 175%, from about 110% to about 160%, from about 120% to about 160%, from about 120% to about 150%, from about 135% to about 150%, or any range or subrange therebetween.

In some embodiments, as shown in FIG. 18, the further chemically strengthening the foldable substrate 201 in step 1011 can comprise contacting at least a portion of a foldable substrate 201 comprising lithium cations and/or sodium cations with a salt bath 1801 comprising salt solution 1803 comprising one or more of the alkali metal ions and/or alkali metal-containing compounds discussed above with regards to steps 1003 and 1007. In some embodiments, the salt solution 1803 can comprise a temperature within one or more of the ranges discussed above with regards to step 1003. After step 1011, the foldable substrate can comprise one or more compressive stress regions (e.g., first, second, third, fourth, first central, and/or second central compressive stress region(s)) comprising a depth of compression and/or an associated depth of layer within the one or more ranges discussed above in regards to the corresponding compressive stress region. In some embodiments where step 1011 is omitted (e.g., following arrow 1004 or 1006), after step 1009, the foldable substrate can comprise one or more compressive stress regions (e.g., first, second, third, fourth, first central, and/or second central compressive stress region(s)) comprising a depth of compression and/or an associated depth of layer within the one or more ranges discussed above in regards to the corresponding compressive stress region. In further embodiments, an absolute difference between a depth of layer between one of the first depth of layer, second depth of layer, third depth of layer, or fourth depth of layer divided by the substrate thickness and the first central depth of layer or second central depth of layer divided by the central thickness can be within one or more of the ranges discussed above. In further embodiments, an absolute difference between a depth of compression between one of the first depth of compression, second depth of compression, third depth of compression, or fourth depth of compression divided by the substrate thickness and the first central depth of compression or second central depth of compression divided by the central thickness can be within one or more of the ranges discussed above. In further embodiments, an absolute difference between the first average concentration of potassium or the second average concentration of potassium and the central average concentration of potassium can be within one or more of the ranges discussed above.

In some embodiments, step 1011 can further comprise chemically etching foldable substrate 201 after chemically strengthening the foldable substrate 201 (e.g., after chemically strengthening in step 1007 and/or 1011). In some embodiments, step 1013, described below, can comprise chemically etching foldable substrate 201 after chemically strengthening the foldable substrate 201 (e.g., after chemically strengthening in step 1007 and/or 1011) before assembling the foldable apparatus in step 1013. As described above, etching can comprise contacting the foldable substrate 201 with an etching solution contained in an etching bath. In some embodiments, the first major surface 203 and the first central surface area 209 are etched. In some embodiments, the second major surface 205 is etched. In further embodiments, the first major surface 203, the first central surface area 209, the second major surface 205, and/or the second central surface area 213 are etched. Chemically etching, if present in steps 1011 and/or 1013, can be designed to remove surface imperfections that may be left over from chemically strengthening the foldable substrate 201. Indeed, chemically strengthening may result in surface imperfections that can affect the strength and/or optical quality of the foldable substrate 201. By etching during step 1011 and/or 1013, surface imperfections generated during chemically strengthening can be removed. In some embodiments, such etching can be designed to remove a portion of the layer comprising a depth of about 1 nm or more, about 5 nm or more, about 2 μm or less, about 1 μm or less, about 500 nm or less, about 100 nm or less, about 50 nm or less, or about 10 nm or less. In some embodiments, such etching can be designed to remove a portion of the layer comprising a depth in a range from about 1 nm to about 2 μm, from about 1 nm to about 1 μm, from about 5 nm to about 1 μm, from about 5 nm to about 500 nm, from about 5 nm to about 100 nm, from about 5 nm to about 50 nm, from about 5 nm to about 10 nm, or any range or subrange therebetween. Such etching may avoid substantially changing the thickness of the foldable substrate 201 or the surface compression achieved during chemically strengthening.

After step 1011, methods of the disclosure can proceed to step 1013, which comprises assembling the foldable apparatus using the foldable substrate 201. As shown in FIGS. 24 and 26, step 1013 can comprise applying an adhesive layer 261 to contact the first surface area 223 of the first major surface 203 and the third surface area 233 of the first major surface 203. As shown, the second contact surface 265 of the adhesive layer 261 can contact the first surface area 223 and the third surface area 233. In some embodiments, as shown in FIG. 24, the adhesive layer 261 can comprise one or more layers of an adhesive material. For example, there can be an integral interface between the one or more layers comprising the adhesive layer 261, which can reduce (e.g., avoid) optical diffraction and/or optical discontinuities as light travels between the layers since the one or more layers can, in some embodiments, include substantially the same index of refraction. In some embodiments, as shown in FIG. 24, the adhesive layer 261 can further fill the recess 219. In further embodiments, as shown in FIG. 24, the second contact surface 265 of the adhesive layer 261 can contact the first central surface area 209. In some embodiments, as shown in FIG. 26, step 1013 can comprise disposing a polymer-based portion 241 in the recess 219. In further embodiments, the polymer-based portion 241 can comprise the third contact surface 245 that can contact the first central surface area 209. In further embodiments, as shown in FIG. 26, the polymer-based portion 241 can comprise the fourth contact surface 247 that can contact the second contact surface 265 of the adhesive layer 261. In some embodiments, although not shown, the recess may not be totally filled, for example, to leave room for electronic devices and/or mechanical devices.

Figure 32:
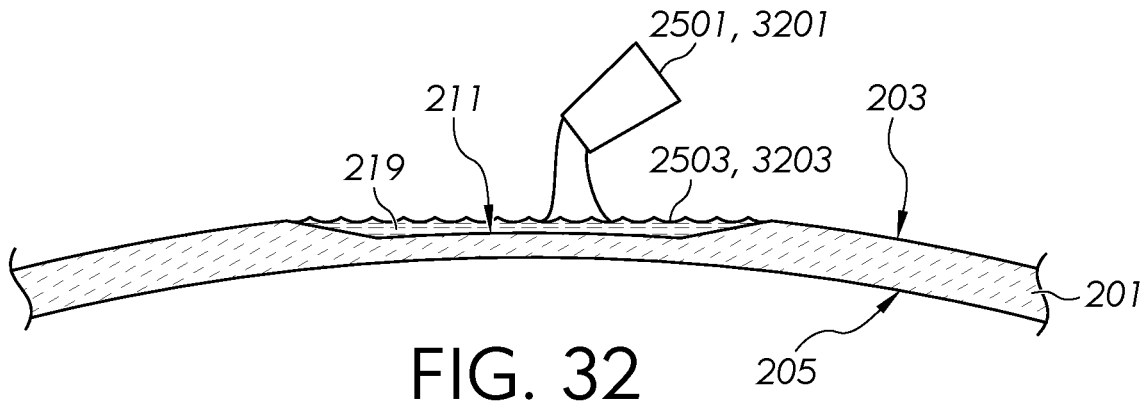
Figure 33:
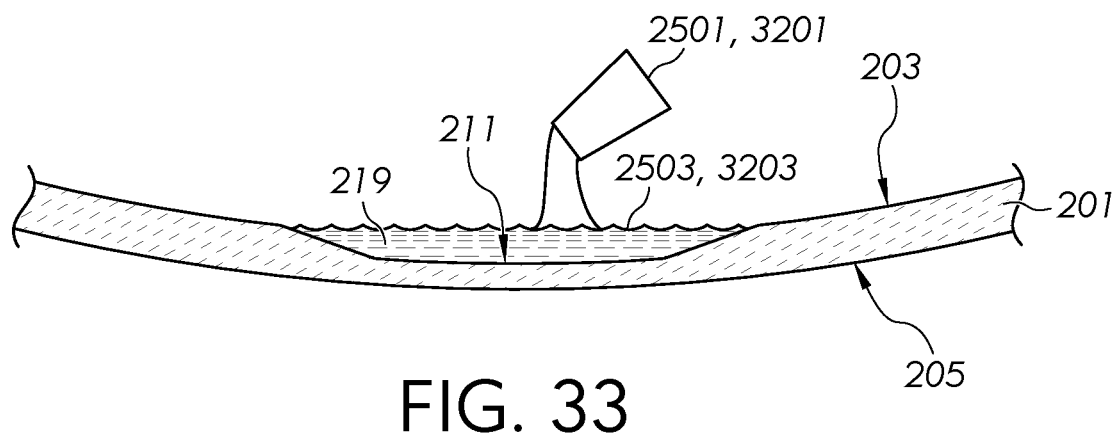
Figure 34:
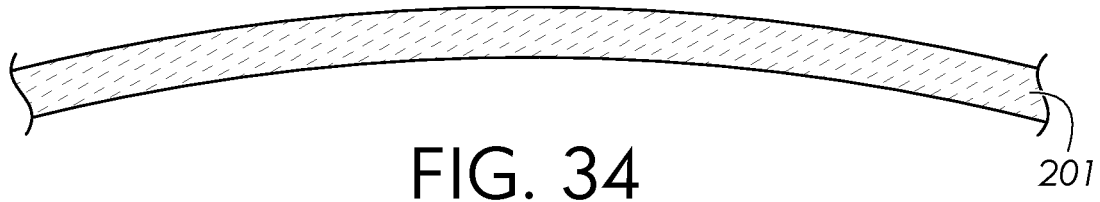

In some embodiments, as shown in FIGS. 25 and 32-33, step 1013 can comprise disposing a second liquid 2503 in the recess 219. The second liquid 2503 can then be cured to form the polymer-based portion. In some embodiments, as shown in FIG. 25, step 1013 can further comprise curing the second liquid 2503 to form a polymer-based portion 241 while the foldable substrate 201 is in a flat configuration. In some embodiments, as shown in FIGS. 32-33, step 1013 can further comprise curing the second liquid 2503 to form the polymer-based portion 241 while the foldable substrate 201 is in a bent configuration. In further embodiments, as shown in FIG. 32, in step 1013, the foldable substrate 201 can be in a bent configuration such that the first major surface 203 and the first central surface area 209 are on the outside of the bend. In further embodiments, as shown in FIG. 33, in step 1013, the foldable substrate 201 can be in a bent configuration such that the second major surface 205 is on the outside of the bend.

Curing the second liquid 2503 can form the polymer-based portion 241 in step 1013. In some embodiments, as shown in FIGS. 25 and 32-33, step 1013 can comprise disposing a liquid 2503 into the recess 219. In further embodiments, a conduit (e.g., flexible tube, micropipette, or syringe) may be used to dispose the second liquid 2503 into the recess 219. In further embodiments, as shown in FIGS. 25 and 32-33, the second liquid 2503 may be disposed in the recess 219 by dispensing the second liquid 2503 from a container 2501 into the recess 219. In some embodiments, disposing the second liquid 2503 into the recess 219 may at least partially (e.g., substantially fully) fill the recess 219. In some embodiments, as shown, disposing the second liquid 2503 in the recess 219 can dispose the second liquid 2503 between the first portion 221 and the second portion 231. In some embodiments, the second liquid 2503 may comprise one or more precursor(s) of the polymer-based portion and solvent(s). In some embodiments, the precursor(s) of the polymer-based portion can comprise, without limitation, one or more of a monomer, an oligomer, an accelerator, a curing agent, an epoxy, a polyurethane (e.g., isocyanate, ester, glycols), a mercapto-ester, an acrylate, particles (e.g., one or more of copper oxide, beta-quartz, a tungstate, a vanadate, a pyrophosphate, and a nickel-titanium alloy), and/or fibers. In some embodiments, the solvent(s) for the precursor(s) may comprise a polar solvent (e.g., water, an alcohol, an acetate, acetone, formic acid, dimethylformamide, acetonitrile, dimethyl sulfoxone, nitromethane, propylene carbonate, poly(ether ether ketone)) and/or a non-polar solvent (e.g., pentane, 1,4-dioxane, chloroform, dichloromethane, diethyl ether, hexane, heptane, benzene, toluene, xylene). The second liquid 2503 can be cured to form the polymer-based portion 241 as shown in FIG. 26. In further embodiments, curing the second liquid 2503 to form the polymer-based portion 241 may comprise heating the second liquid 2503. In further embodiments, curing the second liquid 2503 to form the polymer-based portion 241 may comprise irradiating the second liquid 2503 with ultraviolet (UV) radiation. In further embodiments, the curing the second liquid 2503 to form the polymer-based portion 241 can comprise waiting a predetermined amount of time (e.g., from about 30 minutes to 24 hours, from about 1 hour to about 8 hours). In some embodiments, the polymer-based portion 241 can comprise a negative coefficient of thermal expansion, as discussed above. In some embodiments, the precursor(s) can comprise a cyclic monomer (e.g., norbornene, cyclopentene), where curing the precursor(s) comprises ring-opening metathesis polymerization that can result in an increase in volume from the second liquid 2503 to the polymer-based portion 241. In some embodiments, curing the second liquid 2503 can form the polymer-based portion positioned between the first portion 221 and the second portion 231 of the foldable substrate 201.

In some embodiments, the foldable apparatus comprising the foldable substrate after step 1013 and/or step 1015 can comprise a neutral stress configuration when the foldable apparatus is in a bent configuration. In further embodiments, the foldable apparatus can comprise a maximum magnitude of the deviatoric strain of the polymer-based portion in one or more of the ranges discussed above (e.g., in a range from about 1% to about 8%, from about 2% to about 6%) in the neutral stress configuration. In further embodiments, the foldable apparatus can comprise an angle within one or more of the ranges discussed above in the neutral stress configuration. In some embodiments, the neutral stress configuration can correspond to a bent configuration as a result of bending the foldable substrate 201. In some embodiments, the neutral stress configuration can correspond to a bent configuration as a result of curing the second liquid 2503 to form the polymer-based portion 241 while the foldable substrate 201 was bent. In some embodiments, the neutral stress configuration can correspond to a bent configuration as a result of an increase in volume in curing the second liquid 2503 to form the polymer-based portion 241. In some embodiments, the neutral stress configuration can correspond to a bent configuration as a result of the polymer-based portion 241 comprising a negative coefficient of thermal expansion.

In some embodiments, a release liner (e.g., see release liner 271 in FIG. 2) or a display device (e.g., see display device 307 in FIG. 3) may be disposed on the first contact surface 263 of the adhesive layer 261. In some embodiments, a coating (e.g., see coating 281 in FIG. 2) may be disposed on the second major surface of the foldable substrate 201. At the end 1015 of the flow chart in FIG. 10 the foldable apparatus is complete.

Figure 10:
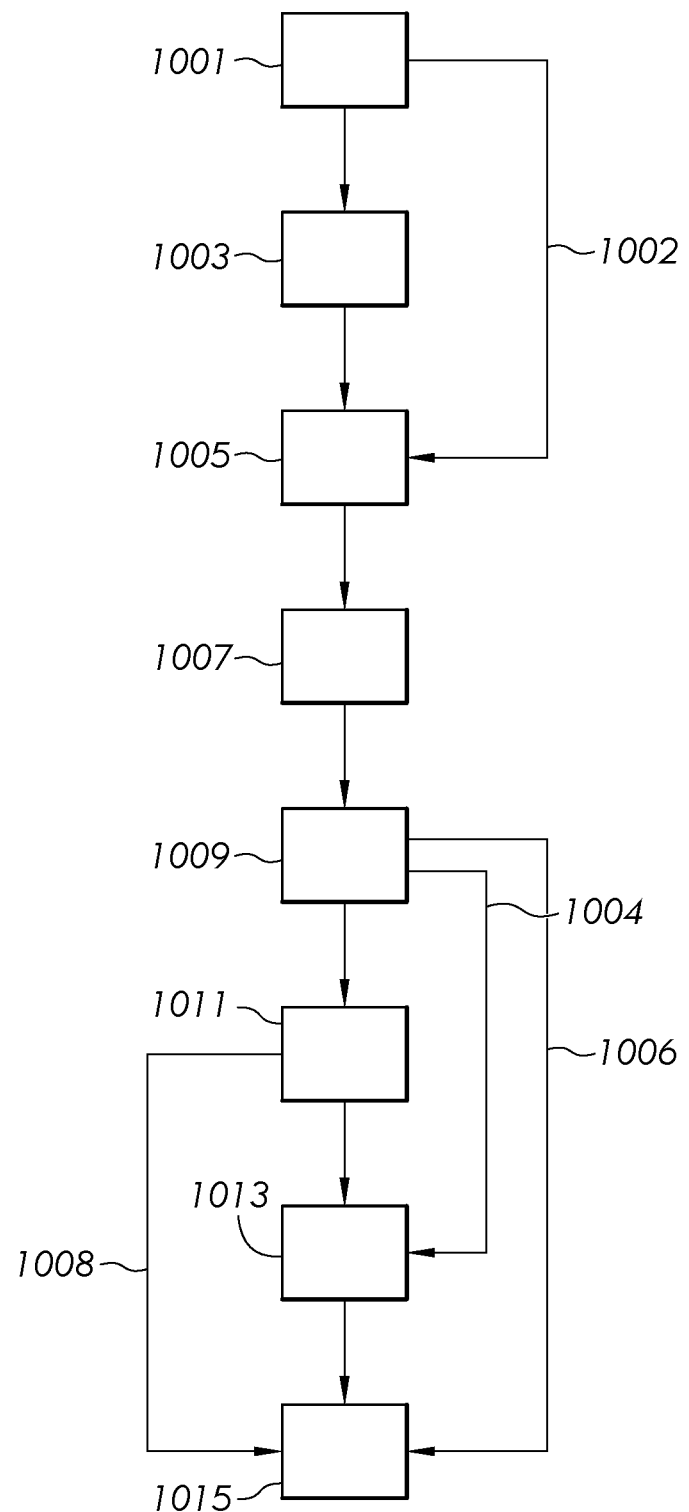
FIGS. 10-11 are flow charts illustrating example methods making a foldable substrate and/or foldable apparatus in accordance with embodiments of the disclosure.

In some embodiments, methods of making a foldable apparatus in accordance with embodiments of the disclosure can proceed along steps 1001, 1003, 1005, 1007, 1009, 1011, 1013, and 1015 of the flow chart in FIG. 10 sequentially, as discussed above. In some embodiments, as shown in FIG. 10, arrow 1002 can be followed from step 1001 omitting step 1003, for example, when the foldable substrate 201 is not chemically strengthened before step 1007. In some embodiments, arrow 1004 can be followed from step 1009 to step 1013 omitting step 1011, for example, if the foldable substrate 201 already comprises the compressive stress regions of the finished foldable substrate. In some embodiments, arrow 1006 can be followed from step 1009 to step 1015, for example if the method produces a foldable substrate 201 (e.g., see FIG. 5) and the foldable substrate 201 already comprises the compressive stress regions of the finished foldable substrate. In some embodiments, arrow 1008 can be followed from step 1011 to step 1015, for example if the method produces a foldable substrate 201 (e.g., see FIG. 5). In some embodiments, the method can comprise a single chemically strengthening step in step 1007, for example, by following arrow 1002 and one of arrows 1004 or 1006, omitting additional chemically strengthening steps. In some embodiments, the method can comprise two chemically strengthening steps comprising step 1007 and one of steps 1003 or 1011, for example by following arrow 1002 or one of arrows 1004 or 1006, respectively, omitting an additional chemical strengthening step. Any of the above options may be combined to make a foldable apparatus in accordance with embodiments of the disclosure.

Example embodiments of making the foldable apparatus 101 and/or 301, test foldable apparatus 602, and/or foldable substrate 201 illustrated in FIGS. 2-3 and 5-7 will now be discussed with reference to FIGS. 12, 18-26, and 32-34 and the flow chart in FIG. 11. In a first step 1101 of methods of the disclosure, methods can start with providing a foldable substrate 201. In some embodiments, the foldable substrate 201 may be provided by purchase or otherwise obtaining a substrate or by forming the foldable substrate. In some embodiments, the foldable substrate 201 can comprise a glass-based substrate and/or a ceramic-based substrate. In further embodiments, glass-based substrates and/or ceramic-based substrates can be provided by forming them with a variety of ribbon forming processes, for example, slot draw, down-draw, fusion down-draw, up-draw, press roll, redraw or float. In further embodiments, ceramic-based substrates can be provided by heating a glass-based substrate to crystallize one or more ceramic crystals. The foldable substrate 201 may comprise a second major surface 205 (see FIG. 12) that can extend along a plane. The second major surface 205 can be opposite a first major surface 203. In some embodiments, as shown in FIG. 34, the foldable substrate 201 can be bent (e.g., comprise a bent configuration). In further embodiments, the foldable substrate 201 can comprise a bent configuration as a result of bending the foldable substrate 201 into a bent configuration while the foldable substrate 201 comprises a viscosity in a range from about $10^4$ Pascal-seconds to about $10^7$ Pascal-seconds (e.g., in a working range of the foldable substrate 201, between a softening point of the foldable substrate 201 and a working point of the foldable substrate 201).

In some embodiments, the foldable substrate 201 can comprise a recess 219 in the first major surface 203 of the foldable substrate 201 exposing the first central surface area 209. In further embodiments, the recess 219 may be formed by etching, laser ablation or mechanically working the first major surface 203. For example, the first major surface 203 may be mechanically worked by diamond engraving to produce very precise patterns in glass-based substrates and/or ceramic-based substrates. As shown in FIG. 12, diamond engraving can be used to create the recess 219 in the first major surface 203 of the foldable substrate 201 where a diamond-tip probe 1201 can be controlled using a computer numerical control (CNC) machine 1203. Materials other than diamond can be used for engraving with a CNC machine. Furthermore, other methods of forming the recess include lithography, etching, and laser ablation. For example, etching can comprise disposing a mask over the first surface area 223 and the third surface area 233, exposing the first major surface 203 of the foldable substrate 201 to an etchant to form the recess 219, and then removing the mask. Forming the recess 219 in the first major surface 203 can provide a central portion 251 between a first portion 221 and a second portion 231 of the foldable substrate 201. The central portion 251 can comprise a first central surface area 209 wherein the recess 219 can be defined between the first central surface area 209 and the first plane 204a along which the first major surface 203 extends in the flat configuration shown in FIG. 12. The first central surface area 209 can attach the first portion 221 to the second portion 231. As shown in FIG. 2, the central portion 251 can also comprise a first transition portion 253 attaching the first portion 221 to a central major surface 211 and a second transition portion 255 attaching the second portion 231 to the central major surface 211. In some embodiments, a thickness of the first transition portion 253 can continuously increase from the central major surface 211 to the first portion 221. In further embodiments, a thickness of the second transition portion 255 can continuously increase from the central major surface 211 to the second portion 231. As shown in FIG. 12, in some embodiments, the first central surface area 209 can comprise the central major surface 211 of the central portion 251 that, as shown, may be planar although nonplanar configurations may be provided in further embodiments. Furthermore, the central major surface 211 can be parallel with respect to the first plane 204a and/or the second major surface 205 as shown in FIG. 12.

In some embodiments, although not shown for the apparatus of FIG. 12, step 1101 can further comprise reducing a thickness of the foldable substrate 201. In further embodiments, the thickness of the foldable substrate 201 can be reduced by mechanically working (e.g., grinding). In further embodiments, the thickness of the foldable substrate 201 can be reduced using chemical etching. In even further embodiments, chemical etching can comprise contacting the foldable substrate 201 with an etching solution contained in an etching bath. In even further embodiments, the etching solution can comprise one or more mineral acids (e.g., HCl, HF, $H_2SO_4$, $HNO_3$). For example, with reference to the foldable substrate 201 shown in FIG. 29, the thickness of the foldable substrate 201 can be reduced using chemical etching, which can comprise contacting the foldable substrate 201 with an etching solution 2903 contained in an etching bath 2901 comprising one or more mineral acids (e.g., HCl, HF, $H_2SO_4$, $HNO_3$). In some embodiments, the thickness of the foldable substrate 201 can be reduced by removing a layer from the first major surface 203 of the foldable substrate 201 to expose a new first major surface that can comprise the first major surface 203 illustrated in FIGS. 2-3 and 5-7. In addition, or alternatively, the thickness of the foldable substrate 201 can be reduced by removing a layer from the second major surface 205 of the foldable substrate 201 to expose a new second major surface that can comprise the second major surface 205 illustrated in FIGS. 2-3 and 5-7.

In some embodiments, the second major surface 205 (e.g., the entire second major surface 205) may be covered with the optional mask (e.g., mask 2905 in FIG. 29) such that the second major surface 205 is not etched and may provide the second major surface 205 as the second major surface 205 discussed with respect to FIGS. 2-3 and 5-7 above. Preventing etching of the second major surface 205 may be beneficial to preserve a pristine nature of the second major surface 205 that may exist with some processing techniques (e.g., up draw or down draw, for example, by overflow or fusion). Maintaining the pristine surface may present a particularly smooth surface for the second major surface 205 that may form the outermost surface of the foldable apparatus that may be observed and/or touched by a user of the foldable apparatus. Alternatively, the thickness of the foldable substrate 201 can be reduced by removing the layer from the second major surface 205, for example, to remove the skin layer to expose a central layer with more consistent optical properties across the length of foldable substrate 201 (e.g., glass-based substrate and/or ceramic-based substrate), as discussed above. In some embodiments, the layer can be removed from the first major surface 203 to expose the new first major surface that can comprise the first major surface 203 illustrated in FIGS. 2-3 and 5-7 and the layer can be removed from the second major surface 205 to expose the new second major surface that can comprise the second major surface 205 illustrated in FIGS. 2-3 and 5-7. Removing the layers from both the first major surface and the second major surface can remove the outer layers of the foldable substrate 201 (e.g., glass-based substrate and/or ceramic-based substrate) that may have inconsistent optical properties than the underlying interior portions of the foldable substrate 201 (e.g., glass-based substrate and/or ceramic-based substrate). Consequently, the entire thickness throughout the length and the width of the foldable substrate 201 may have more consistent optical properties to provide consistent optical performance with little or no distortions across the entire foldable substrate 201 (e.g., glass-based substrate and/or ceramic-based substrate).

In some embodiments, removing the layer from the first major surface 203 can be beneficial to remove surface imperfections generated during formation of the recess 219. For example, mechanically working the first major surface 203 (e.g., with a diamond tip probe) to generate the recess 219 may generate micro-crack surface flaws or other imperfections that can present points of weakness where catastrophic failure of the foldable substrate 201 may occur upon folding. Thus, by removing the layer from the first major surface 203, surface imperfections generated in the layer during formation of the recess 219 may be removed where a new first major surface 203 with fewer surface imperfections can be presented. As fewer surface imperfections are present, a smaller bend radius may be achieved without failure of the foldable substrate. For example, some processing of ribbons may present differences in glass-based material properties and/or ceramic-based material properties at the first major surface and the second major surface of the foldable substrate than central portions of the foldable substrate. For example, during a down-draw process, properties of a glass-based material and/or a ceramic-based material at the major surfaces may be different than central portions. Thus, by removing the layer from the first major surface 203 at the first portion 221 and the second portion 231, the new first major surface 203 of these portions can have the same properties as the first central surface area 209 to provide consistent optical properties across the length of the foldable substrate 201, for example, if the foldable substrate 201 comprises a glass-based substrate and/or a ceramic-based substrate.

Figure 19:
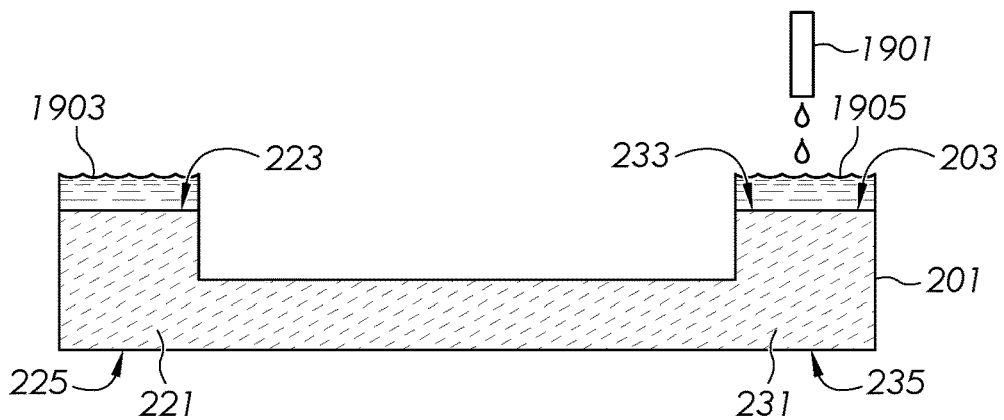

After step 1101, as shown in FIG. 19, methods of the disclosure can proceed to step 1103 comprising applying a paste comprising alkali metal ions to the first portion 221 and the second portion 231. In some embodiments, as shown in FIG. 19, step 1103 can comprise disposing a first salt paste 1903 on the first portion 221 and a first salt paste 1905 on the second portion 231 from a source 1901. In further embodiments, as shown, the first salt paste 1903 can be applied to the first surface area 223 of the first portion 221 and the first salt paste 1905 can be applied to the third surface area 233 of the second portion 231. In further embodiments, although not shown, the first salt paste (e.g., first salt paste 1903 and/or 1905) can be applied to the second surface area 225 of the first portion 221 and the fourth surface area 235 of the second portion 231. In some embodiments, the source 1901 may comprise a conduit (e.g., flexible tube, micropipette, or syringe), a spray nozzle, or a vessel (e.g., beaker). The first salt paste 1903 can be disposed on the first portion 221 and the second portion 231 can be cured to form the first salt deposits 2005, 2007, 2009, and/or 2011.

As used herein, the salt paste contains potassium and/or sodium. In some embodiments, the first salt paste 1903 and 1905 can comprise one or more of one or more of potassium nitrate, potassium phosphate, potassium chloride, potassium sulfate, sodium chloride, sodium sulfate, sodium nitrate, and/or sodium phosphate. In further embodiments, the first salt paste can comprise potassium nitrate and potassium phosphate. In further embodiments, the first salt paste can be substantially free from alkali earth metals (e.g., alkali earth metal ions, alkali earth metal-containing compounds). As used herein, alkali earth metals include beryllium, magnesium, calcium, strontium, barium, and radium. In further embodiments, the first salt paste can contain a concentration of potassium and/or sodium on an oxide basis of about 1,000 ppm or more, about 5,000 ppm or more, about 10,000 ppm or more, about 25,000 ppm or more, about 500,000 ppm or less, about 200,000 ppm or less, about 100,000 ppm or less, or about 50,000 ppm or less. In further embodiments, the first salt paste can contain a concentration of potassium and/or sodium on an oxide basis in a range from about 1,000 ppm to about 500,000 ppm, from about 5,000 ppm to about 500,000, from about 5,000 ppm to about 200,000 ppm, from about 10,000 ppm to about 200,000 ppm, from about 10,000 ppm to about 100,000, from about 25,000 ppm to about 100,000 ppm, from about 25,000 ppm to about 50,000 ppm, or any range or subrange therebetween.

In some embodiments, the first salt paste 1903 and 1905 can comprise an organic binder or a solvent. The organic binder can comprise one or more of cellulose, a cellulose derivative, a hydrophobically modified ethylene oxide urethane modifier (HUER), and an ethylene acrylic acid. Examples of a cellulose derivate comprise ethyl cellulose, methyl cellulose, and AQUAZOL (poly 2 ethyl-2 oxazine). The solvent can comprise a polar solvent (e.g., water, an alcohol, an acetate, acetone, formic acid, dimethylformamide, acetonitrile, dimethyl sulfoxone, nitromethane, propylene carbonate, poly(ether ether ketone)) and/or a nonpolar solvent (e.g., pentane, 1,4-dioxane, chloroform, dichloromethane, diethyl ether, hexane, heptane, benzene, toluene, xylene). In some embodiments, the first salt paste can be cured to form the first salt deposits 2005, 2007, 2009, and/or 2011 by removing the solvent and/or the organic binder. In further embodiments, the solvent and/or organic binder can be removed by drying the first salt paste 1903 and 1905 at room temperature (about 20° C. to about 30° C.) for eight hours or more. In further embodiments, the solvent and/or organic binder can be removed by drying the first salt paste 1903 and 1905 at a temperature in a range from about 100° C. to about 140° C. or from about 100° C. to about 120° C. for a time period in a range from about 8 minutes to about 30 minutes, or from about 8 minutes to about 20 minutes, or from about 8 minutes to about 15 minutes.

Figure 20:
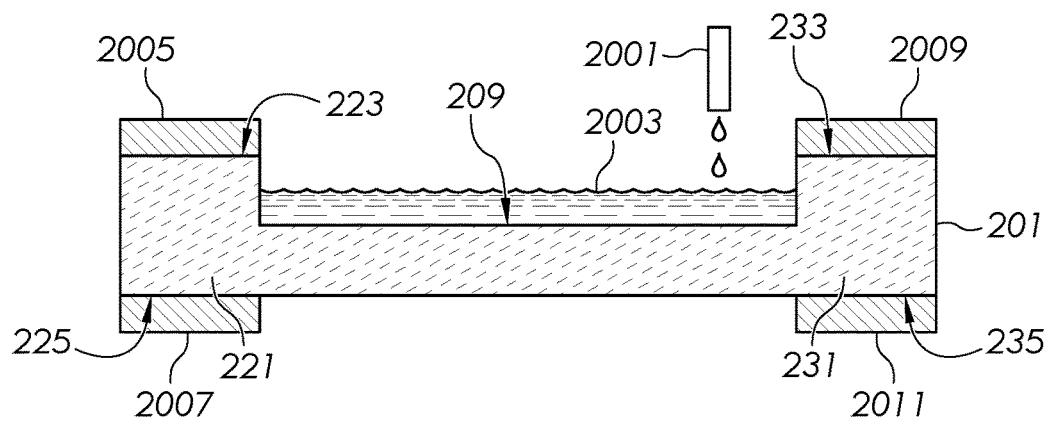

After step 1103, as shown in FIG. 20, methods of the disclosure can proceed to step 1105 comprising applying a paste comprising alkali metal ions to the central portion 251. In some embodiments, as shown in FIG. 20, step 1105 can comprise disposing a second salt paste 2003 on the first central surface area 209 of the central portion 251 from a source 2001. In further embodiments, although not shown, the second salt paste (e.g., second salt paste 2003) can be applied to the second central surface area 213 of the central portion 251. In some embodiments, the source 2001 may comprise any of the structures described above with regards to the source 1901. The second salt paste 2003 can be disposed on the central portion 251 can be cured to form the second salt deposits 2103, and/or 2105.

In some embodiments, the second salt paste 2003 can comprise one or more of the potassium-containing compounds and/or sodium-containing compounds discussed above with regards to the first salt past 1903 and 1905. In some embodiments, the second salt paste 2003 can comprise an organic binder or a solvent, including those discussed above with regards to the first salt paste 1903 and 1905. In some embodiments, the second salt paste can be cured to form the second salt deposits 2103, and/or 2105 by removing the solvent and/or the organic binder, for example, by drying the second salt paste 2003 at room temperature (e.g., for about 8 hours or more) or an elevated temperature (e.g., in a range from about 100° C. to about 140° C. or from about 100° C. to about 120° C.) for a time period (e.g., in a range from about 8 minutes to about 30 minutes, or from about 8 minutes to about 20 minutes, or from about 8 minutes to about 15 minutes).

In some embodiments, the second salt paste can comprise a concentration of potassium and/or sodium on an oxide basis that is less than a corresponding concentration of the first salt paste. In further embodiments, the concentration of potassium and/or sodium on an oxide basis as a percentage of the corresponding concentration of the first salt paste can be about 10% or more, about 20% or more, about 25% or more, about 80% or less, about 60% or less, about 50% or less, about 40% or less, or about 30% or less. In further embodiments, the concentration of potassium and/or sodium on an oxide basis as a percentage of the corresponding concentration of the first salt paste can be in a range from about 10% to about 80%, from about 10% to about 60%, from about 20% to about 60%, from about 20% to about 50%, from about 25% to about 50%, from about 25% to about 40%, from about 25% to about 30%, or any range or subrange therebetween.

In some embodiments, the second salt paste can comprise one or more alkali earth metals (e.g., alkali earth metal ions, alkali earth metal-containing compounds). In further embodiments, the one or more alkali earth metals in the second salt paste can comprise calcium (e.g., calcium ions, calcium chloride, calcium nitrate, potassium carbonate). Without wishing to be bound by theory, providing one or more alkali earth metals in a salt paste can reduce the extent of chemically strengthening, for example, by competing with alkali metals in the salt paste, which reduces the rate of exchange between ions in the foldable substrate and alkali metal ions in the salt paste. Without wishing to be bound by theory, providing calcium as the one or more alkali earth metals in the salt paste can more effectively compete with potassium than other alkali earth metals because of the similarity in ionic radius and mass between potassium ions and calcium ions. In further embodiments, a concentration of one or more alkali earth metals (e.g., calcium) can be about 10 ppm or more, about 50 ppm or more, about 100 ppm or more, about 200 ppm or more, about 400 ppm or more, about 10,000 ppm or less, about 5,000 ppm or less, about 2,000 ppm or less, about 1,000 ppm or less, about 750 ppm or less, or about 500 ppm or less. In further embodiments, a concentration of one or more alkali earth metals (e.g., calcium) can be in a range from about 10 ppm to about 10,000 ppm, from about 10 ppm to about 5,000 ppm, from about 50 ppm to about 5,000 ppm, from about 50 ppm to about 2,000 ppm, from about 100 ppm to about 2,000 ppm, from about 100 ppm to about 1,000 ppm, from about 200 ppm to about 1,000 ppm, from about 200 ppm to about 750 ppm, from about 400 ppm to about 750 ppm, from about 400 ppm to about 500 ppm, or any range or subrange therebetween.

Figure 21:
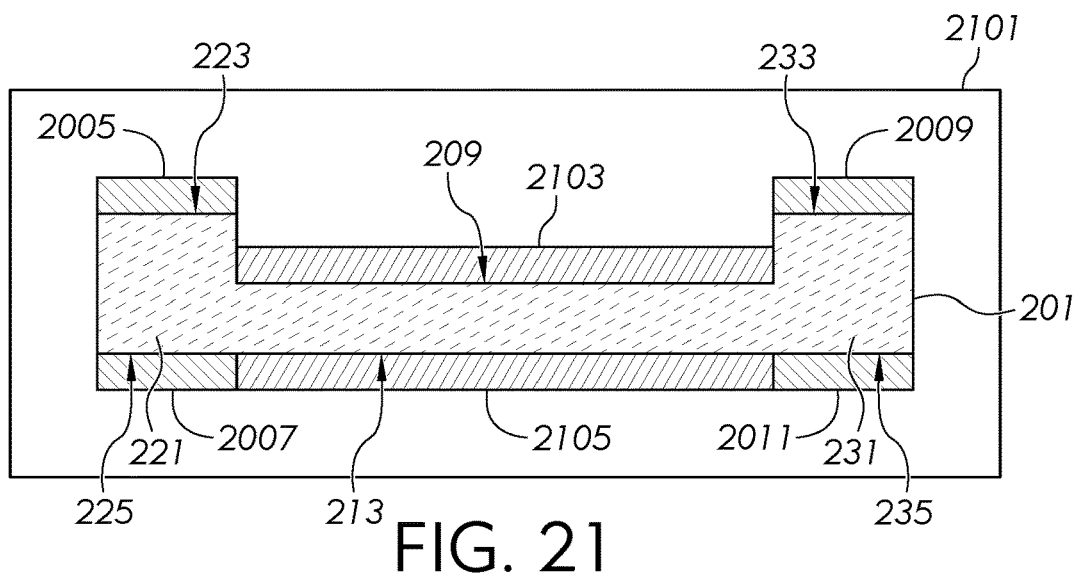
Figure 23:
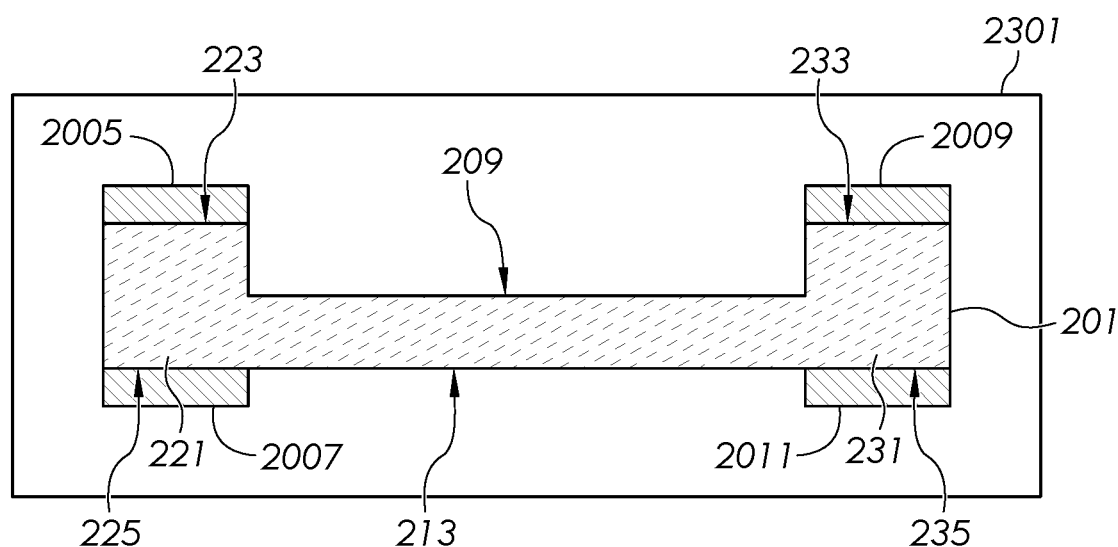

After step 1105, as shown in FIG. 21, methods of the disclosure can proceed to step 1107 comprising heating the foldable substrate 201. In some embodiments, as shown in FIG. 21, the foldable substrate 201 can be placed in an oven 2101. In further embodiments, as shown in FIG. 21, the foldable substrate 201 can comprise a plurality of first salt deposits 2005, 2007, 2009, and/or 2011 and one or more second salt deposits 2103 and/or 2105. In some embodiments, as shown in FIG. 23, the foldable substrate 201 being heated (e.g., in the oven 2301) in step 1105 can comprise the first salt deposits 2005, 2007, 2009, and/or 2011 but not any second salt deposits, for example, when following arrow 1102 to omit step 1105. In some embodiments, the foldable substrate 201 can be heated at a temperature of about 300° C. or more, about 360° C. or more, about 400° C. or more, about 500° C. or less, about 460° C. or less, or about 400° C. or less. In some embodiments, foldable substrate 201 can be heated at a temperature in a range from about 300° C. to about 500° C., from about 360° C. to about 500° C., from about 400° C. to about 500° C., from about 300° C. to about 460° C., from about 360° C. to about 460° C., from about 400° C. to about 460° C., from about 300° C. to about 400° C., from about 360° C. to about 400° C., or any range or subrange therebetween. In some embodiments, the foldable substrate 201 can be heated for about 15 minutes or more, about 1 hour or more, about 3 hours or more, about 48 hours or less, about 24 hours or less, or about 8 hours or less. In some embodiments, the foldable substrate 201 can be heated for a time in a range from about 15 minutes to about 48 hours, from about 1 hour to about 48 hours, from about 3 hours to about 48 hours, from about 15 minutes to about 24 hours, from about 1 hour to about 24 hours, from about 3 hours to about 48 hours, from about 3 hours to about 24 hours, from about 3 hours to about 8 hours, or any range or subrange therebetween. After the foldable substrate 201 has been heated, as shown in FIGS. 21 and 23, the foldable substrate 201 may comprise a chemically strengthened first portion 221, second portion 231, and/or central portion 251.

Figure 22:
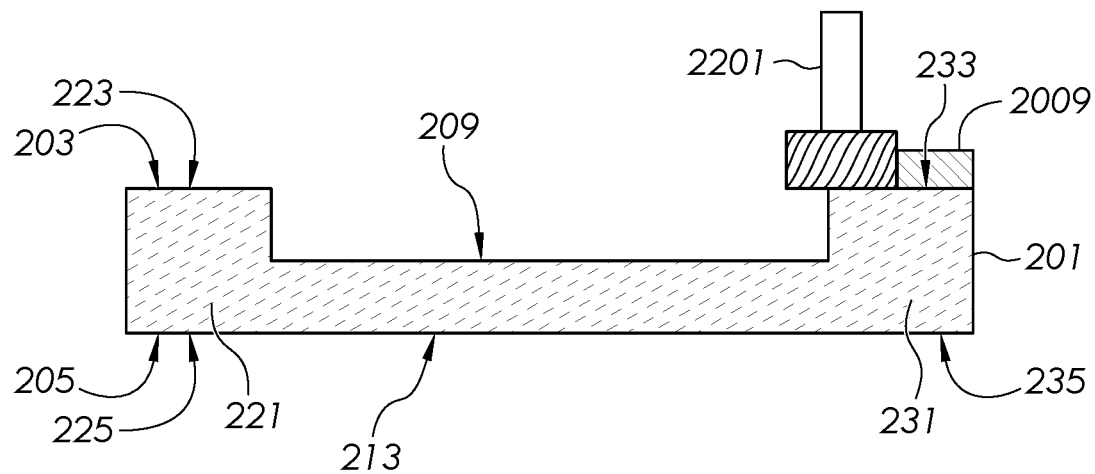

After step 1107, as shown in FIG. 22, methods of the disclosure can proceed to step 1109 comprising removing the paste. In some embodiments, as shown, removing the paste (e.g., first salt deposits 2009) can comprise moving a grinding tool 2201 in a direction 2202 across the surface (e.g., third surface area 233). In even further embodiments, using the tool may comprise sweeping, scraping, grinding, pushing, etc. In further embodiments, the paste (e.g., first salt deposits 2005, 2007, 2009, and/or 2011, second salt deposits 2103 and/or 2105) can be removed by washing the surface (e.g., first surface area 223, second surface area 225, third surface area 233, fourth surface area 235, first central surface area 209, second central surface area 213) with a solvent. In some embodiments, removing the paste can comprise removing the first salt deposits 2005, 2007, 2009, and 2011 from the first surface area 223, the second surface area 225, the third surface area 233, and the fourth surface area 235, respectively. In further embodiments, removing the paste can further comprise removing the second salt deposits 2103 and 2105 from the first central surface area 209 and the second central surface area 213, respectively.

After step 1109, methods of the disclosure can proceed to step 1111 comprising further chemically strengthening the foldable substrate 201. In some embodiments, as shown in FIG. 18, the further chemically strengthening the foldable substrate 201 in step 1111 can comprise contacting at least a portion of a foldable substrate 201 comprising lithium cations and/or sodium cations with a salt bath 1801 comprising salt solution 1803 comprising one or more of the alkali metal ions and/or alkali metal-containing compounds discussed above with regards to step 1003. In some embodiments, the salt solution 1803 can comprise a temperature within one or more of the ranges discussed above with regards to step 1003. After step 1111, the foldable substrate can comprise one or more compressive stress regions (e.g., first, second, third, fourth, first central, and/or second central compressive stress region(s)) comprising a depth of compression and/or an associated depth of layer within the one or more ranges discussed above in regards to the corresponding compressive stress region. In some embodiments where step 1111 is omitted (e.g., following arrow 1104 or 1106), after step 1109, the foldable substrate can comprise one or more compressive stress regions (e.g., first, second, third, fourth, first central, and/or second central compressive stress region(s)) comprising a depth of compression and/or an associated depth of layer within the one or more ranges discussed above in regards to the corresponding compressive stress region. In further embodiments, an absolute difference between a depth of layer between one of the first depth of layer, second depth of layer, third depth of layer, or fourth depth of layer divided by the substrate thickness and the first central depth of layer or second central depth of layer divided by the central thickness can be within one or more of the ranges discussed above. In further embodiments, an absolute difference between a depth of compression between one of the first depth of compression, second depth of compression, third depth of compression, or fourth depth of compression divided by the substrate thickness and the first central depth of compression or second central depth of compression divided by the central thickness can be within one or more of the ranges discussed above. In further embodiments, an absolute difference between the first average concentration of potassium or the second average concentration of potassium and the central average concentration of potassium can be within one or more of the ranges discussed above.

In some embodiments, step 1111 can further comprise chemically etching foldable substrate 201 after chemically strengthening the foldable substrate 201 (e.g., after chemically strengthening in steps 1107 and/or 1011). In some embodiments, step 1113, described below, can comprise chemically etching foldable substrate 201 after chemically strengthening the foldable substrate 201 (e.g., after chemically strengthening in step 1107 and/or 1111) before assembling the foldable apparatus in step 1113. As described above, etching can comprise contacting the foldable substrate 201 with an etching solution contained in an etching bath (e.g., etching solution 2903 contained in an etching bath 2901 shown in FIG. 29). In some embodiments, the first major surface 203 and the first central surface area 209 are etched. In some embodiments, the second major surface 205 is etched. In further embodiments, the first major surface 203, the first central surface area 209, the second major surface 205, and/or the second central surface area 213 are etched. Chemically etching, if present in steps 1111 and/or 1113, can be designed to remove surface imperfections that may be left over from chemically strengthening the foldable substrate 201. Indeed, chemically strengthening may result in surface imperfections that can affect the strength and/or optical quality of the foldable substrate 201. By etching during step 1111 and/or 1113, surface imperfections generated during chemically strengthening can be removed. In some embodiments, such etching can be designed to remove a portion of the layer comprising a depth of about 1 nm or more, about 5 nm or more, about 2 μm or less, about 1 μm or less, about 500 nm or less, about 100 nm or less, about 50 nm or less, or about 10 nm or less. In some embodiments, such etching can be designed to remove a portion of the layer comprising a depth in a range from about 1 nm to about 2 μm, from about 1 nm to about 1 μm, from about 5 nm to about 1 μm, from about 5 nm to about 500 nm, from about 5 nm to about 100 nm, from about 5 nm to about 50 nm, from about 5 nm to about 10 nm, or any range or subrange therebetween. Such etching may avoid substantially changing the thickness of the foldable substrate 201 or the surface compression achieved during chemically strengthening.

After step 1111, methods of the disclosure can proceed to step 1113, which comprises assembling the foldable apparatus using the foldable substrate 201. As shown in FIGS. 24 and 26, step 1113 can comprise applying an adhesive layer 261 to contact the first surface area 223 of the first major surface 203 and the third surface area 233 of the first major surface 203. As shown, the second contact surface 265 of the adhesive layer 261 can contact the first surface area 223 and the third surface area 233. In some embodiments, as shown in FIG. 24, the adhesive layer 261 can comprise one or more layers of an adhesive material. For example, there can be an integral interface between the one or more layers comprising the adhesive layer 261, which can reduce (e.g., avoid) optical diffraction and/or optical discontinuities as light travels between the layers since the one or more layers can, in some embodiments, include substantially the same index of refraction. In some embodiments, as shown in FIG. 24, the adhesive layer 261 can further fill the recess 219. In further embodiments, as shown in FIG. 24, the second contact surface 265 of the adhesive layer 261 can contact the first central surface area 209. In some embodiments, as shown in FIG. 26, step 1113 can comprise disposing a polymer-based portion 241 in the recess 219. In further embodiments, the polymer-based portion 241 can comprise the third contact surface 245 that can contact the first central surface area 209. In further embodiments, as shown in FIG. 26, the polymer-based portion 241 can comprise the fourth contact surface 247 that can contact the second contact surface 265 of the adhesive layer 261. In some embodiments, although not shown, the recess may not be totally filled, for example, to leave room for electronic devices and/or mechanical devices.

In some embodiments, as shown in FIGS. 25 and 32-33, step 1113 can comprise disposing a second liquid 2503 in the recess 219. The second liquid 2503 can then be cured to form the polymer-based portion. In some embodiments, as shown in FIG. 25, step 1113 can further comprise curing the second liquid 2503 to form a polymer-based portion 241 while the foldable substrate 201 is in a flat configuration. In some embodiments, as shown in FIGS. 32-33, step 1113 can further comprise curing the second liquid 2503 to form the polymer-based portion 241 while the foldable substrate 201 is in a bent configuration. In further embodiments, as shown in FIG. 32, in step 1113, the foldable substrate 201 can be in a bent configuration such that the first major surface 203 and the first central surface area 209 are on the outside of the bend. In further embodiments, as shown in FIG. 33, in step 1113, the foldable substrate 201 can be in a bent configuration such that the second major surface 205 is on the outside of the bend.

Curing the second liquid 2503 can form the polymer-based portion 241 in step 1113. In some embodiments, as shown in FIGS. 25 and 32-33, step 1013 can comprise disposing a liquid 2503 into the recess 219. In further embodiments, a conduit (e.g., flexible tube, micropipette, or syringe) may be used to dispose the second liquid 2503 into the recess 219. In further embodiments, as shown in FIGS. 25 and 32-33, the second liquid 2503 may be disposed in the recess 219 by dispensing the second liquid 2503 from a container 2501 into the recess 219. In some embodiments, disposing the second liquid 2503 into the recess 219 may at least partially (e.g., substantially fully) fill the recess 219. In some embodiments, as shown, disposing the second liquid 2503 in the recess 219 can dispose the second liquid 2503 between the first portion 221 and the second portion 231. In some embodiments, the second liquid 2503 may comprise one or more precursor(s) of the polymer-based portion and solvent(s), as discussed above. The second liquid 2503 can be cured to form the polymer-based portion 241 as shown in FIG. 26. In further embodiments, curing the second liquid 2503 to form the polymer-based portion 241 may comprise heating the second liquid 2503. In further embodiments, curing the second liquid 2503 to form the polymer-based portion 241 may comprise irradiating the second liquid 2503 with ultraviolet (UV) radiation. In further embodiments, the curing the second liquid 2503 to form the polymer-based portion 241 can comprise waiting a predetermined amount of time (e.g., from about 30 minutes to 24 hours, from about 1 hour to about 8 hours). In some embodiments, the polymer-based portion 241 can comprise a negative coefficient of thermal expansion, as discussed above. In some embodiments, the precursor(s) can comprise a cyclic monomer (e.g., norbornene, cyclopentene), where curing the precursor(s) comprises ring-opening metathesis polymerization that can result in an increase in volume from the second liquid 2503 to the polymer-based portion 241. In some embodiments, curing the second liquid 2503 can form the polymer-based portion positioned between the first portion 221 and the second portion 231 of the foldable substrate 201.

In some embodiments, the foldable apparatus comprising the foldable substrate after step 1013 and/or step 1015 can comprise a neutral stress configuration when the foldable apparatus is in a bent configuration. In further embodiments, the foldable apparatus can comprise a maximum magnitude of the deviatoric strain of the polymer-based portion in one or more of the ranges discussed above (e.g., in a range from about 1% to about 8%, from about 2% to about 6%) in the neutral stress configuration. In further embodiments, the foldable apparatus can comprise an angle within one or more of the ranges discussed above in the neutral stress configuration. In some embodiments, the neutral stress configuration can correspond to a bent configuration as a result of bending the foldable substrate 201. In some embodiments, the neutral stress configuration can correspond to a bent configuration as a result of curing the second liquid 2503 to form the polymer-based portion 241 while the foldable substrate 201 was bent. In some embodiments, the neutral stress configuration can correspond to a bent configuration as a result of an increase in volume in curing the second liquid 2503 to form the polymer-based portion 241. In some embodiments, the neutral stress configuration can correspond to a bent configuration as a result of the polymer-based portion 241 comprising a negative coefficient of thermal expansion.

In some embodiments, a release liner (e.g., see release liner 271 in FIG. 2) or a display device (e.g., see display device 307 in FIG. 3) may be disposed on the first contact surface 263 of the adhesive layer 261. In some embodiments, a coating (e.g., see coating 281 in FIG. 2) may be disposed on the second major surface of the foldable substrate 201. At the end 1015 of the flow chart in FIG. 10 the foldable apparatus is complete. At the end 1115 of the flow chart in FIG. 11 the foldable apparatus is complete.

Figure 11:
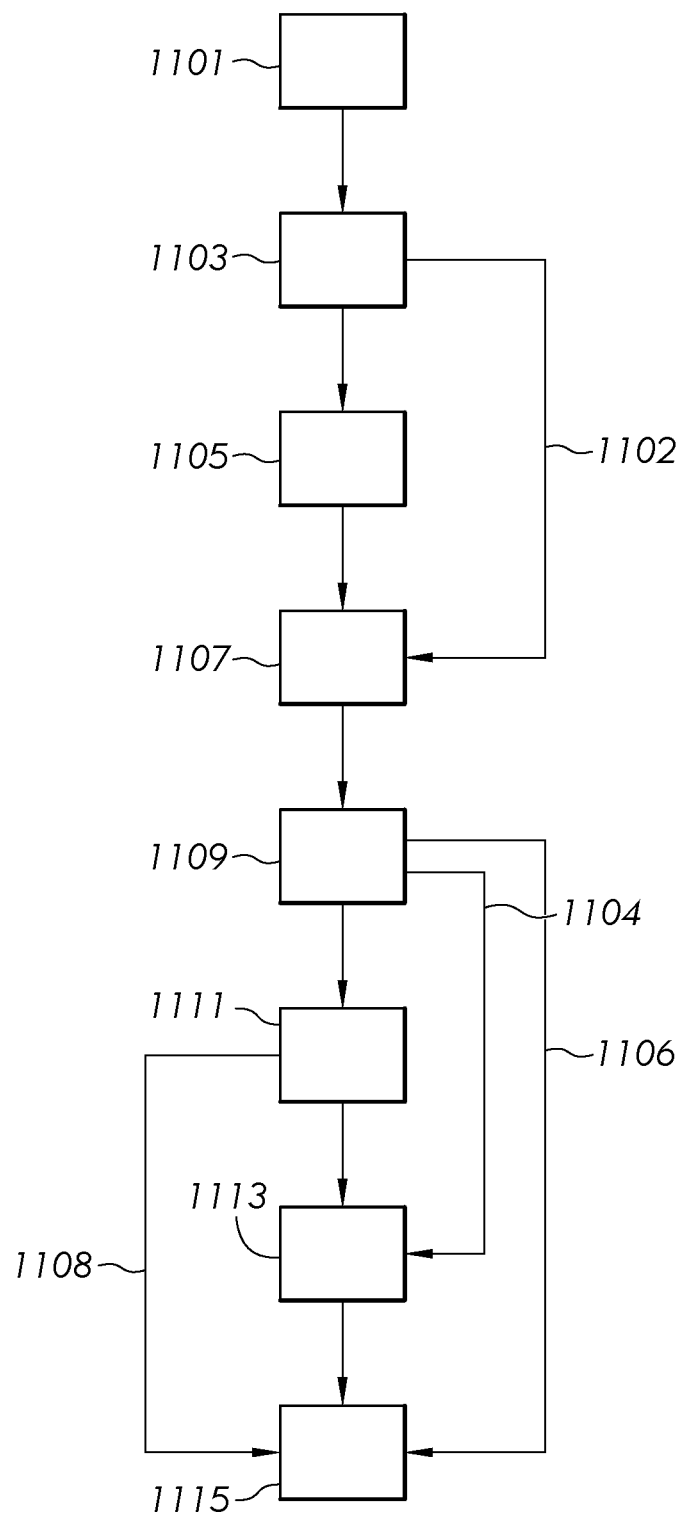

In some embodiments, methods of making a foldable apparatus in accordance with embodiments of the disclosure can proceed along steps 1101, 1103, 1105, 1107, 1109, 1111, 1113, and 1115 of the flow chart in FIG. 11 sequentially, as discussed above. In some embodiments, as shown in FIG. 11, arrow 1102 can be followed from step 1101 omitting step 1103 when at the least first portion 221 of the foldable substrate 201 is to be chemically strengthened by the heating but the central portion is not in step 1107, for example, in methods including chemically strengthening in step 1111. In some embodiments, arrow 1104 can be followed from step 1109 to step 1113 omitting step 1011, for example, if the foldable substrate 201 already comprises the compressive stress regions of the finished foldable substrate. In some embodiments, arrow 1106 can be followed from step 1109 to step 1115, for example if the method produces a foldable substrate 201 (e.g., see FIG. 5) and the foldable substrate 201 already comprises the compressive stress regions of the finished foldable substrate. In some embodiments, arrow 1108 can be followed from step 1111 to step 1115, for example if the method produces a foldable substrate 201 (e.g., see FIG. 5). In some embodiments, the method can comprise a single chemically strengthening step by the heating in step 1107, for example, by following one of arrows 1104 or 1106, omitting chemically strengthening in step 1113. In some embodiments, the method can comprise two chemically strengthening steps comprising the heating in step 1107 and step 1113. Any of the above options may be combined to make a foldable apparatus in accordance with embodiments of the disclosure.

Example embodiments of making the foldable apparatus 101 and/or 301, test foldable apparatus 602, and/or foldable substrate 201 illustrated in FIGS. 2-3 and 6-7 will now be discussed with reference to FIGS. 28-37 and the flow chart in FIG. 27. In a first step 2701 of methods of the disclosure, as shown in FIG. 28, start with providing the foldable substrate 201. In some embodiments, the foldable substrate 201 may be provided by obtaining by purchase or otherwise obtaining a foldable substrate or by forming the foldable substrate. In some embodiments, foldable substrates, for example glass-based substrates and/or ceramic-based substrates, can be provided by forming them with a variety of ribbon forming processes, for example, slot draw, down-draw, fusion down-draw, up-draw, press roll, redraw or float. The foldable substrate 201 may comprise a first major surface 203 that can extend along a first plane 204a. The first major surface 203 can be opposite a second major surface 205. In some embodiments, as shown in FIG. 34, the foldable substrate 201 can be bent (e.g., comprise a bent configuration). In further embodiments, the foldable substrate 201 can comprise a bent configuration as a result of bending the foldable substrate 201 into a bent configuration while the foldable substrate 201 comprises a viscosity in a range from about $10^4$ Pascal-seconds to about $10^7$ Pascal-seconds (e.g., in a working range of the foldable substrate 201, between a softening point of the foldable substrate 201 and a working point of the foldable substrate 201).

After step 2701, as shown in FIG. 28, the method can optionally proceed to step 2703 comprising forming a recess 219 in the first major surface 203 of the foldable substrate 201. As shown in FIG. 28, the recess 219 may be formed by etching, laser ablation or mechanically working the first major surface 203. For example, the first major surface 203 may be mechanically worked by diamond engraving to produce very precise patterns in glass-based substrates and/or ceramic-based substrates. As shown in FIG. 28, diamond engraving can be used to create the recess 219 in the first major surface 203 of the foldable substrate 201 where a diamond-tip probe 1201 can be controlled using a computer numerical control (CNC) machine 1203. Materials other than diamond can be used for engraving with a CNC machine. Furthermore, other methods of forming the recess include lithography, etching, and laser ablation. Forming the recess 219 in the first major surface 203 can provide a central portion 251 between a first portion 221 and a second portion 231 of the foldable substrate 201. The central portion 251 can comprise a first central surface area 209 wherein the recess 219 can be defined between the first central surface area 209 and the first plane 204a along which the first major surface 203 extends. The central portion 251 can also comprise a first transition portion 253 attaching the first portion 221 to a central major surface 211 and a second transition portion 255 attaching the second portion 231 to the central major surface 211. In some embodiments, a thickness of the first transition portion 253 can continuously increase from the central major surface 211 to the first portion 221. In further embodiments, a thickness of the second transition portion 255 can continuously increase from the central major surface 211 to the second portion 231. As shown in FIG. 28, in some embodiments, the first central surface area 209 can comprise a central major surface 211 of the central portion 251 that, as shown, may be planar although nonplanar configurations may be provided in further embodiments. Furthermore, the central major surface 211 can be parallel with respect to the first plane 204a and/or the second major surface 205 as shown in FIG. 28.

After step 2703, as further shown in FIG. 29, the method can optionally proceed to step 2705 comprising reducing a thickness of the foldable substrate 201. In some embodiments, although not shown, the thickness of the foldable substrate 201 can be reduced by mechanically working (e.g., grinding). In further embodiments, as shown in FIG. 29, the thickness of the foldable substrate 201 can be reduced using chemical etching. In some embodiments, as shown, chemical etching can comprise contacting the foldable substrate 201 with an etching solution 2903 contained in an etching bath 2901. In further embodiments, the etching solution 2903 can comprise one or more mineral acids (e.g., HCl, HF, $H_2SO_4$, $HNO_3$). In some embodiments, the thickness of the foldable substrate 201 can be reduced by removing a layer from the first major surface 203 of the foldable substrate 201 to expose a new first major surface that can comprise the first major surface 203 illustrated in FIGS. 2-3 and 6-7. In addition, or alternatively, the thickness of the foldable substrate 201 can be reduced by removing a layer from the second major surface 205 of the foldable substrate 201 to expose a new second major surface that can comprise the second major surface 205 illustrated in FIGS. 2-3 and 6-7.

In some embodiments, removing the layer from the first major surface 203 can be beneficial to remove surface imperfections generated during formation of the recess 219. For example, mechanically working the first major surface 203 (e.g., with a diamond tip probe) to generate the recess 219 may generate micro-crack surface flaws or other imperfections that can present points of weakness where catastrophic failure of the foldable substrate 201 may occur upon bending. Thus, by removing the layer from the first major surface 203, surface imperfections generated in the layer during formation of the recess 219 may be removed where a new first major surface 203 with less surface imperfections can be presented. As fewer surface imperfections are present, a smaller bend radius may be achieved without failure of the foldable substrate. Furthermore, some processing of foldable substrates may present differences in material properties at the first and second major surfaces of the foldable substrate than central portions of the foldable substrate. For example, during a down-draw process, properties of the foldable substrate at the major surfaces of the foldable substrate may be different than central portions of the foldable substrate. Thus, by removing the layer from the first major surface 203 at the first portion 221 and the second portion 231, the new first major surface 203 of these portions can have the same properties as the foldable material forming the first central surface area 209 to provide consistent optical properties across the length of the foldable substrate.

In some embodiments, the second major surface 205 (e.g., the entire second major surface 205) may be covered with the optional mask 2905 such that the second major surface 205 is not etched and may provide the second major surface 205 as the second major surface 205 discussed with respect to FIGS. 2-3 and 6-7 above. Preventing etching of the second major surface 205 may be beneficial to preserve a pristine nature of the second major surface 205 that may exist with some processing techniques (e.g., up draw or down draw). Maintaining the pristine surface may present a particularly smooth surface for the second major surface 205 that may form the outermost surface of the foldable apparatus that may be observed and/or touched by a user of the foldable apparatus. Alternatively, the thickness of the foldable substrate 201 can be reduced by removing the layer from the second major surface 205, for example, to remove the skin layer to expose a central layer with move consistent optical properties across the length of the foldable substrate at discussed above. Thus, in some embodiments, a layer can be removed from the second major surface 205 to expose a new second major surface that can comprise the second major surface 205 illustrated in FIGS. 2-3 and 6-7.

In some embodiments, the layer can be removed from the first major surface 203 to expose the new first major surface that can comprise the first major surface 203 illustrated in FIGS. 2-3 and 6-7 and the layer can be removed from the second major surface 205 to expose the new second major surface that can comprise the second major surface 205 illustrated in FIGS. 2-3 and 6-7. Removing the layers from both the first and second major surfaces can remove the outer layers of the foldable substrate that may have more inconsistent optical properties than the underlying interior portions of the foldable substrate. Consequently, the entire thickness throughout the length and the width of the foldable substrate may have more consistent optical properties to provide consistent optical performance with little or no distortions across the entire foldable substrate.

As shown in FIG. 29, the step 2705 can produce the foldable substrate 201 illustrated in FIGS. 2-3 and 6-7 wherein the recess 219 of the foldable substrate 201 of FIG. 8 develops into the recess 219 of the foldable substrate 201. Furthermore, the central portion 251 of the foldable substrate 201 can develop into the central portion 251 of FIGS. 2-3 and 6-7 that can include the central portion 251, first transition portion 253, and second transition portion 255 described previously. Still further, the first portion 221 and the second portion 231 of the foldable substrate 201 can develop into the corresponding first portion 221 and the second portion 231 of the foldable substrate 201 described previously.

After step 2705, as further shown in FIG. 30, the method can proceed to step 2707 comprising chemically strengthening the foldable substrate 201. In some embodiments, as shown in FIG. 30, chemically strengthening may be conducted by immersing at least a portion of the foldable substrate 201 in a salt solution 1303 contained in a salt bath 1301. In further embodiments, the salt solution 1303 can contain any of the compositions discussed above with regards to salt solution 1303 and/or be at a temperature within any of the ranges discussed above for the temperature of the salt solution 1303. In some embodiments, the foldable substrate 201 can be in contact with the salt solution 1303 for about 15 minutes or more, about 1 hour or more, about 3 hours or more, about 48 hours or less, about 24 hours or less, or about 8 hours or less. In some embodiments, the foldable substrate 201 can be in contact with the salt solution 1303 for a time in a range from about 15 minutes to about 48 hours, from about 1 hour to about 48 hours, from about 3 hours to about 48 hours, from about 15 minutes to about 24 hours, from about 1 hour to about 24 hours, from about 3 hours to about 48 hours, from about 3 hours to about 24 hours, from about 3 hours to about 8 hours, or any range or subrange therebetween.

Chemically strengthening the foldable substrate 201 can comprise chemically strengthening the first central surface area 209, chemically strengthening the first surface area 223 of the first portion 221 of the first major surface 203, chemically strengthening the third surface area 233 of the second portion 231 of the first major surface 203, and the second major surface 205 of the foldable substrate 201. In some embodiments, chemically strengthening comprises chemically strengthening the first portion 221 to a first depth of compression from the first surface area 223 of the first major surface 203, chemically strengthening the second portion 231 to a third depth of compression from the third surface area 233 of the first major surface 203, and chemically strengthening the central portion 251 to a first central depth of compression from the first central surface area 209.

In some embodiments, chemically strengthening the second major surface 205 of the foldable substrate 201 can comprise chemically strengthening the second surface area 225 of the first portion 221 of the second major surface 205, chemically strengthening the fourth surface area 235 of the second portion 231 of the second major surface 205, and chemically strengthening the second central surface area 213 of the central portion 251 of second major surface 205. In some embodiments, chemically strengthening the second major surface 205 can comprise chemically strengthening the first portion 221 to a second depth of compression from the second surface area 225 of the second major surface 205, chemically strengthening the second portion 231 to a fourth depth of compression from the fourth surface area 235 of the second major surface 205, and chemically strengthening the central portion 251 to a second central depth of compression from the second central surface area 213 of the second major surface 205.

After step 2707, as further shown in FIG. 31, the method can optionally proceed to step 2709 comprising chemically etching the foldable substrate. As described above with respect to step 2703 and FIG. 29, etching can comprise contacting the foldable substrate 201 with an etching solution 2903 contained in an etching bath 2901. The etching solution 2903 can comprise any of the compounds discussed above with regards to etching solution 2903. In some embodiments, the first major surface 203 and the first central surface area 209 are etched. In some embodiments, the second major surface 205 is etched. In further embodiments, the first major surface 203, the first central surface area 209, and the second major surface 205 are etched. The step 2709 of chemically etching can be designed to remove surface imperfections that may be left over from the step 2707, if carried out, of chemically strengthening the foldable substrate 201. Indeed, the step 2707 of chemically strengthening may result in surface imperfections that can affect the strength and/or optical quality of the foldable substrate. By etching during step 2709, surface imperfections generated during the step 2707 of chemically strengthening can remove surface imperfections. Such etching during step 2709 can be designed to remove less than 5-10 nanometers of the layer, thereby not substantially changing the thickness of the foldable substrate or the surface compression achieved during step 2707 of chemically strengthening.

After step 2709, as shown in FIGS. 32-37, methods of the disclosure can proceed to step 2711, which comprises applying an adhesive layer 261 (e.g., second adhesive layer 3503) to contact the first surface area 223 of the first major surface 203, the third surface area 233 of the first major surface 203, and the first central surface area 209 of the central portion 251 with the adhesive layer 261 (e.g., first adhesive layer 3501) filling the recess 219. In some embodiments, although not shown, the recess may not be totally filled, for example, to leave room for electronic devices and/or mechanical devices.

In some embodiments, as shown in FIG. 35, one or more layers 3501 of adhesive can be disposed in the recess 219 to fill the recess 219. A central portion of a second contact surface 265 of the adhesive layer 261 can contact the first central surface area 209 of the central portion 251. Additionally, as shown in FIG. 35, a second adhesive layer 3503 of the adhesive layer 261 can be disposed on the foldable substrate 201. A first surface area of the second adhesive layer 3503 can contact the first surface area 223 of the first major surface 203 and a second surface area of the second adhesive layer 3503 can contact the third surface area 233 of the first major surface 203. Furthermore, a third surface area of the second adhesive layer 3503 can contact the outer surface of the one or more layers 3501 filling the recess 219 to provide an integral interface therebetween. Due to the integral interface between the one or more layers 3501 and the second adhesive layer 3503, optical diffraction can be avoided as light travels between the layers since the one or more layers 3501 and the second adhesive layer 3503 can, in some embodiments, include substantially the same index of refraction. Providing the one or more layers 3501 and the second adhesive layer 3503 with substantially the same index of refraction can avoid optical discontinuities that may otherwise exist at the foldable apparatus at the vicinity of the interface between the one or more layers 3501 and the second adhesive layer 3503. As such, the second contact surface 265 of the adhesive layer 261 can contact the first central surface area 209 while also contacting the first surface area 223 of the first major surface 203 and the third surface area 233 of the first major surface 203. In further embodiments, as shown in FIG. 35, the second adhesive layer 3503 of adhesive can comprise a second contact surface that can be planar and, in some embodiments, can be parallel with the first surface area 223 and/or the third surface area 233. In other embodiments, the entire layer of adhesive may be formed by application (by any suitable method known in the art) of a liquid material followed by optional curing.

In some embodiments, as shown in FIGS. 32-33 and 36, step 2711 can comprise disposing an adhesive liquid 3203 in the recess 219. The adhesive liquid 3203 can then be cured to form at least a portion of the adhesive layer 261. In some embodiments, as shown in FIG. 36, step 2711 can further comprise curing the adhesive liquid 3203 to form a portion of the adhesive layer 261 (e.g., first adhesive layer 3501 in FIGS. 345 and 37) while the foldable substrate 201 is in a flat configuration. In some embodiments, as shown in FIGS. 32-33, step 2711 can further comprise curing the adhesive liquid 3203 to form at least a portion of the adhesive layer 261 while the foldable substrate 201 is in a bent configuration. In further embodiments, as shown in FIG. 32, in step 2711, the foldable substrate 201 can be in a bent configuration such that the first major surface 203 and the first central surface area 209 are on the outside of the bend. In further embodiments, as shown in FIG. 33, in step 2711, the foldable substrate 201 can be in a bent configuration such that the second major surface 205 is on the outside of the bend.

Curing the adhesive liquid 3203 can form at least a portion of the adhesive layer 261 in step 2711. In some embodiments, as shown in FIGS. 32-33 and 36, step 2711 can comprise disposing an adhesive liquid 3203 into the recess 219. In further embodiments, a conduit (e.g., flexible tube, micropipette, or syringe) may be used to dispose the adhesive liquid 3203 into the recess 219. In further embodiments, as shown in FIGS. 32-33 and 36, the adhesive liquid 3203 may be disposed in the recess 219 by dispensing the adhesive liquid 3203 from a container 3201 into the recess 219. In some embodiments, disposing the adhesive liquid 3203 into the recess 219 may at least partially (e.g., substantially fully) fill the recess 219. In some embodiments, as shown, disposing the adhesive liquid 3203 in the recess 219 can dispose the adhesive liquid 3203 between the first portion 221 and the second portion 231. In some embodiments, the adhesive liquid 3203 may comprise one or more precursor(s) of the adhesive layer and solvent(s). In some embodiments, the precursor(s) of the adhesive layer can comprise, without limitation, one or more of a monomer, an oligomer, an accelerator, a curing agent, an epoxy, a polyurethane (e.g., isocyanate, ester, glycols), a mercapto-ester, an acrylate, a silicone, particles (e.g., one or more of copper oxide, beta-quartz, a tungstate, a vanadate, a pyrophosphate, and a nickel-titanium alloy), and/or fibers. In some embodiments, the solvent(s) for the precursor(s) may comprise a polar solvent (e.g., water, an alcohol, an acetate, acetone, formic acid, dimethylformamide, acetonitrile, dimethyl sulfoxone, nitromethane, propylene carbonate, poly(ether ether ketone)) and/or a non-polar solvent (e.g., pentane, 1,4-dioxane, chloroform, dichloromethane, diethyl ether, hexane, heptane, benzene, toluene, xylene). The adhesive liquid 3203 can be cured to form at least a portion of the adhesive layer 261 (e.g., first adhesive layer 3501) as shown in FIGS. 35 and 37. In further embodiments, curing the adhesive liquid 3203 to form at least a portion of the first adhesive layer 3501 may comprise heating the adhesive liquid 3203. In further embodiments, curing the adhesive liquid 3203 to form at least a portion of the adhesive layer 261 may comprise irradiating the adhesive liquid 3203 with ultraviolet (UV) radiation. In further embodiments, the curing the adhesive liquid 3203 to form at least a portion of the adhesive layer 261 can comprise waiting a predetermined amount of time (e.g., from about 30 minutes to 24 hours, from about 1 hour to about 8 hours). In some embodiments, at least the portion of the adhesive layer 261 positioned in the recess 219 can comprise a negative coefficient of thermal expansion, similar to the properties of the polymer-based portion 241 as discussed above. In some embodiments, the precursor(s) can comprise a cyclic monomer (e.g., norbornene, cyclopentene), where curing the precursor(s) comprises ring-opening metathesis polymerization that can result in an increase in volume from the adhesive liquid 3203 to the at least a portion of the adhesive layer 261. In some embodiments, curing the adhesive liquid 3203 can form at least a portion of the adhesive layer 261 positioned between the first portion 221 and the second portion 231 of the foldable substrate 201 (e.g., positioned in and/or filling the recess 219).

In some embodiments, the foldable apparatus comprising the foldable substrate after step 2711 or step 2713 can comprise a neutral stress configuration when the foldable apparatus is in a bent configuration. In further embodiments, the foldable apparatus can comprise a maximum magnitude of the deviatoric strain of the polymer-based portion in one or more of the ranges discussed above (e.g., in a range from about 1% to about 8%, from about 2% to about 6%) in the neutral stress configuration. In further embodiments, the foldable apparatus can comprise an angle within one or more of the ranges discussed above in the neutral stress configuration. In some embodiments, the neutral stress configuration can correspond to a bent configuration as a result of bending the foldable substrate 201. In some embodiments, the neutral stress configuration can correspond to a bent configuration as a result of curing the adhesive liquid 3203 to form at least a portion of the adhesive layer 261 positioned in the recess 219 while the foldable substrate 201 was bent. In some embodiments, the neutral stress configuration can correspond to a bent configuration as a result of an increase in volume in curing the adhesive liquid 3203 to form at least a portion of the adhesive layer 261 positioned in the recess 219. In some embodiments, the neutral stress configuration can correspond to a bent configuration as a result of the adhesive layer 261 comprising a negative coefficient of thermal expansion.

As shown in FIG. 37, a second adhesive layer 3503 of the adhesive layer 261 may be disposed on the foldable substrate 201 and the polymer-based portion 241 or the first adhesive layer 3501 (see FIG. 35). In some embodiments, the second surface area of the second adhesive layer 3503 can contact the first surface area 223 of the first major surface 203 and a third contact surface 245 of the polymer-based portion 241 or the second surface area of the second adhesive layer 3503 (see FIG. 35) can contact the third surface area 233 of the first major surface 203. Furthermore, a third surface area of the second adhesive layer 3503 can contact the fourth contact surface 247 of the polymer-based portion 241 or the outer surface of the first adhesive layer 3501 (see FIG. 35) to provide an integral interface therebetween. Due to the integral interface between the polymer-based portion 241 or the first adhesive layer 3501 and the second adhesive layer 3503, optical diffraction can be avoided as light travels between the layers since the polymer-based portion 241 or the first adhesive layer 3501 and the second adhesive layer 3503 can, in some embodiments, include substantially the same index of refraction. Providing the polymer-based portion 241 or the first adhesive layer 3501 and the second adhesive layer 3503 with substantially the same index of refraction can avoid optical discontinuities that may otherwise exist at the foldable apparatus at the vicinity of the interface between the polymer-based portion 241 or the first adhesive layer 3501 and the second adhesive layer 3503. As such, as shown in FIG. 35, the second contact surface 265 of the adhesive layer 261 can contact the first central surface area 209 while also contacting the first surface area 223 of the first major surface 203 and the third surface area 233 of the first major surface 203. In further embodiments, as shown in FIG. 35, the second adhesive layer 3503 of adhesive can comprise a first contact surface 263 that can be planar and, in some embodiments, can be parallel with the first surface area 223 and/or the third surface area 233. As such, as shown in FIG. 37, the third contact surface 245 of the polymer-based portion 241 can contact the first central surface area 209 while second contact surface 265 of the adhesive layer 261 can contact the first surface area 223 of the first major surface 203 and the third surface area 233 of the first major surface 203. In further embodiments, as shown in FIG. 37, the second adhesive layer 3503 of adhesive can comprise a first contact surface 263 that can be planar and, in some embodiments, can be parallel with the first surface area 223 and/or the third surface area 233. In some embodiments, a release liner (e.g., see release liner 271 in FIG. 2) or a display device (e.g., see display device 307 in FIG. 3) may be disposed on the second contact surface 265 of the adhesive layer 261. At the end 2713 of the flow chart in FIG. 27 the foldable apparatus is complete.

In some embodiments, methods of making a foldable apparatus can comprise the steps disclosed above in the order disclosed above (e.g., 2701, 2703, 2705, 2707, 2709, 2711, 2713). In some embodiments, as shown in FIG. 27, the arrows 2702, 2704, and 2706 may be sequentially followed, where the provided foldable substrate 201 (step 2701) is etched to reduce the thickness of the foldable substrate 201 (step 2705) before the recess 219 is formed in the first major surface 203 of the foldable substrate 201 (step 2703) and the foldable substrate 201 is chemically strengthened (e.g., ion exchange, step 2707). In some embodiments, arrow 2706 may be followed to skip etching the foldable substrate 201 to reduce the thickness of the foldable substrate, for example, when the provided foldable substrate 201 comprises a thickness substantially equal to the substrate thickness 222. In some embodiments, the arrow 2708 may be followed to skip etching the foldable substrate 201 after chemically strengthening the foldable substrate 201. In some embodiments, the method can comprise obtaining by purchase or otherwise a foldable substrate 201 comprising a recess 219 and then proceeding from step 2707 comprising chemically strengthening the foldable substrate 201 onward. Any of the above options may be combined to make a foldable apparatus in accordance with the embodiments of the disclosure.

EXAMPLES

Various embodiments will be further clarified by the following examples. Examples A-X and DD-HH all comprise a glass-based substrate (having a Composition 1 of, nominally, in mol % of: 69.1 $SiO_2$; 10.2 $Al_2O_3$; 15.1 $Na_2O$; 0.01 $K_2O$; 5.5 MgO; 0.09 $SnO_2$). Unless otherwise indicated, chemically strengthened examples A-X were chemically strengthened in a bath comprising 100% molten $KNO_3$ at 380° C. Lower effective minimum bend radius values are associated with increased flexibility (e.g., bendability). Higher pen drop heights are associated with increased impact resistance and better puncture resistance. Examples A-E are discussed with reference to Tables 1-3. Examples F-J are discussed with reference to Tables 4-6. Examples K-X are discussed with reference to Tables 7-8. Examples DD-HH are discussed with reference to Table 9.

The maximum bend stress and maximum bend force associated with Examples A-E achieving an effective bend radius of 2 mm from simulations are reported in Table 1. The maximum bend stress and lower maximum bend force associated with Examples A-E achieving an effective bend radius of 4 mm from simulations are reported in Table 2. Lower maximum bend stresses and maximum bend forces are associated with better bend properties. The experimental results of the Pen Drop Test were conducted in a region comprising the first thickness for Examples A, D, and E. Expected pen drop heights for Examples B and C are based on the above experimental results. The pen drop heights for Examples A-E are reported in Table 3. Examples A-E are not chemically strengthened.

Example A comprises a glass-based substrate comprising a uniform thickness of 35 μm across the length and width of the glass-based substrate. Example B comprises a glass-based substrate in accordance with embodiments of the disclosure. Example B comprises a first thickness of 70 μm in a first portion and a second portion. Example B comprises a second thickness of 35 μm in a central portion. Example C comprises a glass-based substrate in accordance with embodiments of the disclosure. Example C comprises a first thickness of 105 μm in a first portion and a second portion. Example C comprises a second thickness of 35 μm in a central portion. Example D comprises a glass-based substrate comprising a uniform thickness of 70 μm across the length and width of the glass-based substrate. Example E comprises a glass-based substrate comprising a uniform thickness of 100 μm across the length and width of the glass-based substrate. Simulations indicate that a maximum bend stress is 2292 MPa and a maximum bend force is 117.3 N when Example E achieves an effective bend radius of 2 mm. Simulations indicate that a maximum bend stress is 1132 MPa and a maximum bend force is 28.6 N when Example E achieves an effective bend radius of 4 mm.

TABLE 1

Effective Bend Radius of 2 mm for Examples A-E

| Example | First Thickness (μm) | Second Thickness (μm) | Maximum Bend Stress (MPa) | Maximum Bend Force (N) |
|---|---|---|---|---|
| A | 35 | 35 | 789 | 4.9 |
| B | 70 | 35 | 786 | 5.1 |
| C | 105 | 35 | 786 | 5.1 |
| D | 70 | 70 | 1708 | 48.8 |
| E | 100 | 100 | 2292 | 117.3 |

TABLE 2

Effective Bend Radius of 4 mm for Examples A-E

| Example | First Thickness (μm) | Second Thickness (μm) | Maximum Bend Stress (MPa) | Maximum Bend Force (N) |
|---|---|---|---|---|
| A | 35 | 35 | 393 | 1.2 |
| B | 70 | 35 | 392 | 1.3 |
| C | 105 | 35 | 392 | 1.3 |
| D | 70 | 70 | 789 | 9.7 |
| E | 100 | 100 | 1132 | 28.6 |

TABLE 3

Pen Drop Test for Examples A-E

| Example | First Thickness (μm) | Second Thickness (μm) | Pen Drop Height (cm) |
|---|---|---|---|
| A | 35 | 35 | 12 |
| B | 70 | 35 | 15 |
| C | 105 | 35 | 22 |
| D | 70 | 70 | 15 |
| E | 105 | 105 | 22 |

Example B and Example C achieve substantially the same bend properties (e.g., maximum bend stress, maximum bend force) for both an effective bend radius of 2 mm and an effective bend radius of 4 mm. Further, Example B and Example C achieve substantially the same bend properties (e.g., maximum bend stress within 1%, maximum bend force within 10%) as Example A for both an effective bend radius of 2 mm and an effective bend radius of 4 mm. The maximum bend stress of Example B and Example C is less than Example A by 3 MPa (0.4%) for an effective bend radius of 2 mm. The maximum bend stress of Example B and Example C is less than Example A by 1 MPa (0.2%) for an effective bend radius of 4 mm. The maximum bend force of Example B and Example C is greater than Example A by 0.2 N (4%) for an effective bend radius of 2 mm. The maximum bend force of Example B and Example C is greater than Example A by 0.1 N (8%) for an effective bend radius of 4 mm. These results indicate that the thicker first thickness in example C relative to example B does not substantially impact bend properties. As such, the impact performance (e.g., pen drop reported in Table 3) can be improved by increasing the first thickness without substantially reducing bend properties.

In contrast, the bend properties of Example D are substantially worse (e.g., maximum bend stress more than 100% greater, maximum bend force more than 700% greater) than Example A for effective bend radii of 2 mm and 4 mm. The maximum bend stress of Example D is greater than Example A by more than 900 MPa (116%) for an effective bend radius of 2 mm. The maximum bend force of Example D is greater than Example A by more than 40 N (895%) for an effective bend radius of 2 mm. The maximum bend stress of Example D is greater than Example A by more than 390 MPa (101%) for an effective bend radius of 4 mm. The maximum bend force of Example D is greater than Example A by more than 8 N (708%) for an effective bend radius of 4 mm.

Further, the bend properties of Example E are substantially worse (e.g., maximum bend stress more than 150% greater, maximum bend force more than 2000% greater) than Example A for effective bend radii of 2 mm and 4 mm. The maximum bend stress of Example E is greater than Example A by more than 1500 MPa (190%) for an effective bend radius of 2 mm. The maximum bend force of Example E is greater than Example A by more than 110 N (2293%) for an effective bend radius of 2 mm. The maximum bend stress of Example E is greater than Example A by more than 700 MPa (188%) for an effective bend radius of 4 mm. The maximum bend force of Example E is greater than Example A by more than 27 N (2283%) for an effective bend radius of 4 mm.

Examples D and E indicate that changing the second thickness can substantially impact (e.g., impair) bend performance of the corresponding glass-based substrate and/or foldable apparatus. Specifically, Example E indicates that the bend performance deteriorates nonlinearly with changes in second thickness (e.g., the bend performance more significantly deteriorates as the second thickness is increased by larger amounts).

Example B and Example C achieve substantially the same bend properties (e.g., maximum bend stress, maximum bend force) as Example A for both an effective bend radius of 2 mm and an effective bend radius of 4 mm. This indicates that the second thickness substantially controls the bend properties of a glass-based substrate. In contrast, Example D and Example E comprise substantially greater maximum bend stress and maximum bend force than Examples A-C.

As discussed above, the pen drop heights reported in Table 3 were conducted where the pen was only dropped within the region comprising the first thickness (e.g., first portion). As such, locations within the central portion (e.g., first transition portion, central surface areas, second transition portion) were not used for the data reported in Table 3. Table 3 shows that Example A achieves the lowest pen drop height without failure. Example B achieves the same pen drop height as Example D while Example C achieves the same pen drop height as Example E. This indicates that the first thickness substantially controls the puncture resistance properties of the first portion and/or the second portion of a glass-based substrate. As such, Examples B and C can combine the favorable bend characteristics of Example A with the puncture resistance of Example D or Example E by comprising a second thickness (e.g., 35 µm) less than a first thickness (e.g., 70 µm, 105 µm). Consequently, as discussed above, the first thickness can be increased to increase pen drop performance (e.g., puncture resistance, impact resistance) without significantly impacting (e.g., impairing) bend properties).

The maximum compressive stress and maximum tensile stress in the first portion of Examples F-J are reported in Table 4. The maximum compressive stress and maximum tensile stress in the central portion of Examples F-J are reported in Table 5. Mechanical properties of Examples F-J are reported in Table 6. Examples F-J were prepared by chemically strengthening the first portion, the second portion, and the central portion to the depth of compression stated in Tables 4 and 5 for both the first major surface, first central surface area, and second major surface. The experimental results of the Pen Drop Test were conducted in a region comprising the substrate thickness for Examples F-J.

Example F comprised a uniform thickness of 25 µm across the length and width of a glass-based substrate. Example F was chemically strengthened to achieve a uniform 6 µm depth of compression and an associated maximum tensile stress of 354 MPa. Example F exhibited an effective minimum bend radius of 1.2 mm and a pen drop height of 15 cm.

Example G comprised a uniform thickness of 50 µm across the length and width of the glass-based substrate of the same composition as in Example F. Example G was chemically strengthened to achieve a uniform 9.7 µm depth of compression and an associated maximum tensile stress of 235 MPa. Example G exhibited an effective minimum bend radius of 2.5 mm and a pen drop height of 10 cm.

Example H comprised a uniform thickness of 125 µm across the length and width of the glass-based substrate of the same composition as in Example F. Example H was chemically strengthened to achieve a uniform 21.2 µm depth of compression and an associated maximum tensile stress of 226 MPa. Example H exhibited an effective minimum bend radius of 6.2 mm and a pen drop height of 25 cm.

Example I comprised a glass-based substrate of the same composition as in Example F made in accordance with embodiments of the disclosure. The first portion and second portion comprised a substrate thickness of 150 µm while the central portion comprises a central thickness of 30 µm. Example I was chemically strengthened to obtain a uniform 5.5 µm depth of compression, which corresponded to a maximum tensile stress of 37 MPa in the first portion and a maximum tensile stress of 223 in the central portion. Example I exhibited an effective minimum bend radius of 1.7 mm and a pen drop height of 80 cm.

Example J comprised a glass-based substrate made in accordance with embodiments of the disclosure. The first portion and second portion comprised a substrate thickness of 150 µm while the central portion comprises a central thickness of 50 µm. Example J was chemically strengthened to obtain a uniform 9.7 µm depth of compression. Example J exhibited an effective minimum bend radius of 2.5 mm and a pen drop height of 80 cm.

TABLE 4

Properties of First Portion for Examples F-J

| Example | Substrate thickness (µm) | First Portion Depth of Compression (µm) | First Portion Maximum Compressive Stress (MPa) | First Portion Maximum Tensile Stress (MPa) |
| --- | --- | --- | --- | --- |
| F | 25 | 6 | 768 | 354 |
| G | 50 | 9.7 | 740 | 235 |

TABLE 4-continued

Properties of First Portion for Examples F-J

| Example | Substrate thickness (μm) | First Portion Depth of Compression (μm) | First Portion Maximum Compressive Stress (MPa) | First Portion Maximum Tensile Stress (MPa) |
|---|---|---|---|---|
| H | 125 | 21.2 | 882 | 226 |
| I | 150 | 5.5 | 937 | 37 |
| J | 150 | 9.7 | 920 | 68 |

TABLE 5

Properties of Central Portion for Examples F-J

| Example | Central thickness (μm) | Central Portion Depth of Compression (μm) | Central Portion Maximum Compressive Stress (MPa) | Central Portion Maximum Tensile Stress (MPa) |
|---|---|---|---|---|
| F | 25 | 6 | 768 | 354 |
| G | 50 | 9.7 | 740 | 235 |
| H | 125 | 21.2 | 882 | 226 |
| I | 30 | 5.5 | 770 | 223 |
| J | 50 | 9.7 | 740 | 144 |

TABLE 6

Mechanical Properties of Examples F-J

| Example | Effective Minimum Bend Radius (mm) | Pen Drop Height (cm) | Failure Mode |
|---|---|---|---|
| F | 1.2 | 15 | High Energy |
| G | 2.5 | 10 | High Energy |
| H | 6.2 | 25 | High Energy |
| I | 1.7 | 80 | Low Energy |
| J | 2.5 | 80 | Low Energy |

Examples F-H all comprise a first portion maximum tensile stress of about 200 MPa or more, namely, 354 MPa, 235 MPa, and 226 MPa, respectively. Examples F-H all have high energy failure modes, as defined above. In contrast, Examples I-J comprise a first portion maximum tensile stress less than about 100 MPa, namely, 37 MPa and 68 MPa, respectively. Examples I-J have low energy failure modes, as defined above. As such, providing a first portion and/or a second portion maximum tensile stress of about 100 MPa or less can be associated with low energy failure modes.

Examples F-H demonstrate that increasing substrate thickness is associated with increasing effective minimum bend radius. However, Example I comprises an effective minimum bend radius of 1.7 mm, which is in between the effective minimum bend radius associated with Example F (1.2 mm for 25 μm substrate thickness) and Example G (2.5 μm for 50 μm substrate thickness). Example the substrate thickness of Example G is substantially equal to the central thickness of Example J. As such, the effective minimum bend radius can be decreased by decreasing the central thickness of a glass-based substrate while maintaining a predetermined substrate thickness. Providing a central thickness less than a substrate thickness can be associated with better bend performance (e.g., lower effective minimum bend radius) than a glass-based substrate comprising the uniform thickness.

As discussed above, the impact resistances based on the pen drop heights reported in Table 6 were conducted where the pen was only dropped within the region comprising the substrate thickness (e.g., first portion). As such, locations within the central portion (e.g., first transition portion, central portion, second transition portion) were not used for the data reported in Table 6. Examples F-H demonstrate a non-uniform trend for impact resistance. Still, Examples F-H all have pen drop heights of about 25 or less. In contrast, Examples I-J achieve a pen drop height of about 80 cm. This demonstrates that the thickness of the central portion does not substantially effect the impact resistance of the glass-based substrate when tested in a region comprising the substrate thickness. Rather, increased impact resistance can be obtained by increasing the substrate thickness while maintaining a constant central thickness.

Examples K-Q were chemically strengthened in a bath comprising 100% molten $KNO_3$ at 380° C. while Examples R-X were chemically strengthened in a bath comprising 100% molten $KNO_3$ at 410° C. The duration (e.g., period of time) of the chemically strengthening is stated in Tables 7-8 for Examples K-Q and R-X, respectively. Examples K-X comprised a layer of $SiO_2$ deposited using PVD comprising the thickness stated in Tables 7-8, respectively. The effective diffusivity was calculated as 0.13 times the square of the depth of layer divided by the duration of the chemically strengthening.

In Table 7, the maximum compressive stress and effective diffusivity of Examples K-Q continuously decrease going down the table. However, for the depth of layer, the examples that were chemically strengthened for 228 minutes comprise greater depths of layer than those that were chemically strengthened for 96 minutes, with the exception of Example Q. These trends demonstrate that increasing the thickness of the layer decreases the maximum compressive stress, effective diffusivity, and depth of layer.

TABLE 7

Properties of Examples K-Q

| Example | $SiO_2$ Layer Thickness (nm) | Time (min) | Maximum Compressive Stress (MPa) | Depth of Layer (μm) | Effective Diffusivity ($10^{-12}$ cm$^2$/s) |
|---|---|---|---|---|---|
| K | 0 | 228 | 1025 | 21.6 | 62 |
| L | 0 | 96 | 1013 | 13.8 | 60 |
| M | 10 | 228 | 592 | 18.7 | 46 |
| N | 10 | 96 | 538 | 11.8 | 43 |
| O | 50 | 228 | 213 | 15.4 | 31 |
| P | 50 | 96 | 182 | 9.0 | 25 |
| Q | 100 | 228 | 126 | 11.4 | 17 |

In Table 8, the effective diffusivity of Examples R-X continuously decrease going down the table. A similar trend exists in Table 8 for the maximum compressive stress with the exception of Example S, where the maximum compressive stress of Example R and Example S are substantially the same. However, for the depth of layer, the examples that were chemically strengthened for 105 minutes comprise greater depths of layer than those that were chemically strengthened for 45 minutes, with the exception of Example X. These trends demonstrate that increasing the thickness of the layer decreases the maximum compressive stress, effective diffusivity, and depth of layer.

TABLE 8

Properties of Examples R-X

| Example | SiO$_2$ Layer Thickness (nm) | Time (min) | Maximum Compressive Stress (MPa) | Depth of Layer (μm) | Effective Diffusivity ($10^{-12}$ cm$^2$/s) |
|---|---|---|---|---|---|
| R | 0 | 105 | 998 | 21.7 | 135 |
| S | 0 | 45 | 1001 | 13.8 | 128 |
| T | 10 | 105 | 620 | 18.6 | 99 |
| U | 10 | 45 | 564 | 11.8 | 92 |
| V | 50 | 105 | 150 | 14.4 | 60 |
| W | 50 | 45 | 140 | 9.2 | 57 |
| X | 100 | 105 | 92.5 | 12.0 | 41 |

Also, Examples K-X can be used to demonstrate how a layer disposed over a portion of a foldable substrate can be used in methods of embodiments of the disclosure. Without wishing to be bound by theory, depth of layer and effective diffusivity can be substantially constant across different substrate thicknesses when the depth of layer is less than about 40% of the corresponding substrate thickness. For example, using Examples K and Q, it is expected that a foldable substrate comprising a substrate thickness of 125 μm and a central portion comprising a central thickness of about 66 μm with a layer of SiO$_2$ comprising a thickness of 100 μm disposed over the central portion can be chemically strengthened for 105 minutes at 380° C. to obtain a substantially constant depth of layer divided by the corresponding thickness of about 17.28%. In contrast, without the SiO$_2$ layer, the above foldable substrate would be expected to have a depth of layer divided by the corresponding thickness of about 32.73% in the central portion and 17.28% in the portion(s) comprising the substrate thickness, which would likely result in mechanical instabilities being observed.

In Table 9, the maximum compressive stress and depth of layer imparted to a 100 μm thick sheet of glass comprising Composition 1 by heating the sheet with a salt deposit. The salt deposits were created by spraying a salt solution using a Nordson Asymtek SL940 with a pressure of 60 psi (414 kiloPascals (kPa)) for the salt solution and an air assist pressure of 50 psi (345 kPa) at a distance of about 7 cm from the surface to be coated in rows with a spacing of about 1.8 cm between rows. The salt solution, temperature that the glass sheet and salt deposits were heated at, and the period of time that the glass sheet and salt deposits were heated for are shown in Table 9. Also, the maximum compressive stress and depth of layer reported in Table 9 were measured using an FSM-6000.

Salt solutions AA-CC comprise ethylene acrylic acid (organic binder, alkali metal compounds, and water (solvent). Salt solution AA comprised 0.17 weight % (wt %) ethylene acrylic acid, 0.66 wt % potassium nitrate (KNO$_3$), 5.64 wt % potassium phosphate (K$_3$PO$_4$), and 93.53 wt % water. Salt solution BB comprised 0.17 wt % ethylene acrylic acid, 0.32 wt % potassium nitrate (KNO$_3$), 5.98 wt % potassium phosphate (K$_3$PO$_4$), and 93.53 wt % water. Salt solution CC comprised 0.17 wt % ethylene acrylic acid, 0.33 wt % potassium nitrate (KNO$_3$), 0.33 wt % sodium nitrate (NaNO$_3$), 2.82 wt % potassium phosphate (K$_3$PO$_4$), 2.82 wt % sodium phosphate (Na$_3$PO$_4$), and 93.53 wt % water. The ratio of phosphate ions to nitrate ions for salt solutions AA-CC are 9:1, 19:1, and 9:1, respectively.

Example DD comprises a maximum compressive stress of 295 MPa and a depth of layer of 8.4 μm. Example EE was heated at a higher temperature than Example DD, which slightly decreased the maximum compressive stress (14 MPa, 4.7% decrease) but increased the depth of layer (1.8 μm, 21.4% increase). Example GG was heated at the same temperature as Example EE, but the salt deposits of Example EE were created from salt solution AA while the salt deposits of Example GG were created from salt solution BB. The maximum compressive stress of Example GG is lower than the maximum compressive stress of Example EE (107 MPa, 38% decrease). Example FF was heated at a lower temperature than Example GG. The maximum compressive stress of Example FF is about the same as Example GG (2 MPa, 1% difference) even though the heating time was decreased from 300 minutes to 75 minutes. Example HH was heated at the same temperature and for the same time as Example FF, but the salt deposits of Example FF were created from salt solution BB while the salt deposits of Example HH were created from salt solution CC. The maximum compressive stress of Example HH is lower than the maximum compressive stress of Example FF (66 MPa, 37.5% decrease).

TABLE 9

Properties of Examples S-W

| Example | Salt Solution | Temperature (° C.) | Time (min) | Maximum Compressive Stress (MPa) | Depth of Layer (μm) |
|---|---|---|---|---|---|
| DD | AA | 360 | 300 | 295 | 8.4 |
| EE | AA | 410 | 300 | 281 | 10.2 |
| FF | BB | 360 | 75 | 176 | 8.2 |
| GG | BB | 410 | 300 | 174 | n/a |
| HH | CC | 360 | 75 | 110 | n/a |

Based on the results of Table 9, increasing the ratio of phosphate ions to nitrate ions from 9:1 to 19:1 decreased the maximum compressive stress by about 38%. Increasing the temperature that the salt deposits and glass sheet was heated at from 360° C. to 410° C. decreased the maximum compressive stress but increased the depth of layer. Including sodium ions at a 1:1 ratio to potassium ions (Salt Solution CC) decreased the maximum compressive stress. Without wishing to be bound by theory, sodium ions and potassium ions in the salt deposits compete with each other to exchange into the glass sheet, which decreases the rate and extent of the compressive stress region formed.

The above observations can be combined to provide foldable substrate comprising a low effective minimum bend radius, high impact resistance, low closing force, increased durability, and reduced fatigue. The portions can comprise glass-based and/or ceramic-based portions, which can provide good dimensional stability, reduced incidence of mechanical instabilities, good impact resistance, and/or good puncture resistance. The first portion and/or the second portion can comprise glass-based and/or ceramic-based portions comprising one or more compressive stress regions, which can further provide increased impact resistance and/or increased puncture resistance. By providing a substrate comprising a glass-based and/or ceramic-based substrate, the substrate can also provide increased impact resistance and/or puncture resistance while simultaneously facilitating good folding performance.

In some embodiments, the substrate thickness can be sufficiently large (e.g., from about 80 micrometers (microns or μm) to about 2 millimeters) to provide good impact resistance and good puncture resistance. Providing a foldable substrate comprising a central portion comprising a central thickness that is less than a substrate thickness of the first portion and/or the second portion can enable small effective minimum bend radii (e.g., about 10 millimeters (mm) or less) based on the reduced thickness in the central portion. In some embodiments, the central thickness can be sufficiently small (e.g., from about 10 micrometers to about 125 micrometers) in a bend region (e.g., central portion) of the foldable apparatus to provide low effective bend radii (e.g., about 10 mm or less, about 9 mm or less, about 8 mm or less, about 7 mm or less, about 6 mm or less, about 5 mm or less, about 4 mm or less, about 3 mm or less, about 2 mm or less, or about 1 mm).

In some embodiments, the foldable substrate can comprise a first transition portion attaching the central portion to the first portion and/or a second transition region attaching the central portion to the second portion. Providing transition regions with continuously increasing thicknesses can reduce stress concentration in the transition regions and/or avoid optical distortions. Providing a sufficient length of the transition region(s) (e.g., about 1 mm or more) can avoid optical distortions that may otherwise exist from an abrupt stepped changed in thickness of the foldable substrate. Providing a sufficiently small length of the transition regions (e.g., about 5 mm or less) reduce the amount of the foldable substrate having an intermediate thickness that may have reduced impact resistance and/or reduced puncture resistance.

Providing a first portion and/or a second portion comprising an average concentration of one or more alkali metal that is close to (e.g., within 100 parts per million, 10 parts per million on an oxide basis) a concentration of one or more alkali metal of the central portion can minimize differences in expansion of the first portion and/or the second portion compared to the central portion as a result of chemically strengthening. Substantially uniform expansion can decrease the incidence of mechanical deformation and/or mechanical instability as a result of the chemically strengthening. Providing a ratio of a depth of layer to a thickness of the first portion and/or the second portion that is close to (e.g., within 0.1%, within 0.01%) a corresponding ratio of the central portion can minimize differences in near-surface expansion of the first portion and/or the second portion compared to the central portion as a result of chemically strengthening. Minimizing differences in near-surface expansion can reduce stresses and/or strains in a plane of the first major surface, second major surface, first central surface area, and/or the second central surface area, which can further reduce the incidence of mechanical deformation and/or mechanical instability as a result of the chemically strengthening. Providing a ratio of a depth of compression to a thickness of the first portion and/or the second portion that is close to (e.g., within 1%, within 0.1%) a corresponding ratio of the central portion can minimize differences between chemically strengthening-induced strains in the first portion and/or the second portion relative to the central portion. Minimizing differences in chemically strengthening-induced strains can reduce the incidence of mechanical deformation and/or mechanical instability as a result of the chemically strengthening. Minimizing stresses and/or strains on the first major surface, second major surface, first central surface area, and/or the second central surface area can reduce stress-induced optical distortions. Also, minimizing such stresses can increase puncture and/or impact resistance. Also, minimizing such stresses can be associated with low difference in optical retardation along a centerline (e.g., about 2 nanometers or less). Further, minimizing such stresses can reduce the incidence of mechanical deformation and/or mechanical instability as a result of the chemically strengthening.

Providing a central maximum tensile stress of a central tensile stress region of the central portion that is greater than a first maximum tensile stress of the first tensile stress region of the first portion and/or a second maximum tensile stress region of a second tensile stress region of the second portion can provide low energy fractures from impacts in the first portion and/or the second portion while providing good folding performance. In some embodiments, low energy fractures may be the result of the reduced thickness of the central portion, which stores less energy for a given maximum tensile stress than a thicker glass portion would. In some embodiments, low energy fractures may be result of fractures in the first portion and/or the second portion located away from the central portion undergoing the bend, where the first portion and/or the second portion comprise lower maximum tensile stresses than the central portion. Further, in some embodiments, providing a substantially uniform depth of compression associated with compressive stress regions of the foldable substrate can simplify the making of the article by avoiding the use of masking or other method for non-uniform ion exchange.

Providing a neutral stress configuration when the foldable apparatus is in a bent configuration, the force to bend the foldable apparatus to a predetermined parallel plate distance can be decreased. Further, providing a neutral stress configuration when the foldable apparatus is in a bent state can reduce the maximum stress and/or strain experienced by the foldable substrate, an adhesive layer, and/or a polymer-based portion during normal use conditions, which can, for example, enable increased durability and/or reduced fatigue of the foldable apparatus. In some embodiments, the polymer-based portion can comprise a low (e.g., negative) coefficient of thermal expansion, which can mitigate warp caused by volume changes during curing of the polymer-based portion. In some embodiments, the neutral stress configuration can be generated by providing a polymer-based portion that expands as a result of curing. In some embodiments, the neutral stress configuration can be generated by curing the polymer-based portion in a bent configuration. In some embodiments, the neutral stress configuration can be generated by bending a foldable substrate at an elevated temperature (e.g., when the foldable substrate comprises a viscosity in a range from about $10^4$ Pascal-seconds to about $10^7$ Pascal-seconds).

Methods of the disclosure can enable making foldable substrates comprising one or more of the above-mentioned benefits. For example, disposing a diffusion barrier over a first central surface area and/or a second central surface area can adjust a rate of chemically strengthening of the central portion relative to the first portion and/or the second portion. For example, disposing an alkali metal ion-containing paste over a surface area of the first portion and/or the second portion can enable the above benefits by facilitating balancing one or more of the above ratios and/or concentrations of the central portion relative to the first portion and/or the second portion. In some embodiments, the foldable substrate can undergo further chemically strengthening to achieve greater compressive stresses without encountering mechanical deformation and/or mechanical instability, and the greater compressive stresses can further increase the impact and/or puncture resistance of the foldable substrate. Further, methods of embodiments of the disclosure can achieve the above-mentioned benefits in a single chemically strengthening step (e.g., heating an alkali ion-containing paste, immersing the foldable substrate in an alkali ion-containing solution), which can reduce time, equipment, space, and labor costs associated with producing a foldable substrate.

For example, a diffusion barrier disposed over both surfaces of the central portion can comprise a thickness that can produce a foldable substrate after a single chemically strengthening step. For example, a different alkali metal ion-containing paste can be applied to the central portion than the alkali metal ion-containing paste applied to the first portion and/or the second portion to produce a foldable substrate after a single chemically strengthening step. In some embodiments, a concentration of one or more alkali metal ions can be greater in the alkali metal ion-containing paste applied to the first portion and/or the second portion than in the different alkali metal containing paste applied to the central portion. In some embodiments, the different alkali metal containing paste applied to the central portion can comprise one or more alkali earth metal ions that can reduce the rate of chemically strengthening the central portion.

Directional terms as used herein—for example, up, down, right, left, front, back, top, bottom—are made only with reference to the figures as drawn and are not intended to imply absolute orientation.

It will be appreciated that the various disclosed embodiments may involve features, elements, or steps that are described in connection with that embodiment. It will also be appreciated that a feature, element, or step, although described in relation to one embodiment, may be interchanged or combined with alternate embodiments in various non-illustrated combinations or permutations.

It is also to be understood that, as used herein the terms "the," "a," or "an," mean "at least one," and should not be limited to "only one" unless explicitly indicated to the contrary. For example, reference to "a component" comprises embodiments having two or more such components unless the context clearly indicates otherwise. Likewise, a "plurality" is intended to denote "more than one."

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. Ranges can be expressed herein as from "about" one particular value, and/or to "about" another particular value. When such a range is expressed, embodiments include from the one particular value and/or to the other particular value. Similarly, when values are expressed as approximations, by use of the antecedent "about," it will be understood that the particular value forms another embodiment. Whether or not a numerical value or endpoint of a range in the specification recites "about," the numerical value or endpoint of a range is intended to include two embodiments: one modified by "about," and one not modified by "about." It will be further understood that the endpoints of each of the ranges are significant both in relation to the other endpoint and independently of the other endpoint.

The terms "substantial," "substantially," and variations thereof as used herein are intended to note that a described feature is equal or approximately equal to a value or description. For example, a "substantially planar" surface is intended to denote a surface that is planar or approximately planar. Moreover, as defined above, "substantially similar" is intended to denote that two values are equal or approximately equal. In some embodiments, "substantially similar" may denote values within about 10% of each other, for example, within about 5% of each other, or within about 2% of each other.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

While various features, elements or steps of particular embodiments may be disclosed using the transitional phrase "comprising," it is to be understood that alternative embodiments, including those that may be described using the transitional phrases "consisting" or "consisting essentially of," are implied. Thus, for example, implied alternative embodiments to an apparatus that comprises A+B+C include embodiments where an apparatus consists of A+B+C and embodiments where an apparatus consists essentially of A+B+C. As used herein, the terms "comprising" and "including", and variations thereof shall be construed as synonymous and open-ended unless otherwise indicated.

The above embodiments, and the features of those embodiments, are exemplary and can be provided alone or in any combination with any one or more features of other embodiments provided herein without departing from the scope of the disclosure.

It will be apparent to those skilled in the art that various modifications and variations can be made to the present disclosure without departing from the spirit and scope of the disclosure. Thus, it is intended that the present disclosure cover the modifications and variations of the embodiments herein provided they come within the scope of the appended claims and their equivalents.

What is claimed:

1. A foldable apparatus comprising a foldable substrate foldable about an axis extending in a direction of a width of the foldable substrate, the foldable substrate further comprising:
   a substrate thickness defined between a first major surface and a second major surface opposite the first major surface, wherein the foldable substrate is formed of an amorphous glass material;
   a first portion comprising the substrate thickness and a first surface area of the first major surface;
   a second portion comprising the substrate thickness and a third surface area of the first major surface; and
   a central portion comprising a central thickness defined between a first central surface area and the second major surface opposite the first central surface area, the first central surface area attaching the first surface area to the third surface area, a width of the central portion, extending from the first portion to the second portion, is about 45 millimeters or less, and the central thickness is less than the substrate thickness,
   wherein the central portion is positioned between the first portion and the second portion in a direction of a length of the foldable substrate that is perpendicular to the direction of the width of the foldable substrate, and the foldable apparatus comprises a neutral stress configuration when the foldable apparatus is in a bent configuration, wherein:
   the foldable substrate of the foldable apparatus comprises an effective minimum bend radius in a range from about 1 millimeter to about 10 millimeters,
   the width of the central portion is in a range from about 2.8 times the effective minimum bend radius to about 6 times the effective minimum bend radius, the substrate thickness is in a range from about 125 micrometers to about 200 micrometers, the central thickness is in a range from about 10 micrometers to about 40 micrometers, and the substrate is chemically strengthened so that the first portion and the second portion each comprise a maximum tensile stress of about 100 MPa or less.

2. The foldable apparatus of claim 1, wherein the foldable apparatus comprises a polymer-based portion positioned in a recess defined between the first central surface area of the central portion and a first plane that the first major surface extends along, and a movement of the foldable apparatus from a flat configuration to the neutral stress configuration corresponds to a maximum magnitude of a deviatoric strain of the polymer-based portion in a range from about 1% to about 8%.

3. The foldable apparatus of claim 2, wherein the maximum magnitude of the deviatoric strain is in a range from about 2% to about 6%.

4. The foldable apparatus of claim 1, wherein the foldable substrate achieves an effective bend radius of 5 millimeters.

5. The foldable apparatus of claim 1, wherein the width of the central portion is in a range from about 2.8 millimeters to about 40 millimeters.

6. The foldable apparatus of claim 1, wherein the central thickness is in a range from about 0.5% to about 13% of the substrate thickness.

7. The foldable apparatus of claim 1, wherein the substrate thickness is at least 71 micrometers greater than about 4 times the central thickness.

8. A method of making a foldable apparatus comprising:

forming a recess in a first major surface of a foldable substrate that forms a first central surface area of a central portion attaching a first portion to a second portion, wherein the first portion comprises a first surface area and a second surface area opposite the first surface area, the second portion comprises a third surface area and a fourth surface area opposite the third surface area, the foldable substrate comprises a second major surface comprising the second surface area and the fourth surface area, and the foldable substrate comprises a first major surface opposite the second major surface, the first major surface comprising the first surface area and the third surface area; and curing a polymer-based portion disposed between the first portion and the second portion, wherein the foldable apparatus is in a bent configuration during the curing, wherein a movement of the foldable apparatus from a flat configuration to a neutral stress configuration corresponds to a maximum magnitude of a deviatoric strain of the polymer-based portion in a range from about 1% to about 8%, and the foldable apparatus comprise the foldable apparatus of claim 1.

9. The method of claim 8, further comprising chemically strengthening the first central surface area of the central portion, the first surface area, the third surface area, and the second major surface.

10. The method of claim 8, wherein the maximum magnitude of the deviatoric strain is in a range from about 2% to about 6%.

11. The method of claim 8, wherein the polymer-based portion expands as a result of curing.

12. The method of claim 8, wherein the polymer-based portion comprises a negative coefficient of thermal expansion.

13. The method of claim 12, wherein the polymer-based portion comprises particles of one or more of copper oxide, beta-quartz, a tungstate, a vanadate, a pyrophosphate, or a nickel-titanium alloy.

14. The method of claim 8, wherein curing the polymer-based portion comprises a ring-opening metathesis polymerization.

* * * * *